(12) United States Patent
Shore

(10) Patent No.: US 8,706,627 B2
(45) Date of Patent: Apr. 22, 2014

(54) APPARATUS, SYSTEMS AND METHODS FOR WIRELESSLY TRANSACTING FINANCIAL TRANSFERS, ELECTRONICALLY RECORDABLE AUTHORIZATION TRANSFERS, AND OTHER INFORMATION TRANSFERS

(76) Inventor: Jon Shore, Evergreen, CO (US)

( * ) Notice: Subject to any disclaimer, the term of this patent is extended or adjusted under 35 U.S.C. 154(b) by 1974 days.

(21) Appl. No.: 10/203,502

(22) PCT Filed: Feb. 9, 2001

(86) PCT No.: PCT/US01/04258
§ 371 (c)(1),
(2), (4) Date: Aug. 9, 2002

(87) PCT Pub. No.: WO01/59732
PCT Pub. Date: Aug. 16, 2001

(65) Prior Publication Data
US 2003/0149662 A1 Aug. 7, 2003

Related U.S. Application Data

(60) Provisional application No. 60/181,600, filed on Feb. 10, 2000, provisional application No. 60/187,924, filed on Mar. 8, 2000, provisional application No. 60/255,980, filed on Dec. 15, 2000.

(51) Int. Cl.
*G06Q 40/00* (2012.01)

(52) U.S. Cl.
USPC .............................................. 705/41; 705/67

(58) Field of Classification Search
USPC ................................ 705/39, 41, 14.38, 65, 67
See application file for complete search history.

(56) References Cited

U.S. PATENT DOCUMENTS 4,949,256 A   8/1990 Humble
5,590,038 A   12/1996 Pitroda
(Continued)

FOREIGN PATENT DOCUMENTS

JP   07-168930   7/1995
JP   1997305832   11/1997
(Continued)

OTHER PUBLICATIONS

Beat F. Schmid, Markus A. Lindemann, "Elements of a Reference Model for Electronic Markets," hicss,pp. 0193, Thirty-First Annual Hawaii International Conference on System Sciences-vol. 4, 1998, avalaible online @ http://www2.computer.org/portal/web/csdl/doi/10.1109/HICSS.1998.655275, last accessed Feb. 1, 2009.*

(Continued)

*Primary Examiner* — Behrang Badii
*Assistant Examiner* — Daniel L Greene
(74) *Attorney, Agent, or Firm* — Khorsandi Patent Law Group, A Law Corporation; Marilyn R. Khorsandi

(57) ABSTRACT

The present invention provides apparatus, systems and methods to wirelessly pay for purchases, electronically interface with financial accounting systems, and electronically record and wirelessly communicate authorization transactions using Personal Digital Assistant ("PDA")(also referred to as Personal Intelligent Communicators (PICs), and Personal Communicators), palm computers, intelligent handheld cellular and other wireless telephones, and other personal handheld electronic devices configured with infrared or other short range data communications (for referential simplicity, such devices are referred to herein as "PDA's"). The present invention further provides apparatus, firmware, software programs and computer-implemented methods for making service and/or sale service charge payments for credit card charges, debit card charges, electronic cash transfers, ticket and other like financial transactions and for other types of transactions, such as for electronic coupons, where the amount of the transaction is for a small amount of money, such as, for example, less than $5.00.

16 Claims, 70 Drawing Sheets

(56) References Cited

U.S. PATENT DOCUMENTS

| | | | |
|---|---|---|---|
| 5,613,012 A * | 3/1997 | Hoffman et al. | 382/115 |
| 5,794,210 A | 8/1998 | Goldhaber | |
| 5,805,719 A * | 9/1998 | Pare et al. | 382/115 |
| 5,822,735 A | 10/1998 | De Lapa et al. | |
| 5,850,442 A * | 12/1998 | Muftic | 705/65 |
| 5,884,271 A | 3/1999 | Pitroda | |
| 5,892,900 A * | 4/1999 | Ginter et al. | 726/26 |
| 5,903,830 A | 5/1999 | Joao et al. | |
| 5,917,913 A | 6/1999 | Wang | |
| 6,015,344 A | 1/2000 | Kelly et al. | |
| 6,016,476 A | 1/2000 | Maes et al. | |
| 6,044,349 A * | 3/2000 | Tolopka et al. | 705/1.1 |
| 6,587,835 B1 | 7/2003 | Treyz et al. | |
| 7,096,003 B2 | 8/2006 | Joao et al. | |
| 7,451,114 B1 | 11/2008 | Matsuda et al. | |
| 2001/0042014 A1 | 11/2001 | Lowry et al. | |
| 2001/0051894 A1 | 12/2001 | Delapa | |
| 2002/0004746 A1 | 1/2002 | Ferber et al. | |
| 2002/0038456 A1 | 3/2002 | Hansen et al. | |
| 2002/0059100 A1 | 5/2002 | Shore | |
| 2002/0128903 A1 | 9/2002 | Kernahan | |
| 2003/0135853 A1 | 7/2003 | Goldman et al. | |
| 2003/0163373 A1 | 8/2003 | Cornateanu | |
| 2003/0165128 A1 | 9/2003 | Sisodia et al. | |
| 2003/0167202 A1 | 9/2003 | Marks et al. | |
| 2003/0212759 A1 | 11/2003 | Wu | |
| 2005/0001711 A1 | 1/2005 | Doughty et al. | |
| 2009/0125429 A1 | 5/2009 | Takayama | |

FOREIGN PATENT DOCUMENTS

| | | |
|---|---|---|
| JP | 3051748 U | 6/1998 |
| JP | 10-269291 | 10/1998 |
| JP | 11-232348 | 8/1999 |
| WO | 96/13814 A1 | 5/1996 |
| WO | 96/25828 A1 | 8/1996 |
| WO | WO 97/45814 | 12/1997 |
| WO | 9900773 | 1/1999 |
| WO | 9908238 | 2/1999 |
| WO | 9909502 | 2/1999 |
| WO | 9931630 | 6/1999 |

OTHER PUBLICATIONS

United States Patent Office: Office Action dated Aug. 20, 2008 for Jon Shore; Apparatus, Systems and Methods for Customer Specific Receipt; U.S. Appl. No. 09/960,899, filed Sep. 21, 2001.
United States Patent Office: Office Action dated Oct. 4, 2005 for Jon Shore; Apparatus, Systems and Methods for Customer Specific Receipt Advertising; U.S. Appl. No. 09/960,899, filed Aug. 9, 2002.
United States Patent Office: Office Action dated Mar. 10, 2006 for Jon Shore; Apparatus, Systems and Methods for Customer Specific Receipt Advertising; U.S. Appl. No. 09/960,899, filed Aug. 9, 2002.
United States Patent Office: Office Action dated Sep. 6, 2006 for Jon Shore; Apparatus, Systems and Methods for Customer Specific Receipt Advertising; U.S. Appl. No. 09/960,899, filed Sep. 21, 2001.
United States Patent Office: Office Action dated Mar. 7, 2007 for Jon Shore; Apparatus, Systems and Methods for Customer Specific Receipt Advertising; U.S. Appl. No. 09/960,899, filed Aug. 9, 2002.
United States Patent Office: Office Action dated Aug. 23, 2007 for Jon Shore; Apparatus, Systems and Methods for Customer Specific Receipt Advertising; U.S. Appl. No. 09/960,899, filed Aug. 9, 2002.
United States Patent Office: Office Action dated Feb. 19, 2008 for Jon Shore; Apparatus, Systems and Methods for Customer Specific Receipt Advertising; U.S. Appl. No. 09/960,899, filed Aug. 9, 2002.
"Coca-Cola Co. Secures Patent for M-Commerce in the U.S.; Vending Market Watch", Gale Group, Inc. ©2005 Cygnus Business Media, No. 3, vol. 47; p. 10, Issn: 1061-1797, Dated Mar. 1, 2005.
Ex parte Christian-Friedrich Von Brockdorff, United States Patent and Trademark Office Board of Patent Appeals and Interferences; Opinion in Support of Decision of Appeal No. 2003-2102, U.S. Appl. No. 09/254,723; Heard Mar. 18, 2004.
Japan Patent Office, Office Action for Japan Patent Application No. 2001-558974, mailing date Jun. 8, 2010, 11 pages (English translation copy pp. 1-6; Japanese original copy pp. 7-11).
Office Action for U.S. Appl. No. 09/960,899, dated May 11, 2010, pp. 1-12, USPTO.
Office Action for Japan Patent Application No. 2001-558974, mailing date Feb. 9, 2011, 7 pages (English translation copy pp. 1-4; Japanese original copy pp. 5-7).
Office Action for U.S. Appl. No. 09/960,899, mailing date Mar. 17, 2009, 10 pages.
Office Action for U.S. Appl. No. 09/960,899, mailing date Sep. 2, 2009, 11 pages.
European Patent Office Examiner Peller, I., Summons to attend oral proceedings pursuant to Rule 115(1) EPC, dated Aug. 2, 2011, regarding EP Application No. 01910508.9, 7 pages.
Uchida, Kaoru and Mizoguchi, Massanori, "Fingerprint-Based User Indentification Using a Handy Mobile Terminal for Authentication and Enhanced User Interface", The Institute of Electronics, Information and Communication Engineers, Technical Report of IEICE PRMU99-21, Jun. 17, 1999, vol. 99, Issue 118, cited quotation of English Translastion of the Abstract only, 1 page.
Japan Patent Office, Office Action for Japan Patent Application No. 2011-172456, mailing date Dec. 14, 2011, 4 pages (English translation copy).

* cited by examiner

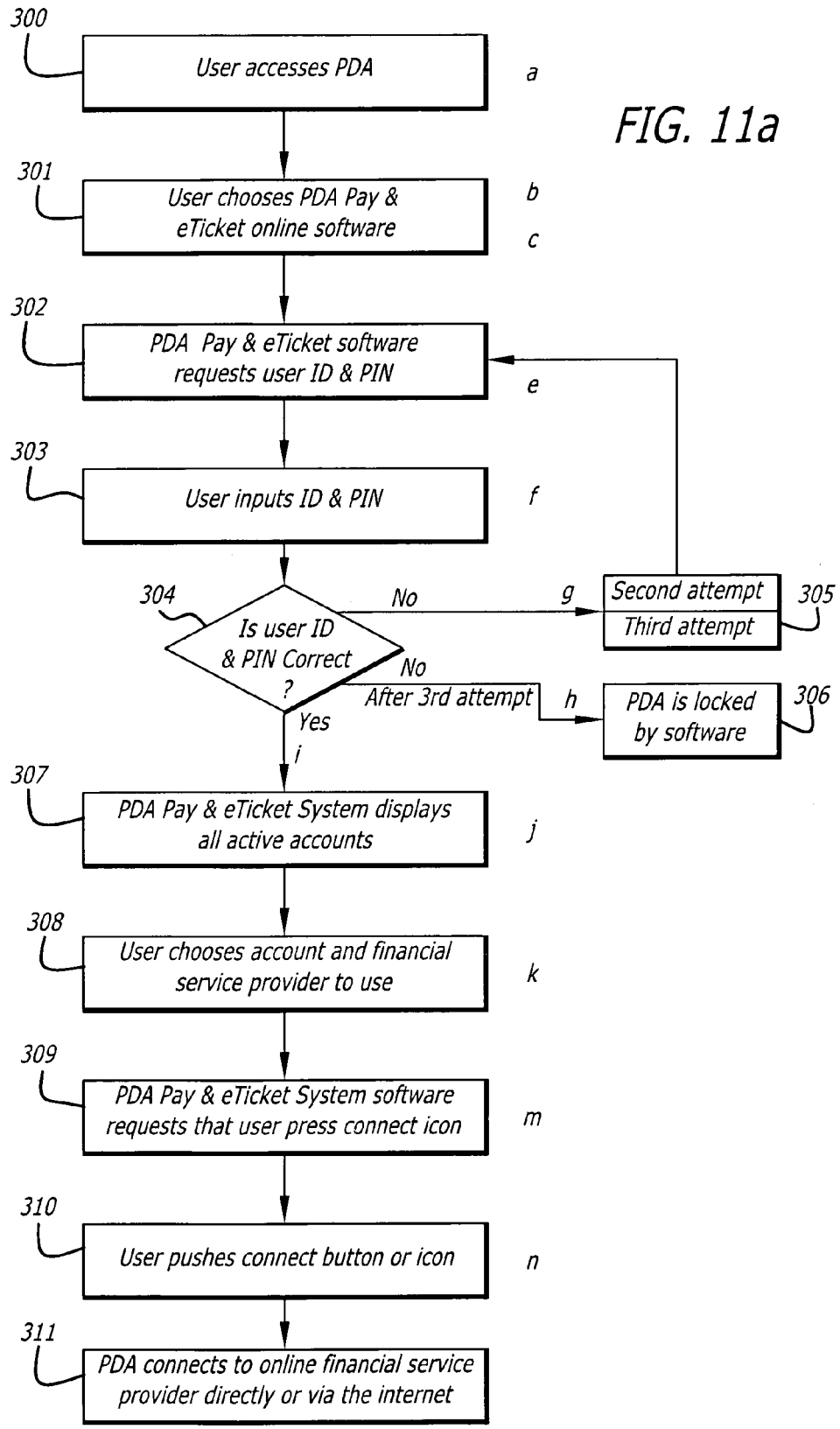

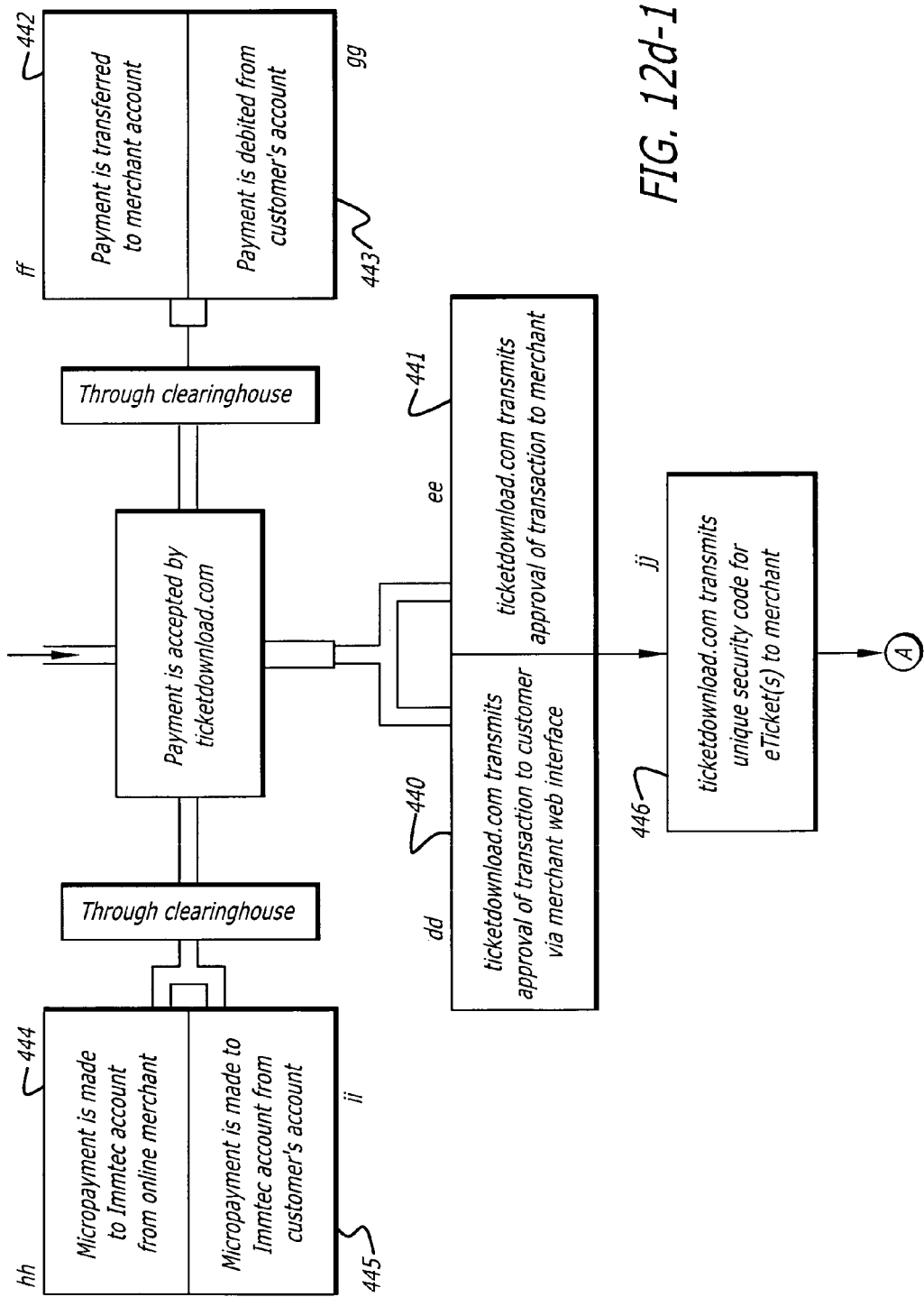

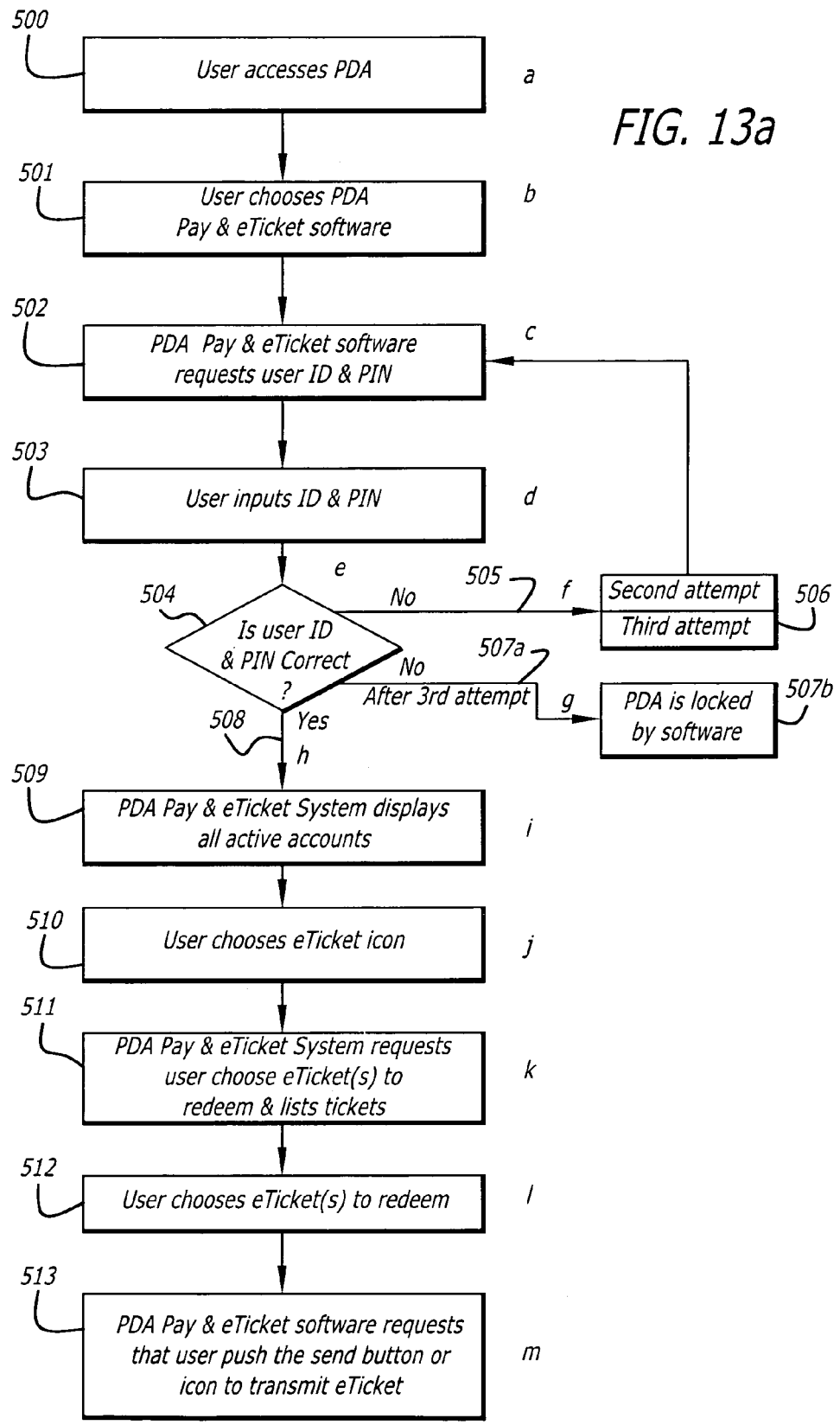

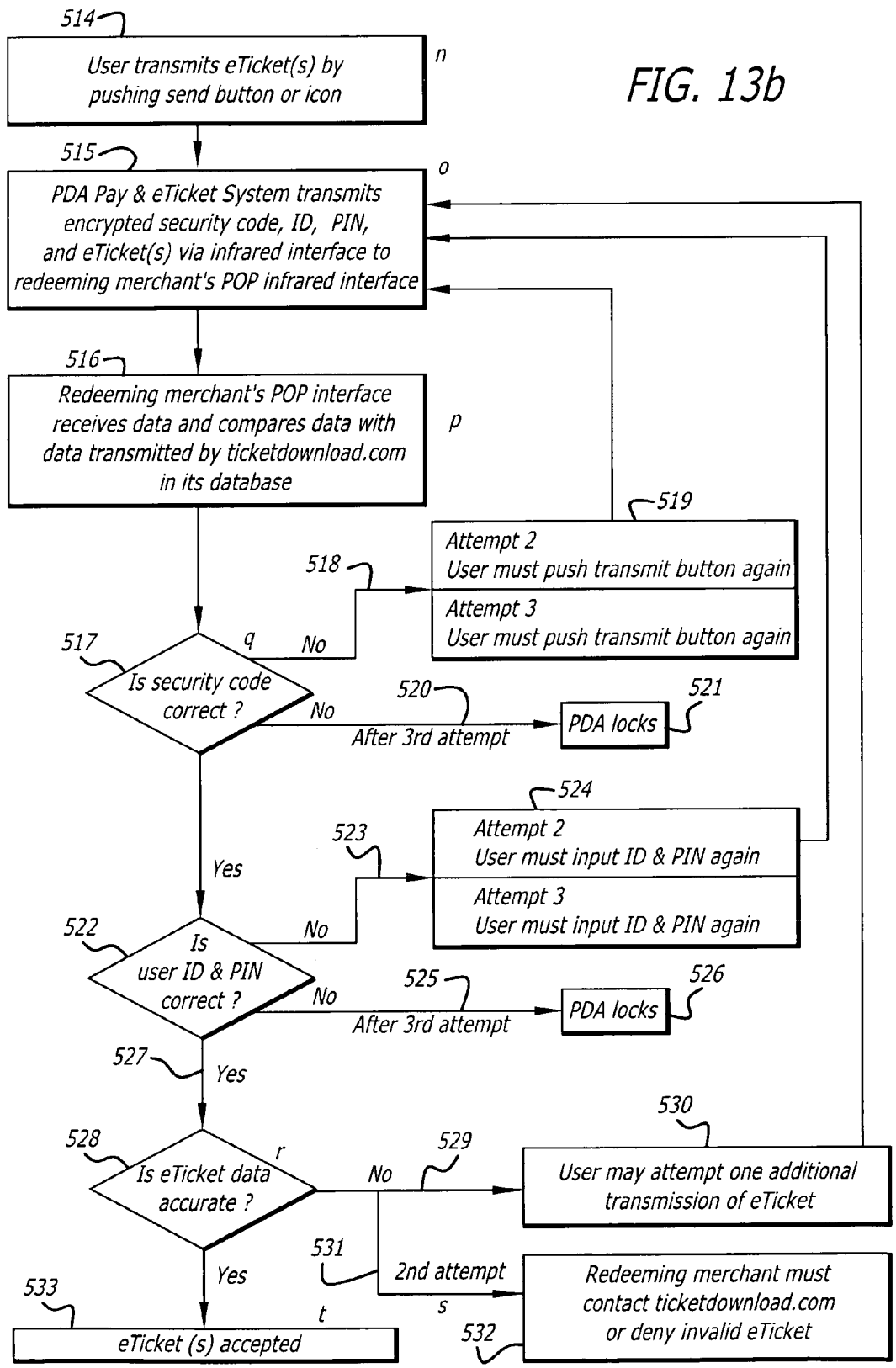

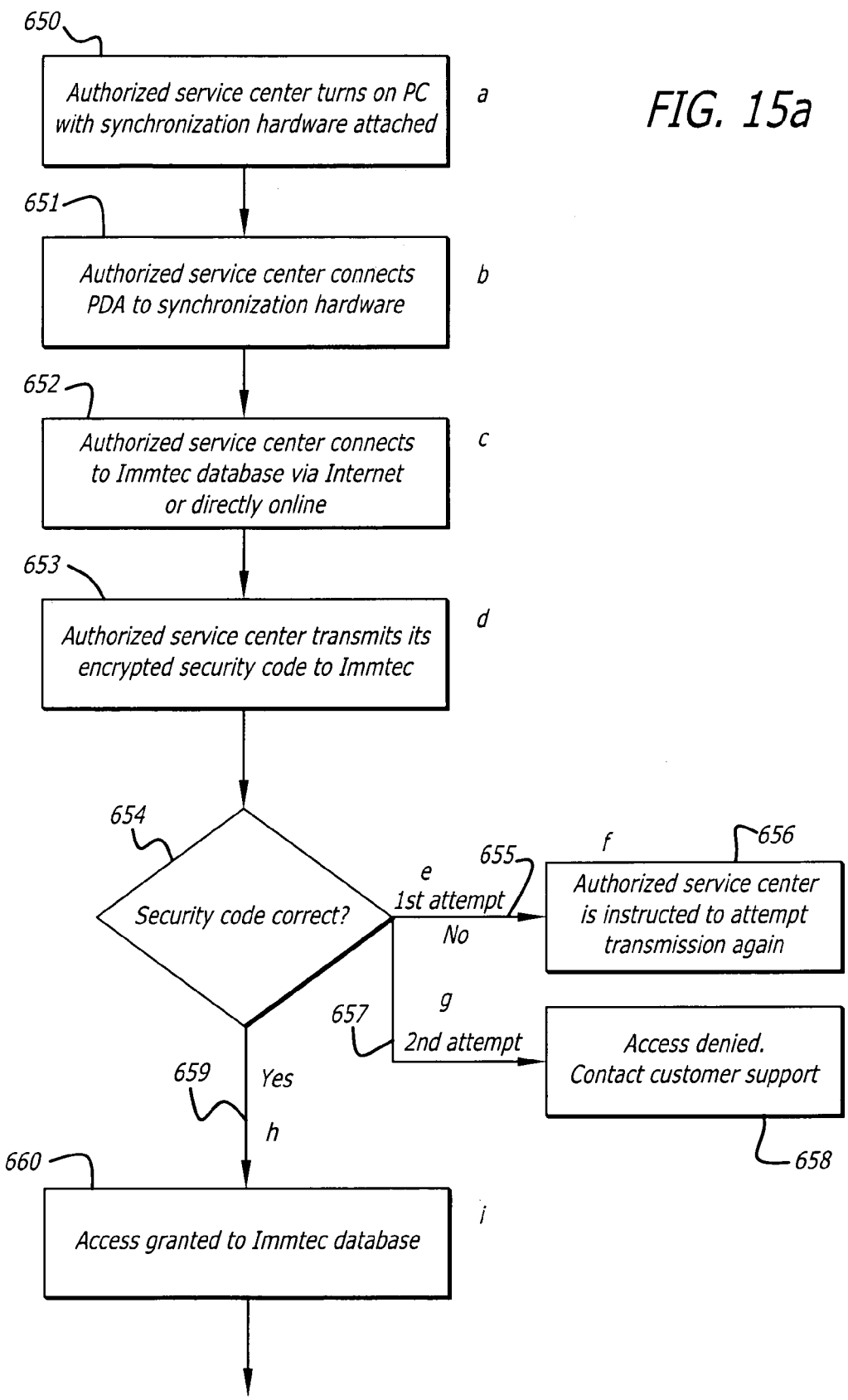

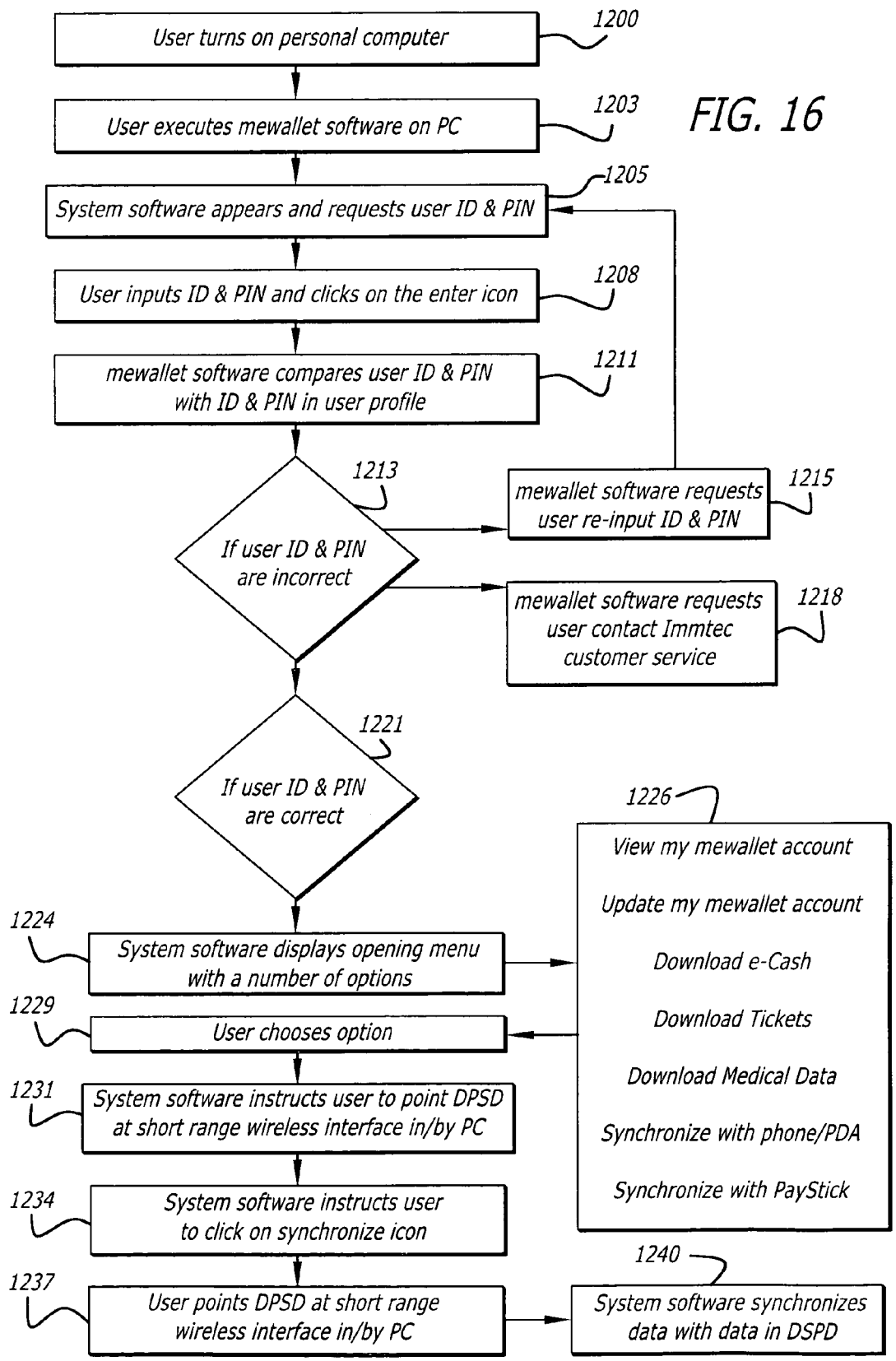

| Part | Value | Package | Library | Position (mil) | Orientation |
|---|---|---|---|---|---|
| B1 | CR2032PY | CR2032PY | BATTERY | (450 900) | R0 |
| BATT+ | + | 1X01 | PINHEAD | (225 150) | R0 |
| BATT- | - | 1X01 | PINHEAD | (525 150) | R0 |
| BU1 | FH12-10 | FH12 | 0Tester | (1350 2050) | R180 |
| C1 | 15p | 0805 | 0Tester | (1525 2550) | R270 |
| C2 | 4,7u | 1206 | 0Tester | (1400 3100) | R0 |
| C3 | WITT-10U | WITT-10U | 0Tester | (1150 -200) | R0 |
| C4 | WITT-10U | WITT-10U | 0Tester | (1850 150) | R180 |
| C5 | 100n | 0805 | 0Tester | (600 -200) | R0 |
| C6 | 100n | 0805 | 0Tester | (250 700) | MR180 |
| C7 | 100n | 0805 | 0Tester | (800 800) | MR90 |
| C8 | 100n | 0805 | 0Tester | (2150 2150) | R180 |
| C9 | 100n | 0805 | 0Tester | (2150 2650) | R180 |
| C10 | 100n | 0805 | 0Tester | (1000 1950) | R180 |
| C12 | 100n | 0805 | 0Tester | (1400 3000) | R0 |
| C15 | 100n | 0805 | 0Tester | (1675 2475) | R180 |
| C16 | 15p | 0805 | 0Tester | (1525 2750) | R90 |
| C17 | 0.1u | 1206 | 0Tester | (1700 3000) | R180 |
| D4 | BAS16 | SOT-23 | 0Tester | (650 750) | MR90 |
| IC1 | 74HCT08 | SO14 | 74XXSMD | (2250 2375) | R90 |
| IC6 | 74HCT02 | SO14 | 74XXSMD | (2225 2900) | R90 |
| JP1 | PINHD-1X1 | 1X01 | PINHEAD | (1050 150) | R0 |
| JP2 | PINHD-1X1 | 1X01 | PINHEAD | (1250 150) | R0 |
| JP3 | PINHD-1X1 | 1X01 | PINHEAD | (2250 150) | R0 |
| JP4 | PINHD-1X1 | 1X01 | PINHEAD | (2450 150) | R0 |
| LCD1 | LM1140TE | LM1140TE | 0Tester | (575 2550) | R0 |
| Q1 | PHYUM-DS | PHYMICRO | 0Tester | (1375 700) | R90 |
| Q2 | BSP-315 | SOT-223 | 0Tester | (350 1000) | MR270 |
| Q3 | TFDU | BABYFACE | 0Tester | (1525 3275) | R180 |
| Q4 | L4931CD50 | SO-8 | 0Tester | (850 -200) | R0 |
| Q6 | HSDL7001 | SO16 | 0Tester | (1775 2725) | R90 |
| Q7 | 3.6864MHz | SXA | QUARTZ | (1125 2650) | R180 |
| R1 | 10M | 0805 | 0Tester | (1425 2650) | R270 |
| R2 | 10K | 0805 | 0Tester | (2050 150) | R270 |
| R3 | 10K | 0805 | 0Tester | (1700 3100) | R0 |
| R4 | 33R | 1206 | 0Tester | (1900 3200) | R180 |
| R5 | TRIMMER | TRIMMER | 0Tester | (1000 2350) | R90 |
| R6 | 4,7K | 0805 | 0Tester | (1000 2175) | R0 |
| R7 | 220K | 0805 | 0Tester | (625 1050) | MR270 |
| R8 | 100K | 0805 | 0Tester | (700 1050) | MR90 |
| R9 | 220K | 0805 | 0Tester | (250 800) | MR0 |
| R10 | 100K | 0805 | 0Tester | (250 600) | MR180 |
| R11 | 10K | 0805 | 0Tester | (650 600) | MR180 |
| R12 | 5,6K | 0805 | 0Tester | (1700 1850) | MR180 |
| R13 | 10K | 0805 | 0Tester | (1700 1950) | MR180 |
| R14 | 10K | 0805 | 0Tester | (1500 2050) | MR270 |
| R15 | 10K | 0805 | 0Tester | (1350 2250) | MR90 |
| R16 | 5,6K | 0805 | 0Tester | (1700 2150) | MR180 |
| R17 | 10K | 0805 | 0Tester | (1700 2050) | MR0 |
| R18 | 10K | 0805 | 0Tester | (2650 175) | R270 |
| R20 | 10K | 0805 | 0Tester | (2550 1450) | MR180 |
| R21 | 33R | 1206 | 0Tester | (1900 3300) | R180 |
| T1 | BC846 | SOT-23 | 0Tester | (650 900) | MR270 |
| T2 | BSN-20 | SOT-23 | 0Tester | (1350 2050) | MR180 |
| T3 | BSN-20 | SOT-23 | 0Tester | (1500 2250) | MR0 |

FIG. 20d

Bill of Material / BOM

| Designator | Manufacturer / Distributor | Article number for orders | Numb. of Pieces | |
|---|---|---|---|---|
| Connector FH12 Serie für 0,5mm Flex Kabel | Hirose Corporation | FH12-10S-0,5SH | 1 | |
| 0,5mm Pitch Flex Kabel | Parlex Corporation | 0.5MM-10-2-B | 1 | ca. 10cm in length |
| Batterie | Phytec | | 1 | Backup batterie for RAM |
| C 15p | RS | 741-183 | 2 | 0805 |
| C 0.1u | RS | 742-237 | 1 | |
| C 4.7u | RS | 262-4298 | 1 | B |
| C 10u 10v | RS | 262-4535 | 2 | A |
| C 100n | RS | 211-3811 | 10 | 0805 |
| D BAS16 | RS | 785-408 | 1 | Diode BAS16, SOT23 |
| 74HCT08 | RS | 301-375 | 1 | Standard Logic, 4 AND-Gates |
| 74HCT02 | RS | 633-903 | 1 | Standard Logic, 4 NOR-Gates |
| HSDL7001 | HP | | 1 | IR 3/16 Encode/Decode IC (IrDA) |
| Quartz | RS | 370-157 | 1 | 3.6864 MHz SMD |
| LCD12X2 | RS | | 1 | Alphanumeric LCD module ..x2 |
| Phytec Micro | Phytec | MM-203-CD | 1 | Microcontroller Module with Dallas 80C320, 32KB SRAM / 128KB Flash |
| BSP 315 FET P-Kanal | Schuricht | | 1 | 20V 1A SOT23 |
| L4931CD50 | SGS | | 1 | Low Drop Voltage Regulator, 5V 1A |
| R 2.2M | RS | 137-578 | 1 | 0805 |
| R10K | RS | 137-326 | 9 | 0805 |
| Trimmer 5K | RS | 177-087 | 1 | |
| R4,7K | RS | 137-281 | 1 | 0805 |
| R220K | RS | 790-359 | 2 | 0805 |
| R100K | RS | 790-315 | 2 | 0805 |
| R33R | RS | 169-020 | 2 | 1206 |
| R5.6K | RS | 790-163 | 2 | 0805 |
| BC846 | RS | 287-392 | 1 | |
| BSN20 | RS | 198-4246 | 2 | N-FET SOT23 |
| Tasten | RS | 183-701 | 2 | 1x Schließer |
| IRDA TFDU6102E | VISHAY | | 1 | Fast Infrared Transceiver Module (IRDA) |

Remarks:

- All parts beginning with "C" are capacitors
- All parts beginning with "R" are resistors
- All parts beginning with "B" are semiconductors of the classic transistor type

FIG. 20e

Stückliste

| Bezeichnung | Hersteller | Bestellnummer | Stück | |
|---|---|---|---|---|
| Connector FH12 Serie fur 0,5mm Flex Kabel | Hirose Electric | FH12-10S-0,5SH | 1 | |
| 0,5mm Pitch Flex Kabel | Parlex Corporation | 0.5MM-10-2-B | 1 | Länge ca. 10cm |
| Batterie | Phytec | | 1 | Stützbatterie RAM |
| C 15p | RS | 741-183 | 2 | 0805 |
| C 0.1u | RS | 742-237 | 1 | |
| C 4,7u | RS | 262-4298 | 1 | B |
| C 10u 10v | RS | 262-4535 | 2 | A |
| C 100n | RS | 211-3811 | 10 | 0805 |
| D BAS16 | RS | 785-408 | 1 | irgend eine Diode SOT23 |
| 74HCT08 | RS | 301-375 | 1 | SO14 |
| 74HCT02 | RS | 633-903 | 1 | |
| HSDL7001 | HP | | 1 | |
| Quartz | RS | 370-157 | 1 | 3.6864 MHz SMD |
| LCD12X2 | RS | | 1 | |
| Phytec Micro | Phytec | MM-203-CD | 1 | Dallas 80C320 |
| BSP 315 FET P-Kanal | Schuricht | | 1 | 20V 1A SOT23 |
| L4931CD50 | SGS | | 1 | LD-Spanngsregler 5V 1A |
| R 2.2M | RS | 137-578 | 1 | 0805 |
| R10K | RS | 137-326 | 9 | 0805 |
| Trimmer 5K | RS | 177-087 | 1 | |
| R4,7K | RS | 137-281 | 1 | 0805 |
| R220K | RS | 790-359 | 2 | 0805 |
| R100K | RS | 790-315 | 2 | 0805 |
| R33R | RS | 169-020 | 2 | 1206 |
| R5,6K | RS | 790-163 | 2 | 0805 |
| BC846 | RS | 287-392 | 1 | |
| BSN20 | RS | 198-4246 | 2 | N-FET SOT23 |
| Tasten | RS | 183-701 | 2 | Ix Schließer |
| IRDA TFDU6102E | VISHAY | | 1 | IRDA-Rx-Tx |

FIG. 20f

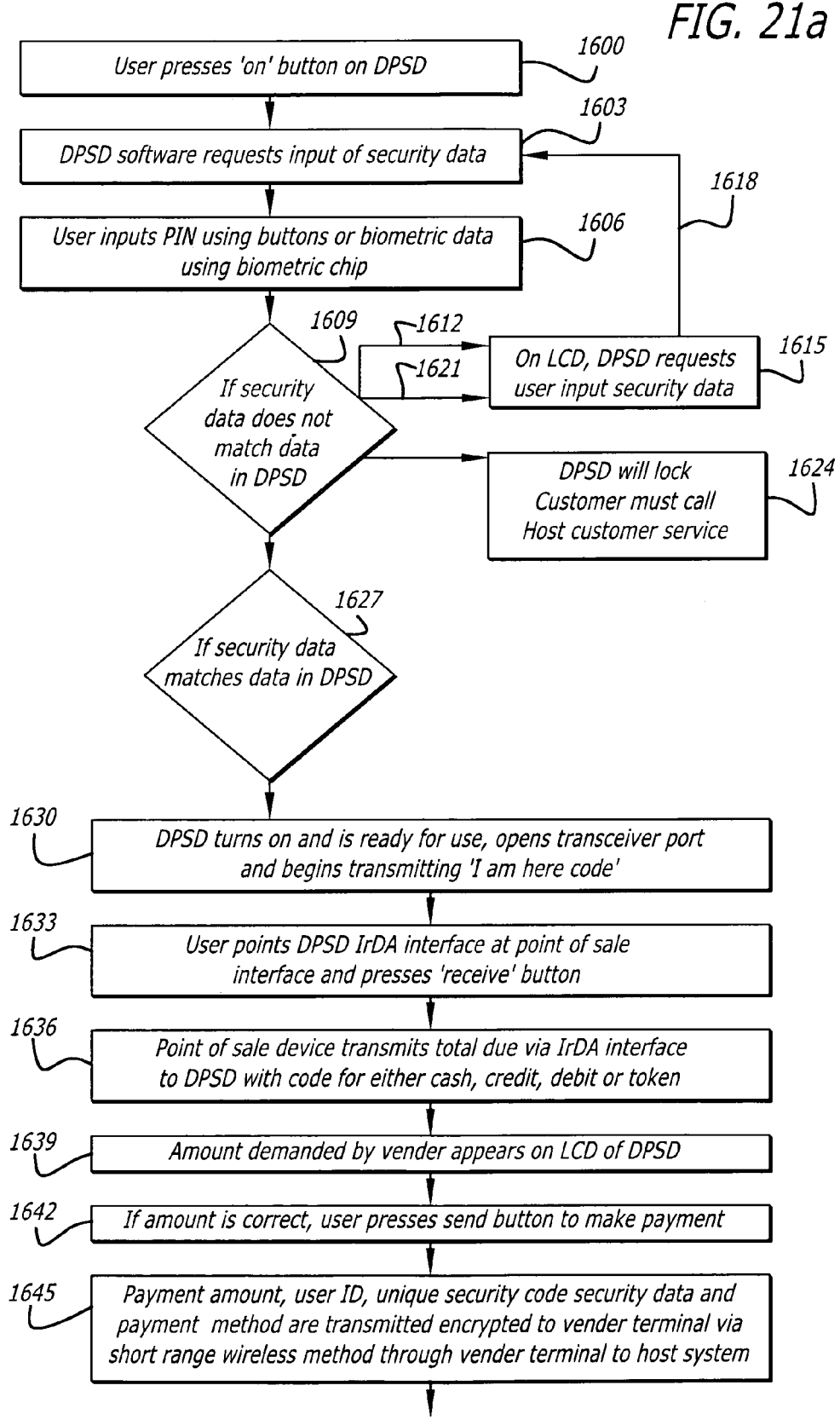

APPARATUS, SYSTEMS AND METHODS FOR WIRELESSLY TRANSACTING FINANCIAL TRANSFERS, ELECTRONICALLY RECORDABLE AUTHORIZATION TRANSFERS, AND OTHER INFORMATION TRANSFERS

CROSS-REFERENCE TO RELATED APPLICATIONS

This is a U.S. National Stage Application of International Application No. PCT/US01/04258, International Filing Date Feb. 9, 2001, which claims benefit of U.S. Provisional Patent Application, Ser. No. 60/181,600 filed Feb. 10, 2000; U.S. Provisional Patent Application, Ser. No. 60/187,924 filed Mar. 8, 2000; and U.S. Provisional Patent Application, Ser. No. 60/255,980 filed Dec. 15, 2000.

FIELD OF INVENTION

The present invention relates generally to point of sale financial transactions and more particularly to conducting point of sale transactions using a portable electronic device equipped with wireless communications capabilities.

BACKGROUND OF THE INVENTION

In the past, there have been, and continue to be, many traditional ways to pay for purchases, including cash, checks, credit cards, and debit cards. Traditional payment methods typically require the user to separately, manually update financial accounting records, such as making an entry for each check in the user's check book, or writing a check to pay for credit card bills.

More recently, online Internet payment systems have been developed to provide for payment of bills through online access to a centralized payment system. Some of these systems provide some level of integration with financial accounting systems. However, online Internet payment systems are limited in that the user can not take such a system to a store.

A way to pay for purchases is needed that is mobile, and that provides a user-friendly electronic interface with financial accounting systems.

Items that can be purchased include authorization transfers—tickets, for example. The purchase of various types of tickets is the purchase of the authorization to do something—to attend a movie, to take a particular airline flight, and the like. Traditionally, tickets were available in hardcopy paper form. More recently, many merchant services provide electronic ticketing. Traditional hardcopy tickets can be lost Electronic ticketing relies on the integrity of a particular merchant's system. A way to personally control electronic ticketing is needed.

In the past, bank charges and credit card processing charges for processing credit card charges, debit card charges, electronic transfers, and other like transactions have been for amounts that make processing transactions for smaller amounts such as amounts of less than five U.S. dollars $5.00 unattractive for merchants and infeasible for consumers. A way is needed to process small amount transactions and for charging a small fee that is more compatible with the amount of the transaction.

SUMMARY OF THE INVENTION

The disclosures of U.S. Provisional Patent Application, Ser. No. 60/181,600 filed Feb. 10, 2000, U.S. Provisional Patent Application, Ser. No. 60/187,924 filed Mar. 8, 2000, and U.S. Provisional Patent Application, Ser. No. 60/255,980 filed Dec. 15, 2000, are incorporated for all purposes herein by reference as if fully stated here.

The present invention would provide apparatus, systems and methods to wirelessly pay for purchases, electronically interface with financial accounting systems, and electronically record and wirelessly communicate authorization transactions using Personal Digital Assistant (PDA)(also referred to as Personal Intelligent Communicators (PICs), and Personal Communicators), palm computers, intelligent handheld cellular and other wireless telephones, and other personal handheld electronic devices configured with infrared, BLUETOOTH® (hereinafter sometimes also referred to as "Bluetooth"), Radio Frequency (RF), or other short range wireless data communications (for referential simplicity, such devices are referred to herein as "PDA's" and all short range wireless interfaces are referred to as "infrared"). PDAs are consumer electronic devices which may be configured and programmed to perform specific tasks such as acting like an electronic diary, carry-along personal database, personal communicator and the like.

The present invention would provide apparatus, firmware, software programs and computer-implemented methods for making service and/or sale service charge payments for credit card charges, debit card charges, electronic cash transfers, ticket and other like financial transactions where the amount of the transaction is for a small amount of money, such as, for example, less than $5.00. Someone with ordinary skill in the art will understand that the $5.00 amount used herein is exemplary and is not a limitation of the invention. The invention applies to foreign currencies and small monetary amounts in those currencies.

DESCRIPTION OF THE DRAWINGS

These and other features of the present invention are more fully set forth in the following description of exemplary embodiments of the invention. The description is presented with reference to the accompanying drawings in which:

FIGS. 11a-11d are high level functional flow diagrams depicting an exemplary embodiment of the online financial service provider interface with a Wireless-modem-equipped PDA and/or wireless phone;

FIGS. 12a-12d-2 (FIGS. 12d-1 and 12d-2 are referred to herein as "FIG. 12d") are high level functional flow diagrams depicting an exemplary embodiment of the ticketdownload.com licensed online merchants interface;

FIGS. 13a-13c are high level functional flow diagrams depicting an exemplary embodiment of the PDA eTicket redemption aspect of the invention;

FIGS. 15a-15c are high level functional flow diagrams depicting an exemplary embodiment of the PDA unlocking routine through an authorized service center;

FIG. 16 is a high level functional flow diagram depicting exemplary Personal Computer System interface processing with an exemplary Directed Purpose System device in an exemplary embodiment of the present invention;

FIGS. 18a-1 and 18a-2 (referred to herein as "FIG 18a") are high level functional flow diagrams depicting exemplary Personal Medical, Insurance and Emergency Data interface processing with an exemplary Directed Purpose System device in an exemplary embodiment of the present invention;

FIGS. 20b-1 and 20b-2 (referred to herein as "FIG. 20b") are schematic diagrams depicting exemplary components of an exemplary embodiment of a PayStick™ and exemplary connections between the exemplary components;

FIG. 20d is a parts list listing exemplary specifications for the exemplary components depicted in FIG. 20b.

FIGS. 20e and 20f are exemplary Bills of Material for the exemplary components depicted in FIG. 20a, FIG. 20e depicting English specifications and FIG. 20f depicting German specifications;

FIGS. 21a-21b are high level functional flow diagrams depicting exemplary transaction interface processing between an Electronic Currency enabled Directed Purpose System device and a point of sale terminal or electronic kiosk in an exemplary embodiment of the present invention

FIGS. 24-1 and 24-2 (referred to herein as "FIG. 24") are data relationship diagrams of exemplary data structures for data that would be maintained by the Server and/or the PDA/wireless/Directed Purpose devices;

FIGS. 29-1 and 29-2 (referred to herein as "FIG. 29") are high level simplified graphic representations of an exemplary relationship between some of the components of an exemplary embodiment of the present invention;

FACSIMILE REPRODUCTION OF COPYRIGHT MATERIAL

A portion of the disclosure of this patent document contains material, which is subject to copyright protection by Immtec, Inc. Immtec, Inc., the copyright owner, has no objection to the facsimile reproduction by anyone of the patent document or the patent disclosure, as it appears in the Patent and Trademark Office patent file or records, but otherwise reserves all copyright rights whatsoever.
Trademarks Immtec™, Microwallet™, mewallet™, CSRA™, Customer Specific Receipt Advertising™, and PayStick™ are trademarks of Immtec, Inc. The names of actual companies and products mentioned herein may be the trademarks of their respective owners.

DETAILED DESCRIPTION OF THE INVENTION

A. Overview of the Major Processes of the Invention

Figure 1A:
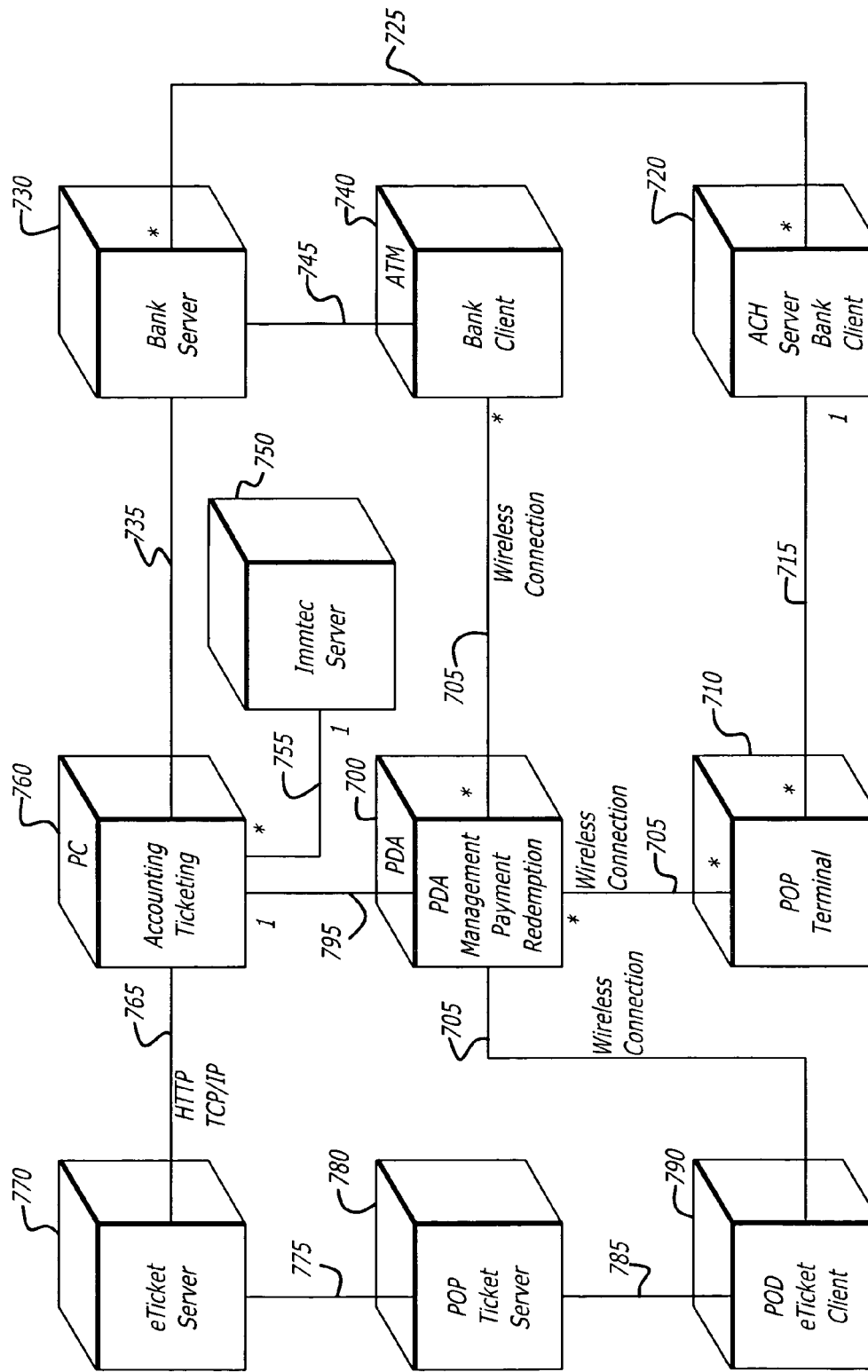
FIG. 1a is a Unified Modeling Language (UML) deployment diagram depicting exemplary relationships between the major networked nodes used by an exemplary embodiment of the present invention.
Figure 17A:
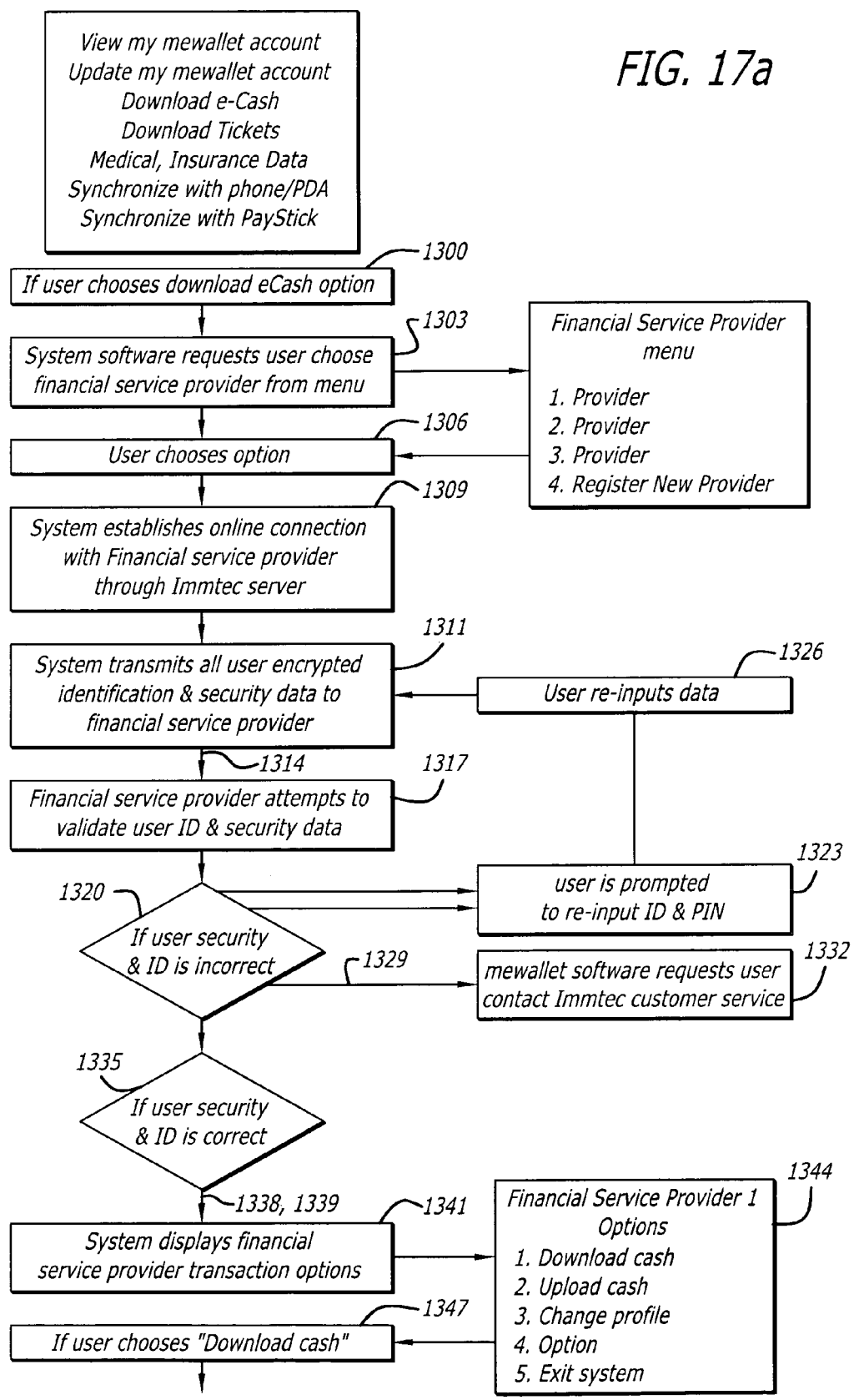
FIGS. 17a-17d (FIGS. 17b-1 and 17b-2 are referred to herein as "FIG. 17b") are high level functional flow diagrams depicting exemplary Download eCash processing for an exemplary Directed Purpose System device in an exemplary embodiment of the present invention.
Figures 1, 17B:
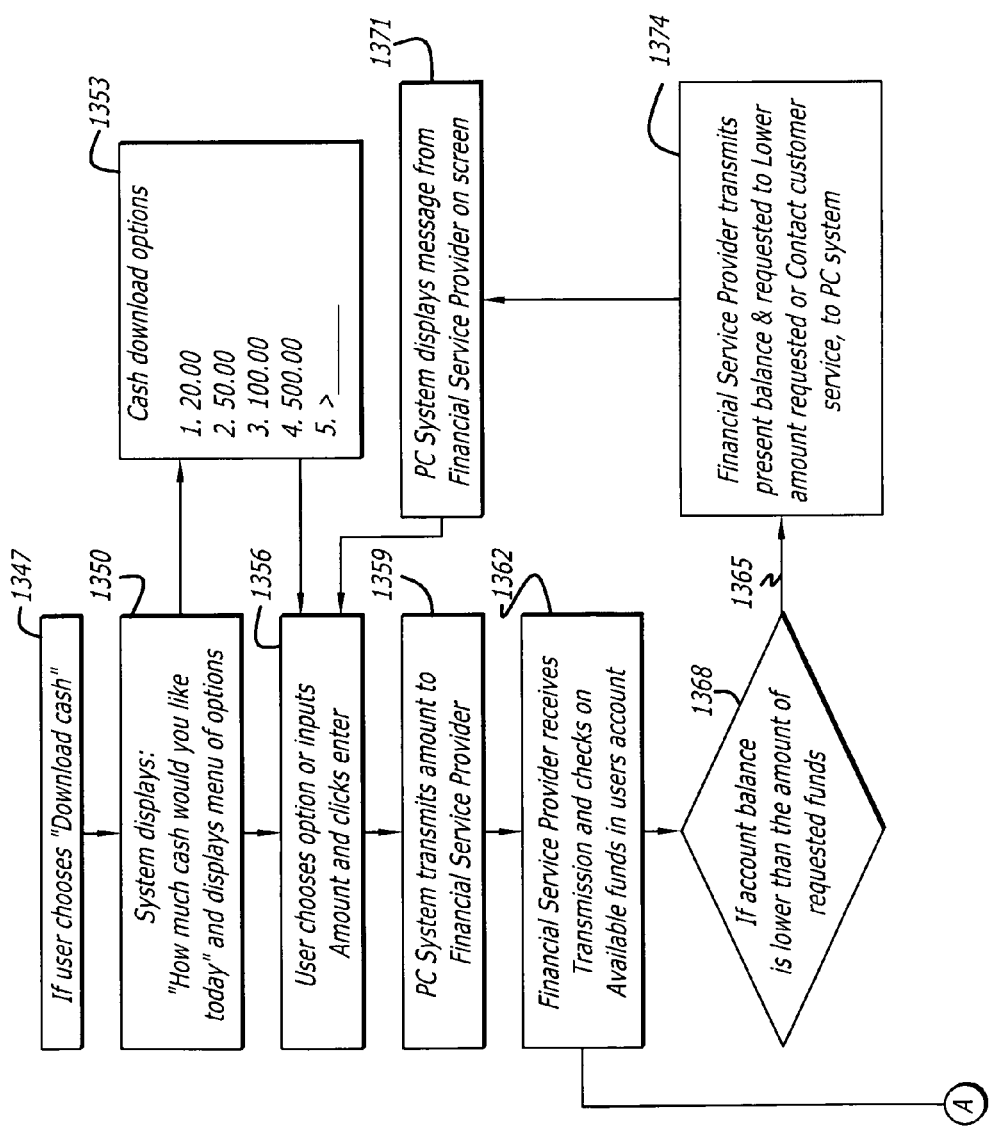
Figures 2, 17B:
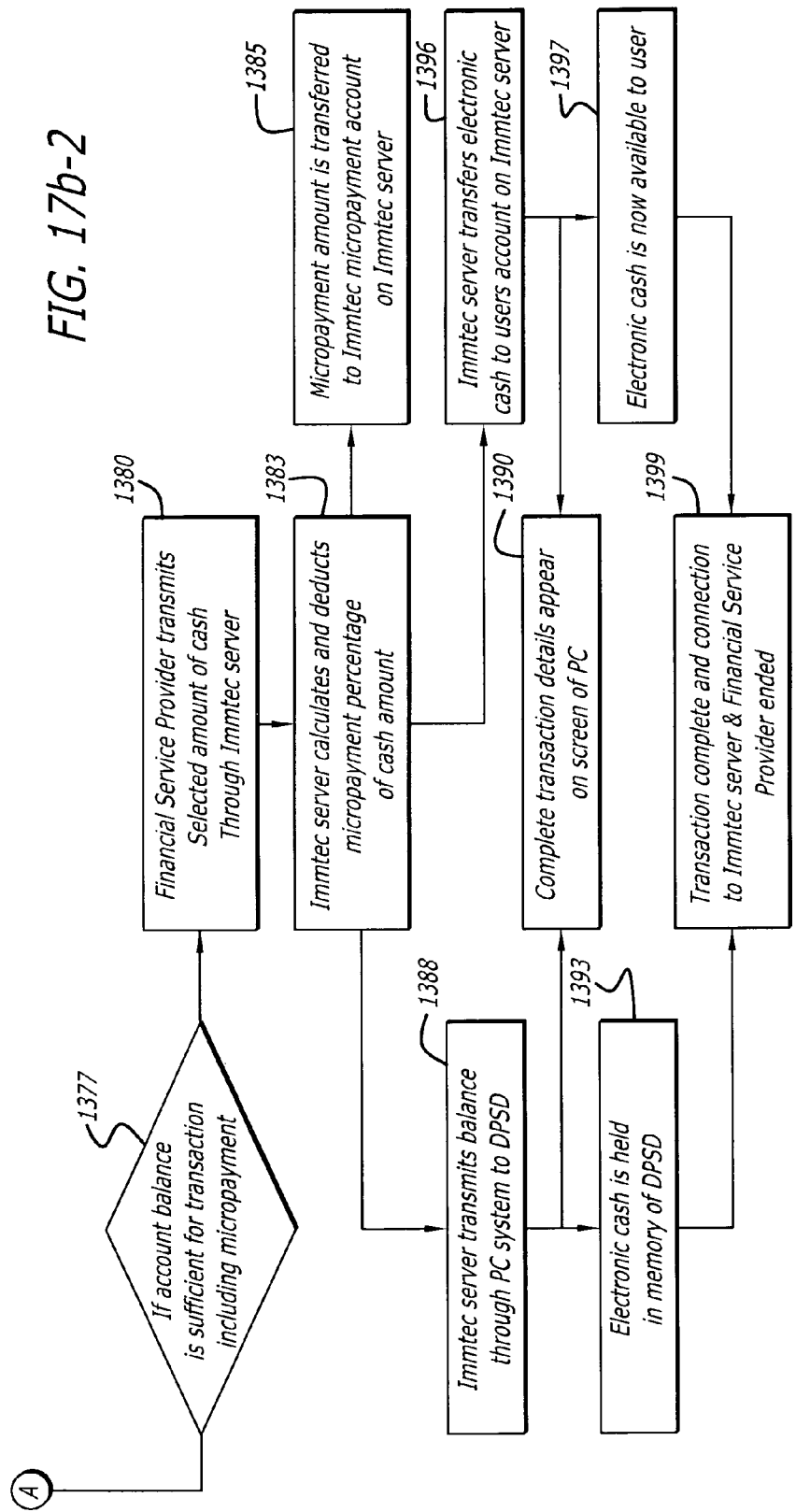
Figure 17C:
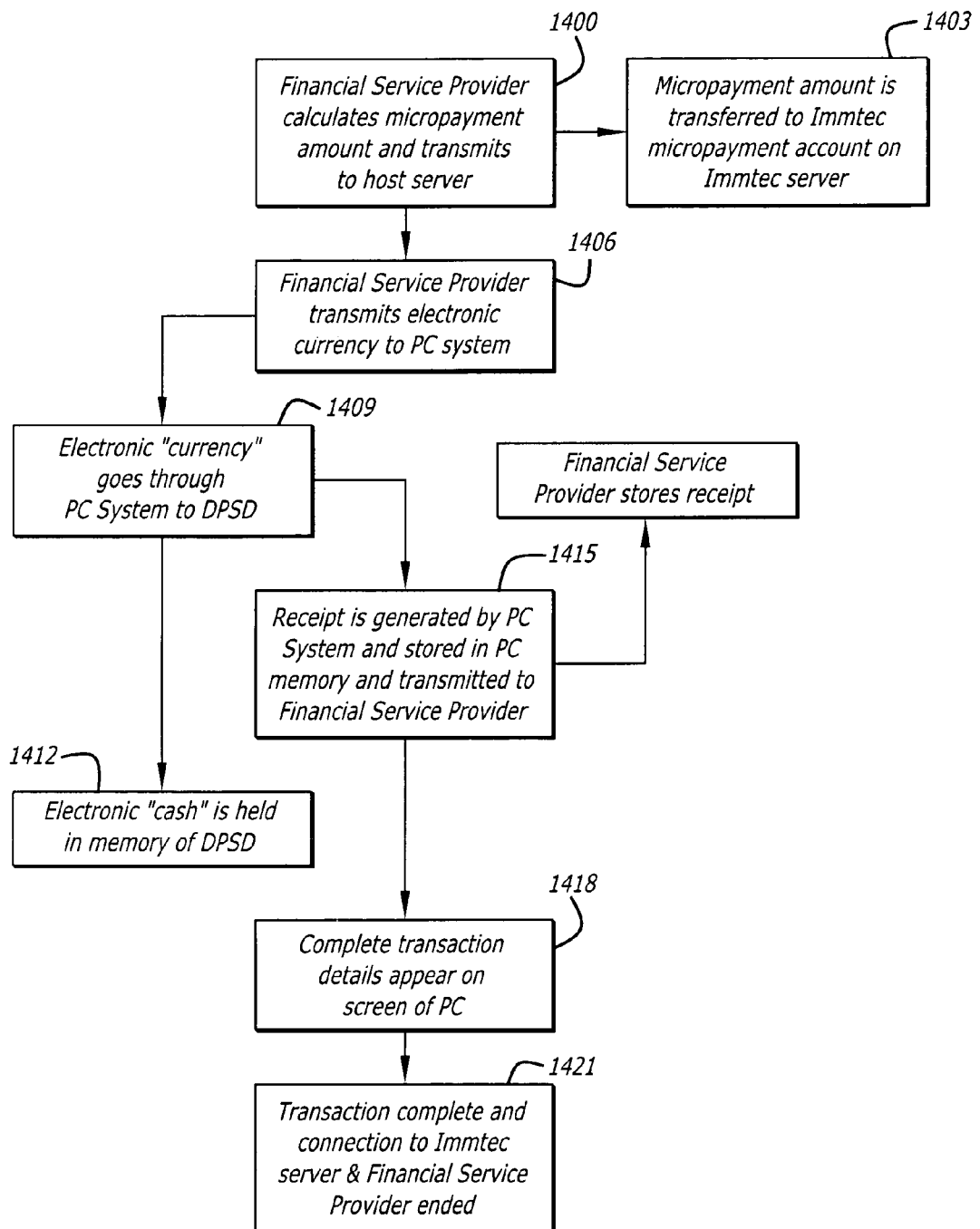
Figure 17D:
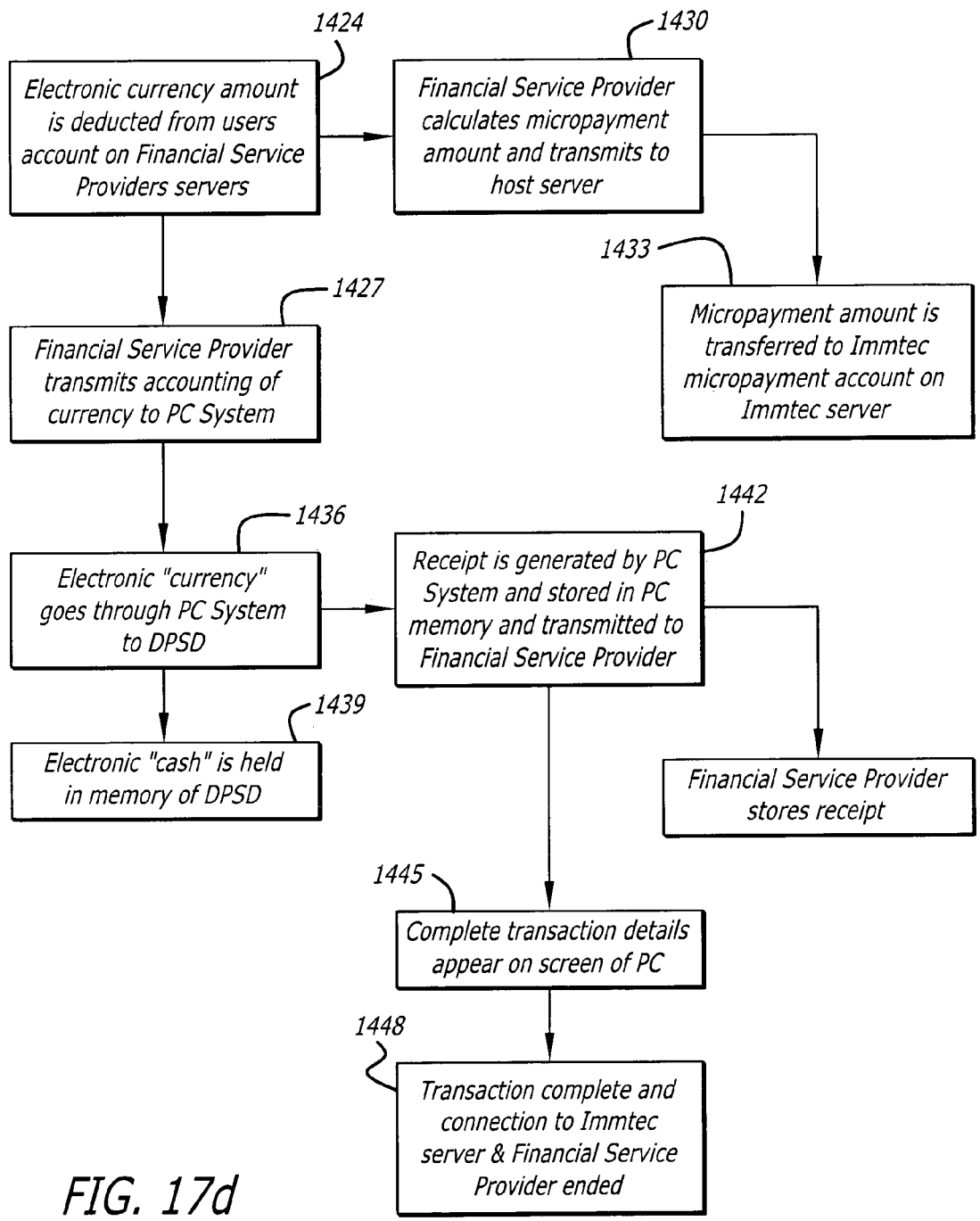

FIG. 1a is an overview of an exemplary embodiment of a PDA payment system illustrating exemplary relationships between the major nodes of an exemplary hardware network. In the embodiment depicted in FIG. 1, a PDA 700 would be the central component of the network. The role of the PDA would be to serve as a central short-term repository and communications device for all, or a portion, of the daily financial transactions a user may want to complete while the user is away from his or her home. In the exemplary embodiment, the PDA would be equipped with a wireless interface 705 through which the PDA would communicate with other devices distributed throughout the user's environment.

The PDA would communicate with an Automated Teller Machine (ATM) 740. In an ATM transaction, the PDA would obtain or provide electronic cash or electronic cash certificates from the ATM.

The PDA would communicate with a Point of Purchase (POP) terminal (also sometimes referred to herein as a Point of Sale (POS) terminal) 710. In a transaction with a POP terminal, the PDA would pay for purchases using one of several credit or bank accounts, or with electronic cash. In one exemplary embodiment, account identifiers would be stored within the memory storage device configured with the PDA. The PDA would facilitate this transaction by keeping several account numbers from which the user would select a payment method. The PDA would communicate the account number to the POP terminal and would then update the user's account information temporarily held in the PDA.

The PDA would also communicate with a POP ticket terminal. In the transaction with a POP ticket terminal, the PDA would hold electronic authorization certificates, or eTickets, to use for particular service or attend a particular entertainment event. Tickets, including electronic tickets, are sometimes synonymously referred to herein as transaction authorizations, authorization certificates, or transaction authorization certificates.

The PDA would communicate with a Personal Computer (PC) 760 via a communications interface 795 which would be one of several different types of interfaces. This communications interface 795 would be used to synchronize the PDA=s data storage with the user's account information stored in the PC. The ATM would communicate with a bank's server over a communications link 745. The POP terminal would communicate with an Automated Clearing House (ACH) server 720 via a communications link 715 (as explained further below, the communications link 715 may be either a direct link or may be a link via the Immtec server host 750). The POP eTicket terminal would communicate with a POP ticket server 780 via communications link 785. The ticket server would hold the database of issued, redeemed, or outstanding eTickets which would be used to verify an eTicket The PC would communicate via communications link 765 with the eTicket server. The communications link 765 would be used to enable purchasing of eTickets to be stored in the PDA. The PC would also communicate with a bank server 730 via communications link 735 (as explained further below, the communications link 735 may be either a direct link or may be a link via the Immtec server host 750). This communication would allow the PC to be used in conjunction with the bank server to manage the user's bank/cash and credit accounts which could be used by the PDA when making payments.

The PC would also communicate with the Immtec server host 750 via communications link 755. References herein to "Immtec" apply equally to any host server system embodying the present invention. That is, references to Immtec should be understood to include references to other host systems. References to Immtec are illustrative and are not a limitation of the invention. In the exemplary embodiment of the invention, communications link 755 would be an Internet link using the Hyper Text Transfer Protocol (HTTP) suite. The PC would use resources on the Immtec host to manage the PDA device.

Figure 1B:
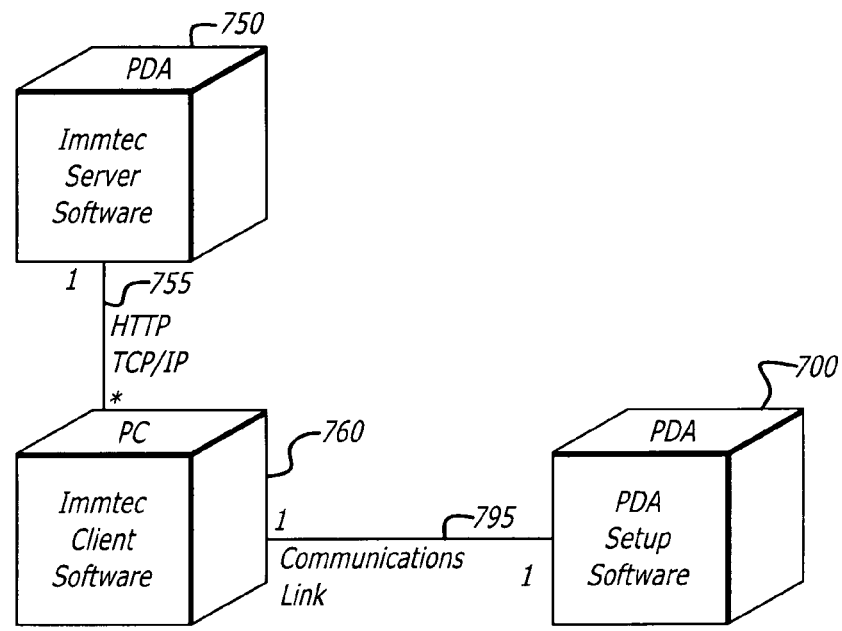
FIG. 1b is a UML deployment diagram depicting exemplary node relationships during setup of the PDA device in an exemplary embodiment of the present invention.

The PDA wireless system would require a setup process to be performed using the PC, Immtec server, and the PDA device. Exemplary relationships between the network nodes of the exemplary embodiment during the setup of the PDA device are depicted in FIG. 1b as a UML deployment diagram. As depicted in FIG. 1b, the PC 760 would host the software objects which would communicate with the Immtec server 750 via the Internet 755 and with the PDA device 700 via communications link 795. This communication link would be one of several different types. In the exemplary embodiment, the link would be a Universal Serial Bus (USB).

Figure 1C:
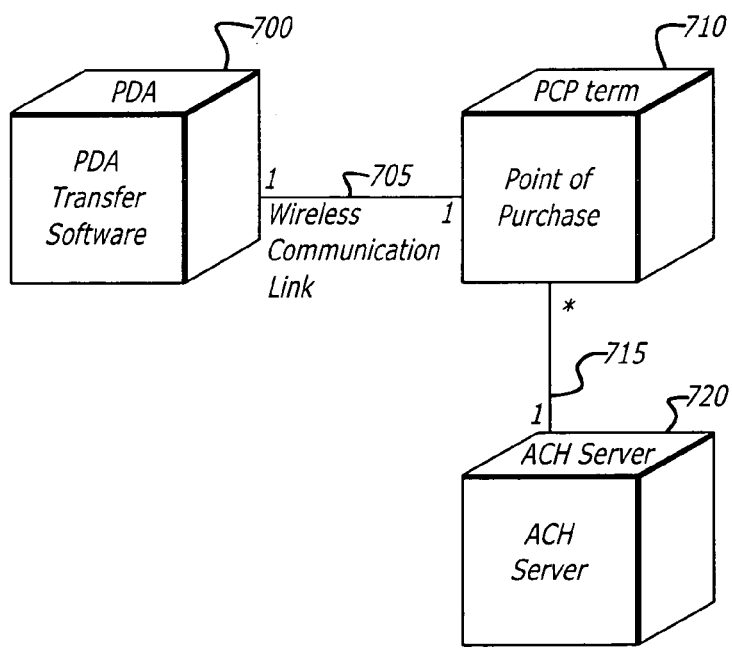
FIG. 1c is a UML diagram depicting exemplary node relationships while using the PDA device to pay for a purchase in an exemplary embodiment of the present invention.
Figure 1D:
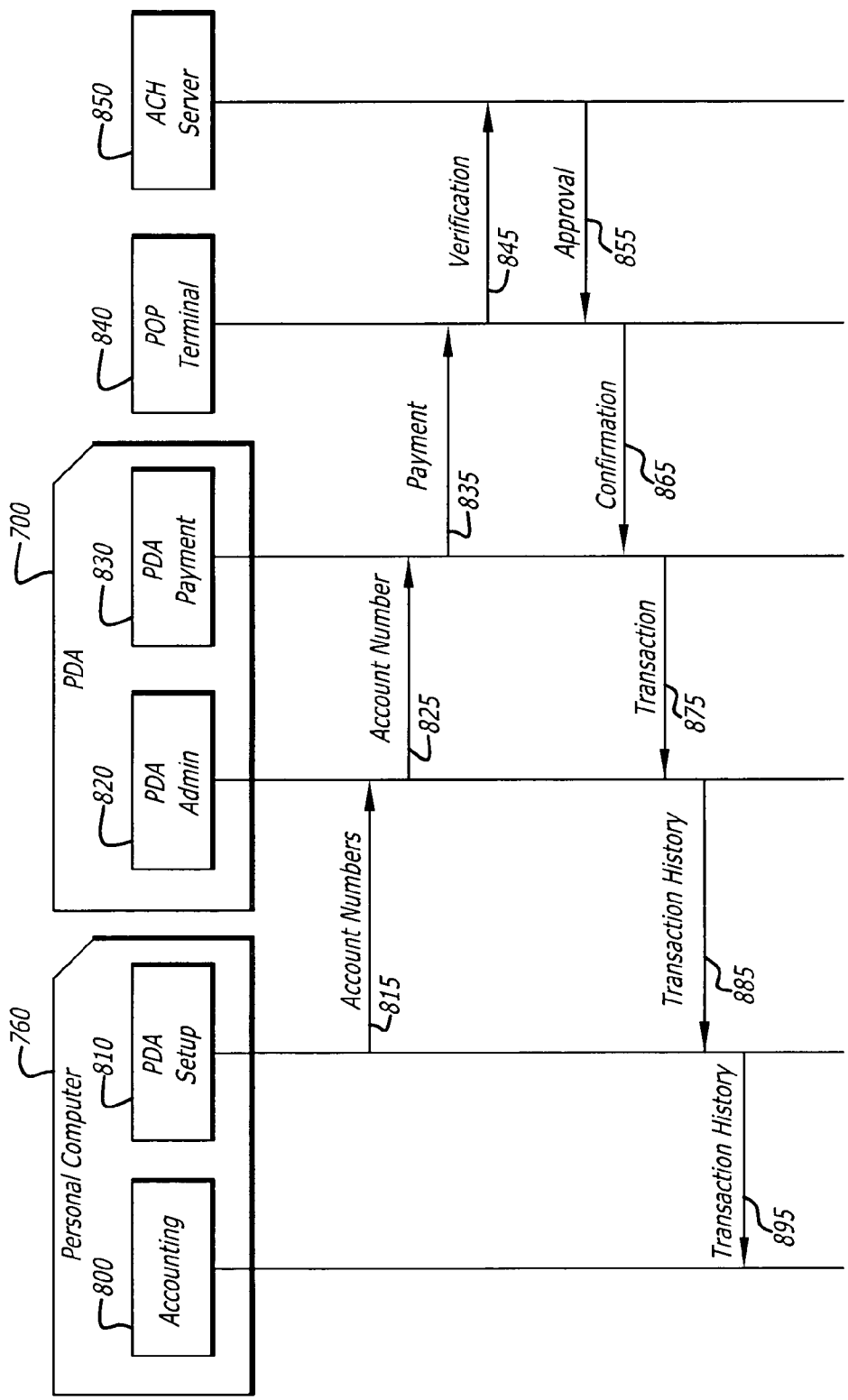
FIG. 1d is a UML sequence diagram depicting an exemplary communication sequence when a PDA device is used to pay for a purchase in an exemplary embodiment of the present invention.

The Immtec server would hold initialization data for the PDA device. This initialization data would contain encrypted registration data specific to each PDA device which, in the exemplary embodiment, would be maintained at the Immtec host site. The PC would contain setup software which would query the Immtec server for setup data, would combine the setup data from the Immtec server with the user input credit and bank account information, and would store the combined data in the PDA device. FIG. 1*d* is a partial illustration of an exemplary software object communication sequence during an exemplary setup process using the exemplary embodiment. As depicted in FIG. 1*d*, the PDA setup software object 810 would be hosted by the PC 760. The PDA setup object would request setup data from the user and would send the data 815 to the PDA administration software object 820 hosted by the PDA 700. The setup data would then be stored for future use.

References herein to Internet connections "via modem" should be understood to include all methods of Internet connection, including wireless, DSL, and all other methods of connecting to and/or accessing the Internet.

One of the uses of the invention would be to make payments at a point of purchase terminal. FIG. 1*c* is an UML deployment diagram depicting use of an exemplary embodiment of the invention to pay for a purchase. As depicted in FIG. 1*c*, the PDA 700 would establish a wireless communications link 705 with the POP terminal 710. Payment information would be sent to the POP terminal from the PDA using the communications link 705. The POP terminal would be connected to the ACH server 720 by a communications link 715. The POP terminal would send the payment information to the ACH server via the communications link 715.

An exemplary sequence of communications between the software objects in the exemplary embodiment is depicted in FIG. 1*d*. As depicted in FIG. 1*d*, the PDA payment object 830 hosted by the PDA 700 would send the payment information 835 to the POP terminal object 840. The POP terminal would send the payment information to the ACH server 850 and would request 845 verification of the payment. The ACH would send an approval 855 back to the POP terminal. The POP terminal would then send confirmation 865 of the transaction back to the PDA payment object 830. The PDA payment object 830 would then send the transaction data 875 to the PDA administration object which would then store the transaction data in a transaction history database. The PDA administration object would then send the transaction history 885 to the PDA setup object hosted by the PC. The transaction data would then be stored in a transaction history database on the PC and then sent to the accounting object 800 for further processing.

Figure 1E:
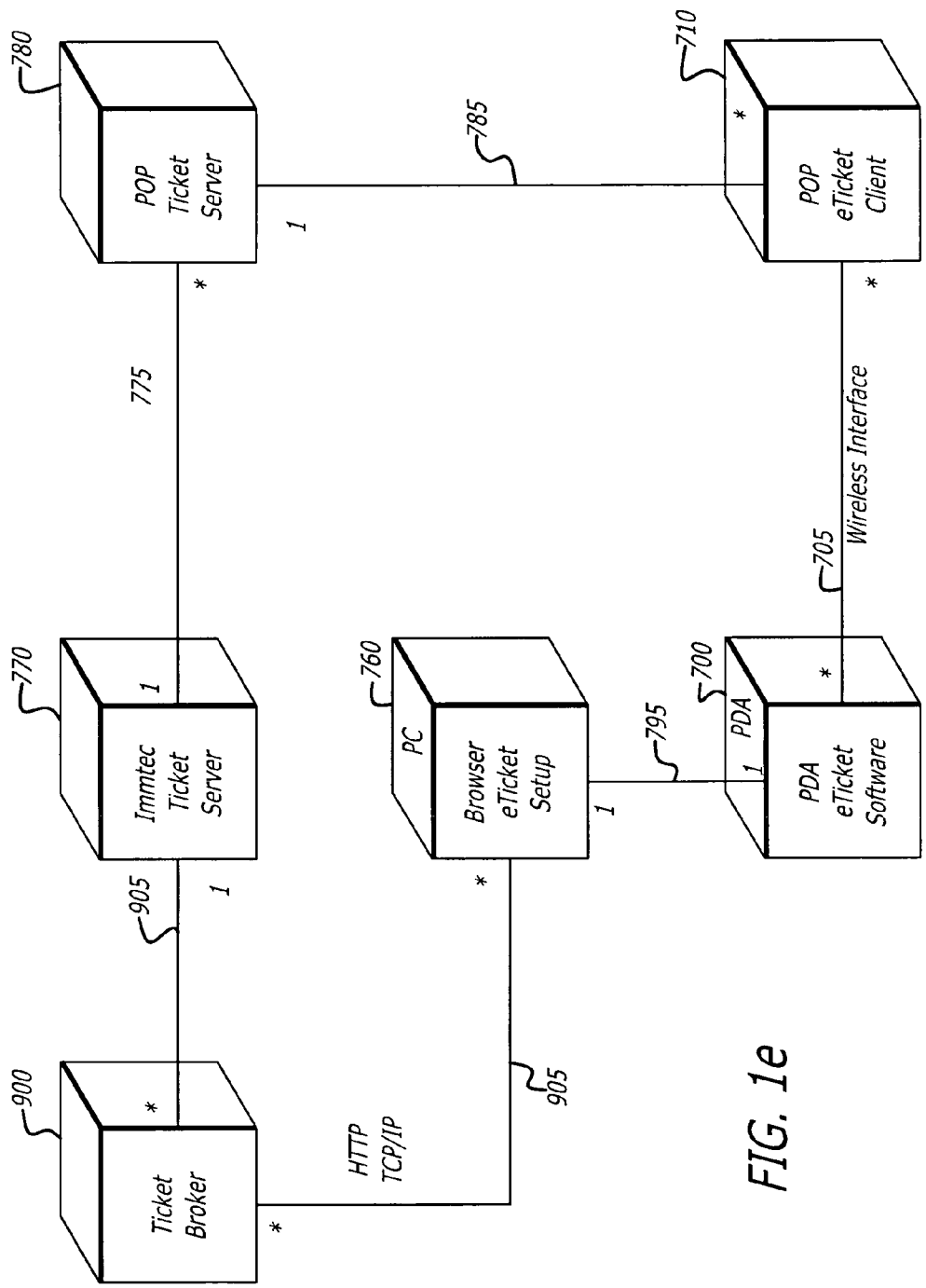
FIG. 1e is a UML deployment diagram illustrating exemplary major node relationships when the PDA device is used to purchase a ticket in an exemplary embodiment of the present invention.

The invention would also be used as a carrier for electronic authorizations or eTickets. A UML deployment diagram of the exemplary embodiment of the invention used as an eTicket carrier is shown in FIG. 1*e*. As depicted in FIG. 1*e*, the PC 760 would host a browser client communicating via communications link 905 to a ticket broker server 900. In the exemplary embodiment depicted in FIG. 1*e*, the communications link would be a connection using the Internet. The user could use the browser to order a ticket from the ticket broker. The user could then select the Immtec server as the provider of the eTicket certificate. If the user does so, the ticket broker would open a communications link 905 to the Immtec ticket server 770. The ticket broker could then request an eTicket certificate from the Immtec server. The certificate would then be sent to the PC where it would then be used to setup the PDA device 700. In the exemplary embodiment depicted in FIG. 1*e*, the Immtec server would send a copy of the eTicket certificate to the POP ticket server 780, such as a POP ticket server located at or accessible by a POP ticket terminal at the site where the ticket will be used, via communications link 775. In an alternative embodiment, the PC would be connected transparently to the Immtec server via the ticket broker to receive the certificate.

Once the PC has the eTicket certificate, the PC would then setup the PDA device by sending the eTicket certificate to the PDA device via communications link 795. The PDA would then be transported by the user to the location of the event or service and would then be used by the user to establish a wireless communications link 705 with the POP eTicket terminal 710. The eTicket certificate would be verified by the POP eTicket terminal via the communications link 785 to the POP ticket server.

Figure 1F:
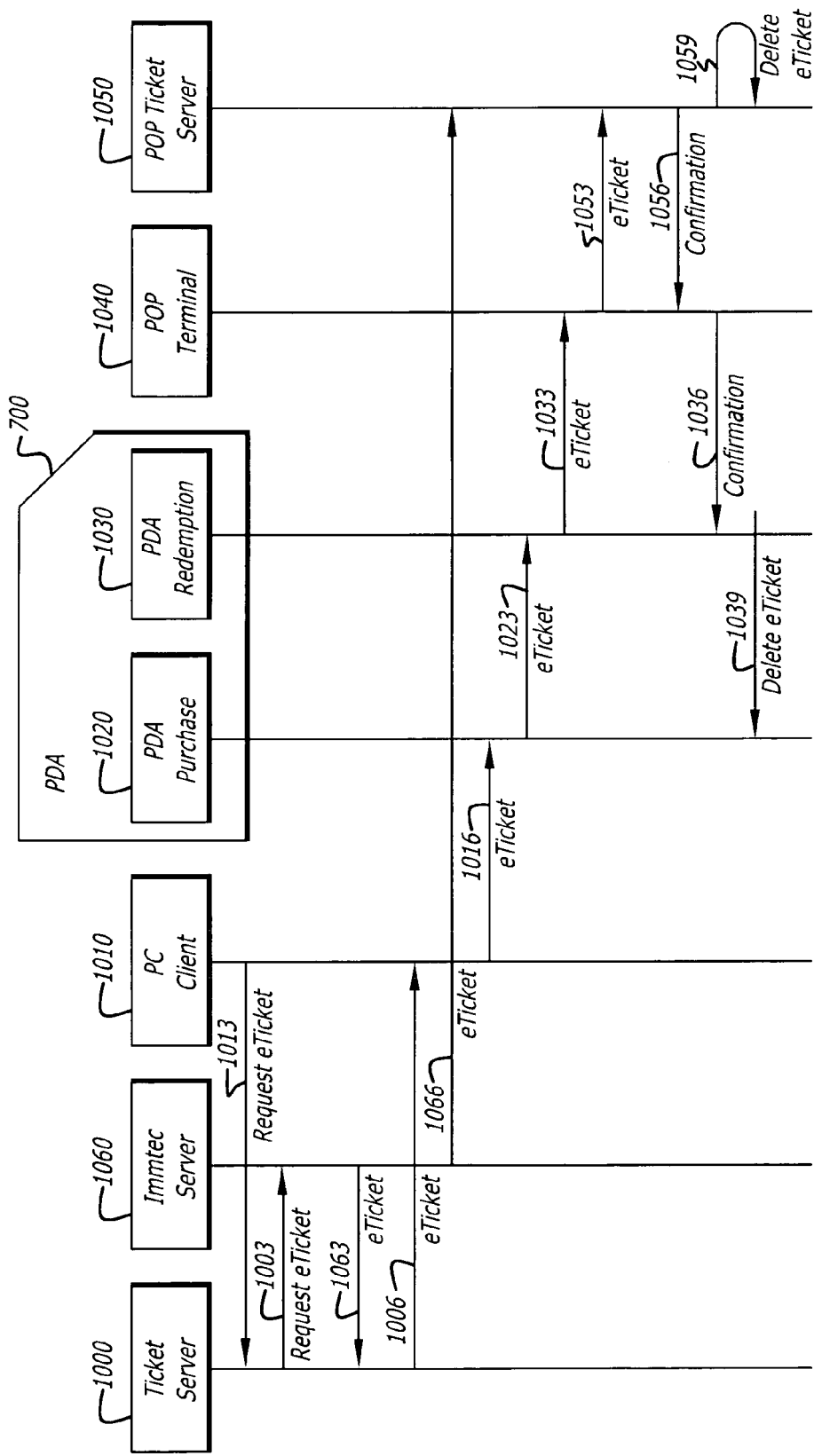
FIG. 1f is UML sequence diagram illustrating an exemplary communication sequence between the major software objects when the PDA device is used to purchase and redeem a ticket in an exemplary embodiment of the present invention.

Exemplary communication events of an eTicket creation and transfer between exemplary software components of the exemplary embodiment are illustrated in FIG. 1*f*. The PC client 1010 would send a request 1013 to the ticket server 1000. The ticket server would then request 1003 the generation of an eTicket certificate from the Immtec ticket server 1060. The Immtec ticket server would then generate and send 1063 the eTicket to the ticket server. The Immtec server would then send a copy of the eTicket certificate 1066 to the POP ticket server. The ticket server would then send the eTicket certificate 1006 to the PC client. The PC client would then send the eTicket certificate 1016 to the PDA purchase object 1020 hosted by the PDA 700. The PDA purchase object would then store the eTicket certificate.

The PDA redemption object 1030 hosted by the PDA would then request the eTicket certificate be sent 1023 from the eTicket database. The PDA redemption object would then send the eTicket certificate 1033 to the POP terminal 1040 via the wireless communications link. The POP terminal would then request verification of the eTicket 1053 from the POP ticket server 1050. If the eTicket certificate is valid, the POP ticket server would then send confirmation 1056 to the POP terminal. The POP ticket server would then delete 1059 the ticket from the database of valid certificates. The POP terminal would then send confirmation 1036 of receipt of the ticket to the PDA redemption object. The PDA redemption object would then request 1039 the eTicket certificate to be deleted.

B. Hardware Overview in Exemplary Embodiment

1. Hand Held Computing Device, (PDA), with Infrared Input/Output Device

The invention could be applied to all hand held or watch-sized PDA computing devices without departing from the spirit of the invention. Data could be input by a user via a keypad, pen, voice, modem, or by syncing to a PC. The PDA device would be configured with infrared communication and/or other short range data transmission capabilities and would be further configured for communicating with personal computers (via hard wired synchronization cradle or infrared interface), point of purchase/point of sale hardware, automatic teller machines (via the wireless interface) and electronic kiosks (also via the wireless interface). The PDA device would optionally be configured for communicating with wired and wireless communication devices and the Internet.

Figure 1G:
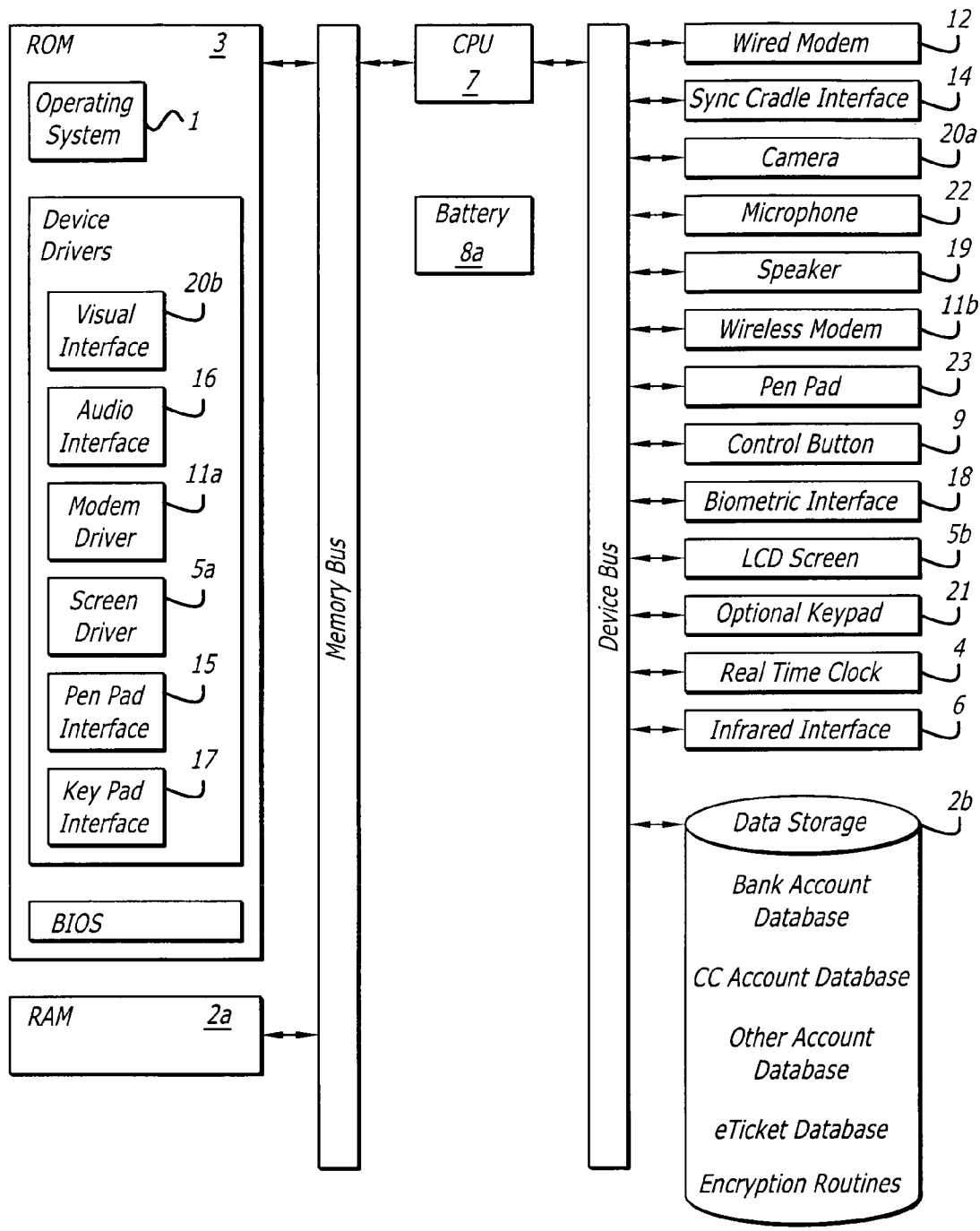
FIG. 1g is a semi-schematic diagram depicting an exemplary embodiment of a PDA configured with infrared receiving and transmission components and interface.

As depicted in FIG. 1*g*, the PDA in the exemplary embodiment of the invention would provide the following exemplary hardware components: Operating System 1; RAM (Random Access Memory) 2*a*-2*b*; ROM (Read Only Memory) 3; Clock 4; Screen Driver 5*a* and LCD (Liquid Crystal Display) Screen or other display device 5*b*; Infrared input/output interface 6; CPU (Central Processing Unit) or other computer device, including microprocessors, micro controllers, and the like 7;

Battery 8; Software control buttons 9; Installed software 10; Optional wireless modem 11b and modem driver 11a; Optional wired modem 12 and modem driver 11a; PC synchronization interface 13; PC synchronization cradle 14; Pen interface (requires touch sensitive pad 23) 15 or Voice interface (requires internal microphone 22) 16 or Keypad interface 17; Optional biometric device 18; Optional speaker 19; Optional camera 20a and visual interface 20b; and an Optional keypad 21.

2. Wireless Mobile Phone with Optional Internal PDA and Infrared Input/Output Device A wireless mobile phone enabled to perform functions according to the present invention could be of any size or make. Its operating protocol could be CDMA (Code-Division Multiple Access), TDMA (Time Division Multiple Access), GSM (Global System for Mobile Communications), or any other digital protocol. It would be configured to be capable of infrared communication or other short range data transmission capabilities. It would be configured to be capable of communicating with personal computers, (via hard wired synchronization cradle or infrared interface), point of purchase hardware, automatic teller machines and/or electronic kiosks (via infrared interface), wired and wireless communication devices, or the Internet.

Figure 2:
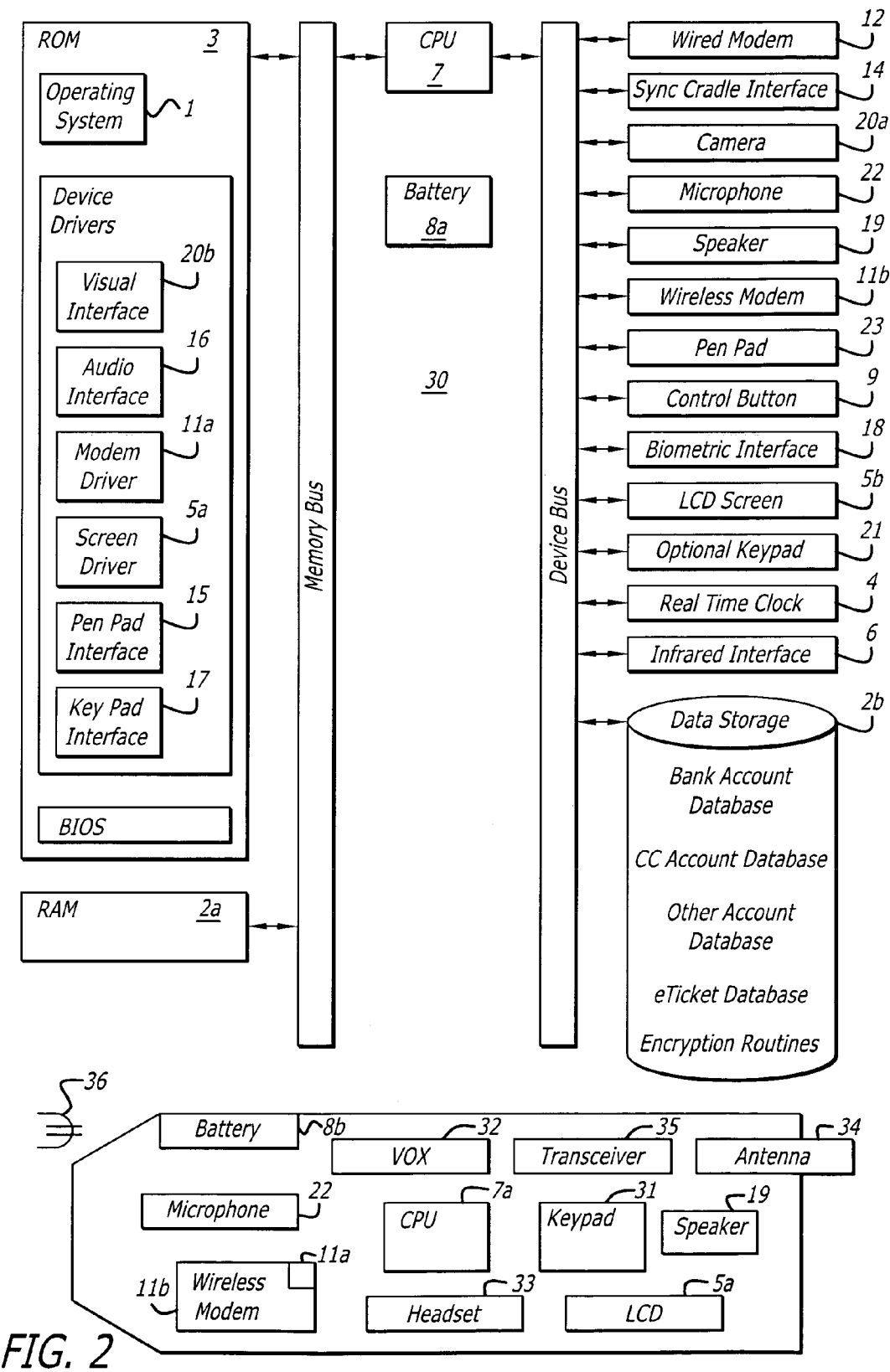
FIG. 2 is a semi-schematic diagram depicting an exemplary embodiment of a wireless phone/PDA configured with infrared receiving and transmission components and interface.

As depicted in FIG. 2, a wireless mobile phone in the exemplary embodiment of the invention would provide the following exemplary hardware and software components: Internal PDA computing device 30; Keypad interface 31; Optional voice activation capability 32; Optional headset and headset interface 33; Speaker 19; Microphone 22; Wireless data and voice transmission hardware 11b; Antenna 34; Transceiver 35; LCD Screen 5a, 5b; Infrared interface 6; PC Synchronization interface 13; RAM 2a-2b; ROM 3; Operating system 1; Clock 4; CPU 7a, 7b; Battery 8a, 8b; Battery charger interface 36; and Battery charger/PC Synchronization cradle interface 14.

3. Credit Card Processing Terminal with Infrared Input/Output Device

A credit card/debit card Point of Purchase/Point of Sale processing terminal in the exemplary embodiment of the present invention would be similar to ones in use at the present time produced by many manufacturers except that there would be the further addition of an infrared input/output interface and/or short range data transmission device preferably located on the top or side surface of the terminal or externally connected to a serial interface port.

In one exemplary embodiment of the present invention, an external aftermarket infrared interface would be provided that would be connectable to various types of point of sale terminals and credit card/debit card processing terminals. The external infrared interface device would provide, among other things: a microprocessor, an infrared communications stack with which to interface with PDA, Wireless phone, and/or Directed Purpose System devices; software with which to communicate with the POS terminal, with PDA, Wireless phone, and/or Directed Purpose System devices, and with the Server System; and serial port plug(s) compatible with various POS terminals. In one exemplary embodiment of the present invention, the external infrared interface device would use the POS power supply to power the infrared transceiver dongle and microprocessor of the external infrared interface device.

Figure 3:
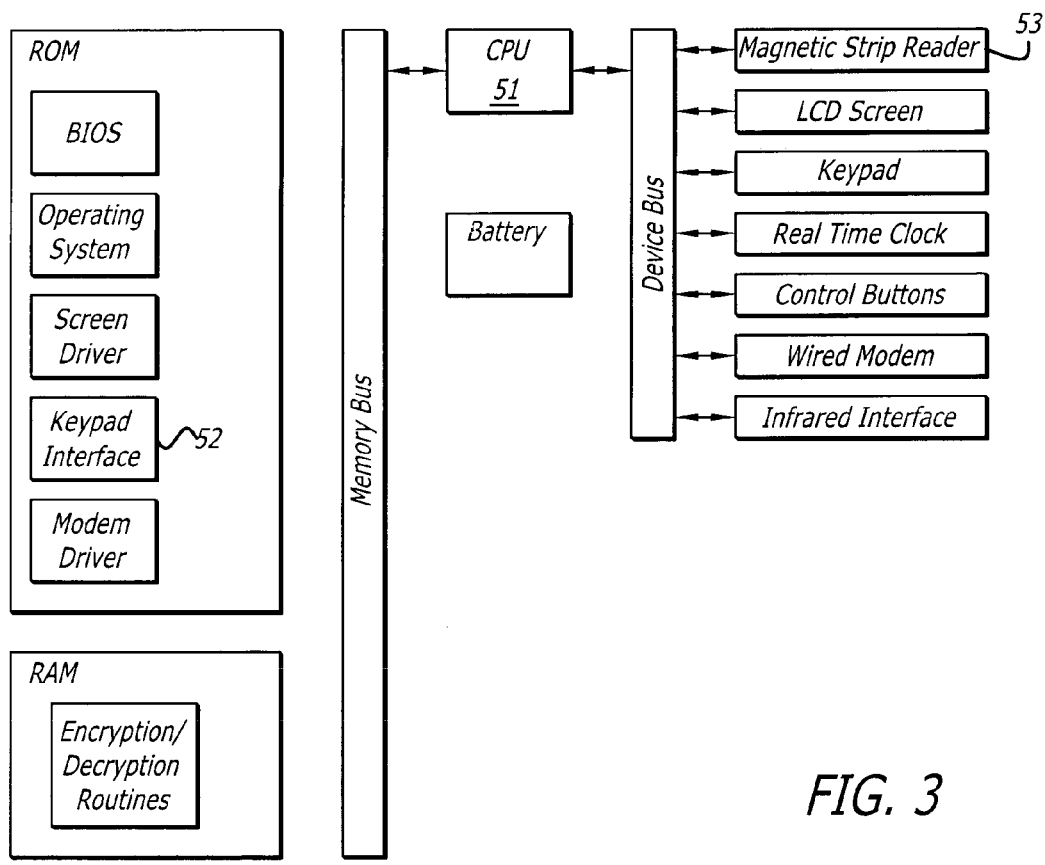
FIG. 3 is a semi-schematic diagram depicting an exemplary embodiment of a credit card processing terminal configured with infrared receiving and transmission components and interface.

As depicted in FIG. 3, the infrared interface 50 would communicate with the POS terminal's CPU 51 in a way similar to the way in which the keypad interface 52 and swipe interface 53 communicate with the CPU 51. The data collected by the infrared interface 50 would be transmitted/received to/from a bank or clearinghouse in much the same way as information collected by the keypad or swipe interface can now be transmitted/received to/from a bank or clearinghouse.

4. Automatic Teller Machine with Infrared Input/Output Device

Figure 4:
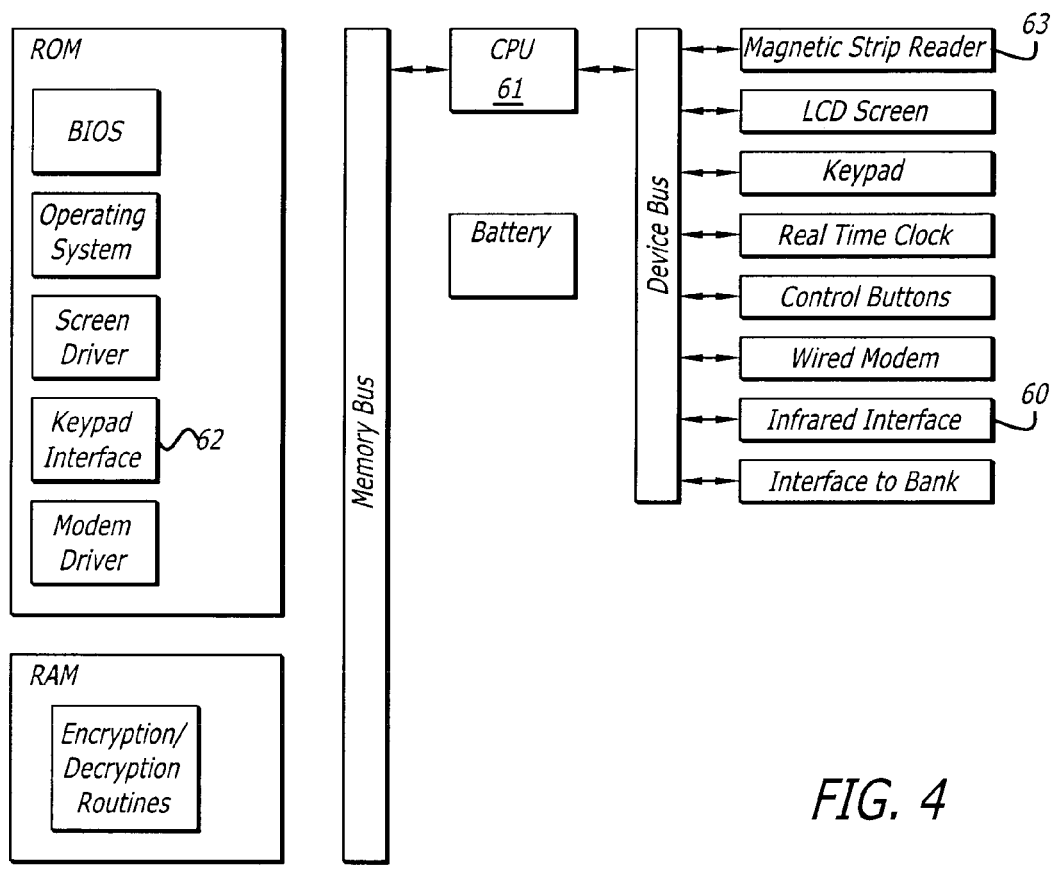
FIG. 4 is a semi-schematic diagram depicting an exemplary embodiment of an Automatic Teller Machine configured with infrared receiving and transmission components and interface.

The ATM (Automatic Teller Machine) in the exemplary embodiment is similar to ATMs currently in use except that, as depicted in FIG. 4, there would be further provided the addition of an infrared input/output interface 60 or other short range data transmission device such as on the front surface of the ATM. The infrared interface would communicate with the ATM's CPU 61 in a way that is similar to the way in which an ATM's keypad interface 62 and swipe interface 63 communicate with the ATM's CPU 61. The data collected by the infrared interface 60 would be transmitted/received to/from a bank or clearinghouse in much the same way as information collected by the keypad or swipe interface can presently be transmitted received to/from a bank or clearinghouse.

5. Wireless Modem

The wireless modem would be incorporated into the PDA, be added to the PDA into a slot provided for that purpose, or be connected to the PDA externally. The wireless modem could be configured and programmed to work on any communications protocol.

6. Wired Modem

The wired modem could be incorporated into the PDA, be added to the PDA into a slot provided for that purpose, or be connected to the PDA externally. The wired modem could be configured to work on any phone line.

7. Personal Computer

The personal computer ("PC") would be configured with WINDOWS® (hereinafter sometimes also referred to as "Windows") 95-98, ME, 2000+, NT-2000 OS (Operating System), MAC® (hereinafter sometimes also referred to as "Mac") OS, LINX® (hereinafter sometimes also referred to as "Linux") OS or other such operating system. The PC could be a desktop model, laptop model, or any other type of PC capable of communicating with external devices. In the exemplary embodiment, the PC would have an internal modem and would be configured for communication to the Internet. Someone with ordinary skill in the art will understand that the description of an internal modem in the exemplary embodiment is not a limitation of the invention and that alternative embodiments that use an external modem would not depart from the spirit of the invention.

Figure 5:
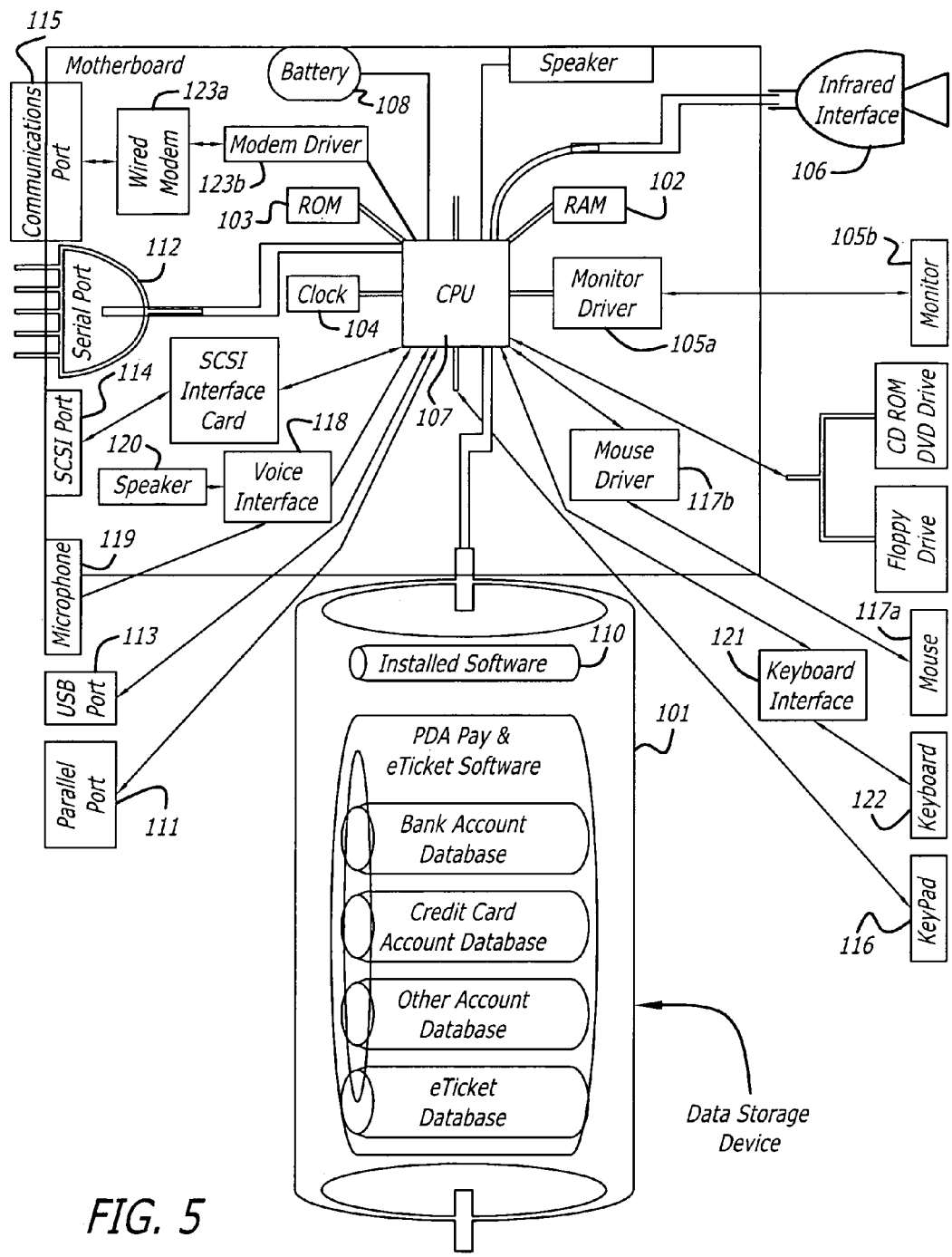
FIG. 5 is a high level graphic representation conceptually depicting an exemplary embodiment of a personal computer configured with PDA interface and infrared receiving and transmission components and interface.

The Personal computer in the exemplary embodiment, as depicted in FIG. 5, would include the following exemplary hardware and software components: Operating System 100; Permanently installed memory storage device (hard drive) 101; RAM 102; ROM 103; Clock 104; Display Monitor 105a-105b; Optional Infrared input/output interface 106; CPU 107; Battery 108; Installed software 110; Parallel port 111; Serial port 112; Optional USB port 113; Optional SCSI port 114; Communications port 115; Input devices: touch sensitive pad 116 or Mouse 117a-117b or Voice interface 118 (with microphone 119 & speakers 120) and/or Keyboard interface 121 and keyboard 122; and Modem 123a-123b.

8. External Infrared Interface Ports

In the case of a Personal Computer, the external infrared interface device would be connected to the personal computer via a communications port. The exemplary port would be USB. In the exemplary embodiment, the cord for the device would be typically at least 1.3 meters or 4 feet in length. In the exemplary embodiment, this device would be capable of sitting on a desktop, table or other flat surface. The external infrared interface would make it possible for any personal computer to communicate with the infrared equipped PDA and for the PDA to communicate directly with the personal computer and/or the Internet without a synchronization cradle when one may not be available.

In the case of a point of purchase device, one exemplary embodiment of the external infrared interface port for a point of purchase terminal would be connected to the same ISDN, analog phone, or network interface as a credit card processing terminal and would communicate with the merchant's computer system, clearinghouse or bank's computer system as well as the customer's PDA. This device could be used if the merchant or issuing bank chooses not to exchange their credit card processing terminal for a new model with a built in wireless communications port.

9. Server Computer

A server computer or set of server computers would be provided by a Server System with which to provide the interface for the payment system aspect of the invention (referred to herein as the "PDA Pay system") and the authorization transaction interface system (referred to herein as "ticketdownload.com" and/or as the "ticketdownload.com system" and/or as the "eTicket System"). The systems administrator of both of these systems is referred to herein as "Immtec". Additionally, as further described below, the Server System would provide other transaction functionality, including the maintenance and exchange of medical information including such information as prescriptions.

C. Software

1. Infrared Drivers

Infrared software drivers would control the functioning of the infrared hardware interfaces. The infrared software driver program feature of the invention would apply equally to all types of hardware systems and operating systems without departing from the spirit of the invention. Infrared software drivers would allow communication between the infrared hardware interface of the PDA with the personal computer's CPU and/or with the host Server System.

2. Interface Software Programs for ATMs, Credit Card Processing Terminals PDAs.

These interface software programs would facilitate communication between: a) an ATM and a bank/clearinghouse (and/or with the host Server System); b) an ATM and a PDA; c) a Credit card processing terminal and a clearinghouse/bank (and/or the host Server System); d) a Credit card processing terminal and a PDA; or e) a PDA, an infrared interface and a credit card processing terminal, ATM, or other infrared terminal(s).

The interface software program features of the invention apply equally to all types of hardware and operating systems without departing from the spirit of the invention.

3. Interface Software for Personal Computer

Personal Computer interface software programs would facilitate communication: between a PC and a hand held PDA via synchronization hardware; between a PC and a watch sized PDA via synchronization hardware; between a PC and a PDA via synchronization hardware over the Internet; between a PC and a hand held PDA via infrared port; between a PC and a watch sized PDA via infrared port; between a PC and a PDA via infrared port over the Internet; or between a PC and a PDA via short range data transmission device.

The PC Interface software feature of the invention would apply equally to all types of personal computers and operating systems without departing from the spirit of the invention.

4. Interface Software for Major Consumer Accounting Programs

Figure 6:
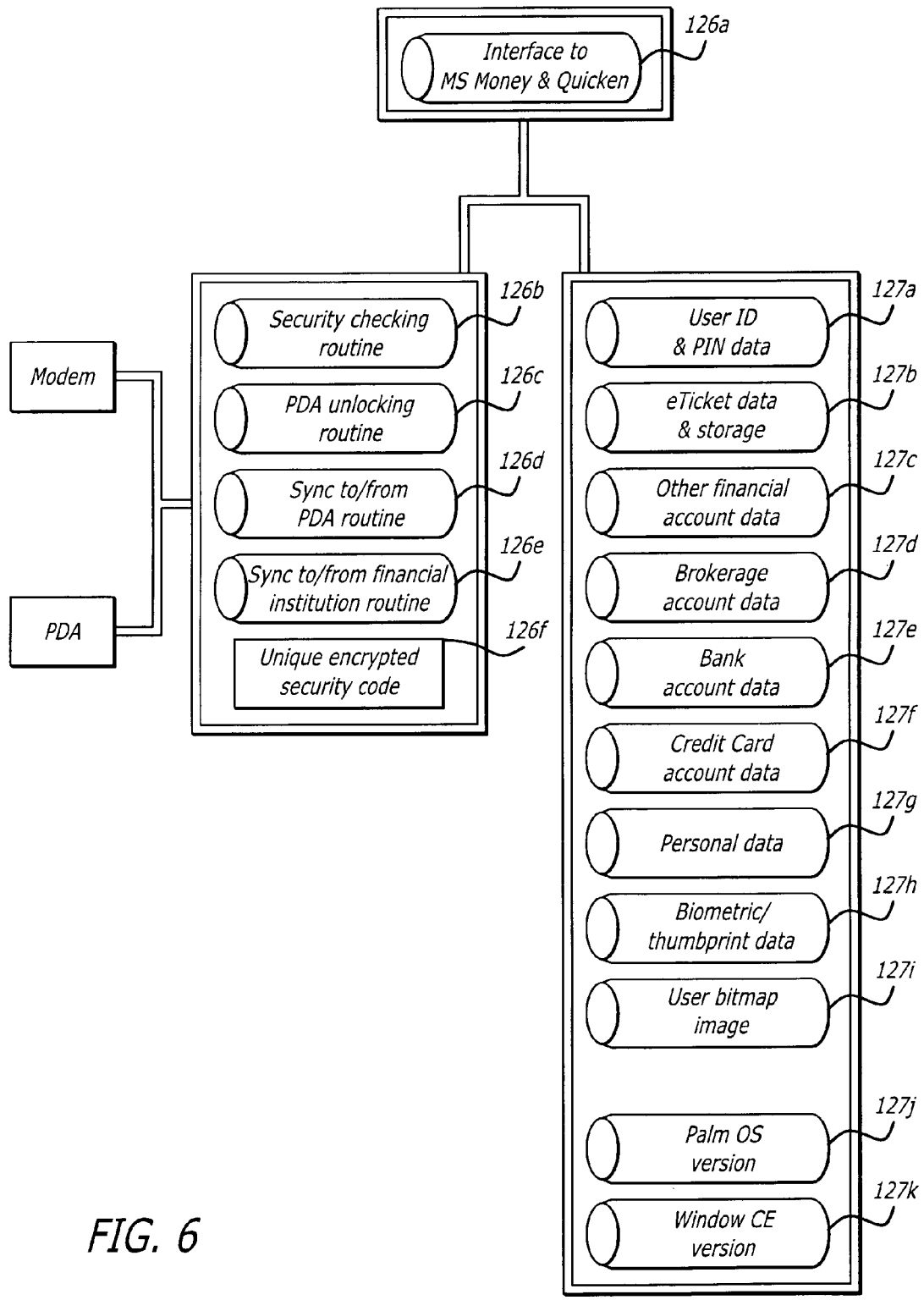
FIG. 6 is a high level graphic representation conceptually depicting an exemplary embodiment of PDA Pay and eTicket System Software components for a personal computer.

As depicted in FIG. 6, the present invention would provide consumer accounting interface software 126*a* would facilitate communication and synchronization and exchange of data between the PDA and various accounting programs, including but not limited to such products as: Quicken 1998+ or Microsoft Money98+ programs for PC or Macintosh. Exemplary software programs would provide accounting interfaces for, among others: Windows based PC's; Macintosh computers; Windows CE/Pocket PC based PDA's 127*k*; and Palm OS 3+based PDA's 127*j*.

5. Interface Software for Internet

The PDA Pay and eTicket System would be programmed to utilize any Internet browser/interface software already present on the client and server computers.

6. PDA Pay & eTicket/mewallet™ System Software for PC & PDA

Figure 7:
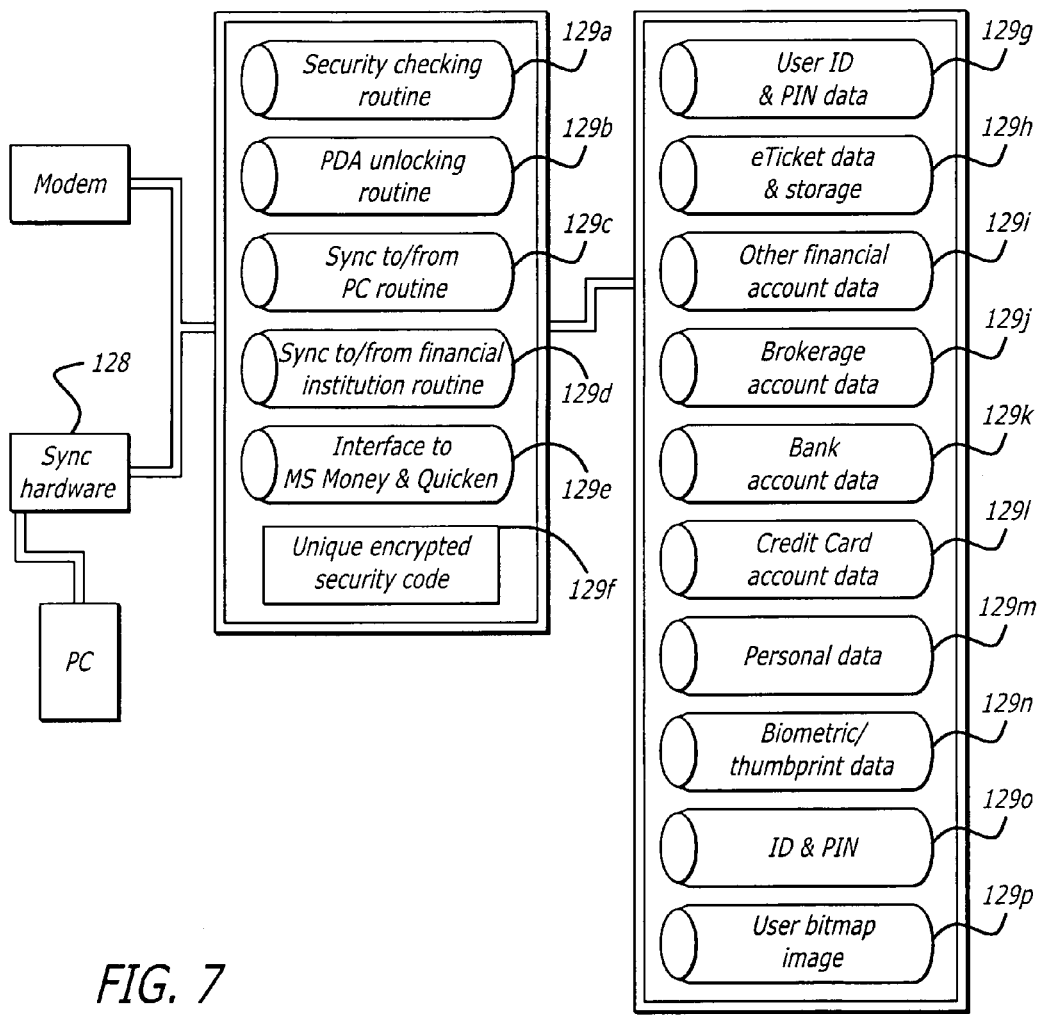
FIG. 7 is a high level graphic representation conceptually depicting an exemplary embodiment of PDA Pay and eTicket System Software components for a PDA.

Software would be provided for storing many types of data 127*a*-127*i*, 129*g*-129*f*, including for example, electronic tickets ("eTickets") 127*b*, 129*h*, banking information 127*e*, 129*k*, credit card information 127*f*, 129*l* and medical information 127*g*, 129*m* in personal computers (FIG. 6) and/or PDA devices (FIG. 7). The PDA Pay and eTicket System personal computer software would be installed on the user's personal computer. It would write and store the user information (such as the eTickets, the user's banking information and credit card information and other pertinent financial data, and/or the user's medical information and other relevant information) in a database(s) in a memory storage device configured with the personal computer, such as, for example, the computer's hard drive. This software would allow all financial, personal medical and eTicket data to be communicated to the customer's PDA after appropriate security protocols have been met.

The PDA Pay and eTicket/mewallet™ System PDA software would be installed in the customer's PDA. In one exemplary scenario, it would be pre-installed by an authorized retail outlet, issuing bank, Credit Card Company or clearinghouse. It could also be installed by the customer from their personal computer. This software would cause the PDA to store an encrypted, secure, unique code 129*f* that would be carried within every communication between the PDA and any other device. This software would further cause the PDA to securely store many types of data 129*g*-129*f*, including, for example, all bank account data 129*k*, securities account data, credit card account data 129*l*, eTickets 129*h*, user ID, PIN's 129*a* and other pertinent financial 129*c* and personal data 129*g*.

In the exemplary embodiment, a user ID or and PIN and/or fingerprint (the phrase "fingerprint" is meant herein to include the "print" or other image of any finger, including a thumb) and/or other biometric data 129*n*, would be required to access or transmit any data from the PDA device using the PDA software. The user would be given 3 chances to input the correct user ID and/or PIN and/or fingerprint. If the ID and/or PIN and/or fingerprint are correct the user would then be allowed to access and transmit data. If the ID and/or PIN and/or fingerprint were not correct after 3 attempts, then the software would shut down the PDA and lock it, preventing it from being used. The PDA would then need to be unlocked. A PDA in the exemplary embodiment would only be unlocked by synchronizing it to the user's personal computer, authorized PDA Pay & eTicket/mewallet™ System (also sometimes referred to herein simply as the "System") service center, or at the issuing bank or other issuing institution.

Figure 8:
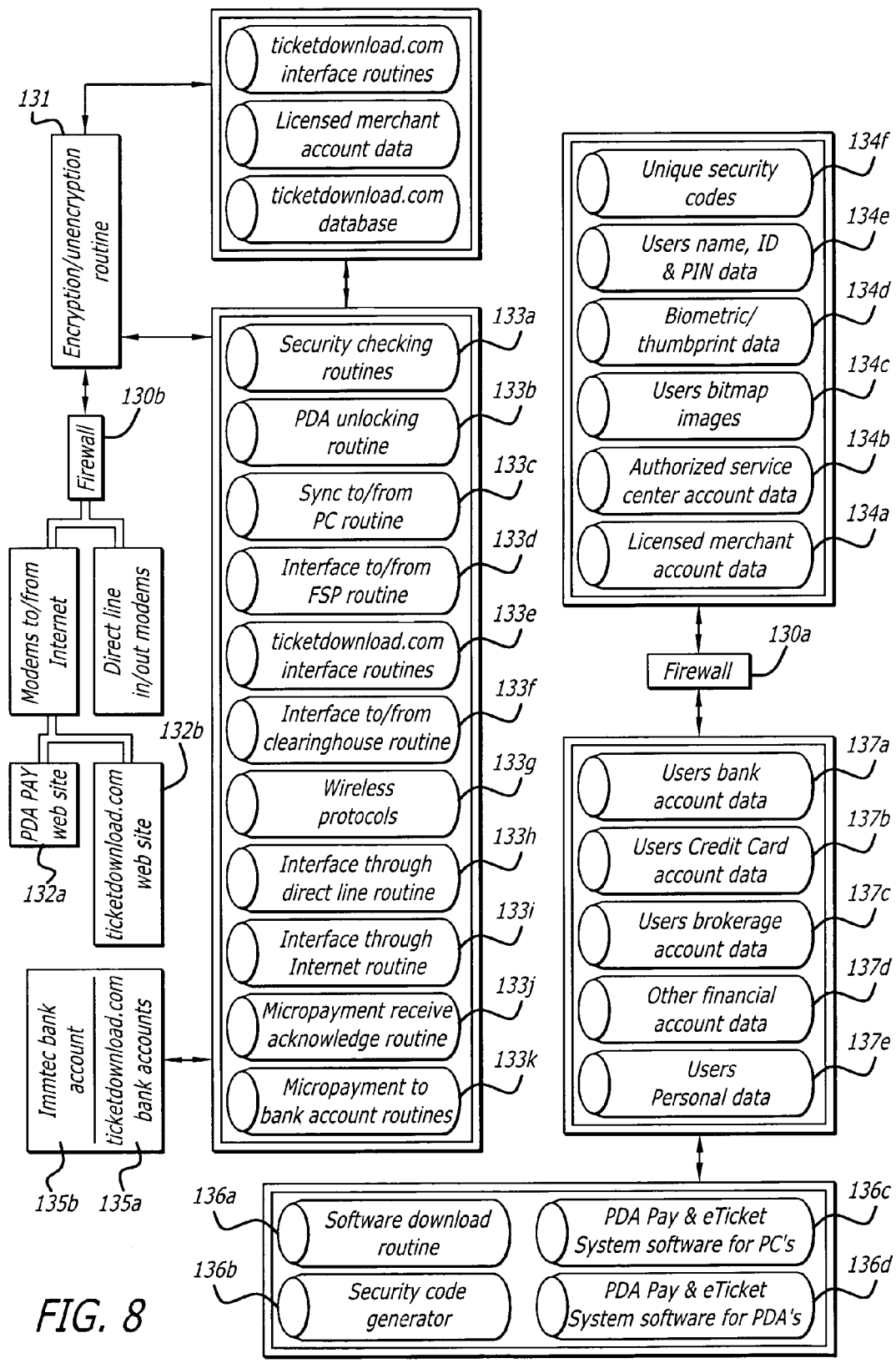
FIG. 8 is a high level graphic representation conceptually depicting an exemplary embodiment of PDA Pay and eTicket System Software components for a server computer.

The PDA Pay & eTicket System/mewallet™ Server software feature of the invention would apply equally to all types of server hardware and operating systems without departing from the spirit of the invention. The System Server software would be installed on the host System servers. FIG. 8 depicts an exemplary embodiment of exemplary Server Software components. The System Server software would include, among other things, firewalls 130*a*, 130*b*, encryption/decryption routines 131, web site server software 132*a*, 132*b*, security checking routines 133*a*, Directed Purpose System device interface routines, PDA unlocking routines 133*b*, synchronize to/from PDA routines 133*c*, interface to/from FSP and clearinghouse routines 133*d*, 133*f*, wireless protocols 133*g*, micropayment receive and acknowledge routines 133*j*, micropayment to bank account routines 133*k*, interface through modems/Internet routines 133*i*, ticketdownload.com interface routines 133*e*, licensed merchant account database 134*a*, ticketdownload.com database 135*a*, unique user security codes 134*f*, unique user security code generator 136*b*, System software for PDA 136*d*, System software for PC 136*c*, authorized service center account database 134*b*, users bitmap images 134*c*, biometric/finger print database 134*d*, users name, ID & PIN database 134*e*, users unique security codes 134*f*, users bank accounts data 137*a*, users credit card accounts data 137*b*, users brokerage accounts data 137*c*, other financial accounts data 137*d*, users personal data 137*e*.

7. Software for Biometric Device in PDA

The biometric interface software would be provided to read the user's fingerprint or optical information on the screen of the PDA or a separate biometric hardware interface on the PDA. The unique user's biometric data/fingerprint would be read and stored by the software in the PDA when software is installed. The software would then compare the stored biometric data/fingerprint with the one read when the user attempts to access the PDA or any secure data in the PDA. If the finger print(s) match within 3 attempts then the software would allow access by the user to the PDA Pay and eTicket System software. If the biometric data/finger print(s) do(es) not match within 3 attempts then the biometric software would shut off and lock the PDA. The locked PDA would then need to be unlocked. A locked PDA would only be unlocked by synchronizing it to the user's personal computer, authorized System center or at the issuing bank.

The biometric interface software feature of the invention would apply equally to all types of operating systems without departing from the spirit of the invention.

8. Image Storage Software for Storing and Displaying Image of PDA Owner

One of a variety of existing image storage software systems would be used. In the exemplary embodiment, the image of the owner would be a bitmap image. The image would be loaded into the PDA from the user's personal computer or at an authorized System outlet or bank. The photo in the PDA would be accessed by opening the 'photo album' where the image would be stored and it would then be displayed on the PDA's screen. The image verification would be an additional security measure that would work in conjunction with all the others.

The PDA image storage software feature of the invention would apply equally to all types of operating systems without departing from the spirit of the invention.

9. PIN/User ID Input and Recognition Software for PDA

In the exemplary embodiment, the PDA would include software that would require the user to input a personal identification number and user identification name/code into the PDA via a pen pad, keypad or voice input device, such as via an internal microphone. The input software would recognize and accept input from any of these input interfaces. The user would be given 3 attempts to input the correct PIN and user ID. If the correct PIN and user ID are input, the software would allow access to all functions of the PDA including the PDA Pay & eTicket System. If after all 3 attempts, the PIN and/or user ID are incorrect, the software would shut down the PDA and disallow access. The only way to unlock a locked PDA would be to synchronize it with the user's personal computer, at the authorizing bank or issuing institution, or at an authorized System center. The PIN and user ID would also be stored within the System software on the user's personal computer.

At the user's option, non-secure areas of the PDA may be accessed without a PIN or user ID. The System would require a PIN and/or user ID.

The PIN/User ID input and recognition software feature of the invention for PDAs would apply equally to all types of platforms without departing from the spirit of the invention.

10. Software that Attaches Unique Encrypted Security Code to All Transmissions from PDA to Identify Correct PDA and User.

The PDA encrypted code software would embed a unique, encrypted security code for attachment to, or embedding in, every communication between the user's PDA and any wireless interface. The user may not change or access this code. This unique code would be embedded in the user's System software on their personal computer and/or at the issuing bank or other issuing institution. The Immtec or other host system database would maintain all security codes correlated with identifiers for their associated users. This database would be made available to all banks and clearinghouses. Each user, issuing bank or other issuing institution would register the System software on their computer with Immtec in order to activate the unique security code. The PDA device would communicate with each merchant's point of purchase device using, for example, a secure socket layer (SSL) providing encryption protection while communicating with the point of purchase terminal. In the exemplary embodiment, the SSL layer would be independent of the type of wireless communication method used.

The feature of the invention that would provide the encrypted security code embedding software for PDA's would apply equally to any platform without departing from the spirit of the invention.

D. Banking & Clearinghouse Infrastructure

1. Utilizing the Same Infrastructure that is Presently in Place for Debit Card/Credit Card Transactions.

Figure 9:
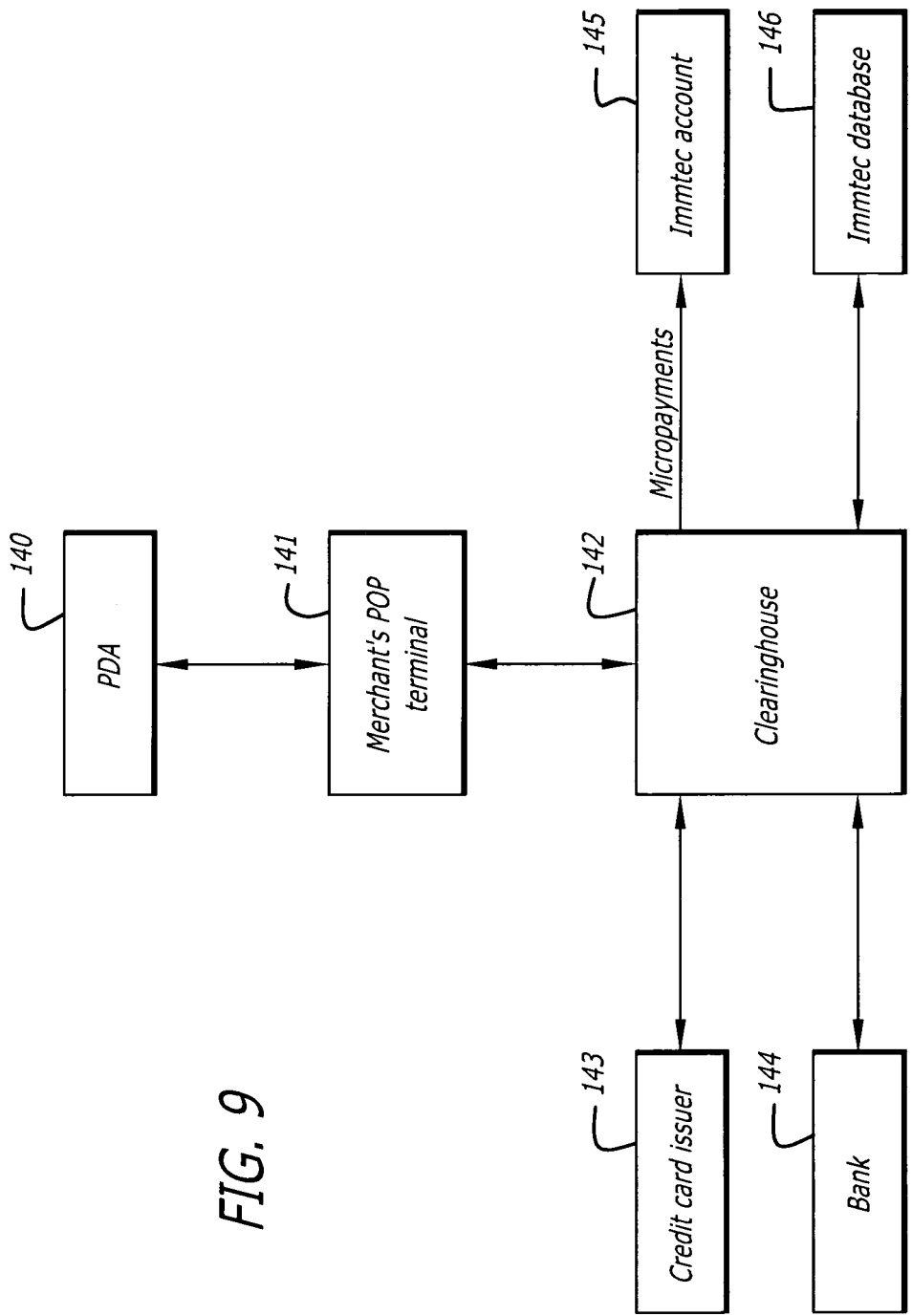
FIG. 9 is a graphic representation depicting an exemplary embodiment of the interfaces between the user, merchant, clearinghouse, financial institutions, and the systems administrator.

In the exemplary embodiment, as depicted in FIG. 9, the present invention would utilize the existing infrastructure presently in place for debit card/credit card transactions. Point of purchase terminals 141 typically communicate via analog or digital phone line or satellite to a clearinghouse 142. The clearinghouse would then distribute credits and debits to the appropriate bank 144 or credit card company 143. The bank 144 or credit card company 143 would then apply the appropriate credit or debit to the consumer's and merchant's account. A micropayment would be deposited in the Server System host's account 145 (described in more detail below). In one exemplary embodiment, no unique software would be provided for this aspect of the PDA Pay & eTicket System. The PDA would act in a manner similar to that of a credit card, debit card or check. Immtec or another host Server system would provide its daily updated database 146 of security codes, ID's and PIN's matched to users, to all clearinghouses. The clearinghouses would then electronically match the embedded security code transmitted from the user's PDA at the time of purchase as is done in the case of credit card and debit card processing.

In another exemplary embodiment, described in more detail below, the Server System controls the processing of the transactions between the PDA and the POS terminal and sends the appropriate transactions to an appropriate clearinghouse system.

E. Interfaces

1. PDA Pay & eTicket System Process

Figure 10A:
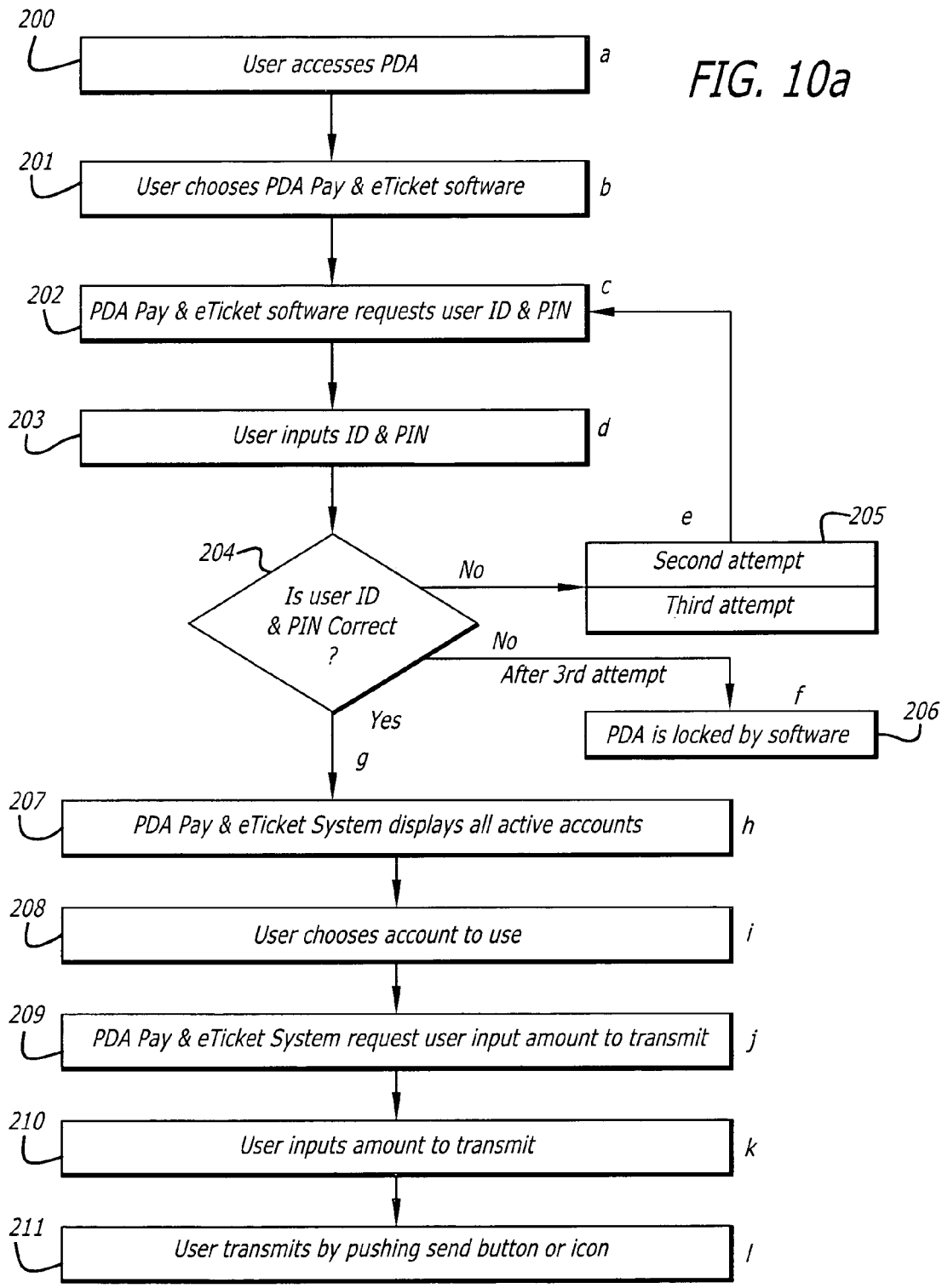
FIGS. 10a-10c are high level functional flow diagrams depicting an exemplary embodiment of the underlying interface-independent process for using a PDA or PDA/wireless phone equipped with the PDA Pay & eTicket System.
Figure 10B:
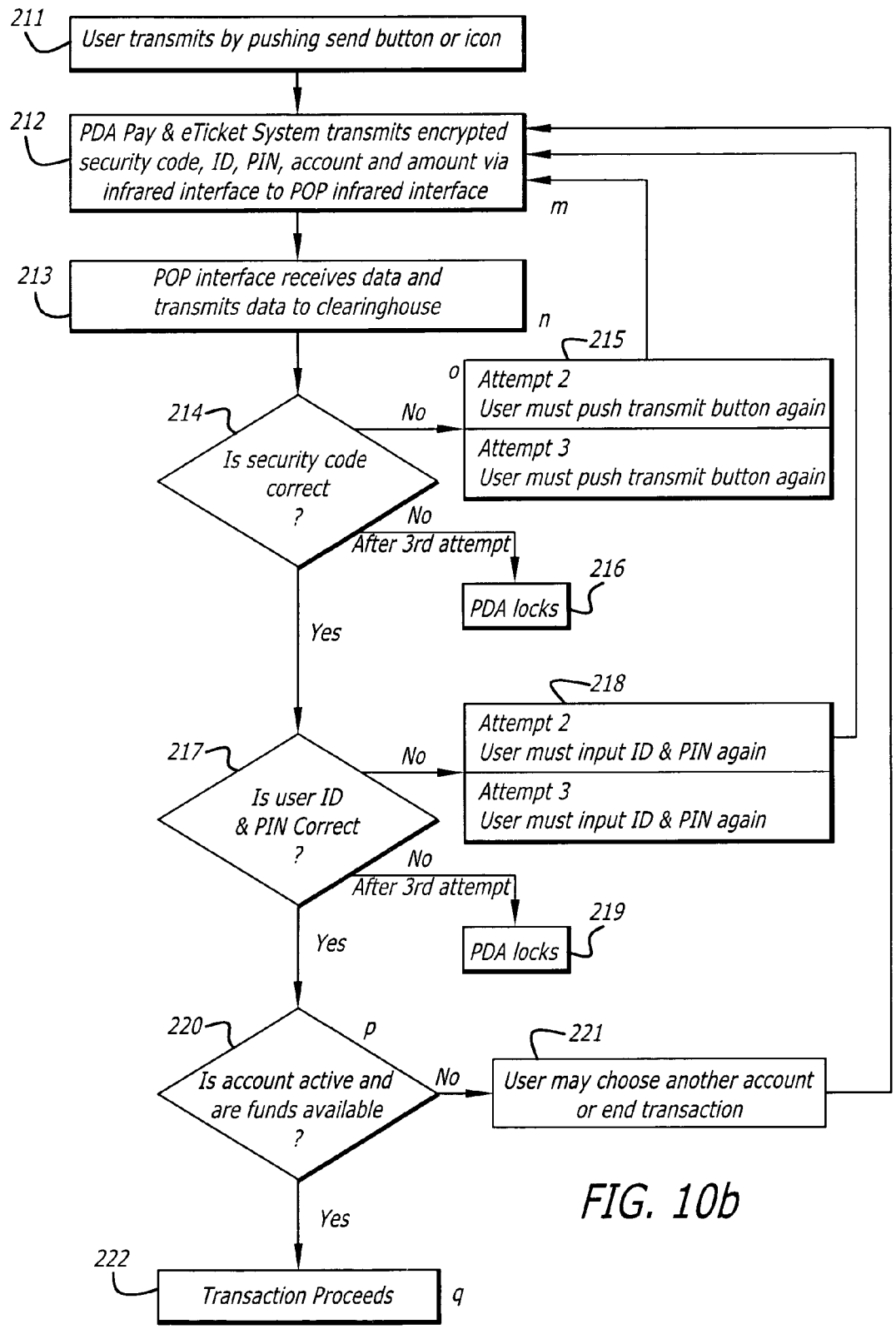
Figure 10C:
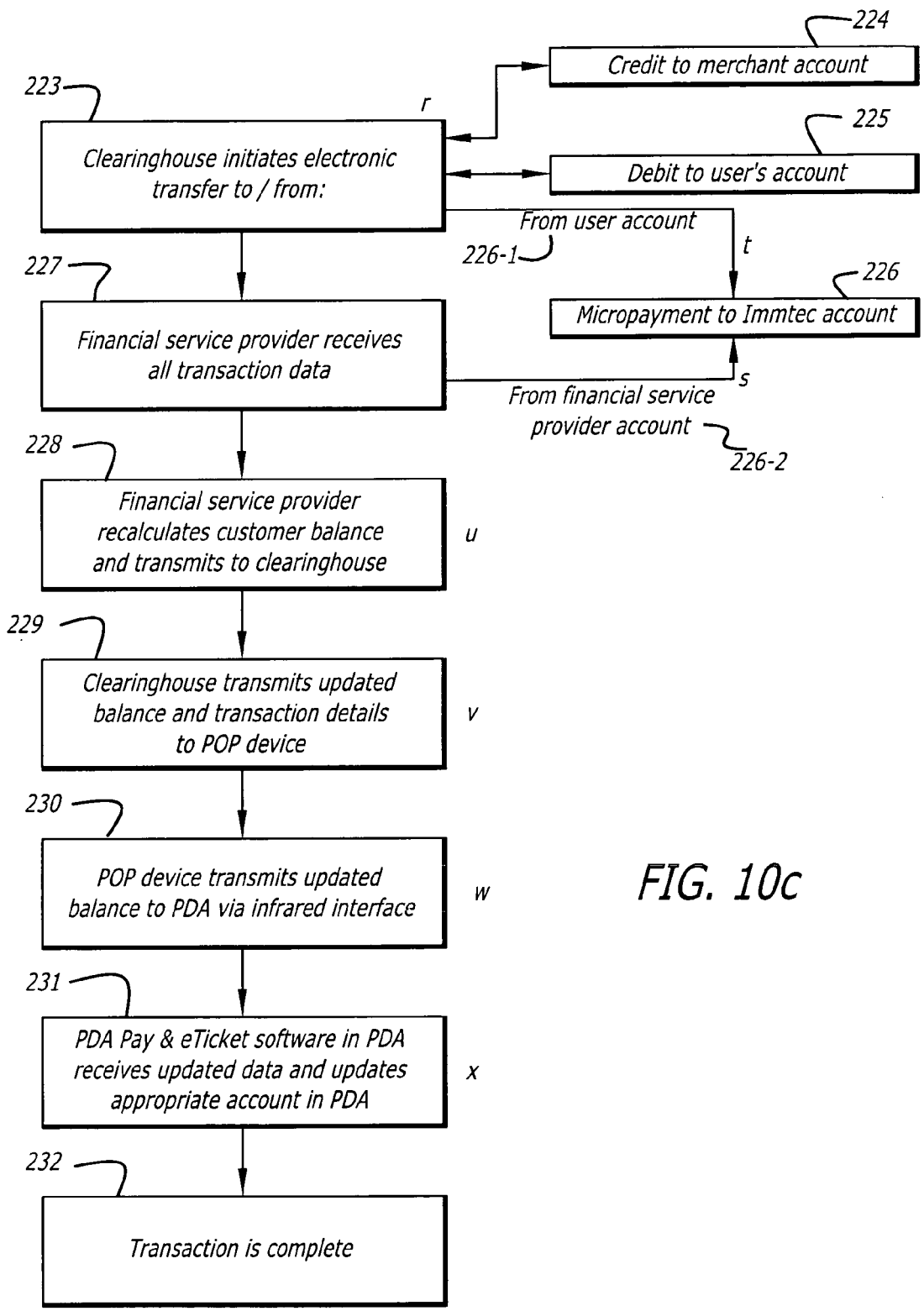
Figure 11B:
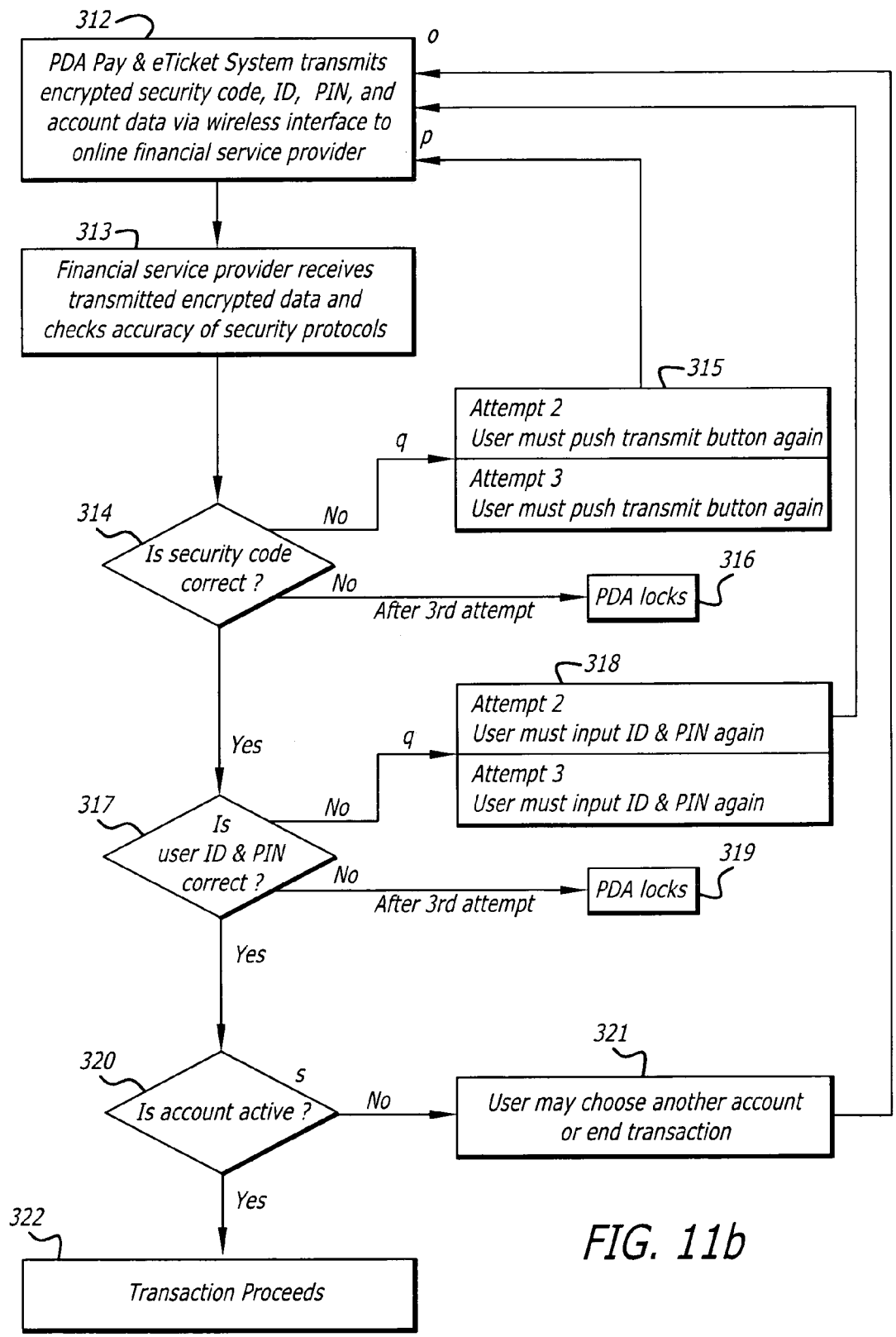
Figure 11C:
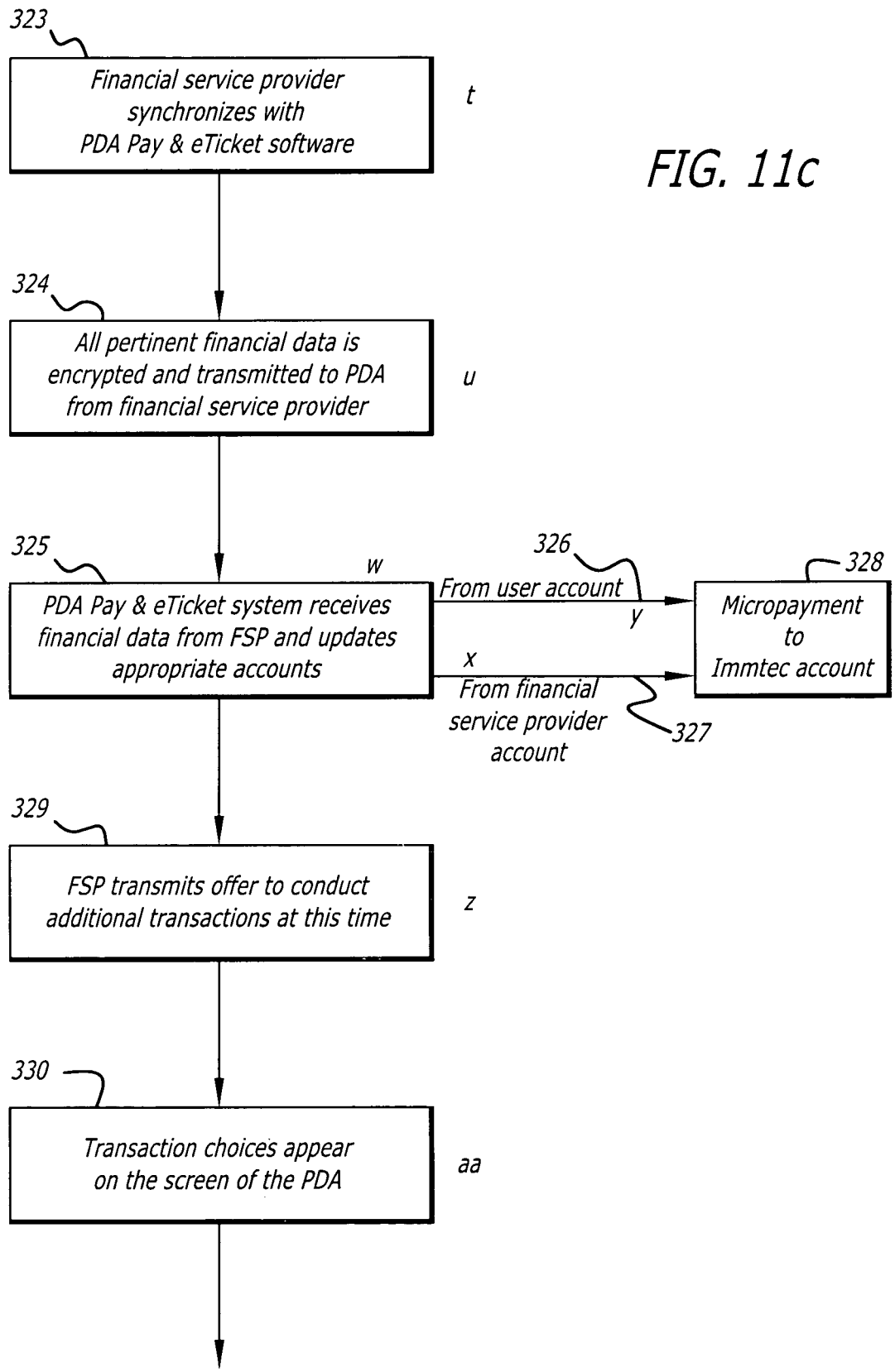
Figure 11D:
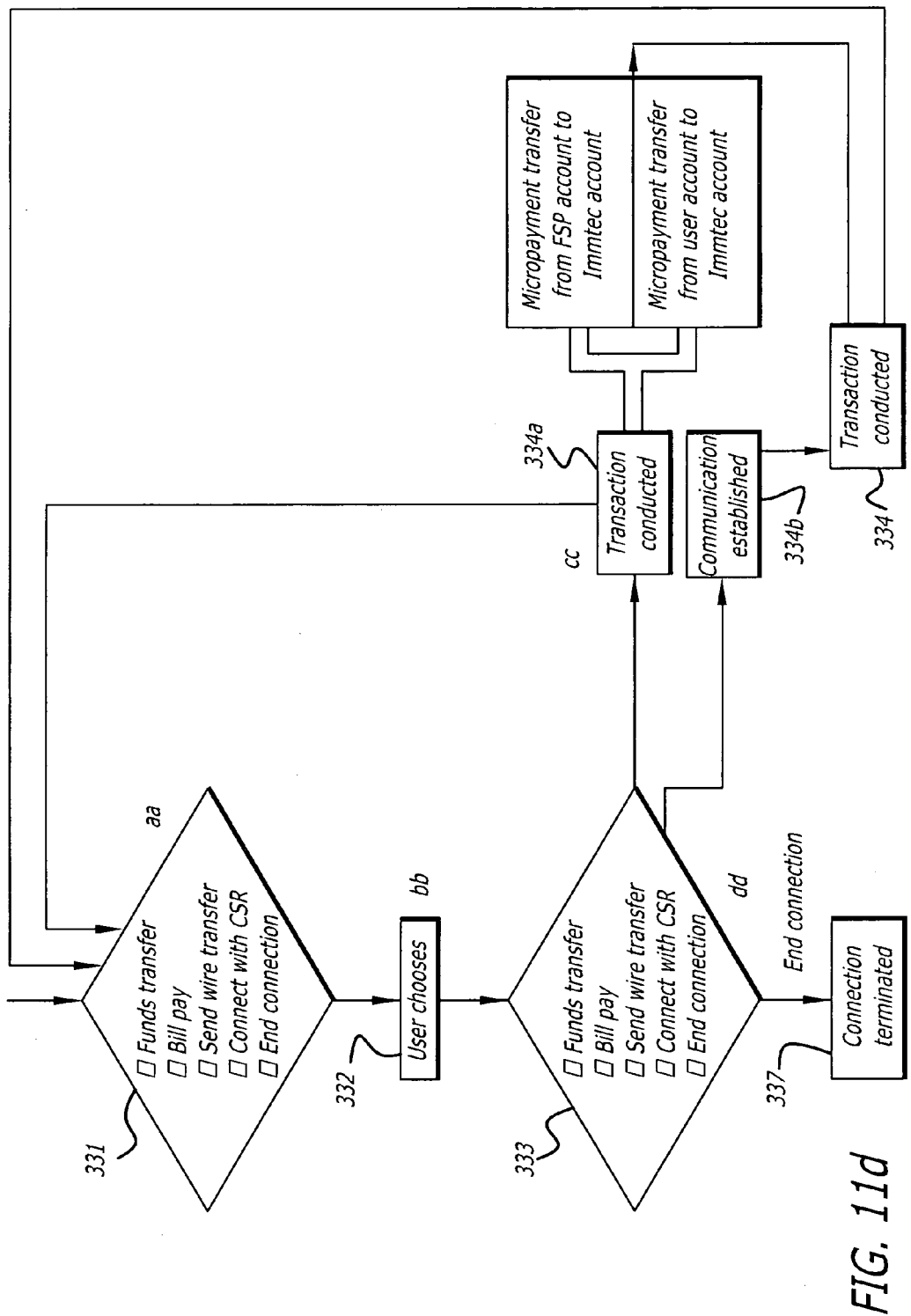
Figure 12A:
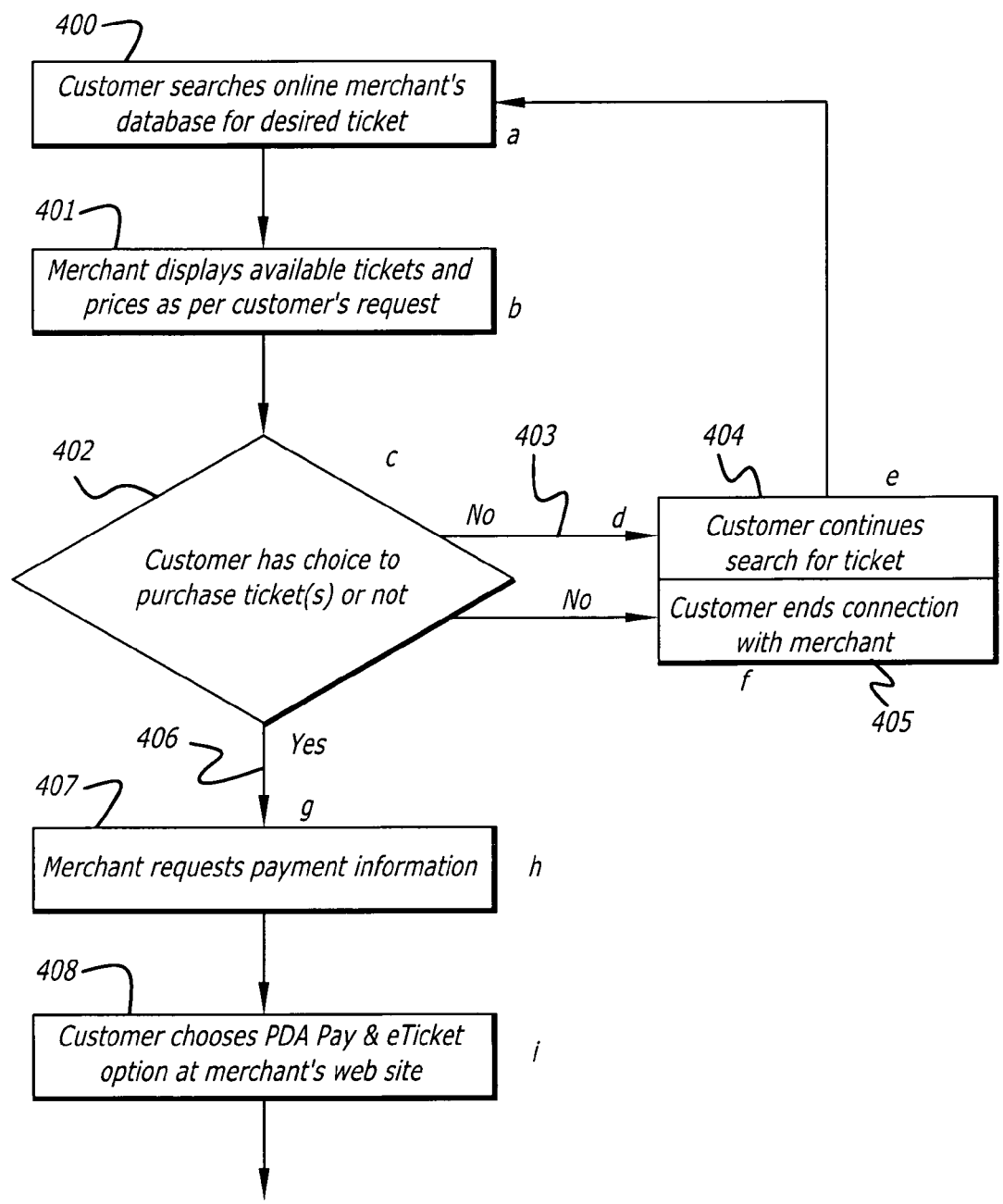
Figure 12B:
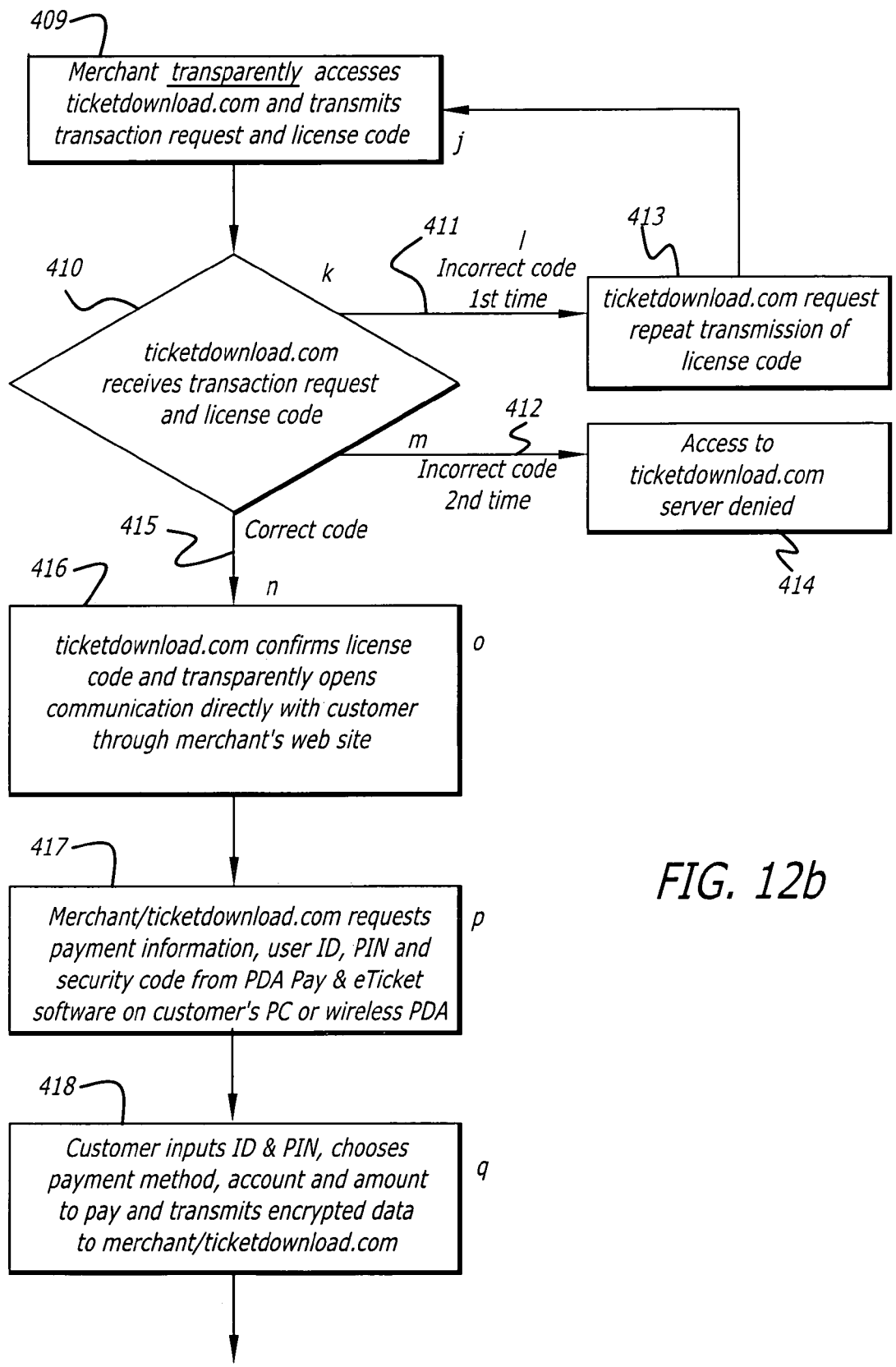
Figure 12C:
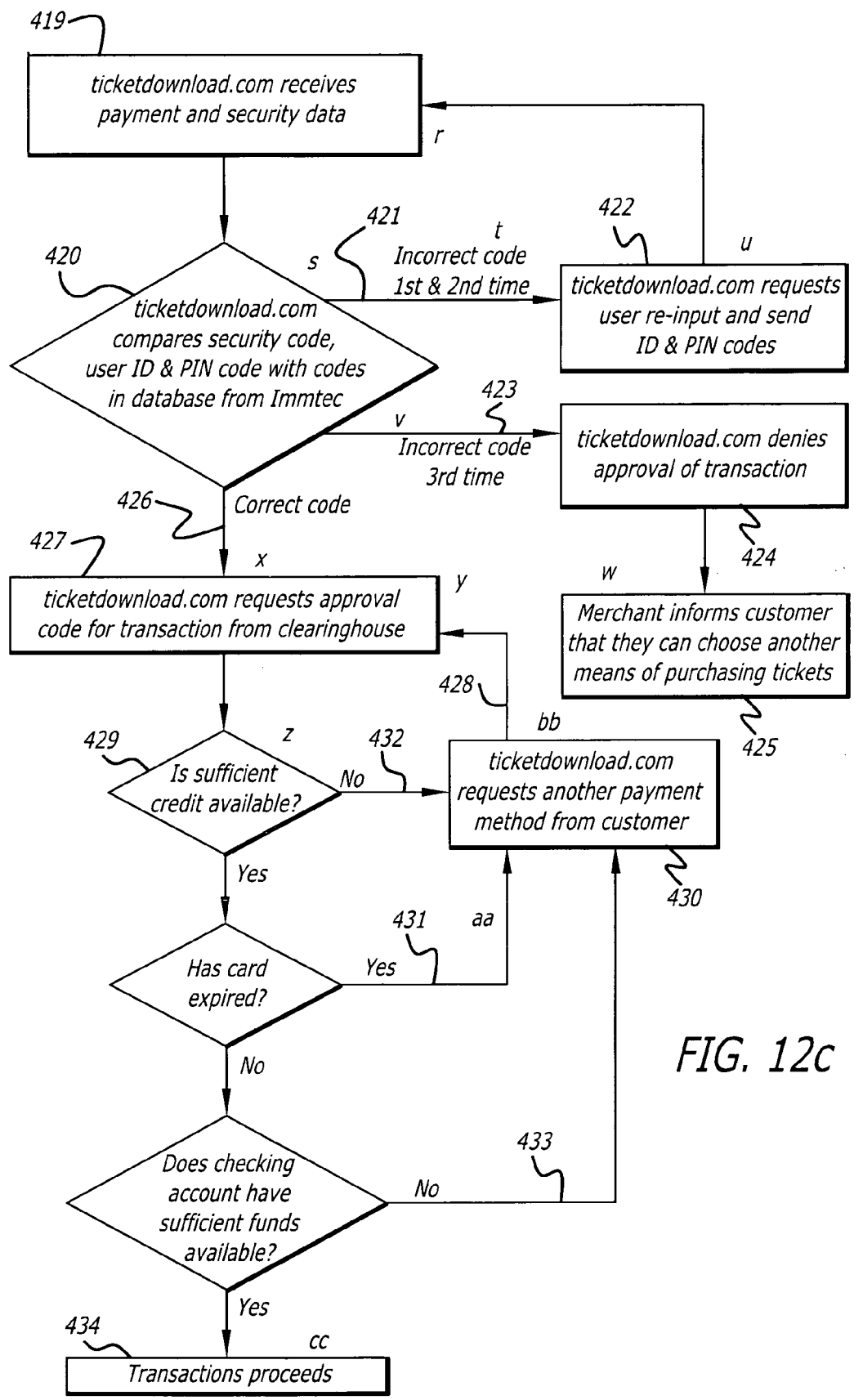
Figures 2, 12D:
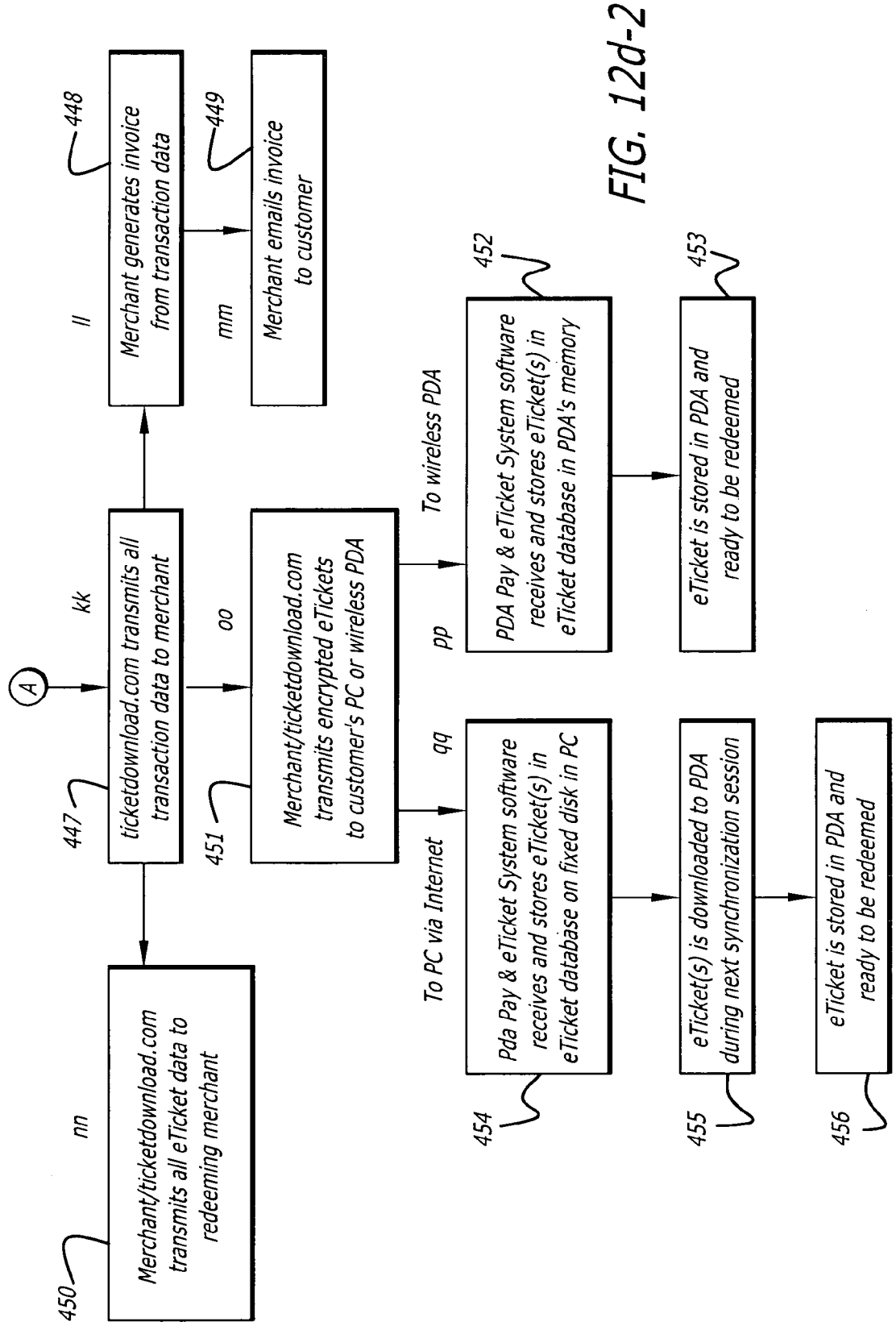

Described below, and as depicted in FIGS. 10a-10c, is an exemplary underlying interface-independent process for using a PDA or PDA/wireless phone equipped with the PDA Pay & eTicket System: (This process would occur while interfacing with a brick and mortar merchant or online merchant, or with a brick and mortar financial service provider or an online financial service provider. The interface would be via infrared. In the alternative, the interface would be via wireless or via hard wired synchronization.)

As depicted in FIGS. 10a-10c, a User would access the PDA (with or without inputting user ID and PIN as per user's choice) 200. The User would choose a PDA Pay & eTicket System icon via pen pad, keypad or voice 201. The System software would request the user ID and PIN 202. The User would input the user ID and/or PIN via pen pad, keypad or voice 203. If the user ID or PIN are incorrect 204 then the System software would request re-input of the user ID and PIN. (User would be allowed to make 3 attempts to input a correct user ID and PIN.) 205. If, after 3 attempts, the user failed to input the correct user ID and PIN, then the System software would shut down the PDA and lock it, preventing further access 206.

If the user input a correct user ID and PIN 204, then the System would display all active accounts 207. The User would choose bank or credit card account 208. The System software would request the user to input an amount to transmit 209. The User would input an amount to transmit 210. The User would then select a "send" icon via pen pad, keypad or voice 211.

The System software would then transmit the encrypted security code, user ID, PIN and amount via infrared interface in the PDA to the point of purchase infrared interface 212. The Point of purchase interface would transmit the data to an appropriate clearinghouse system 213.

If any of the security code, ID or PIN 214, 217 are incorrect, then the transaction would be denied. The System would allow the user to make 3 attempts to input correct data 215, 218. If the user failed to input the correct information, the PDA would lock 216, 219.

If the security code, ID and PIN are all correct but the user-selected account 220 does not have the desired funds, then the transaction would be denied 221 and the User would need to try another account 212 or disconnect.

If the security code, ID and PIN are all correct and if the user-selected account 210 has the desired finds, then the transaction would proceed 222.

If the transaction proceeds 222, then an electronic payment/transfer would be made 223 to the merchant's account 224 and a debit would be applied to the user's account 225. The financial services provider would receive all transaction data 227. A micropayment would be transmitted from the financial service provider account 226-2 to the system host (Immtec) account 226, and/or a micropayment would be transmitted from the user's bank or credit card account 226-1 to the system host (Immtec) account 226.

The financial service provider would then transmit a record of the transaction and updated balance to the point of purchase interface 228. The record of the transaction would then be transmitted from the point of purchase infrared interface to the PDA infrared interface 229. A POP device would also transmit the updated balance to PDA via infrared interface 230.

In the exemplary embodiment, the System software would receive the transaction record and would update the appropriate account data 231 completing the transaction 232.

2. Personal Computer

In the exemplary embodiment, a personal computer would be configured and programmed to interface with the PDA via one or both of hard wired synchronization and/or infrared interface.

3. Credit Card Processing

In the exemplary embodiment, a credit card processing terminal would be configured and programmed to interface with the PDA via an infrared interface.

4. ATM

In the exemplary embodiment, an Automated Teller Machine would be configured and programmed to interface with the PDA via an infrared interface.

5. Other Infrared Point Of Purchase Devices

In the exemplary embodiment, other infrared point of purchase devices would be configured and programmed to interface with the PDA via an infrared interface.

6. Accounting System Interfaces for the Personal Computer

In the exemplary embodiment, accounting program interfaces, such as, for example, Quicken or Microsoft Money, would interface with the PDA via hard-wired synchronization or infrared interface and synchronization software. The data collected and input into the PDA would be synchronized with the accounting software and would be applied to update all accounts. The accounting software would then synchronize with the online bank computer and would update all accounts. The PDA would again synchronize with the accounting software on the personal computer and all information on the PDA would be updated.

7. ATM to/from Bank/Credit Card Co./Clearinghouse.

In the exemplary embodiment, utilizing the existing infrastructure for debit card/credit card transactions, the user's PDA would be able to exchange data with a System-enabled ATM via an infrared communications device such as one on the front of the ATM. The ATM, using an exemplary embodiment of the ATM infrared interface aspect of the invention, would then communicate via hard wire, analog or digital phone line or satellite to the appropriate bank or clearinghouse system. The bank or clearinghouse would then distribute credits and debits to the appropriate bank or credit card company. The bank or credit card company would then apply the appropriate credit or debit to the user's account. All transactions in every direction would generate a micropayment to Immtec or other host system.

8. Bank/Credit Card Co./Clearinghouse to/from user's Personal Computer via Internet Utilizing existing software for online Internet banking as the client interface, such as, for example, Quicken or Microsoft Money software, the user could exchange data with online banking. The PDA would synchronize with the accounting software on the personal computer and the accounting software would then interface with the online bank. With this interface, the PDA would not communicate directly with the online bank through a personal computer.

9. Wireless PDA to/from Internet Online Merchants

The wireless PDA would use the same protocols as an Internet-capable wireless phone. In the exemplary embodiment, the Internet online merchant would have a web site that would work with wireless Internet protocols. All transactions in every direction would generate a micropayment to Immtec or other host system. Transactions would function in much the same way as offline transactions except for the interface.

10. Bank/Credit Card Co./Clearinghouse, (Online Financial Service Provider), to/from Wireless Modem Equipped PDA and/or Wireless Phone.

A wireless-modem-equipped PDA or a wireless phone with System software installed would be programmed to transfer and receive data from any of a plurality of banks, credit card companies and/or clearinghouses with direct online or Internet offerings according to the exemplary embodiment of the invention described below and as depicted in FIGS. 11a-11d. As depicted in FIGS. 11a-11d, in the exemplary embodiment of the invention depicted there: the User would access the User's PDA 300; the User would choose the PDA Pay & eTicket System option 301; the User would choose the Online Synchronization option 301; the User may then choose one of the available options which includes the options to synchronize with a financial service provider, synchronize with more than one financial service provider, or synchronize with all financial service providers with which the user has financial relations.

The PDA software would request the user to input the user ID and/or PIN 302. The User would input the user ID and/or PIN via pen pad, keypad or voice input device 303. If the user ID and/or PIN 304 are incorrect, then the System software would again request input of the ID and/or PIN. The User would be given 3 attempts to input correct user ID and PIN information 305. If, after 3 attempts, the user does not input the correct user ID and/or PIN, then the System software would shut down the PDA and lock it, preventing further access 306.

If the user input a correct ID and/or PIN 304, the System would display all active accounts 307. The PDA would then prompt the User to choose one or more accounts with which to synchronize 308.

A "Connect" icon would appear on the display device of the PDA and the PDA System would prompt the user to press the connect icon 309.

Once the User presses the connect icon or key 310, the internal wireless modem would dial and attempt to connect with the appropriate online financial service provider 311. The PDA System software would then send an encrypted security code and user ID and PIN 312 to the system of the user-identified financial service provider(s). The system of the financial service provider would receive the transmitted encrypted data and would attempt to validate the accuracy of the transmitted information using that system's security protocols 313.

If any of the encrypted security code, ID and PIN 314, 317 are incorrect, the synchronization would be discontinued 316, 319. The User would be allowed 3 attempts to enter and send correct ID and PIN 315, 318.

If all of the encrypted security code, ID and PIN are correct 314, 317, the system of the financial service provider ("FSP") would check the status of the user-selected account 320. If the user-selected account is not active, the user would be prompted to choose another account or to end the transaction 321.

If the user-selected account is active 320, then the transaction would proceed. The PDA software 322 would synchronize with the appropriate online financial service provider system 323: all pertinent financial data would be encrypted and transmitted to the online financial service provider 324; all pertinent financial data would be encrypted and transmitted to PDA from financial service provider 324.

The System software would update all user-chosen accounts 325 with the appropriate financial information. A micropayment would be recorded and transmitted from the online financial service provider to Immtec (or other host system) account 327, 328. A micropayment would be recorded and transmitted from the user's bank or credit card account to Immtec (or other host system) account 326, 328.

The financial service provider would prompt the user to conduct additional transactions via the PDA 329 causing transaction choices to appear on the screen of the PDA 330, 331.

The User would choose a new transaction or choose to end the connection 332. If the user chooses a new transaction 333 then the transaction would be conducted 334a, 334b-334c. If the user chooses to end the connection, then the connection between the PDA/phone and the financial service provider would be terminated 337.

11. Personal Computer to/from Internet.

The interface between a client Personal Computer configured with the System and a host System server over the Internet can be via a dial-up via modem or other connection, including wireless, direct connections to the server, or any available high-speed connection, such as DSL. A browser capable of 128-bit encryption is preferred for security purposes. The invention is not limited to any particular level of encryption. The 128-bit encryption capability is given for illustrative purposes and is not a limitation of the invention.

12. Merchant to/from Bank/Credit Card Co./Clearinghouse.

In the exemplary embodiment of the invention, the invention would utilize the existing infrastructure for processing debit card and/or credit card transactions that is already in place in merchant, bank, credit card, debit card and clearinghouse systems. By utilizing the existing infrastructure, the user's PDA in the exemplary embodiment of the invention would exchange data with a point of purchase device configured with an infrared communications device and with an infrared interface according to the merchant interface aspect of the present invention.

The point of purchase device would then communicate via hard wire, analog or digital phone line, satellite or other wireless communication link to the merchant's computer inventory and accounting system and to the relevant third party financial system such as a bank, credit card, debit card, or clearinghouse system (references herein to a bank or clearinghouse or to a bank or clearinghouse system will be understood to include various types of third party financial systems).

The bank or clearinghouse system would then distribute credits and debits, as the case may be, to the appropriate bank, credit card company, or other financial institution. The bank, credit card company or other financial institution system would then apply the appropriate credit or debit to the user's and merchant's accounts.

In the exemplary embodiment of the invention, all transactions involving the System would cause the System to generate a micropayment from the receiving financial service provider to Immtec. All transactions involving the System would cause the generation of a micropayment from the user's bank or credit card account to Immtec.

13. Ticketdownload.com/downloadticket.com to/from Licensed Online Merchants.

In the exemplary embodiment of the invention, the System would provide a web site, referred to herein as "Ticketdownload.com." In the exemplary embodiment of the invention, Ticketdownload.com would offer the ability to download electronic tickets to a personal computer or a wireless-modem-equipped PDA. The System software would provide for storage of electronic tickets ("eTickets") in the storage devices configured with the user's personal computer and PDA. The System software would provide for transmission of eTickets at the request of the user via the PDA's infrared interface to an infrared interface at a point of ticket use (e.g., air terminal, train terminal, boat terminal, theatre, cinema, museum, etc.).

The ticketdownload.com software engine would interface with all licensed ticket brokers, airlines, theaters, travel agencies, etc. eTickets would be purchased through the ticketdownload.com Internet site or directly from any licensed ticket agency or merchant. In the exemplary embodiment of the invention, Ticketdownload.com would not be a ticket broker web site but would instead be a portal through which merchants and ticket brokers are provided the opportunity to offer downloadable eTickets to customers using the PDA Pay & eTicket/mewallet™ System. The ticketdownload.com software would work transparently to the user/ticket purchaser when utilized by a licensed merchant as described in the exemplary embodiment below and as depicted in FIGS. 12a-12d.

In the exemplary embodiment as depicted in FIGS. 12a-12d, the User/Customer (or simply, "Customer") would search an online merchant's database for desired tickets 400. The Merchant would display available ticket(s) and prices according to the customer's request 401. In the scenario depicted in FIGS. 12a-12d, the Merchant would be licensed to provide a link for the Merchant's customers to the PDA Pay & eTicket/mewallet™ System to download eTickets.

The licensed Merchant's site would prompt the Customer with a choice to purchase ticket(s) or not 402. If the Customer chooses not to purchase ticket(s) 403, the Customer can continue to search for alternative ticket(s) at the Merchant's site 404 or, the Customer can end the connection with the Merchant's site 405.

If the Customer chooses to purchase the ticket(s) 406, the Merchant's site would prompt the Customer to input payment information 407. Once the Customer has input the necessary payment information and the Merchant's site has validated that information, the Customer would be prompted to download electronic tickets by clicking on the ticketdownload option button, or some other type of option button or link, on the Merchant's site. Once the Customer clicks on the ticketdownload (the System) option button at the Merchant's site 408, the Licensed merchant's web site would transparently access the PDA Pay and eTicket/mewallet™ System server software at ticketdownload.com and transmit a license code 409 to the ticketdownload.com site with a request to download the appropriate eTicket(s). In the exemplary embodiment, transmission of the license codes would be encrypted.

The ticketdownload.com site would receive the ticket transaction request and the license code 410, and would de-encrypt and attempt to validate the license code against a database of authorized license codes. If the System is unable to validate the license code on the first attempt 411 then ticketdownload.com would request repeated transmission of the license code from the online Merchant's web site 413. If the System is unable to validate the license code on the second attempt 412 then access to ticketdownload.com server would be denied 414.

If the System is able to validate the transmitted license code 415, then ticketdownload.com would confirm validation of the license code to the Merchant's site and would transparently open communication directly with the Customer through the Merchant's web site 416.

Ticketdownload.com, either through the merchant's system, or directly, would request the Customer to supply payment information (to the extent to which the Merchant's system has not already done so), User ID, PIN and other security code from the System software in the customer's PDA or wireless phone/PDA 417. In one exemplary embodiment, payment information would be provided by the Customer only to the Merchant's site and the Merchant would be responsible for paying a micropayment to the System host, i.e., Immtec. In an alternative embodiment, the Customer would provide payment information to the System and the System would convey the payment information to the Merchant's system.

The Customer would input the Customer's User ID, and PIN, would choose payment method, (check, credit card or debit card) and amount to pay, and would transmit this information to the Merchant/ticketdownload.com via an Internet interface or wireless modem interface 418.

Ticketdownload.com would receive the payment and security data 419. Ticketdownload.com would compare the security data with security data in the System (i.e., Immtec) database 420. If the System is unable to validate the security data 421, then ticketdownload.com would request that the Customer re-input the Customer's User ID & PIN codes 422. The System would provide the Customer/User with 3 opportunities to input the correct security information. If the System is unable to validate the Customer-input security information after the 3rd attempt 423 then ticketdownload.com would deny approval of the transaction 424 and would notify the Merchant system and the Customer.

If the System notifies the Merchant system that the System was unable to validate the security information, then the Merchant's site would inform the customer that the customer can choose another means of purchasing tickets 425.

If the System is able to validate the Customer input security information 426, then ticketdownload.com would request an approval code for the transaction from a credit card/debit card clearinghouse 427. The Clearinghouse may deny approval if sufficient credit is not available 432, the credit or debit card has expired 431, or if the Customer's account does not have sufficient funds available 433.

If the System receives a denial of the transaction from the clearinghouse 431-433, ticketdownload.com/Merchant site would request another payment method from the Customer 430.

If, on the other hand, the System receives an approval of the transaction from the clearinghouse, the System would allow the transaction to proceed 434: ticketdownload.com would transmit approval of the transaction to the Customer's PDA device via the Merchant's web interface 440; and ticketdownload.com would transmit approval of the transaction to the Merchant's site 441.

In the exemplary embodiment of the invention, payment for the transaction would be transferred through the clearinghouse to the Merchant's account 442. The payment would be debited through the clearinghouse from the Customer's account 443. A micropayment would be made to the Immtec (or other host institution) account through the clearinghouse from the Merchant's account 444. Further, a micropayment would be made to the Immtec (or other host institution) account through the clearinghouse from the Customer's account 445.

In the exemplary embodiment, ticketdownload.com would transmit a unique security code for eTicket(s) to the online Merchant 446. Ticketdownload.com would transmit all transaction data to the online Merchant 447. The online Merchant would generate an invoice/receipt from the transaction data 448 and would email the invoice/receipt to the Customer 449. Ticketdownload.com (or the Merchant) would transmit, such as electronically, a confirmation copy of the eTicket(s) to the merchant requiring the ticket for entrance or purchase 450 and would transmit, such as electronically, encrypted eTicket(s) to the Customer's PC or wireless phone/PDA 451.

If the eTicket(s) is transmitted to the Customer's wireless phone/PDA then the System software in the wireless phone/PDA would receive the eTicket(s) and would store the eTicket(s) in the eTicket database in the wireless phone/PDA's memory 452, 453.

If the eTicket(s) is transmitted to the System installed in the Customer's personal computer, then the Customer/user can download the eTicket(s) to the PDA via a hard wire or infrared interface and the System software in the wireless phone/PDA would receive the eTicket(s) and store the eTicket(s) in the eTicket database in the wireless phone/PDA's memory 454-456.

14. Redeeming PDA eTickets

When the user of the PDA (the eTicket Customer) wishes to redeem a downloaded eTicket for entrance to an event or for purchase of an item, they will transmit the eTicket via the PDA's infrared interface to the infrared interface at the redeeming merchant's point of purchase device. In the exemplary embodiment, the eTicket would be transferred with the same security measures as used in the PDA Pay System, from the PDA to the redeeming merchant. Redemption of eTickets is described below for the exemplary embodiment and as depicted in FIGS. 13a-13c.

Figure 13C:
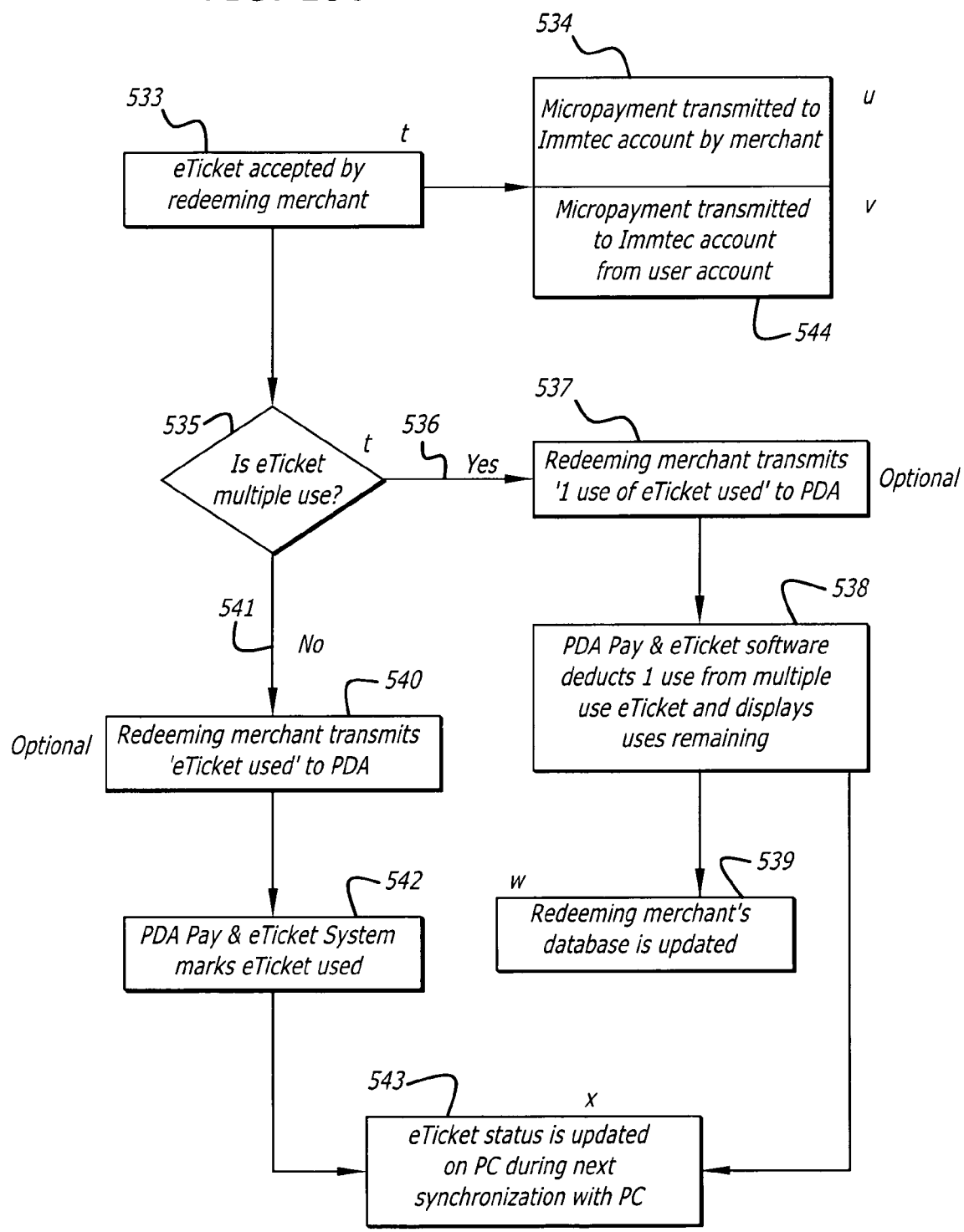

In the exemplary embodiment as depicted in FIGS. 13a-13c, the User would access the PDA or wireless phone/PDA 500. The User would choose the PDA Pay and eTicket/me-wallet™ System icon 501. The PDA System (or in this section, the System) would prompt the User to input a user ID & PIN 502. The User would input the User's user ID & PIN 503 and the System would attempt to validate the input against the user ID and PIN stored in the memory of the PDA device. If the System is unable to validate the user ID & PIN 504, then the System would allow the user to make 2 more attempts to input a correct user ID & PIN 505-506. If the System is unable to validate the user ID & PIN after the 3rd attempt, then the System would lock the PDA using software instructions 507a-507b. Various approaches for unlocking a PDA are disclosed below.

If the System is able to validate the user ID & PIN 508, then the System would display all active accounts 509 available to the User. The User in this illustrative scenario would choose the eTicket option 510.

Once the User has selected the eTicket option, the System would prompt the User to identify the particular eTicket(s) that the User wants to redeem 511. In the exemplary embodiment depicted in FIGS. 13a-13c, the System would prompt the User to select eTicket(s) to be redeemed by listing all eTickets available for redemption.

The User would choose the eTicket(s) the User wishes to redeem 512. Once the User has selected the eTickets that the User wishes to redeem, the System would prompt the User to transmit the eTicket(s) 513. In the exemplary embodiment depicted in FIGS. 13a-13c, the System would prompt the User to transmit the selected eTicket(s) by prompting the User to push a send button or send icon to transmit the eTicket(s) 513.

The User would transmit eTicket(s) by pushing a send button or selecting a send icon 514. The System would recognize the User's pushing of a send button or selection of a send icon to be an instruction to transmit the selected eTicket(s) and the associated user ID, PIN, and encrypted security information via an infrared interface configured with the User's PDA. The System would transmit the eTicket(s), and the associated user ID, PIN and encrypted security information via the infrared interface configured with the User's PDA to the redeeming merchant's infrared interface device 515.

The redeeming Merchant's computer would receive the transmitted eTicket data and would compare the transmitted eTicket data with data previously transmitted by ticketdownload.com and saved by the redeeming Merchant's computer system in its own database 516.

If the redeeming Merchant's computer system is unable to validate the security information 517, 522 then the redeeming Merchant's computer would reject the attempt to redeem the eTicket 520-521, 525-526, (the redeeming Merchant's computer system would provide the User with 3 attempts to transmit the eTicket and valid security information 518-519, 523-524.)

The redeeming Merchant's system would compare the eTicket data transmitted by the User to the eTicket data for that User previously provided by the ticketdownload.com/online Merchant web site. If the eTicket data 528 does not match 529 then the eTicket would be rejected 531-532. The redeeming Merchant's system would provide the User with one additional eTicket redemption attempt 530. If the eTicket data does not match after a 2nd try 531 the ticket would be rejected and the redeeming Merchant must either contact ticketdownload.com or deny the eTicket as an invalid ticket 532.

If the eTicket data transmitted by the user's PDA matches then the eTicket previously transmitted by the ticketdownload.com/online Merchant site and stored in the memory of the redeeming Merchant's system, then, the redeeming Merchant's system would send the User's PDA an eTicket acceptance. Then, depending upon the type of eTicket transmitted, the System in the PDA would either mark the eTicket in the PDA memory as "used" or debit a portion of that eTicket's total value (or total multi-use quantity) 533.

There are various types of eTickets. One type of eTicket is a single use eTicket—such as a ticket to attend a particular entertainment event. Another type of eTicket is a total value, variable use eTicket Such an eTicket would record a total value, such as, for example, a metro ticket that is initially assigned a value of, for example, ten dollars ($10). The value of each use of the eTicket depends on the distance traveled by the user. If the user travels from point A to point B, the System reduces the amount remaining on the eTicket by an amount "X". If the user travels from point A to point C, the System reduces the amount remaining on the eTicket by an amount "Y". Yet another type of eTicket records a total value from which a fixed amount is reduced for each use. For example, a toll booth eTicket might be initialized to $100.00 (one hundred dollars). Each time the user passes the toll booth, the eTicket value is reduced by a fixed amount, for example $2.00 (two dollars). Another type of ticket would be recorded as a quantity—for instance, ten tickets. The type of eTicket would be identified by the eTicket merchant and recorded in the PDA by the System at the time that the User purchases the eTicket. In the exemplary embodiment, the System is programmed to interpret the eTicket type and mark as "used" or reduce the amount remaining as appropriate upon redemption.

When a redeeming Merchant accepts an eTicket, then the redeeming Merchant's system would transmit instructions to a clearinghouse to transfer a micropayment from the redeeming merchant's account to the ticketdownload.com account 534.

When a redeeming Merchant accepts an eTicket, then the redeeming Merchant's system would transmit instructions to a clearinghouse to transfer a micropayment from the User's account to the ticketdownload.com account 544.

When a redeeming Merchant accepts an eTicket, then the redeeming Merchant's system would update the redeeming Merchant's database in the memory of the redeeming Merchant's system is updated 539.

After a redeeming Merchant has accepted an eTicket and has sent the User's PDA an eTicket acceptance, and once the System in the PDA either marks the eTicket in the PDA memory as "used" or debits a portion of that eTicket's total value 533, the System in the PDA would generate synchronization information for the User's PC to synchronize the eTicket status in the memory of the User's PC during the next synchronization session between the user's PDA and user's PC 543.

As mentioned above, in some exemplary embodiments of the invention, an eTicket may be used multiple times 535-538; if it is not 541, the System marks the eTicket as used 542.

15. Unlocking Routine for PDA Using PC

As disclosed above, there are a number of scenarios in which the System in the PDA causes the PDA to be locked from further PDA payment or eTicket usage. This is done for security purposes. If a particular user cannot transmit the proper security information after multiple tries, then there is a possibility that the person trying to use the device is not the rightful owner. By locking the PDA device, the rightful user is protected from use by unauthorized persons of the user's PDA device. However, in the event that the user has simply forgotten the user's own user ID and/or PIN, the user can "unlock" the device in one of the ways described herein. It will be understood by someone with ordinary skill in the art that the exemplary embodiment would provide all of the described ways of unlocking a locked device, but that the invention is not limited to an embodiment that provides all of the described unlocking approaches. Without departing from the spirit of the invention, one or some of the unlocking approaches could be provided without providing any of the other unlocking approaches.

Figure 14A:
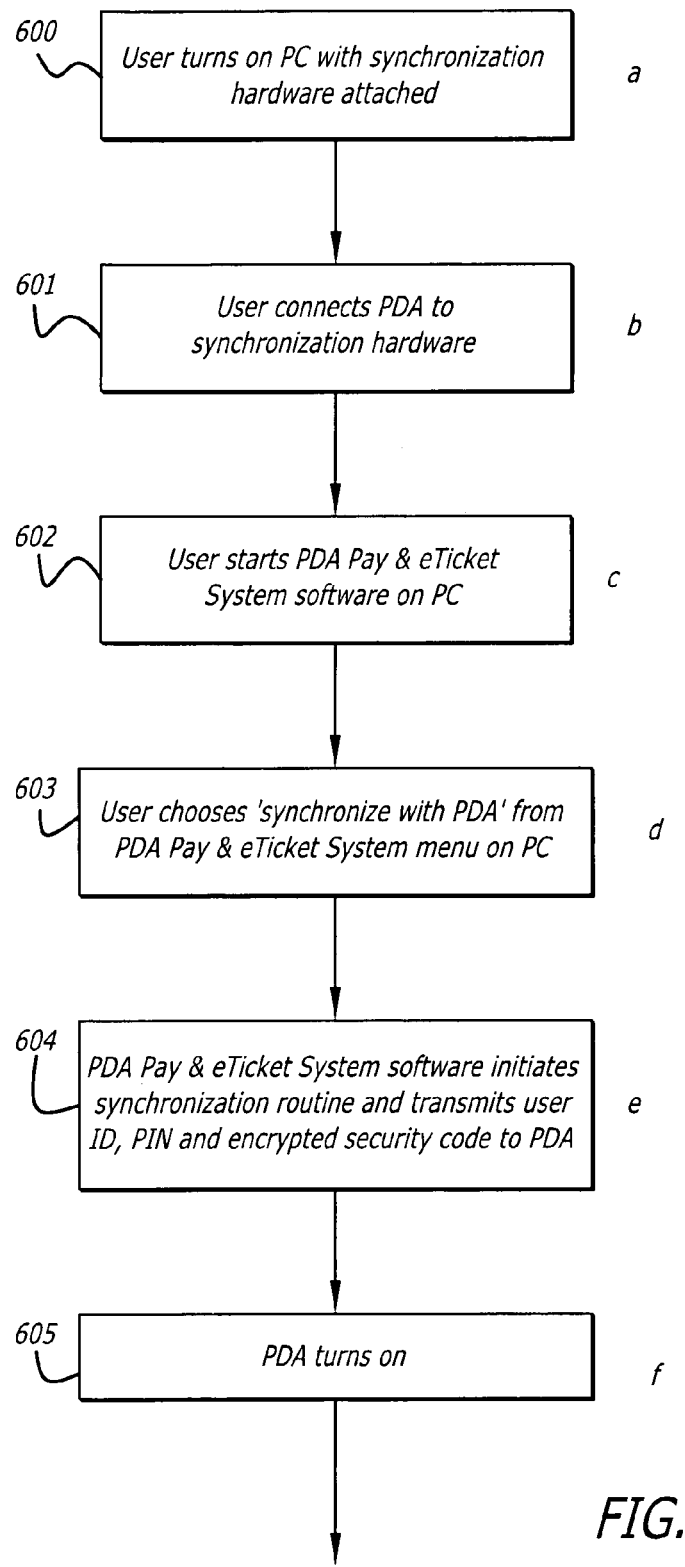
FIGS. 14a-14b are high level functional flow diagrams depicting an exemplary embodiment of the PDA unlocking routine using a personal computer.
Figure 14B:
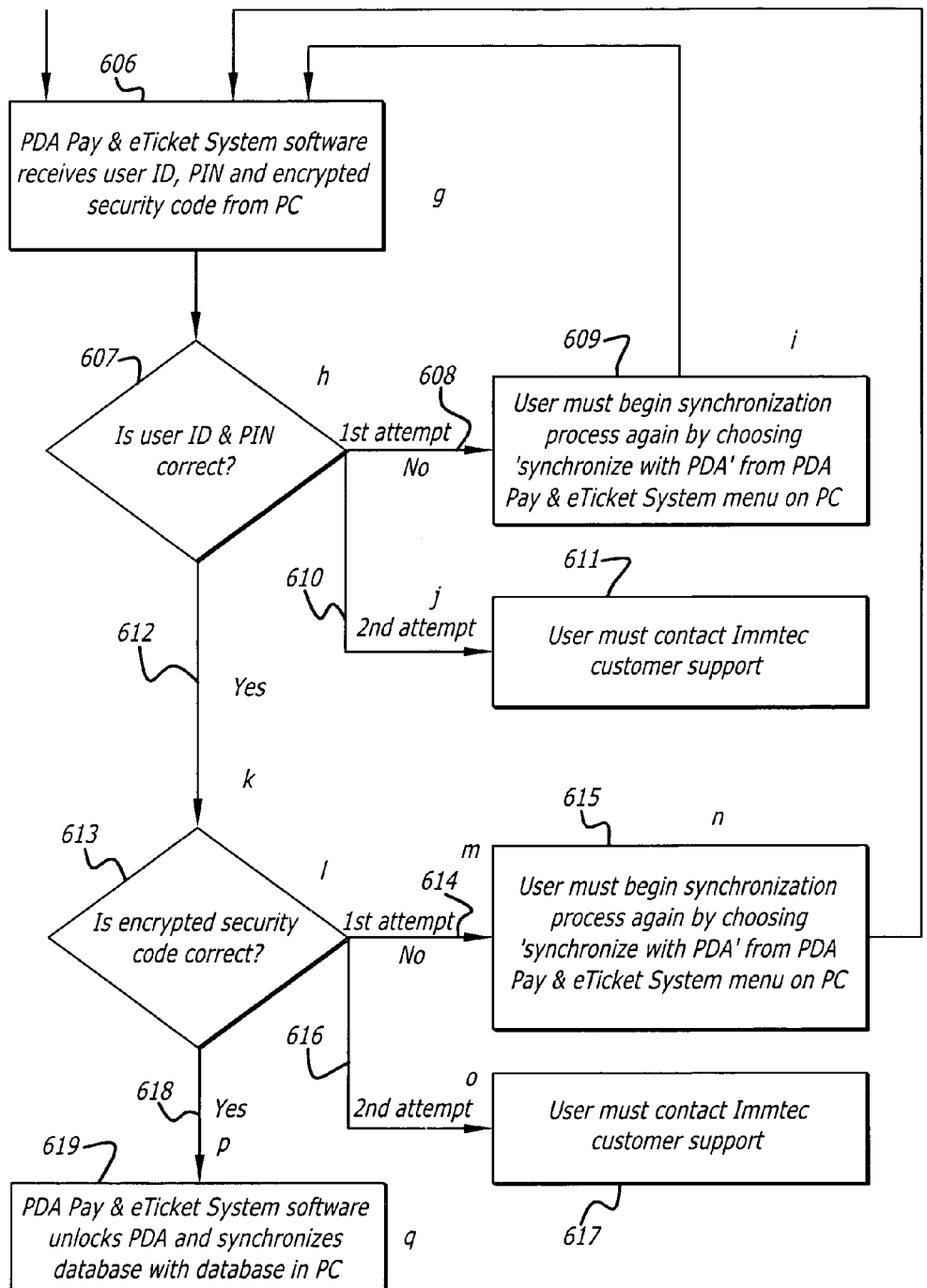

In the exemplary embodiment of the invention, as described below, and as depicted in FIGS. 14a-14b, a PDA unlocking routine through the User's PC would be provided. In the exemplary embodiment, the User would turn on the User's own home PC or office PC configured with synchronization hardware 600. The User would connect the locked PDA to PC synchronization hardware 601. The User would then start the System software resident on the PC 602. The User would choose 'synchronize with PDA' from the System menu on PC 603.

The System on the PC would initiate a synchronization routine and would transmit the user ID, PIN and encrypted security code to the PDA 604. The PDA would activate 605 and the System on the PDA would receive the user ID, PIN & encrypted security code transmitted from the PC 606. The System on the PDA would compare the transmitted user ID and PIN to the user ID & PIN stored in the memory of the PDA 607. If the transmitted user ID and PIN does not match the user ID and PIN stored in the memory of the PDA 608, then the User would be instructed to re-initiate the synchronization process 609. If the user ID and PIN are not matched after a second attempt to synchronize 610 then the user would be advised to contact Immtec or an authorized service center customer support 611.

If on the other hand the System on the PDA determines that the transmitted user ID and PIN match the user ID and PIN stored in the memory of the PDA 612, the System in the PDA would check for a match of the encrypted security code transmitted by the PC with the encrypted security code stored in the memory of the PDA 613. If there is no match of the encrypted security codes 614, then the User would be prompted to re-initiate the synchronization process 615. If there is no match after a second attempt 616, then the User would be advised to contact Immtec or some authorized service center customer support 617.

If there is a match between the transmitted and stored encrypted security codes 618, then the System in the PDA would unlock the PDA and would synchronize the database information stored in the PDA with the database information stored in the PC 619.

In an alternative embodiment, the PDA would transmit the user ID, PIN, and encrypted security information stored in the PDA to the PC. The PC System would check for a match between the user ID, PIN and encrypted security information transmitted by the PDA with the user ID, PIN and encrypted security information stored in the memory of the PC. If there is a match, then the PC System would send an unlocking key to the PDA. The PDA would receive the unlocking key which it would use to unlock the PDA.

In either embodiment, the PDA would be unlocked. However, the user would need to determine through independent means the proper user ID, PIN, and/or security code.

16. PDA Unlocking Routine at Authorized Service Center

Figure 15B:
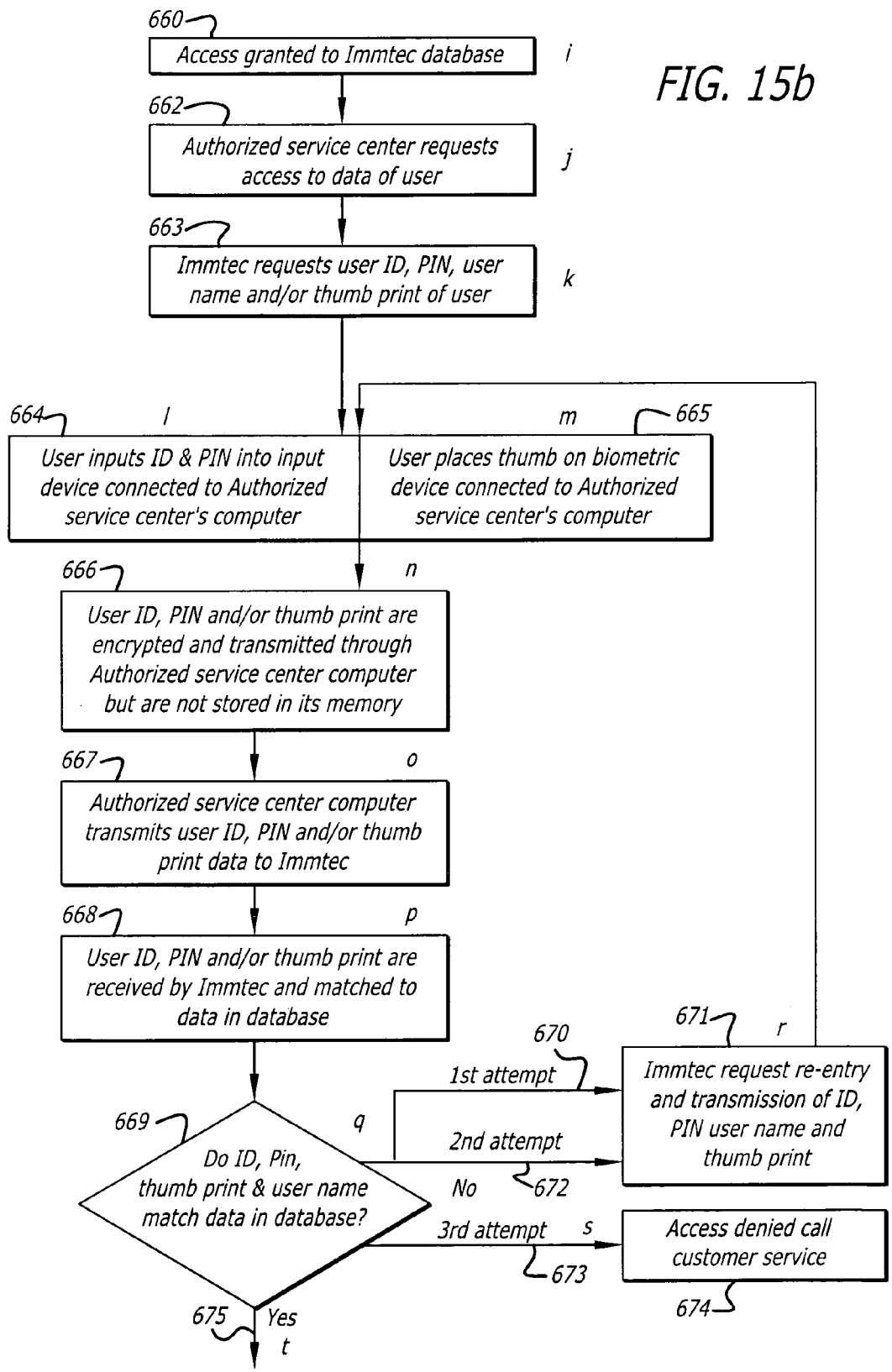
Figure 15C:
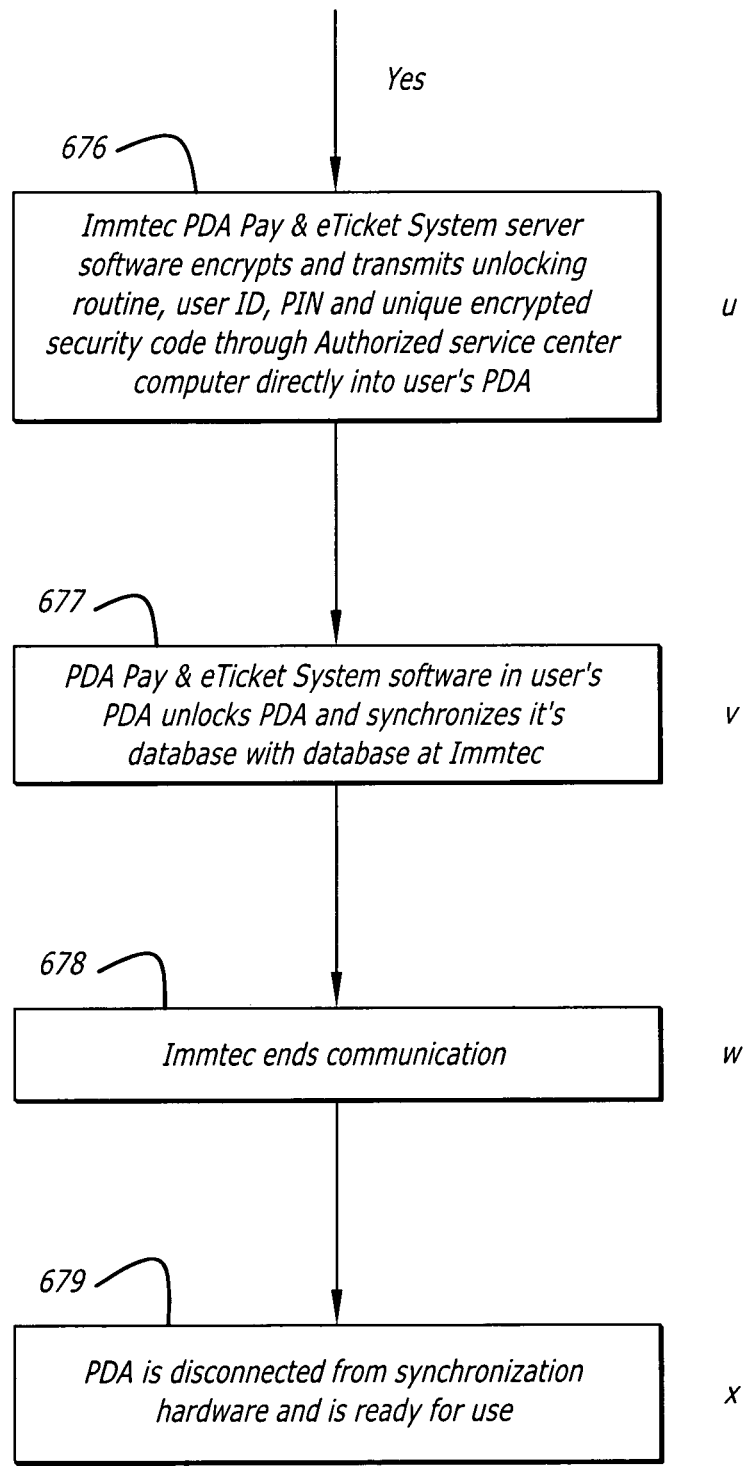

In the exemplary embodiment of the invention, as described below, and as depicted in FIGS. 15a-15c, a PDA unlocking routine through an authorized service center would be provided. As depicted in FIGS. 15a-15c, a representative at the authorized service center would turn on the PC with synchronization hardware attached 650, would connect the locked PDA to synchronization hardware configured with the PC 651, and would connect the PC to Immtec servers and the Immtec database via Internet or directly online 652. The authorized service representative would be prompted to transmit an encrypted security code to the System on the Immtec servers 653. The System on the Immtec servers would attempt to validate the service center's security code. If the security code 654 is incorrect 655, the authorized service center would be instructed to re-attempt transmission 656. If the System on the Immtec servers is unable to validate the security code after a second attempt 657 then access to Immtec database would be denied and the authorized service center would be instructed to contact Immtec or other customer support 658.

If the System on the Immtec servers validates the transmitted security code 659, then access by the authorized service center PC to the Immtec database would be granted 660. The authorized service center would request access to the data of the locked-out user 662. The System on the Immtec server would request user ID, PIN, user's name and/or finger print for the locked-out user 663.

The User would input a user ID and PIN into an input device configured with the authorized service center's computer 664 and/or the user would place a finger on a biometric device configured with authorized service center's computer 665. The user ID, PIN and/or biometric data/fingerprint would be encrypted and transmitted through the authorized service center computer to the System on the Immtec servers 667 but would not be stored in the memory of the authorized service center's PC 666.

The System on the Immtec servers would receive and de-encrypt the transmitted User ID, PIN and/or biometric data/finger print data and would attempt to match the transmitted data with data for the relevant user stored in memory of the System on the Immtec servers in a database 668.

If the transmitted user ID, PIN and/or biometric data/finger print 669 do not match data in Immtec database 670, then the System on the Immtec servers would request re-entry and transmission of data 671-672. If the transmitted data does not match after the third attempt 673, then access to the user's data would be denied and the authorized service center would be instructed to contact Immtec or other authorized entity customer service 674.

If the transmitted data does match data on the Immtec database 675, then the System on the Immtec server would encrypt and transmit an unlocking routine, user ID, PIN and unique security code through the authorized service center computer directly into the user's PDA 676. The System software in the user's PDA would receive and execute the unlocking routine and would unlock the PDA and synchronize the PDA's database with the Immtec database 677. Immtec would end communication 678. The PDA would be disconnected from synchronization hardware and would be ready for use 679.

17. Initial User Setup at Time of Purchase

A User may purchase a PDA/wireless phone at any retail outlet that sells such devices. Or the user may purchase the PDA/wireless phone through a bank or other financial service provider ("FSP"). The user may also purchase such devices, preloaded and configured with the System software through a website, an exemplary embodiment of which is referred to here as "mewallet.com." The System on the PDA/wireless phone device may be setup and initialized through any of the following ways: At an authorized sales/service center; at a bank or other financial service provider; via direct connection to Immtec; or by purchasing a device on which the System has been pre-loaded and pre-configured.

a. Authorized Service Center

If the user purchases a device on which the System is to be installed at an authorized sales/service center, the following functions would be performed:

A representative at the authorized service center would turn on a PC with synchronization hardware attached. The authorized service center representative would connect the new PDA/wireless phone to the synchronization hardware and would connect the PC to the Immtec servers, for example, via a direct line. The authorized service center PC would transmit its encrypted security code to the System on the Immtec servers.

The System on the Immtec servers would attempt to validate the encrypted security code. If the System on the Immtec servers is unable to validate the encrypted security code, then the System on the Immtec servers would instruct the authorized service center to re-attempt transmission. If the Immtec Server System (or simply, the "Server System") is unable to validate the transmitted security code after the second attempt, then access to the Server System user setup routines and the database would be denied and the authorized service center would be instructed to contact Immtec customer support.

If the Server System is able to validate the security code, then the authorized service center PC would be granted access to the Server System user setup routines. Once the authorized service center PC is granted access to the Server System user setup routines, the authorized service center representative would allow the new user to input personal and financial data into an online form, through the authorized service center PC system, which would then be transmitted to the Server System. The authorized service center computer would not capture the user-input data.

The Server System would require that the user input, for example, the user's name, address, phone number, date of birth, social security number or other identification if not in the United States, optional biometric data, optional eye data, optional .bmp image of user, desired PIN, desired user ID, bank account numbers, and credit and debit card numbers. The authorized service center representative would validate the physical presentation of the user's credit and/or debit cards and would enter validation confirmation to the Server System through the authorized service center computer.

The Server System would capture all of the user-input data, and as is discussed further below, would validate it, and would add the valid information to the System database(s). The Server System would attempt to validate the accuracy of bank account data through a clearinghouse system.

If the Server System cannot validate the bank account data, the Server System would transmit a request to the user through the authorized service center's computer for corrected account data. If the Server System cannot validate the bank data after a second attempt, then use of that data would be denied and the User would be instructed to contact Immtec customer service.

If the Server System is able to validate the bank account data, then the Server System would add the validated bank account information to the new user's data in the Server System database(s).

The Server System would also attempt to validate the accuracy of credit card and/or debit card information input by the user by sending the user input to a clearinghouse system.

If the Server System cannot validate the credit card and/or debit card information, the Server System would transmit a request to the User through the authorized service center's computer to correct the credit card and/or debit card information. If the Server System is unable to validate the information after a second attempt, then the Server System would deny further use of that information and would transmit instructions to the User through the authorized service center's computer to contact Immtec or other customer service.

If the Server System validates the information, then the Server System would add the validated credit card and the debit card information to the new User's data in the Server System database(s).

The Server System would also attempt to validate the User input personal identification information through a clearinghouse system. If the Server System is unable to validate the User input personal identification information, then the Server System would transmit notification to the User, through the authorized service center's computer, to contact Immtec or other customer service.

If the Server System is able to validate the User input personal identification information, then the Server System would generate a unique encrypted security code for the User and would add the unique encrypted security code to the System Server database(s). The Server System would then transmit self-executing System software for the appropriate operating system for the particular device (the operating system identification information may have been input by the authorized service center or by the User) with the generated encrypted unique security code as well as all financial and personal data directly to PDA/wireless phone. In one exemplary embodiment of the present invention, the financial and personal data would be transmitted through the authorized service center's computer, to the PDA/wireless phone, and would be stored in encrypted form in the PDA/wireless phone.

The PDA/wireless phone would receive the transmission of the self-executing software and the encrypted data. The PDA/wireless phone would execute the software, installing the System and the data.

The Server System would disconnect from authorized service center computer. The PDA/wireless phone would have been configured with the System and would be ready for use.

b) Bank or Other Financial Service Provider

In some cases, PDA/wireless phones that have been pre-configured with the System software installed would be made available through banks or other financial service providers. In addition, the System software would be provided, such as at the time that the User obtains the PDA/wireless phone, for installation on the User's personal computer on an appropriate storage medium, for example, CD-ROM, diskette, or other storage medium.

The new user would be required to choose a user ID and PIN. The unique encrypted security code described above would already be assigned and installed in the PDA's System software. The initialization process would then be done through the user's personal computer. If the user does not have a personal computer or chooses not to use a personal computer as an interface device to connect with Immtec or mewallet.com then the System-equipped PDA/wireless phone could be initialized at the bank or FSP. If the initialization process is done at the bank, the steps would be the same except for the interface used and the installation of software. The exemplary embodiment of the initialization process in these scenarios is described below:

The User would connect synchronization hardware to the User's personal computer and would turn on the personal computer. The User would install the System software on the personal computer. The User would turn on the PDA/wireless phone and would click on the System icon. The User would connect the PDA/wireless phone to the User's personal computer via the synchronization hardware. The synchronization hardware in one exemplary embodiment would comprise an infrared interface.

The User would start the System software on the User's personal computer. The System software in the PDA would request the User to input a new user ID and PIN. The User would input a user ID and PIN into the PDA.

The PDA System would instruct the User and the PDA to synchronize the PDA with the System software in the User's personal computer. The PDA would respond to the synchronization instruction by transmitting all information in the PDA to the System software in the User's personal computer.

The System software in the User's personal computer would instruct the User to input all personal and financial account information. The User would input personal and financial account information including, for example: name, address, phone number, date of birth, social security number or other identification if not in the United States, optional biometric data, optional eye data, optional .bmp image of user, desired PIN, desired user ID, bank account numbers and credit card numbers.

The System in the PC would record the User's personal and financial account information and would store the information on the hard drive or other memory device of the personal computer 1062.

The System software in the personal computer would instruct the User to connect the PC to the Immtec Server System—such as by instructing the user to click on a "connect" icon displayed on the display monitor configured with the PC. The PC System software would establish a connection, such as a connection over the Internet, or such as a direct secure connection, with the Immtec Server System.

Once a connection has been established between the User's personal computer and the Immtec Server System, the remainder of the initialization would be executed as is described below.

The Immtec Server System would receive transmission of the User's data including new ID, PIN and unique encrypted security code. The data required would include, for example: name, address, phone number, date of birth, social security number or other identification if not in the United States, optional biometric data, optional eye data, optional .bmp image of user, desired PIN, desired user ID, bank account numbers, credit card numbers. The Server System would capture this data, would attempt to validate it in a manner similar to the validation process described above, and would add the information to the Server System database(s).

Once the Server System has validated the data and added it to its database(s), the Server System would transmit a welcome message to new user, transmit any updates to software, and transmit instructions on how to use the System to the User's Personal computer as a printable file. Once this welcome process has been completed, the System Servers would disconnect from the connection to the user's personal computer and the PDA/wireless phone would be configured with the System and ready for use.

c) Ordering from a Direct Order Website—Pre-configured, Pre-installed and Pre-Initialized.

A User could order a PDA/wireless phone with the System pre-installed and with the information pre-initialized by providing all necessary personal and financial account(s) information to a secure website set up for that purpose, such as, for example, a web site named "mewallet.com." The mewallet.com website would also facilitate shipment of the System software for installation on the User's personal computer and instructions to the user. All that would be required would be for the user to install the System software for personal computer on the User's personal computer and then synchronize the PDA/wireless phone with the Immtec Server System via wired or infrared synchronization connection to the personal computer and using a secure connection to the Immtec Server System. In a scenario in which the user has, and wishes to use, a personal computer as the interface to Immtec, the exemplary embodiment of the installation process would be as described below.

The User would attach the pre-configured, pre-initialized PDA/wireless phone to the User's personal computer via supplied synchronization hardware, or would point the PDA/wireless phone infrared interface towards an infrared interface on the User's personal computer. The User would install the System software on the User's personal computer and would start the PC System software. The User would synchronize the PDA/wireless phone to the System software in the User's PC. The PDA/wireless phone would transmit personal and financial data to the PC. The System software in the personal computer would receive and add all of the data transmitted from the PDA/wireless phone into the PC System's database(s).

The User would click on a "connect to Immtec" icon on the display monitor screen configured with the User's PC. The System software in the User's personal computer would connect to the Immtec Server System, e.g., through an Internet connection or through a direct line via modem.

The System software in the User's personal computer would transmit a unique encrypted security code and the user data to the Immtec Server System. The Immtec Server System would compare the transmitted data with data on file in Immtec Server System database—this data would have been received, validated and stored when the User placed the User's order for the pre-initialized PDA/wireless phone.

If the transmitted data does not match the data in the Server System database(s), then the Server System would instruct the user to re-transmit the data. If after a second attempt, the transmitted data does not match the data in the Server System database(s), then the Server System would instruct the user to call Immtec or other customer support.

If the transmitted data matches the data in the Server System database(s), then the Server System would update its database with information about the activation and any other new user data and would send initialization code to the System software in the User's personal computer that will enable full functionality in the System software in the PDA/wireless phone.

The Server System would then transmit a welcome message to new User, transmit any updates to software, and transmit an instruction manual to the User. The Server System would then disconnect from the connection with the User's personal computer.

The User's PC would then instruct the User to synchronize the PDA/wireless phone with the System software in the User's personal computer. Once the User has synchronized the PDA/wireless phone with the System software in the User's personal computer, the PDA/wireless phone with the System would be ready for use.

18. Replacing a Lost or Stolen PDA/Wireless Phone

A lost or stolen PDA/wireless phone with System software installed would need to be reported to Immtec. Immtec would then lock usage of the System of user and would contact all credit card and financial service providers of the loss. In an exemplary embodiment of the invention in which the PDA is equipped with a biometric reader, the data stored in the memory device configured with the PDA would be stored in encrypted form and only a biometric read, such as of a fingerprint, that matches the encrypted biometric data stored on the device would unlock and cause de-encryption of the data. In such an embodiment, someone stealing or finding such a device would not be able to use it. In another exemplary embodiment of the invention, the User ID and the PIN would be stored in encrypted form; a user would have to supply a matching User ID and PIN to activate the device. Encrypting the data stored on the device would make reverse-engineering the identity of the user ID and PIN difficult.

To replace a lost or stolen PDA/wireless phone, the User could do so at the same locations at which the PDA/wireless phone's with the System software installed could be purchased. Replacing a PDA/wireless phone at an authorized service center is representative.

a) Replacement at Authorized Sales/Service Center Bank, or Financial Institution In order to replace a lost or stolen System-enabled PDA/wireless phone device at an authorized service center, bank or financial institution, the User would go to the particular location to apply for a replacement device. References below to an Authorized service center will be understood to apply equally to replacement at a bank or financial institution.

The User would present a personal picture identification to an Authorized service center/bank/FSP representative. The Authorized service center representative would connect the center's computer to the Immtec Server System, such as via the Internet, or via a direct line.

The Authorized service center would transmit its encrypted security code to the Server System. The Server System would attempt to validate the Authorized service center security code. If the Server System cannot validate the security code, the Server System would instruct the Authorized service center to re-attempt transmission. If the Server System is unable to validate the security code after the second attempt, then access by the connected authorized service center to the Server System and its database(s) would be denied; the Server System would instruct the authorized service center to contact Immtec customer support.

If the Server System is able to validate the security code, the Server System would instruct the authorized service center to have the User input the User's user ID and PIN through Authorized service center's computer. In the exemplary embodiment, the Server System would also instruct the User to input the User's fingerprint (or any fingerprint or some combination of fingerprints) via a biometric reader configured with the authorized service center's computer. The User input data would be transmitted to the Server System and would not be captured by the Authorized service center's computer.

The Server System would attempt to validate the user input identification data with identification data for the corresponding user stored in the Server System's database. The information for the corresponding user would have been stored when the user registered for the now-lost/stolen PDA/wireless device.

If the Server System is unable to validate the user identification data, the Server System would instruct the User to re-input the information. If the Server System is unable to validate the user identification after a second attempt, then the User would be asked to contact customer service.

If the Server System validates the user identification information, then, in the exemplary embodiment of the invention, the Server System would transmit an image, such as a .bmp image, of the User for which the information was registered with the Server System, to the display monitor of the Authorized service center's computer and would instruct the Authorized service center representative to confirm the person applying to replace a PDA/wireless device is the person whose image is presented on the screen.

The Authorized service center representative would check the displayed image of the previously registered user with that of the person present. If the image does not match, the Authorized service center representative would indicates so to the Server System and the Server System would instruct the User or the Authorized service center representative to take appropriate action. If the image matches, the Authorized service center representative would indicate so to the Server System. At that point, the Server System would transmit authorization to the Authorized service center representative to provide the User with a replacement System-enabled PDA/wireless phone.

Once the authorization is complete, the Authorized service center representative would connect a new PDA/wireless phone to the Authorized service center computer system via synchronization hardware or via infrared interface and would transmit to the Server System confirmation that a new PDA/wireless phone has been connected.

The Server System would generate a new unique encrypted security code for the User and would add this new code to the User's data in the Server System's database(s).

The Server System would transmit configured System software for the appropriate operating system with the encrypted unique security code attached or embedded as well as all financial and personal data to PDA/wireless phone. The Server System would update its database with replacement user data, unlocks usage for the new device and transmits this information to clearinghouse, bank and financial service providers.

The Server System would disconnect from the authorized service center computer and the PDA/wireless phone would be configured and enabled with the System and ready for use.

b.) Replacement Through Direct Order Website

The procedure for replacing a lost device through a direct order website is similar to the initialization process through an authorized service center, and to the initialization process through a direct order website.

To replace a lost device through a direct order website, the User would connect to the direct order website, referred to herein as "mewallet.com" such as via modem from a personal computer on which the PC System software has been installed. The mewallet.com page would show options that include an option to "replace lost or stolen PDA/wireless phone."

To replace a lost device, the User would choose the "replace lost or stolen PDA/wireless phone" icon. The direct order website Server System would then instruct the User to complete information on a secure page, including name, address, social security number, user ID, PIN and type of equipment that was lost or stolen.

The direct order website, mewallet.com, would attempt to match the user input data supplied on the input form with data maintained in the Server System database(s). If the data does not match, the direct order website, mewallet.com, would instruct the user to correct and re-send the data. If the Server System is unable to make an exact match of the user input data after a second attempt, then mewallet.com would request that user call customer service.

If the Server System is able to make an exact match of the user input data with the data stored for the corresponding user on the System Server database(s), then the Server System would accept and fill an order, and would authorize shipment (such as by next-day delivery), for a PDA/wireless phone with System software installed. The Server System would notify the User that the replacement PDA/wireless phone is on its way and will arrive the next business day and the replacement transaction would be complete.

When the User receives the replacement PDA/wireless phone, a set of printed instructions would arrive with the device at the user's location and/or instructions would be electronically mailed to the User.

The User would be instructed to, and would, connect the replacement PDA/wireless phone with System software installed to personal computer with System software installed via hardwire synchronization or infrared interface devices.

The User would start the System software on the User's personal computer. The User would synchronize the PDA/wireless phone to the System software on the User's personal computer.

The System software on the User's personal computer would recognize the replacement device as a new PDA/wireless phone and would instruct the User to input the User's user ID and PIN. As has been previously described, the PC System would attempt to validate the user ID and PIN. If after a second attempt to do, validation fails, the User would be instructed to contact customer service and the System software would become inaccessible.

If the validation is successful, the System software in the User's personal computer would transmit all data from its database to the System software in the new PDA/wireless device.

The User would then be prompted by the System to select the "connect to Immtec" icon on the display monitor screen of the User's personal computer. Clicking the icon would cause the System software in the User's personal computer to establish a connection to the Server System, e.g., via a direct line via a modem.

The System software in the User's personal computer would then transmit a unique encrypted security code and user data to the Server System. The Server System would then compare the transmitted data with data stored for the corresponding user on the Server System database(s). If the transmitted data does not match the database information, then the Server System instructs the user to re-transmit the data. If the re-transmitted data still does not match, then the Server System would instruct the user to call customer support.

If the transmitted data matches, the Server System would update its database(s) with replacement user data, unlock usage for the new device, and transmit this information to clearinghouse, bank and financial service providers.

The Server System would then send initialization code to the System software in user's personal computer that would enable the System software in the PDA/wireless phone. The Server System would then transmit a thank-you message to the User, transmit any updates to software to the User's PC, and disconnect from the User's personal computer.

The PC System would then instruct the User to synchronize the PDA/wireless phone System with the System software in the User's personal computer. The User would synchronize the PDA/wireless phone System with the System software in the User's personal computer and the System-enabled PDA/wireless phone would be ready for use c.) Replacement by Telephone Directly from Immtec A User can replace a PDA/wireless device by telephone directly from the System host, such as Immtec. The replacement process is similar to the replacement processes described above, with certain exceptions as described below.

Once the Immtec host Server System has validated the information supplied by the User over the telephone and is ready to ship a new device, the Immtec Server System would prepare the replacement device by installing the System software installed, and completely configuring the device with all user personal and financial data for the corresponding user. However, Immtec would set the System software as locked in the PDA/wireless device and in Immtec's database.

Once the user has received the replacement device, the User would be instructed to connect the device to the User's personal computer on which the System software has been previously installed. The device would be "connected" via hardwire synchronization or infrared interface.

Once the User has started the personal computer, and input a valid user ID and PIN, the System software in the User's personal computer would transmit all data from its database (s) to the PDA/wireless device System software.

The User would then select a "connect to Immtec" icon on the display monitor screen of the display device configured with the User's personal computer. Selecting the "connect to Immtec" icon would cause the System software in the User's personal computer to establish a connection to the Server System, such as via a direct line via modem.

Once the connection with the Server System has been established, the System software on the personal computer would transmit a unique encrypted security code and user data to the Server System. The Server System would attempt to validate the information as was previously described above. Once the information has been validated, the Server System would update its database with replacement user data, unlocks usage and would transmit this information to clearinghouse, bank and financial service providers. The Server System would transmit an authorization code to the System software on the User's personal computer. The System software on the User's personal computer would receive the authorization code and unlock and enable the System software in the PDA/wireless phone.

From this point, the User would synchronize the new device with the System software on the User's personal computer as was described above.

If when the User receives the replacement device, the User does not have access to a personal computer, the User would instead call Immtec customer service. Immtec customer service would request name, address, social security number, user ID and PIN and code printed on PDA/wireless phone. An Immtec customer service representative would instruct the User to turn on the replacement device.

Once the User turns on the replacement device, the Immtec customer service representative would instruct the User to choose the "System" icon on the display screen of the replacement device.

Once the User has selected the "System" icon, the System software on the replacement device would open the PDA Pay & eTicket/mewallet™ System.

The Immtec customer service representative would then instruct the User to select the "security" icon. Once the User has selected the "security" icon, the System software on the device would prompt the User to input an authorization code. The Immtec customer service representative would give the user an authorization code to input into PDA/wireless device. Once the User has input the authorization code into PDA/wireless device, the System would unlock the device and the device would be ready for use. The Immtec customer service representative would then transmit unlocking authorization to the Server System database.

F. Directed Purpose System device

1. Overview

In the context of the present invention, the phrase "Directed Purpose" means that the purpose of the device is to store, transmit and process electronic transactions of the type disclosed here, such as electronic money, electronic tickets, and other electronic transactions. The Directed Purpose device may be on any shape or size including the designs in FIGS. 19a-19c, a watch or other handheld device. The "Directed Purpose" device may store, transmit and process multiple types of data and multiple types of transactions. It is referred to as a "Directed Purpose" device because it does not also provide mobile telephone communications or provide such functions as keeping a calendar, or performing some of the other types of special functions that are performed by PDA's and/or cell phones.

In an exemplary embodiment, the Directed Purpose System device would store one or more types of data (exemplary data structures and relationships are described below). For example, it could be configured to store, such as in a memory storage device configured with the Directed Purpose System device, for instance, up to $1,000.00 in electronic currency, or its equivalent in any country's electronic currency.

An exemplary embodiment of a System embodying features of the present invention would provide an international currency exchange and/or conversion. One way in which the currency conversion would work would be that the Server System would maintain a record of each user's account in a first currency. The Server System would receive a request for payment from a merchant's POS terminal for payment in a second currency. The Server System would convert the requested amount in the second currency to a corresponding amount in the first currency. The Server System would send instructions directed to the customer/user device to authorize payment for an amount equal to the requested amount in the second currency, and to reduce the user's total available currency by an amount equal to the requested amount in the first currency. The PDA or PayStick would receive the instructions and would send an authorization of payment to the merchant in an amount equal to the requested amount in the second currency, and would reduce the user's total available currency by an amount equal to the requested amount in the first currency. Merchant's system would send the authorization to the Server System. The Server System would receive the authorization and would debit the user's account balance by an amount equal to the requested amount in the first currency.

One exemplary embodiment of the Directed Purpose System device is referred to here as a PayStick™. A Directed Purpose System device could be configured to hold electronic tickets, for example, multiple use tickets used for commuter trains, buses, trolleys and subways. A Directed Purpose System device could also be configured to be utilized as an electronic key or identity confirmation device. A Directed Purpose System device could also be configured to store credit card or bank account data. A Directed Purpose System device could also be configured to store one individual user's medical, insurance or other personal data. The data in this device can be easily viewed or updated by synchronizing it to a computer system equipped with hardwire or short range data transmission capabilities or infrared interface.

An exemplary embodiment of a Directed Purpose System device would be configured, as depicted in FIGS. 19b-19c, and 20b-20f, with the following hardware components: an Infrared interface 1100; an input port for hardwire synchronization 1101; internal memory (RAM & ROM/eeprom) devices 1102, 1103; an On/off button 1104; a biometric device 1105; a send/receive button 1106; a battery 1107; short range data transmission hardware (optional) 1108; a small LCD display screen 1109, a digital signal processor or microprocessor 1110, a 4 button array 1111, an optional photovoltaic cell 1112. The memory storage device would be used for storage of one or more types of data, including but not limited to: eTickets, electronic currency, personal medical information, personal insurance information, and/or other discrete amounts of data and/or instructions, such as for "unlocking."

Figure 19A:
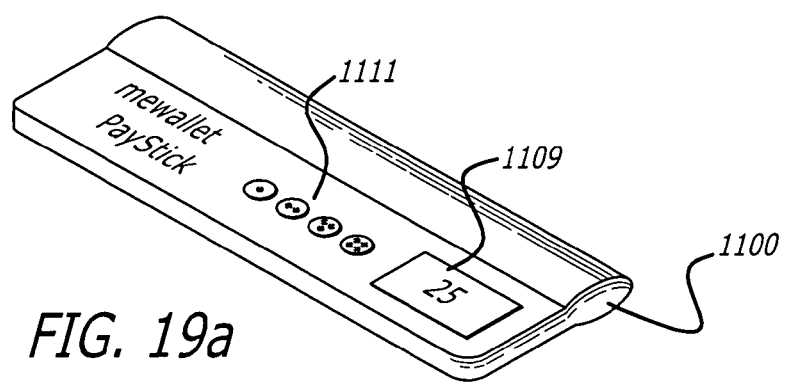
FIGS. 19a-19c are graphic representations depicting various views of an exemplary external configuration of an exemplary embodiment of a Directed Purpose System device.
Figure 19B:
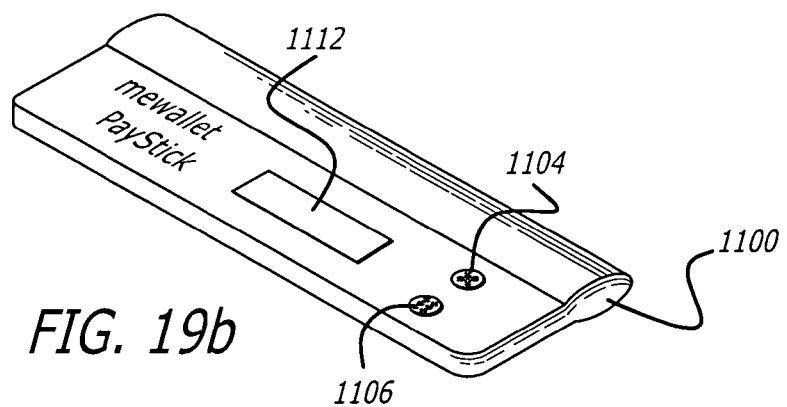

An external view of an alternative exemplary embodiment of the Directed Purpose System device is depicted in FIGS. 19a-19b. As depicted in FIGS. 19a-19b, the device would provide a small, such as an 2 line, multi-character, LCD display 1109, four (4) buttons (input keys) 1111, an optional biometric chip 1105, and an infrared transceiver 1100; the back of the same exemplary embodiment of the device, as depicted in FIGS. 19b, would provide a photovoltaic cell 1112 and two (2) additional buttons (input keys) 1104 1106, and a scroll button 1114. The six buttons 1104 1106 1111 would be enabled to act as input keys with which the User would input the User's User ID and PIN and would also be enabled to act as selection mechanisms with which the User can select prompts presented on the LCD display.

In one embodiment, the serial interface 1101 would be a USB with a proprietary end connecting with the Directed Purpose System device and a standard A end connecting to a computer. One of the pins on the serial interface 1101 would provide power to recharge the battery 1107. The photovoltaic cell 1112 is an optional method of recharging the battery 1107.

2. Software

An exemplary embodiment of the software for the Directed Purpose System device (also alternatively referred to herein as a PayStick™) would provide the following functions: receives input of, stores, retrieves and transmits a unique encrypted security code; performs a synchronization routine to update System software; receives input of, stores, retrieves and transmits a user ID and PIN; receives, stores, retrieves, transmits, and updates one or more types of data, including but not limited to: eTickets, electronic currency, debit card, credit card, electronic coupons, branding vendor's unique code, unique encrypted security code for the device, personal medical information, personal insurance information, identity information, and/or other discrete amounts of data and/or instructions; calculating, and communicating micropayments and updating stored electronic cash with corresponding adjustments; receives, stores, retrieves and transmits biometric data; interfacing with an LCD or other display device; digital clock displaying date and time on LCD, displaying low battery status, interfacing with a biometric reading device; interfacing with a microprocessor, interfacing with a hardware port, interfacing with short range transceiver device(s) such as an infrared or Bluetooth transceiver. Once turned on, the Directed Purpose System device would be capable of responding to a properly coded and secure demand for currency or eTicket from a point of sale terminal connected to a host system with the mewallet™ system software installed without the user having to scroll through and choose the payment method, ticket type or other type of transaction.

3. PC Software

The previously described System software for the personal computer would be able to interface with the Directed Purpose System device in a limited fashion. It would be able to synchronize all data that the Directed Purpose System device would be able to store. The System software for a personal computer would also be able to synchronize with an online financial service provider to download electronic cash. It would be able to synchronize with an online ticket provider to download electronic tickets. It would also be able to store copies of all transactions transmitted to or by the Directed Purpose System device. It would be able to set date and time for an internal Directed Purpose System device clock. It would also store all personal, security and financial data and would be able to synchronize certain personal and security data with the Directed Purpose System device.

4. Server System software

The Server System software for interfacing with Direct Purpose System devices would provide for processing on Unix and Microsoft Windows 2000/NT4+ operating systems. However, one with ordinary skill in the art will understand that the operating system on which the invention is embodied is not a limitation of the invention. The invention can be programmed to provide for processing on other operating systems without departing from the spirit of the invention.

The Server System software would be for use on a centralized host system's servers, such as one accessible over the Internet. However, the Server System software could also be implemented on computers operated by individual banks, financial institutions and others.

The Server System software would include, among other things: firewalls, encryption/de-encryption routines, web sites, security checking routines, Directed Purpose System device interface routines, PDA unlocking routines, currency conversion routines, synchronize to/from Directed Purpose System routines, interface to/from financial service provider and clearinghouse routines, wireless communications protocols, micropayment receive and acknowledge routine, micropayment to bank account routines, interface through modems routines, ticketdownload.com interface routines, licensed merchant account database, ticketdownload.com database, unique user security codes, unique user security code generator, System software for Directed Purpose System Device, System software for PC, authorized service center account database, processing: (receiving, validating, storing, comparing, transmitting) users bitmap images, biometric/finger print database, users name, ID & PIN database, users unique security codes, users bank accounts data, users credit card accounts data, users brokerage accounts data, other financial accounts data, users personal data, users customer specific receipt advertising data.

5. Interfaces for Directed Purpose System Device

An exemplary embodiment of a Directed Purpose System would provide for communications with other devices using one or a combination of, among others, the following types of communications devices: hardwire interface for communication and/or synchronization with a personal computer; infrared interface for communication and/or synchronization with any device with infrared interface; and/or interface for other short range data transmission (e.g., "Bluetooth") to/from any device with short range data transmission capabilities.

An exemplary embodiment of a Directed Purpose System device would interface with a number of other devices, including one or more of the following: a personal computer with hardwire, short range data transmission capabilities, or infrared interface; point of purchase devices with infrared interface; a point of purchase device with short range data transmission capabilities; an authorized financial service provider or ticket sales agency; a System-enabled PDA/wireless phone.

a.) Personal Computer Interface

FIG. 16 is a high level functional flow diagram depicting exemplary Personal Computer System interface processing with an exemplary Directed Purpose System device in an exemplary embodiment of the present invention. As depicted in FIG. 16, when interfacing with a Personal Computer requiring a hardwire synchronization interface, the user would connect the Directed Purpose System device to the personal computer via a direct connection and then turns on the personal computer 1200. If interfacing with a personal computer configured with either an infrared or short range data transceiver, the User would turn on the personal computer and point the infrared or short range data transceiver at the corresponding device on or near the personal computer.

The User would execute the PDA Pay & eTicket/mewallet™ System software 1203 on the personal computer. The System software would request the user to input a user ID and PIN 1205 in the appropriate spaces on the interface screen on the PC and would then prompt the user to click an "enter" icon 1208. The System software would compare the user input user ID and PIN with the user ID and PIN in the System database(s) 1211. If the input user ID and PIN do not match the stored user ID and PIN 1213, the user would be prompted to re-input the data 1215. If the System was unable to validate the information after a pre-set number (for example, two) tries, the System would deny access to the PC System software. The PC System software would instruct the user to contact customer service 1218.

If the System is able to validate the user ID and PIN 1221, the PC System would then list available transaction and action options, 1224 including, for example, Download Cash, Purchase and Download Tickets, and Personal Medical, Insurance and Emergency Data and Synchronize with Directed Purpose System device." The System would prompt the User to select one of the options. If the User selected the "synchronize with Directed Purpose System device" 1226 option 1229, the System would instruct the user to point the Directed Purpose System device at the short range wireless interface configured with the PC 1231. The System would instruct the user to click on a "synchronize" icon on the PC display screen 1234. User would point the Directed Purpose System device at the short range wireless interface configured with the PC 1237. The PC System and the Directed Purpose System device software would synchronize via short range wireless communications 1240.

It will be understood by someone with ordinary skill in the art that the options described below would apply equally to a System-enabled PDA/wireless phone device without departing from the spirit of the invention.

1.) Download Cash

FIGS. 17a-17d are high level functional flow diagrams depicting exemplary Download eCash processing for an exemplary Directed Purpose System device in an exemplary embodiment of the present invention. As depicted in FIGS. 17a-17d, if the user chooses the Download Cash Option 1300, the PC System would prompt1303 the User to identify a financial service provider, such as from a pull down menu or with user input. Once the user has selected 1306 a particular financial service provider, the PC System would establish 1309 an online connection, such as through the Internet, to that online financial service provider's system or website through an Immtec server. Once connected, the PC System would retrieve 1311 from its database(s), and would transmit 1314 to the financial service provider's system, user identification and security information, such as the relevant account number, user ID and PIN. The financial service provider's system attempts to validate 1317 the information. If the financial service provider's system is unable to validate 1320 the information, the user would be prompted 1323 to re-input the data. Once the user re-inputs the data 1326, the PC System would retransmit 1311 the data. If the financial service provider's system is unable to validate 1320 the information after a pre-set number (for example, two) tries, the financial service provider's system would deny access to the PC System. The PC System would receive the denial 1329 and would instruct 1332 the user to contact customer service.

Once the financial service provider's system notifies the PC System that it has validated 1335 the identification and security information, the PC System would request 1338 a listing of the user's available financial transaction options. The financial service provider's system retrieves 1339 the information about the options available for the corresponding user and generates 1341 a display of the available options 1344. One such option would be to "Download Cash."

If the User chooses to download cash 1347, the financial service provider, or in the alternative, the PC System, would generate a selection of amounts, provides an input field and asks the user "How much cash would you like to download today?" 1350. The User selects an amount 1356 from the list 1353 of pre-set amount options or inputs an amount. In the exemplary embodiment, the amount is limited to $1,000.00 U.S. or its non-US currency equivalent. The PC System would communicate 1359 the selected amount to the financial service provider through the Immtec server. The Financial service provider would check on available funds in user's account 1362.

If amount of funds available is less than the requested funds 1368, the financial service provider system would notify the PC System 1365 to prompt the user to request a lower amount or to contact the financial service provider's customer service 1374, 1371.

If the requested funds (including a micropayment amount) are available 1377, the PC System, the Financial Service Provider would transmit the selected amount through the host system, e.g. Immtec servers, 1380 where the host Server System would calculate the micropayment percentage, deduct this amount from the requested amount 1383 and transfer the deducted amount to the host system micropayment account 1385. The host server would then transmit the remaining amount through the PC system to the users Directed Purpose System device 1388. The PC system would display all details of the transaction 1390 and then close the connection with the host server and financial service provider 1399. In an alternative embodiment the electronic cash from the Financial Service Provider may be transferred to the users account 1396 on the host server where it would be available to the user via the Directed Purpose System device 1397. Or in another alternative embodiment, the financial service provider system, would calculate a financial service provider micropayment amount and transfer this amount to its own account. Or in another alternative embodiment, the financial service provider system would calculate 1400 a user micropayment and would instruct the financial service provider to transmit an amount in the amount of the calculated user micropayment from the user's account to the account for the host system, e.g., Immtec 1403. The financial service provider would electronically transmit the requested amount of electronic currency through the user's PC System to the synchronized Directed Purpose System device 1409. The financial service provider would reduce the user's account by the amount of the transmitted electronic currency and the amount of the user's micropayment. The PC system would generate a receipt of the transaction 1415. The PC System would save the receipt of the transaction in the memory of the user's PC and would transmit a copy of the receipt to financial service provider system.

At this point, the transaction would be completed 1418 and connection between the user's PC and the financial service provider system could be terminated 1421. The Directed Purpose System device would contain the appropriate amount of electronic currency and would be ready for use 1412.

In an alternative exemplary embodiment of the Directed Purpose System device, the financial service provider would set up a separate account for the user specifically for the Directed Purpose System device. In such an alternative exemplary embodiment, the financial service provider would transmit the "currency" to the Directed Purpose System device account 1424 for the particular user. In such an alternative exemplary embodiment, the financial service provider would transmit an accounting of the transferred amount to the Directed Purpose System device 1427, 1436, but the device would not "hold" electronic currency 1439. In such an embodiment, the redemption of electronic currency would be activated by a communication between the Directed Purpose System device and a point of sale device. However, the actual transfer of funds would be achieved between the corresponding user's Directed Purpose System device account with a particular financial service provider and an account for the redeeming merchant with that or any other financial service provider.

2.) Purchase and Download Tickets

After starting the user's PC System, the PC System would display various options, one of which is to "Purchase and Download Tickets." If the user selects the "Purchase and Download Tickets" option, the PC System would format and generate the display of option selections that include options for Internet ticket websites from which the user has previously shopped for tickets and an option for "other." The process flow for the download of electronic tickets to a Directed Purpose System device is similar to that described above for a PDA/wireless device, and as described with respect to FIGS. 12a-12d, and is not separately diagrammed here. If the user selects one of the specific Internet ticket websites from the list of options, the PC System would connect to that website via modem or other Internet connection. If the user selects the "other" option, the user would be prompted to either enter a search term or a website address.

Once the user identifies a particular website, the PC System would establish a connection with the identified Internet ticket website.

In the exemplary embodiment of the invention, the Internet ticket websites that would be available for selection through the PC System would be limited to online ticket Merchants that are licensed to interact with the System. Extension of a "license" to a particular online Merchant would require, among other things, that an online ticket Merchant register with the Server System host, e.g., Immtec, and supply all necessary information and approvals so that the Server System would be cleared to transfer amounts into the Merchant's account and to withhold micropayment amounts from such transfers, or to subsequently transfer micropayment amounts from the Merchant's account to the Server System host's account.

Once at the identified Internet ticket website, the user would search the online merchant's website/database for the desired ticket. The Merchant's website would display available ticket(s) and prices according to the user's request. The user would be able choose to not purchase tickets and continue searching or end the connection with the particular Merchant's website and return to the PC System.

Once the user indicates a selection to purchase one or more tickets, the Merchant's system would request payment information. In order to pay for the tickets and download the tickets, the user would click on a "PDA Pay & eTicket/mewallet™ System" option button on the licensed merchant's site. The licensed merchant's web site would transparently access the Server System via Internet or other connection, such as at ticketdownload.com and would transmit a license code. The Server System, such as at ticketdownload.com, would receive the transaction request and the transmitted license code. The Server System would attempt to validate the transmitted license code. If the Server System is unable to validate the transmitted license code after a pre-set number (such as two time) of tries, the Server System would deny the merchant's request to use the Server System ticketdownload.com feature.

If the Server System is able to validate the license code, the Server System ticketdownload.com feature would confirm to the merchant the validation of the license code and would transparently open communication directly with the user through the merchant's web site.

The Server System ticketdownload.com feature (or in an alternative exemplary embodiment, the merchant's web site) would request payment information, user ID, PIN and security code from the user and from the user's PC and/or the user's System device. The user would input the user ID, and PIN and would choose a payment method,(check, credit card or debit card) and the amount to pay. The user would select a Send option that would cause the PC System to transmit the input and other requested information to the merchant/ticketdownload.com feature via the Internet interface.

The ticketdownload.com feature would receive the transmitted payment and security data and would attempt to validate the information against the information for the corresponding user on the Server System database(s). If the Server System is unable to validate the information after a pre-set number (e.g., three (3)) tries, then the Server System would deny the transaction and would return the user to the Merchant's website's control. The merchant would then inform the user to choose another means of purchasing tickets.

If the Server System is able to validate the transmitted information, the Server System ticketdownload.com feature would supply information about the transaction to, and would request an approval, such as in the form of an approval code, for the transaction from, a financial service clearinghouse. A financial service clearinghouse may deny a particular transaction for reasons including, among other reasons: sufficient credit is not available; credit or debit card has expired, or the specified account does not have sufficient funds available.

If the financial service clearinghouse denies approval of the particular transaction, the Server System ticketdownload.com feature (or in an alternative embodiment, the merchant website), would request another payment method selection and identification from the user.

If the financial service clearinghouse approves the transaction, such as by transmitting an approval code, the Server System ticketdownload.com feature/merchant would transmit approval of the proposed transaction to the both the user via the online merchant's web interface and to the online merchant. The Server System would calculate a merchant micropayment. In the exemplary embodiment, the Server System would also calculate a user micropayment. The Server System ticketdownload.com would then instruct the financial service clearinghouse: to transfer payment from the user's specified account to the merchant's account in the amount of the transaction and debit the user's specified account for the amount; to transfer an amount in the amount of the calculated merchant micropayment from the merchant's account to the Server System host's account (e.g., Immtec's account) and to debit the merchant's account for the amount of the merchant micropayment; and in the exemplary embodiment, to transfer an amount in the amount of the calculated user micropayment from the user's account to the Server System host's account (e.g., Immtec's account) and to debit the user's account for the amount of the user micropayment The Server System -ticketdownload.com feature would generate and transmit a unique security code for the particular eTicket(s) to the online merchant.

The Server System ticketdownload.com feature would transmit all transaction data related to the ticket purchase to the online merchant's website. The Online merchant's website would generate an invoice from the transaction data and emails the invoice to the user.

The Server System ticketdownload.com feature would transmit the eTicket data to the computer of the merchant requiring the ticket for entrance or purchase. The Server System ticketdownload.com feature (or in an alternative exemplary embodiment, the merchant's website) would transmit an encrypted eTicket(s) to the user's PC System.

The PC System would store the encrypted eTicket in the memory storage configured with the user's PC. Once this has been done, the user can download the eTicket to the Directed Purpose System device or to some other System device via a hard wire, infrared interface or short range data transmission interface between the user's PC and the System device. Once the user downloads the eTicket to the System device from the user's PC, the PC System would mark the eTicket in the PC's memory as having been downloaded.

3.) Transmit Personal Medical, Insurance, and Emergency Data

Figures 1, 18A:
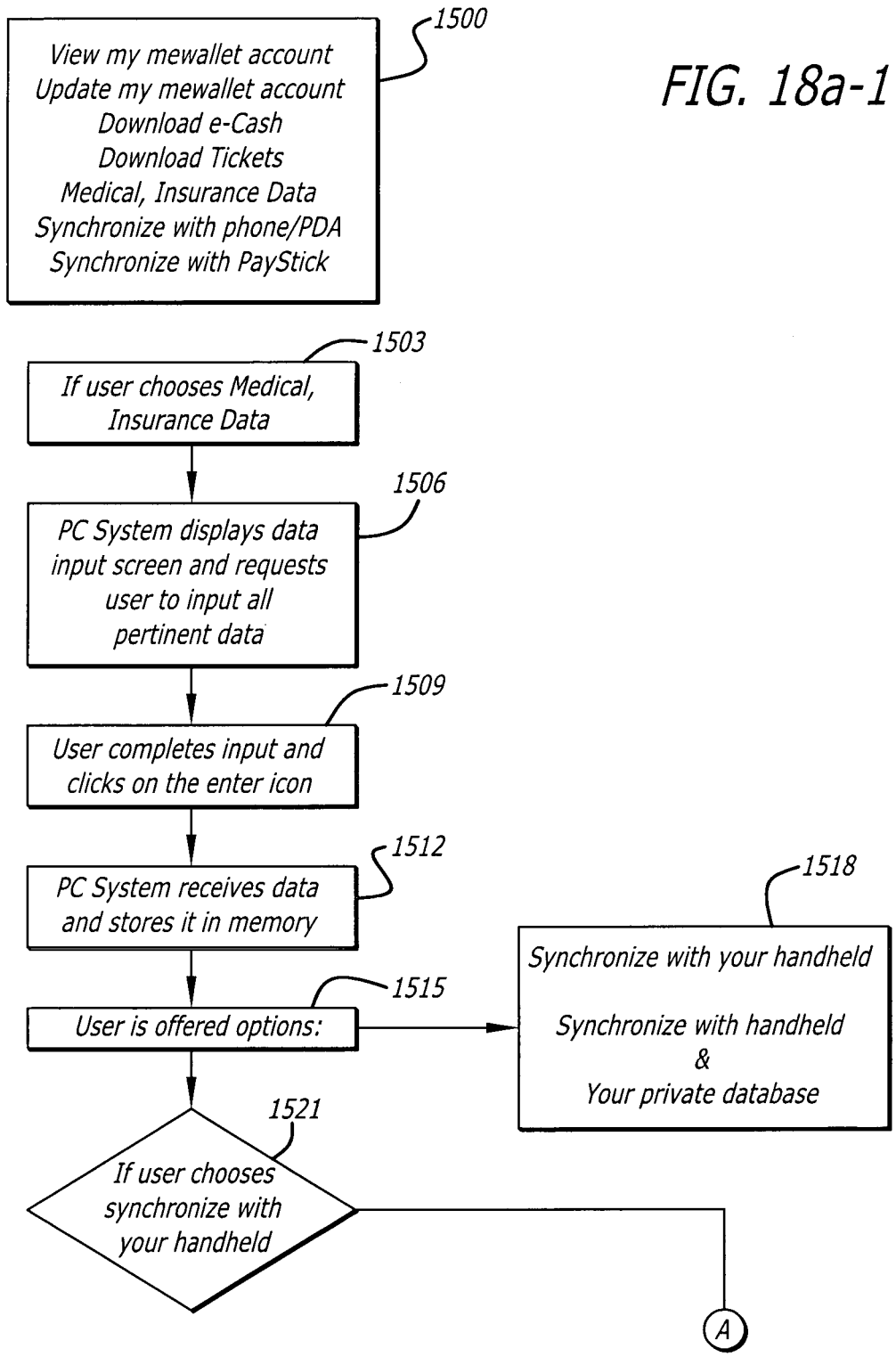
Figures 2, 18A:
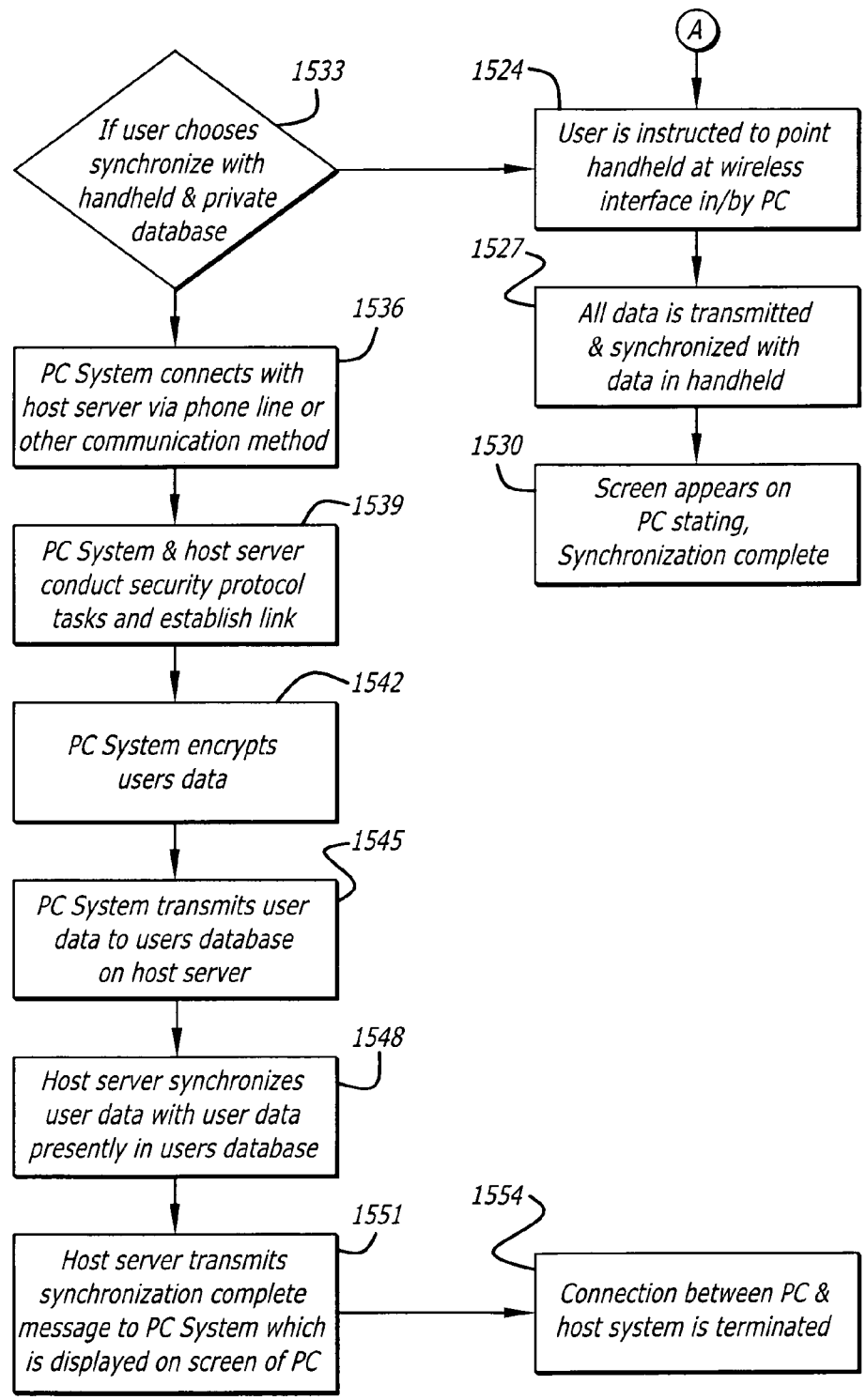

FIG. 18a is a high level functional flow diagram depicting exemplary Personal Medical, Insurance and Emergency Data interface processing with an exemplary Directed Purpose System device in an exemplary embodiment of the present invention. As depicted in FIG. 18a, after starting the user's PC System, the PC System would display various options 1500, one of which is to "Personal Medical, Insurance and Emergency Data." If the user chooses 1503 the "Personal Medical and Insurance Data" option, the PC System would prompt the user to input all pertinent personal medical, emergency and insurance data 1506, 1509.

The PC System would receive this information, and would store it in memory storage configured with the PC 1512. Once the user has input all of the data, the System would generate and display on the display screen of the display device configured with the user's PC, an option menu that would prompt the user 1515 to click on a "synchronize with your handheld device" option or "Synchronize with handheld and database" option 1518. There would also be an option to upload and synchronize all personal medical, insurance and emergency data to a secure host e.g. the Immtec servers. This PC System would encrypt the data and would transmit the encrypted data via phone line or other communications method to the host servers where the Server System would store the information in association with the user's account for emergencies, accessible only to authorized personnel 1533-1554.

Once the user chooses to synchronize the PC with the handheld only 1521, the PC System would transmit the user's personal medical and insurance data to the System device 1524-1530, including a Directed Purpose System device, that has been properly configured to receive the transmitted data.

Figure 18B:
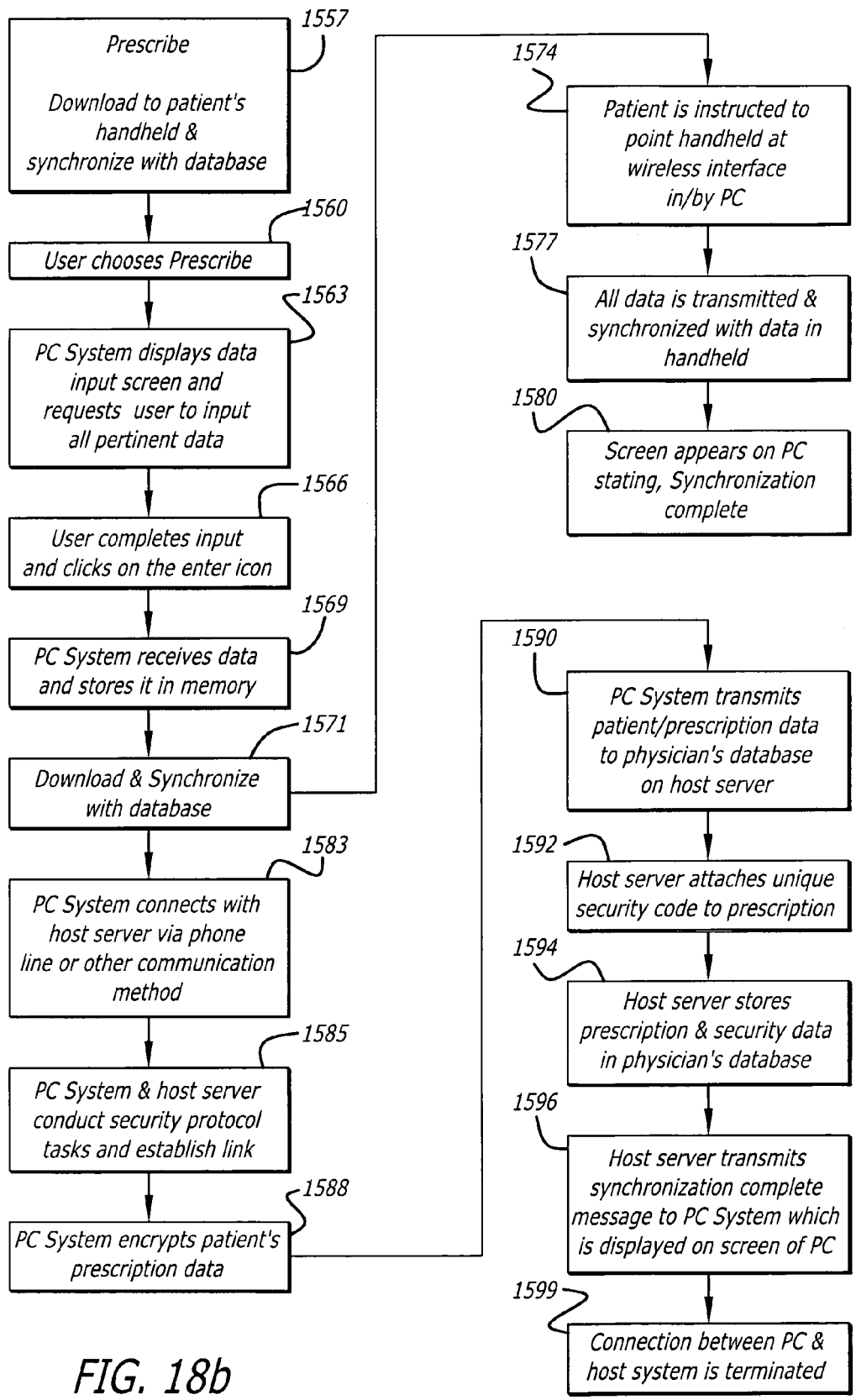
FIG. 18b is a high level functional flow diagram depicting exemplary Prescription Download interface processing with an exemplary Directed Purpose System device in an exemplary embodiment of the present invention.

The Directed Purpose System device would also be capable of receiving, storing and transmitting medical prescriptions such as is depicted in FIG. 18b. FIG. 18b is a high level functional flow diagram depicting exemplary Prescription Download interface processing with an exemplary Directed Purpose System device in an exemplary embodiment of the present invention. To perform the prescription function, the user would provide a licensed physician with the user's Directed Purpose System device. The licensed physician would enter prescriptions 1563 for the user on the physician's computer using a PC System feature for this purpose. Once all of the prescription information, including brand name, generic name, strength, dosage, etc. had been entered into the physician's PC System 1566-1567, the physician would be instructed to download the information to the user's device 1571.

The physician would establish communication between the user's device and the physician's PC System, such as through a hardwire connection or an infrared or short range data transmission transceiver 1574. The physician would select a special physician option to "Download Prescriptions To Patient's handheld & Synchronize with your database." Selection of this option would cause the physician's PC System to authenticate the user and the user's device, and if authenticated, download the selected prescriptions to the device 1577. This choice will also cause the physician's PC System to connect with the host server, e.g. Immtec 1583 and to encrypt and to upload 1585-1588 all prescription and security data to the Server System's database(s) in an association with the particular physician's account 1590-1594 for later retrieval by a pharmacy when the patient attempts to fill the prescription. The Directed Purpose System device would store the downloaded prescriptions for later usage. The host server would transmit a Synchronization Complete notification to the physician's PC System 1596. Connection with host server would then be terminated 1599.

b.) Point of Purchase Device Interfaces

The Directed Purpose System device would interface with any infrared interface equipped or short range data transmission equipped point of purchase device capable of interfacing with a System-enabled PDA/wireless phone. The Directed Purpose System device would be configured to receive and transmit, among other things, electronic tickets, electronic currency, credit card, identity, security and/or personal medical, insurance and emergency data. The configuration of functions for which a particular Directed Purpose System device would perform would be updateable by synchronizing it with the user's personal computer or at an authorized sales/service center.

Figure 19C:
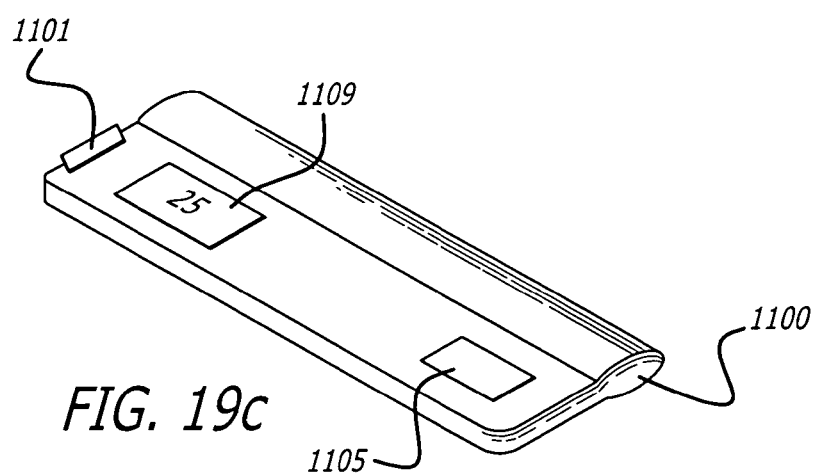

FIGS. 19b-19c are graphic representations depicting various views (FIG. 19c is a "front" side view; FIG. 19b is a reverse-image "back" side view) of an exemplary external configuration of an exemplary embodiment of a Directed Purpose System device. For security purposes the Directed Purpose System device's memory would contain a unique encrypted security code, user's name, address and phone number, and in one exemplary embodiment, the user's biometric (such as, but not limited to, fingerprint data) data. In one exemplary embodiment of the Directed Purpose System device as depicted in FIGS. 19b-19c, on its external surface there would be a biometric reader 1105 on which the user would place a finger, such as the right or left thumb, or the right or left index finger. On the opposite side of the surface of the Directed Purpose System device would be two buttons, one for transmission 1104 and one for receiving 1106, and a small LCD screen 1109. On one end of the Directed Purpose System device would be the input/output interface for a hardwire synchronization cable 1101. On the other end of the Directed Purpose System device would be an infrared interface 1100.

Uses of the Directed Purpose System device would include, among others: as a wallet for electronic currency; to hold and convey electronic single use and/or multi use tickets; as a repository and information source for identity, licenses, personal medical, insurance and emergency data, including medical prescriptions.

In an embodiment of the invention in which a PDA/wireless phone is used, the PDA/wireless phone would provide numerous input devices, including keys, and in the case of PDA's, handwriting and voice input. PDA's and wireless phones would also provide a display interface that is larger than that which can be provided using a small, Directed Purpose System device. The exemplary embodiment of the Directed Purpose System device as depicted in FIGS. 19b-19c, on the other hand, would have limited input and display features due to its size limitations.

Because of the size limitations of the exemplary Directed Purpose System device, the exemplary embodiment of a Directed Purpose System device depicted in FIGS. 19b-19c would provide for interaction with "point of purchase" devices in a way that would require only limited user input at the time of the "point of purchase interaction." The exemplary embodiment of a Directed Purpose System would provide that initial communication between a Directed Purpose System device and a merchant's point of purchase device would activate an interaction between the Directed Purpose System device and the Server System via a connection established by the merchant's point of purchase device with the Server System, such as for example, via an Internet connection. From that point, the Server System would receive requests from the merchant's point of purchase device, such as for an amount of money, for a particular eTicket, for medical information, or for a prescription and would then communicate instructions to fulfill the request, according to System protocols, to the Directed Purpose System device via the merchant's point of purchase interface.

In such an exemplary embodiment, the user would point the infrared or other short-range data communication interface of the Directed Purpose System device at a similar device interface on the point of sale device with which the user wants to communicate and would press a "send" button 1104 on the external surface of the Directed Purpose System device to turn on the device. The Directed Purpose System device would display a request for a PIN and/or biometric identification. Once the correct identification data has been input, the device would transmit the identification and security information to the point of sale device. The user would then press a "receive" button 1106 to receive the Server System's instructions.

The Directed Purpose System device would receive and execute the Server System's instructions and would notify the user on the LCD 1109 display configured with the Directed Purpose System device of the amount and type of transaction. The Directed Purpose System device would also notify the user when the device is ready to fulfill the instructions. At that point, the user would press the "send" button to send the information needed to fulfill the requested transaction (e.g., electronic currency, eTicket, medical information, prescription information, etc.) In the exemplary embodiment, the information would be sent to the Server System, via the merchant's point of purchase interface, according to Server System protocols; and the Server System would fulfill the requested transaction with the merchant.

Figure 20A:
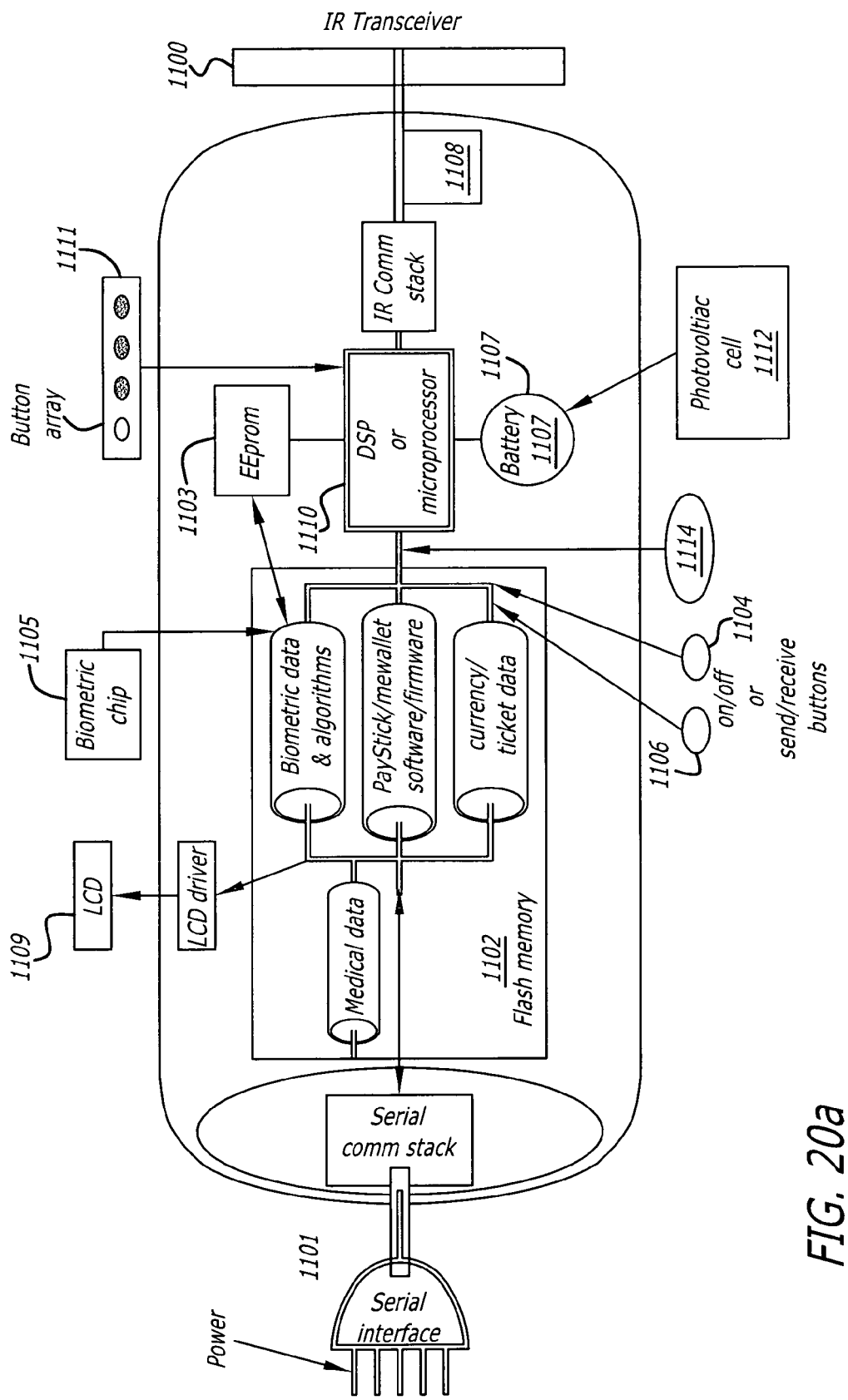
FIG. 20a is a high level graphic representation conceptually depicting an exemplary alternative embodiment of a Directed Purpose System device configuration including a biometric reader and additional contextually sensitive user input buttons.

FIG. 20a is a high level graphic representation conceptually depicting an exemplary alternative embodiment of a Directed Purpose System device configuration including a biometric reader and additional contextually sensitive user input buttons. In the alternative exemplary embodiment depicted in FIG. 20a, the user would use the additional contextually sensitive user input buttons 1111 to enter information and make selections of options that appear on the LCD of the device to fulfill the requested transaction.

Figures 1, 20B:
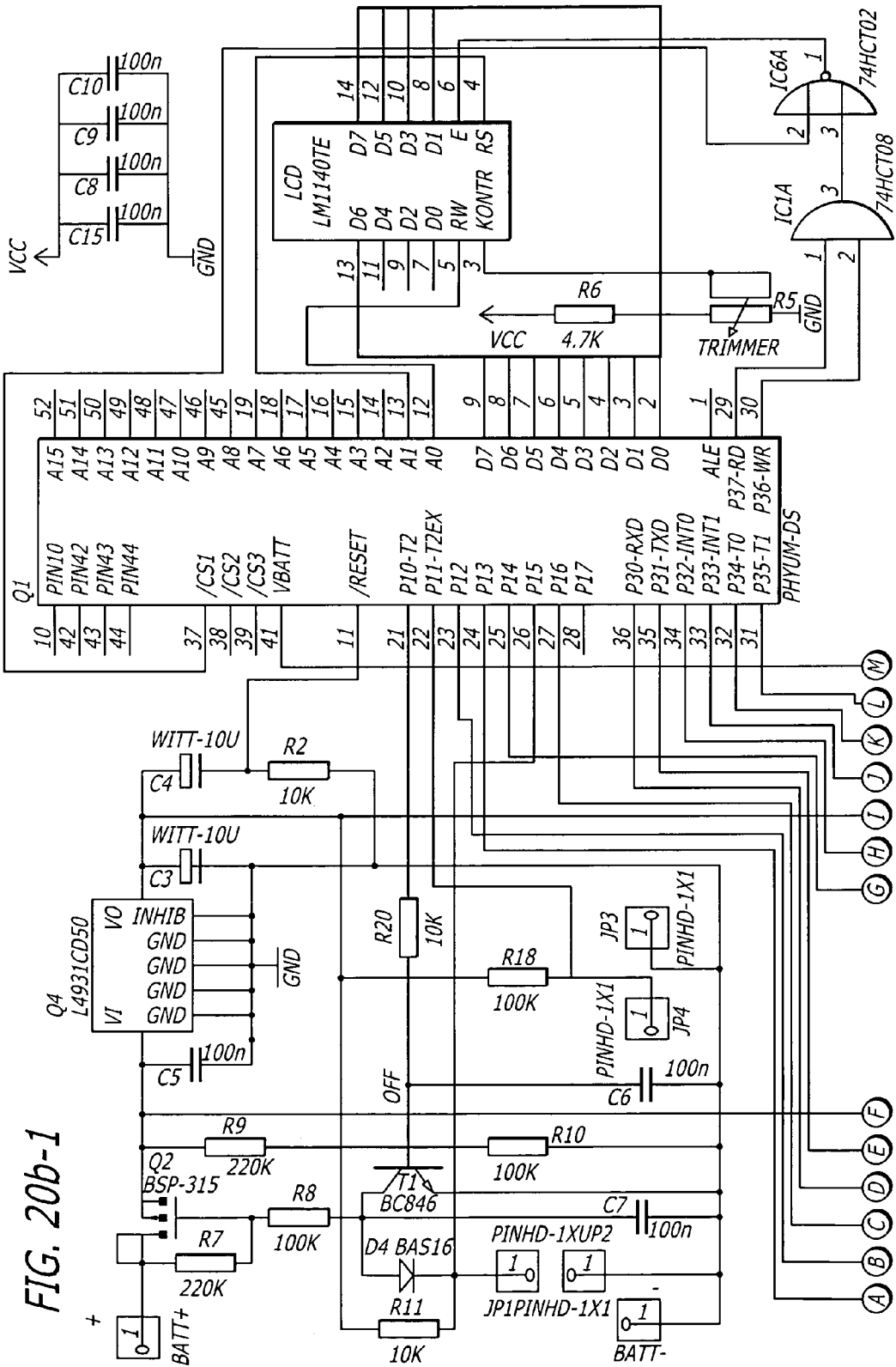
Figures 2, 20B:
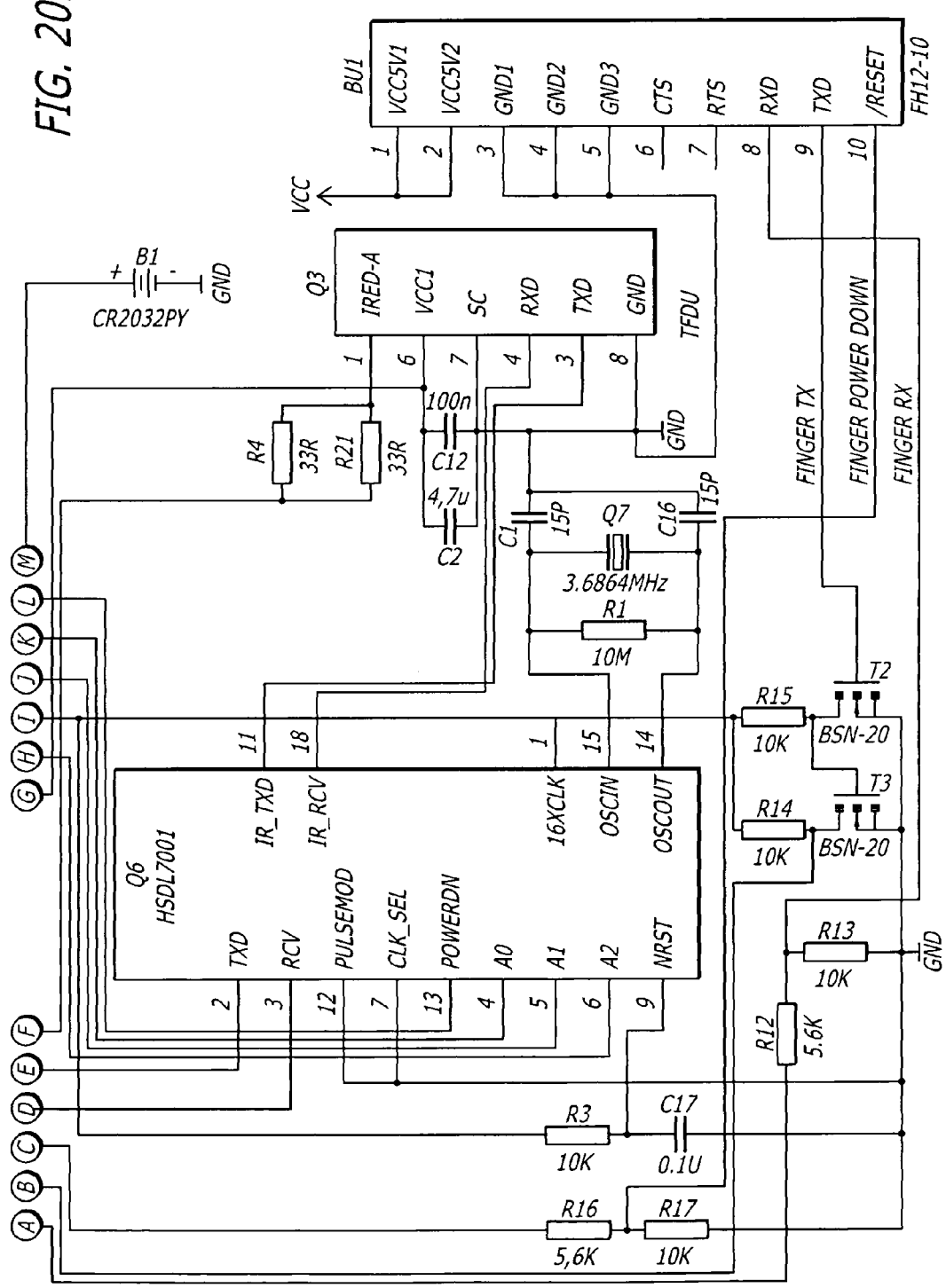
Figure 20C:
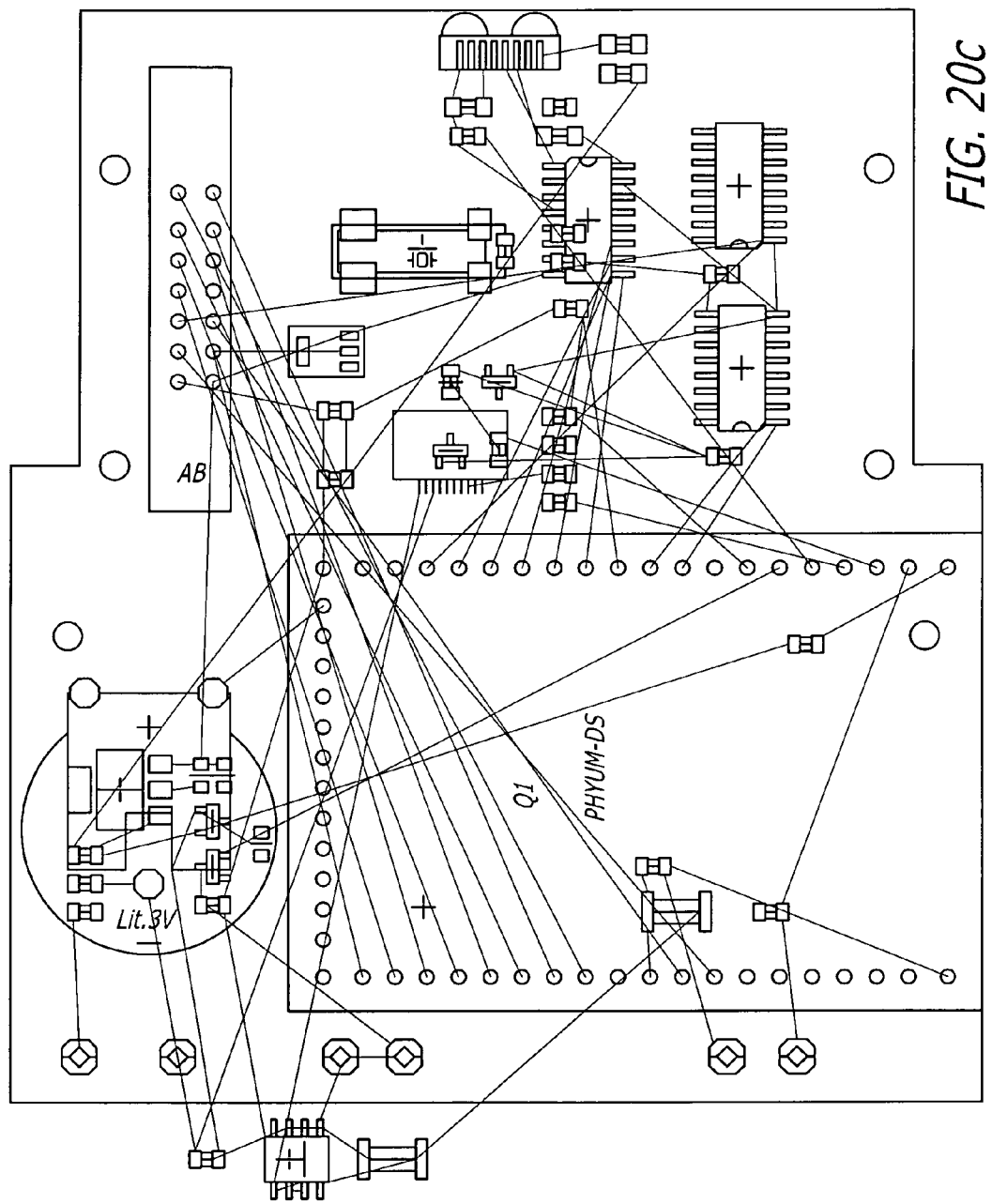
FIG. 20c is a schematic diagram depicting exemplary physical connections between the exemplary components depicted in FIG. 20b.

FIG. 20b is a schematic diagram depicting exemplary components of an exemplary embodiment of a PayStick™ and exemplary connections between the exemplary components. FIG. 20c is a schematic diagram depicting exemplary physical connections between the exemplary components. It should be noted that the parts numbering of the components in FIGS. 20b-20f are relevant to the parts disclosed in FIGS. 20b-20f only and do not necessarily relate to the element numbers in the other figures of this disclosure.

FIG. 20d is a parts list listing exemplary specifications for the exemplary components depicted in FIG. 20b. FIGS. 20e and 20f are exemplary Bills of Material for the exemplary components depicted in FIG. 20a, FIG. 20e depicting English specifications; FIG. 20f depicting German specifications.

The above-described alternative 6 input button exemplary embodiment of the Directed Purpose System device interface with merchant point of purchase devices and with the Server System can be adapted to the scenarios for each Directed Purpose System device function described below without departing from the spirit of the invention.

1.) Electronic Wallet for Electronic Currency

Figure 21B:
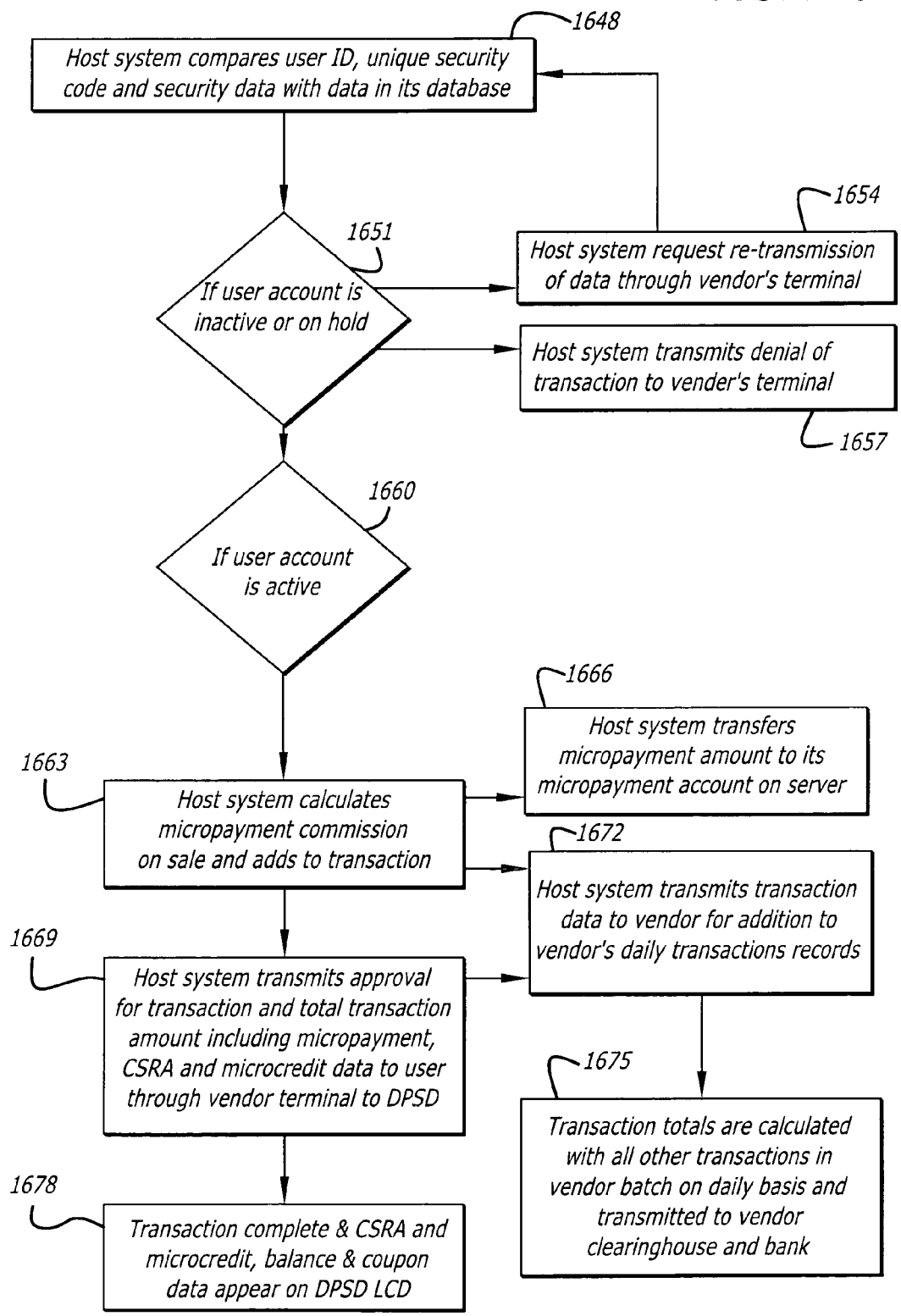

FIGS. 21a-21b are high level functional flow diagrams depicting exemplary transaction interface processing between an Electronic Currency enabled Directed Purpose System device and a point of sale terminal or electronic kiosk in an exemplary embodiment of the present invention. Assuming that the user has downloaded electronic currency into the Directed Purpose System device, the user can use the device as an electronic wallet for electronic currency. To do so, the user would press an "on" button 1600. The Directed Purpose System device would request input of security data 1603. In an exemplary embodiment of a Directed Purpose System device which provides a biometric reader, the user would hold a finger on the biometric/on-off button interface on the Directed Purpose System device so that the Directed Purpose System device would read the biometric data 1606. In an alternative exemplary embodiment of a Directed Purpose System device, the device would provide some number of additional buttons, such as the four (4) buttons 1111 depicted on FIG. 19a, with which the user could enter a user ID and/or a PIN 1606.

If after a pre-set number (e.g., two (2)) the Directed Purpose System is unable to validate the biometric data or the ID and PIN,1609,1621,1615 as the case may be, against that which is stored in the Directed Purpose System device, the Directed Purpose System device would not function and would lock 1624. In the exemplary embodiment, before locking, the user would be prompted to use another finger on biometric interface.

If the Directed Purpose System is able to validate the biometric data, or the ID and PIN as the case may be 1627, the Directed Purpose System device would turn on 1630, open the transceiver communications port and transmit an "I am here" code through the infrared or other short range data communications interface of the device to the like interface of the point of sale device at which the Directed Purpose System device is pointed. In this way, the Directed Purpose System device would open communications with the point of sale device, and through the point of sale device, with the Server System 1630.

The user would point the infrared interface of the Directed Purpose System device at an infrared interface on a merchant's point of purchase device and would press the receive button 1633. In the case of a Directed Purpose System device that had been initialized to perform multiple functions (electronic wallet, eTickets, medical information), the device would display a prompt to the user on the LCD to press the "send" button (e.g., 1106 as depicted in FIG. 19b). Or a specific code is transmitted 1636 through the vendor point of sale terminal which would identify to the Directed Purpose System device the method of payment that is being demanded. The activated interface would cause the merchant's point of purchase device to establish a connection with the Server System, if one had not previously been established.

Transaction details would appear on the Directed Purpose System device LCD 1639. If data is correct, the user would press the 'send' button 1642 which would cause the Directed Purpose System device to transmit the Payment type, amount, user ID, unique security code, and security data through the vendor point of sale terminal to the host Server system (or clearinghouse) using the Server System (or clearinghouse) communications protocols 1645. The Server System would attempt to validate the transmitted identification and security information 1648. If the user account is inactive 1651, has insufficient funds for the transaction, or is on hold, then the host system would request re transmission of the data through vendor's terminal 1654. If, after a second attempt, the users account is in fact inactive, has insufficient funds, or is on hold, then a message that the transaction is denied would be transmitted to the vendor terminal 1657.

Once the Server System validates that the account is active and there are sufficient funds available 1660, the Server System would process the merchant's proposed request (for example, the Server System would test the total amount of electronic currency available in the Directed Purpose System device to ensure that there was a sufficient amount of currency available to satisfy the amount of the charge (plus a micropayment amount, calculated by the Server System 1663, to the Host or Server System host), and would generate and send a set of instructions to the Directed Purpose System device to perform a particular function as requested by the merchant's point of sale device. In an alternative embodiment, the host system would calculate the micropayment commission on the sale, add this to the transaction amount and transmit this data with all discount and/or credit data to the user's Directed Purpose System device through the vendor's terminal via short range wireless transmission. 1669,1678.

In the present scenario of performing the function of an electronic wallet, if the user's account had sufficient funds and the account is active 1660, the instructions transmitted by the Server System would instruct the Directed Purpose System device via the infrared interface configured with the merchant's point of purchase device to retrieve from memory storage the total amount of electronic currency available and to display the total amount available on the LCD screen display of the Directed Purpose System device and to prompt the user to press the receive button 1633. The Server System would transmit the amount requested by the Merchant to the Directed Purpose System device via the infrared interface configured with the merchant's point of purchase device and would prompt the user to press the "send" button if the user approves the total amount to be paid to the merchant 1642.

If the user approves the total amount to be paid, the user would press the "send" button on the Directed Purpose System device 1642. If sufficient electronic currency is not available in the Directed Purpose System device, the transaction would be denied 1657. If the Directed Purpose System device transmits a sufficient amount of electronic currency, the merchant's point of purchase device would notify the Server System to transmit the user's ID, PIN, unique security code, biometric data, currency amount, and micropayment amount to the appropriate financial service clearinghouse system.

If the host system is able to validate the transmitted information, the host Server System would debit the user's account for the total amount of the transaction, collect from that amount the micropayment, deposit the micropayment in the account of the Server System host, e.g., Immtec, account 1666, and deposit the balance of the amount in the merchant's account 1672,1675. The host system would transmit approval of the transaction to the Server System which in turn would notify the merchant's point of purchase device which in turn would notify the Directed Purpose System device and the user that the transaction has been completed. The amount of electronic currency paid would be displayed on the LCD screen of the Directed Purpose System device and would be deducted from the total amount stored in the memory of the Directed Purpose System device 1669. Then the balance of electronic currency remaining would be displayed on the LCD screen 1678.

Refunds would be handled in much the same way as a merchant would handle any other refund or credit transaction involving cash. In some embodiments, the Directed Purpose System device configured as an electronic currency device may not be linked to any financial service provider account. In such case, a credit would not be applicable to a particular account corresponding to the user.

2.) Electronic Multi-Use Ticket Device

In the exemplary embodiment, when multi-use tickets are downloaded from a web site or transmitted to the Directed Purpose System device from a point of purchase device, a unique electronic ticket code would be imbedded in the tickets that the merchants point of purchase device would recognize. In order for the merchant to utilize the Server System infrastructure to sell and redeem the tickets, the merchant would need to "register" with the Server System host, e.g. Immtec.

Redemption of multi-use tickets is similar in many ways to the use of the Directed Purpose device as an electronic wallet. The exemplary embodiment of the invention would provide for prompts for the user to send information and receive instructions and information in much the same way as was described above for the electronic wallet function. The difference with the multi-use ticket function, is that instead of displaying an amount of currency, the number of tickets available and type of tickets available would be displayed on the LCD screen configured with the Directed Purpose System device.

When a merchant requests a ticket and after the Server System has validated identification and security information and the number of tickets available and after the user has approved the redemption of a ticket, the user would turn on the Directed Purpose System device utilizing the standard security protocols and would then point the Directed Purpose System device infrared interface at the merchant's point of purchase device infrared interface and press the "send" button.

By pressing the "send" button, the user would instruct the Directed Purpose System device to transmit 1 ticket plus user ID, unique security code and unique electronic ticket code. The merchant's point of purchase device would receive transmission of the ticket and security data, and in the exemplary embodiment, would transmit the information to the Server System. The Server System would validate the information and would accept and record the redemption of the ticket in the user's and merchant's accounts. The Server System would generate and send instructions to the Directed Purpose System device to reduce the number of available tickets by one and would notify the Directed Purpose System device and the user that the transaction was complete. In contrast to the electronic cash function, the multi-use and single use ticket function in the exemplary embodiment would perform the micropayment calculation and transfer at the time that the tickets are downloaded.

In one alternative exemplary embodiment, a micropayment would be collected for redeemed tickets rather than for downloaded tickets. In such an embodiment, each day, the merchant's system would transmit the merchant's database of Directed Purpose System device redeemed tickets to the Server System, including user ID's, and tickets redeemed. At that point, the Server System would calculate the accumulated micropayments for all tickets redeemed and notify the appropriate clearinghouse system to transfer the total amount of micropayments to the Server System host account.

3.) Repository for Personal Medical, Insurance and Emergency Data

As with the previously described functions of electronic cash and electronic tickets, the Directed Purpose System device can be configured to store, process requests for, and transmit personal medical, emergency and insurance data. The main difference in this function as compared to the other previously described electronic cash and electronic multi-use ticket functions is that the Server System would receive from the "merchant" "point of purchase" system the type of information needed, send the request for the type of information needed to the Directed Purpose System device and instruct the device to send the information to the point of purchase device. The medical, insurance or emergency data would be accessible by an authorized service provider by pressing the send button on the device and transmitting an identifier code to the device from the authorized service providers PC system, point of sale device or other short range wireless transceiver. This identifier code would be available from Immtec and would be provided to an authorized service provider such as a hospital or physician. This method of accessing the Directed Purpose System device would allow only access to the users medical data and no other area of system memory.

c). Third Party Financial Service Provider or Ticket Sales Agency Interfaces

Figure 22A:
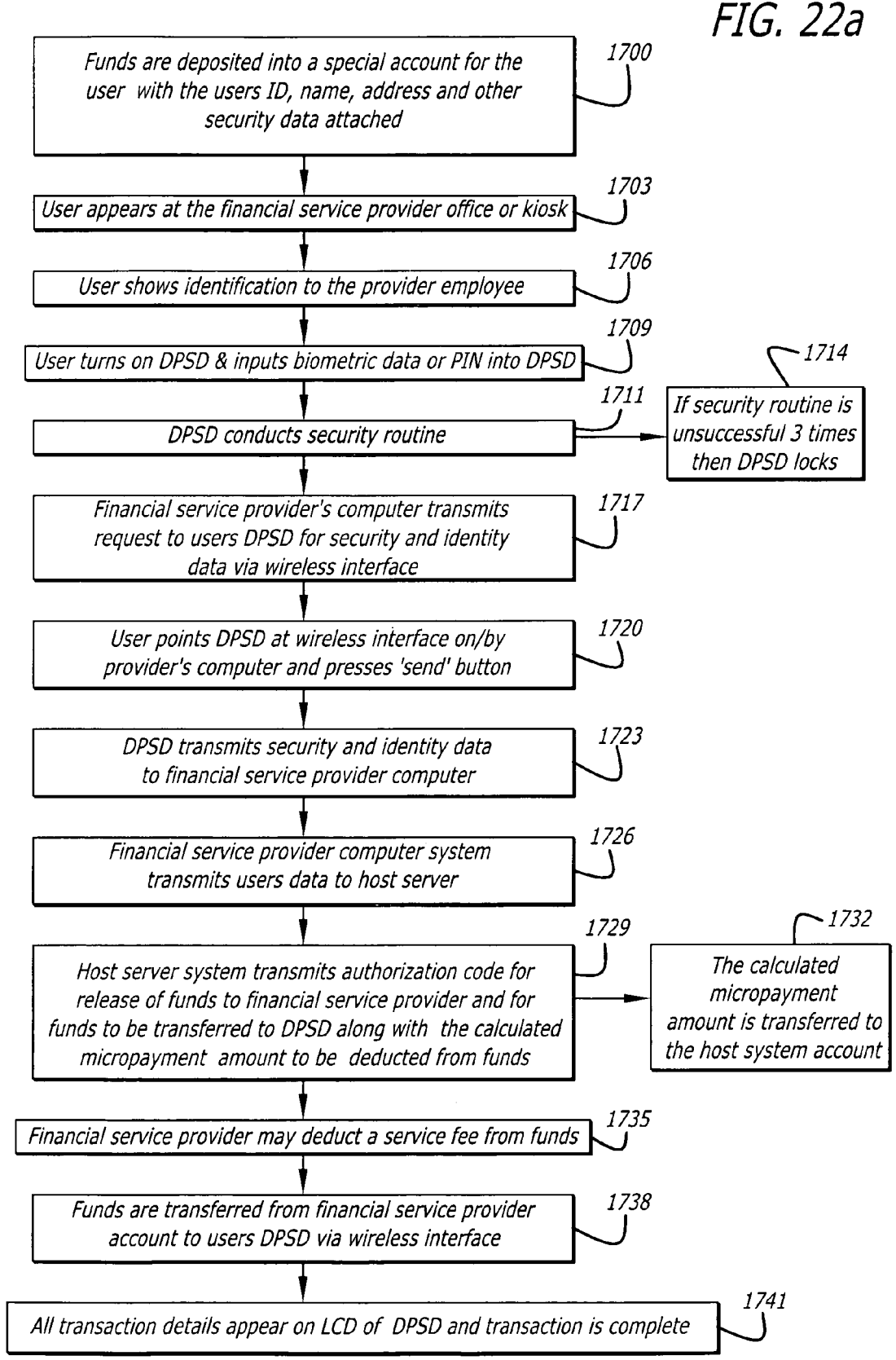
FIGS. 22a-22b are high level functional flow diagrams depicting exemplary electronic currency and ticket download processing between an exemplary Directed Purpose System device and an authorized service provider in an exemplary embodiment of the present invention.
Figure 22B:
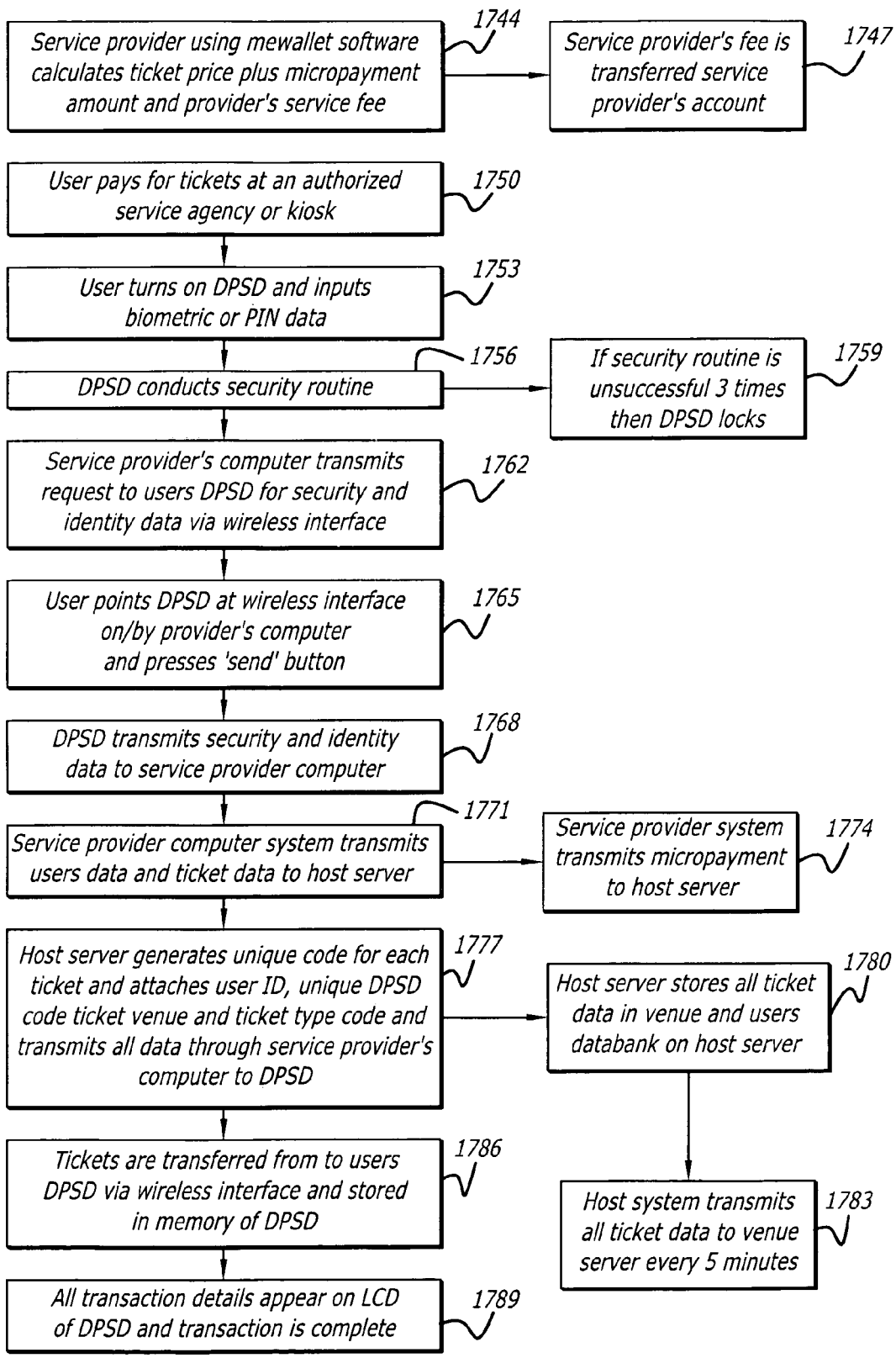

The Directed Purpose System device can be used to download electronic currency from an authorized financial service provider even if the user does not have an account, such as from a bank or Western Union. FIGS. 22a-22b are high level functional flow diagrams depicting exemplary electronic currency and ticket download processing between an exemplary Directed Purpose System device and an authorized service provider in an exemplary embodiment of the present invention. A Directed Purpose System device can be re-filled with multi-use tickets from an authorized ticket agency such as a transportation authority office or electronic kiosk.

As depicted in FIGS. 22a-22b, in an exemplary embodiment of the third party financial service provider interface, funds would be deposited into a special account for the user along with the user's ID, name, address, and other security data 1700.

When the user appears at an authorized financial service provider office 1703, the user would be required to present identification 1706 and optionally to provide cash, check or other payment method for the amount of money requested, plus a micropayment amount and optionally, a transaction fee. If the user presents proper identification and pays the required amount of money, the user would be asked to press the biometric on-off button interface or enter the PIN code for the Directed Purpose System device 1709. The Directed Purpose System device would read the biometric data or PIN 1711. If the Directed Purpose System device determined that the read biometric data does not match the biometric data stored in the Directed Purpose System device, the device would not function, and the transaction would be denied 1714.

Once the Directed Purpose System device validates the biometric or PIN data, the user would be asked to specify an amount of funds, and to point the Directed Purpose System device's infrared interface at the financial service provider's computer infrared interface. A financial service provider representative would input the amount of funds requested. The financial service provider's computer would transmit a request to the Directed Purpose System device for the user ID, unique security code and biometric data 1717. The request would appear, for example, as a blinking "R" on the LCD of the user's Directed Purpose System device. The user would press the "send" button 1720 on the Directed Purpose System device causing the Directed Purpose System device to transmit the user ID, unique encrypted security code, and biometric data to the financial service provider's computer 1723.

The financial service provider's computer would receive the transmitted data and would transmit this data and the amount of funds requested to a financial service clearinghouse or host system. The clearinghouse or host system would request the Server System to compare the transmitted user's data to the information for the corresponding user stored in the Server System's database(s) 1726.

If the Server System validates the information, the Server System would notify the clearinghouse. The clearinghouse would validate the amount of funds availability for the financial service provider. If the financial service provider has sufficient funds, the clearinghouse would notify the financial service provider and the Server System of the approval, and would send the financial service provider instructions to be provided to the Directed Purpose System device to add the specified amount of funds authorized by the clearinghouse 1729. The Server System would calculate a financial service provider micropayment amount and a user micropayment amount and would send notification of the micropayment amounts to the clearinghouse. The clearinghouse would transfer the requested funds from the financial service provider's account to a special account for the user, would transfer an additional amount in the amount of the financial service provider's micropayment amount to the Server System host's account 1732, collecting from the request funds amount an amount equal to the user micropayment amount, and transferring the user micropayment amount to the Server System host's account. In one embodiment of the invention, the clearinghouse would further transfer a service fee 1735 from the user's funds to the financial service provider's account. The clearinghouse would notify the Server System, which in turn would notify the financial service provider system, that the funds have been transferred. The Server System would generate and transmit to the Directed Purpose System device, via the financial service provider's computer and infrared interface 1738, instructions to add to the electronic cash stored in the memory of the Directed Purpose System device the amount of requested funds, minus the amount of the user micropayment and any service fee.

The Directed Purpose System device would receive the instructions to add the requested funds and would increment the amount of electronic funds available. The Directed Purpose System device would generate a display to the LCD screen of the Directed Purpose System device of the amount of funds available, and would notify the user that the transaction is complete 1741.

The Directed Purpose System device would hold multi use tickets such as those used for commuter transportation and single use tickets such as for a particular event. The process for purchasing tickets from an authorized ticket agency, such as a transportation authority is similar in many ways to the process described above for downloading funds from a financial service provider. The user would pay for the requested tickets at the authorized ticket agency 1750. The authorized ticket agency would notify the Server System of the type and number of tickets to be purchased. The Server System would generate the type and number of electronic tickets requested 1777, would generate instructions to add the tickets and would transmit the tickets and the instructions through the authorized ticket agency's computer infrared interface to the user's Directed Purpose System device 1786 through the device's infrared interface. In the exemplary embodiment of the invention, the Server System would attach the user's ID, biometric data and unique encrypted security code to the electronic ticket data. The Server System would store the ticket and security data in its database(s) 1780 for a later ticket redemption information exchange with the Directed Purpose System device through the redeeming ticket authority's computer 1783.

The Directed Purpose System device would receive the electronic tickets with all data attached and the transmitted instructions via the infrared interfaces of the device and the authorized ticket agency's computer 1786. Once the Directed Purpose System device had executed the instructions and added the tickets to its memory, the device would display the number of tickets available on the LCD screen of Directed Purpose System device and mark the transaction as complete 1789.

d.) PDA/Wireless Phone Interface

Figure 23A:
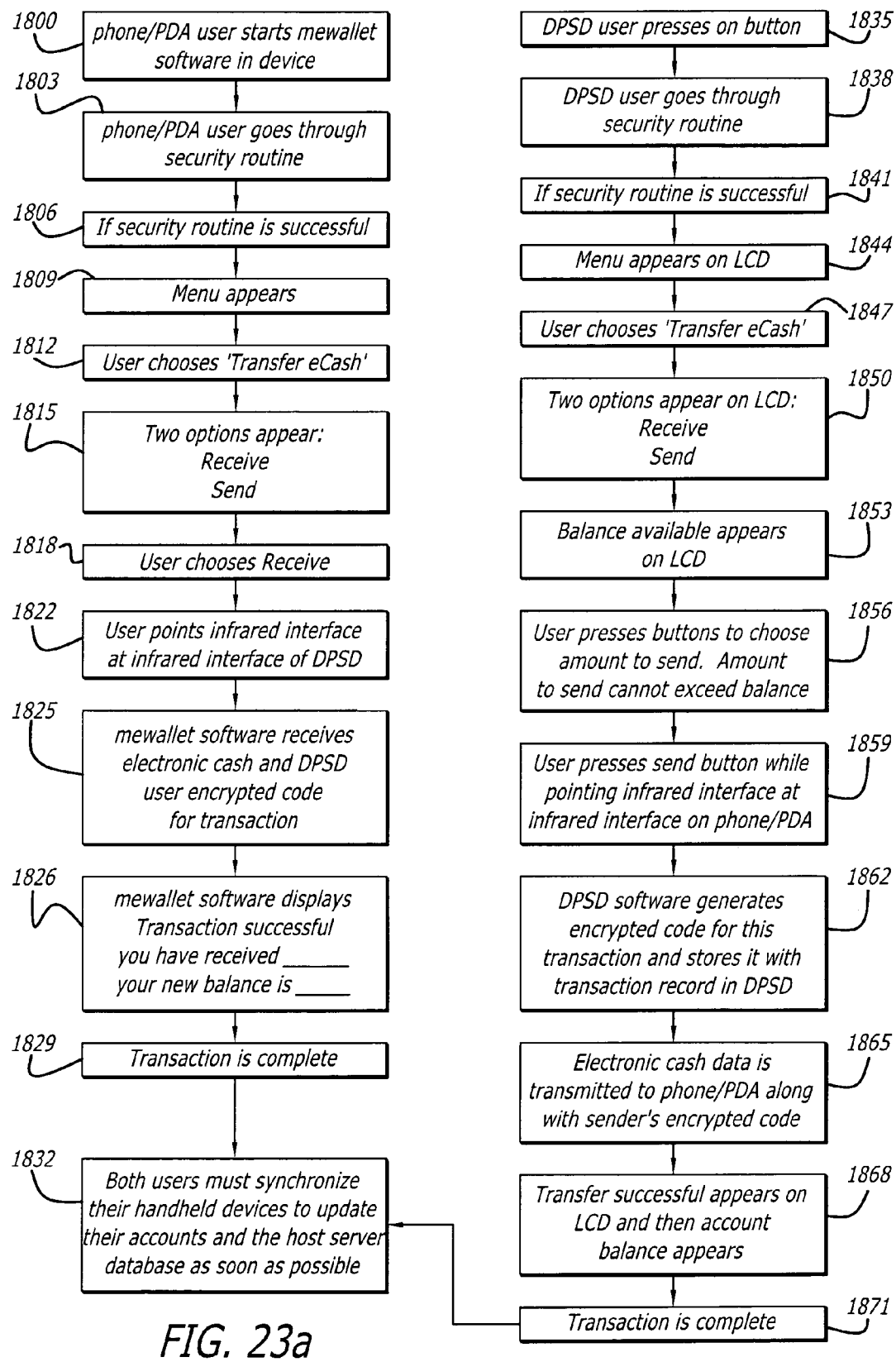
FIGS. 23a-23b are high level functional flow diagrams depicting exemplary electronic currency exchange processing between an exemplary Directed Purpose System device and an exemplary System-enabled PDA/wireless phone in an exemplary embodiment of the present invention.
Figure 23B:
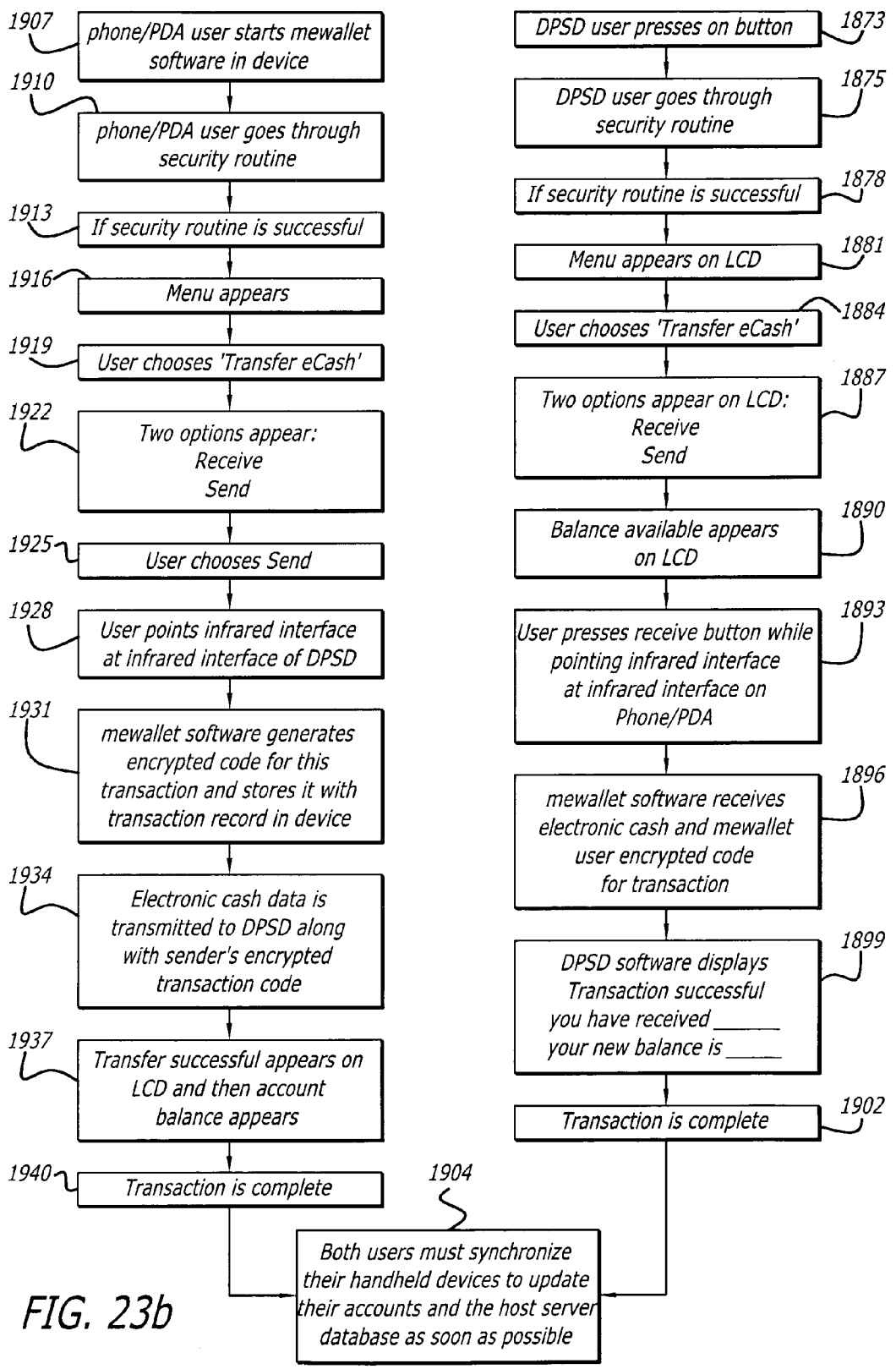

Electronic currency may be transferred between a PDA/wireless phone and a Directed Purpose System device. FIGS. 23a-23b are high level functional flow diagrams depicting exemplary electronic currency exchange processing between an exemplary Directed Purpose System device and an exemplary System-enabled PDA/wireless phone in an exemplary embodiment of the present invention.

In one exemplary embodiment of the invention, in order to transfer electronic currency to a PDA/wireless phone from a Directed Purpose System device, the users would point the infrared interfaces of both devices at each other 1822, 1859. The PDA/wireless phone user would choose the System icon on display screen 1800. The PDA System would request a user ID and PIN 1803. The user would input a user ID and PIN. The PDA System would validate the user ID and PIN. Once validated, the user of the PDA/wireless phone would choose a "Transfer e-cash" icon 1812. The PDA System would prompt the user to input the amount to receive or send and would prompt the PDA System user to choose whether to "receive" or "send" 1815.

If the PDA/wireless phone user chooses to "receive" 1818, the Directed Purpose System device user would press the receive button 1818 and the Directed Purpose System device would receive an electronic currency request and amount and would display the amount requested on the LCD screen of Directed Purpose System device 1856. The Directed Purpose System device user would place a finger on the biometric on-off button interface 1838. The Directed Purpose System device would read the biometric data and attempt to validate it against the information saved in the memory of the device. Once the biometric data has been validated 1841, the Directed Purpose System device user would be prompted to press the "send" button which would cause the Directed Purpose System to transmit the requested amount of electronic currency from the Directed Purpose System device to the PDA/wireless phone 1859. The Directed Purpose System device would decrease the amount of electronic currency available and would display the amount transferred and then the remaining amount on the LCD screen of the Directed Purpose System device 1868.

The PDA/wireless phone would receive the transmitted amount 1825, add the amount to the available amount of electronic currency and display both the transferred amount and the total amount available 1826. The two devices would then exchange transaction-completed notifications 1829, 1871.

In an embodiment of the invention in which the Server System maintains the account balances for each device/user, the accounts would be updated during the next synchronization session 1832 between the PDA and the user's PC and the Server System, and/or between the Directed Purpose System device and the user's PC and the Server System.

As depicted in FIG. 23b, electronic currency may similarly be transferred from a PDA/wireless phone to a Directed Purpose System device, except that the PDA/phone user would select the "Send" option rather than the "receive" option and the direction of the transfer of finds would be reversed 1873-1940.

6. Initialization and Set Up for New Directed Purpose System Device

A Directed Purpose System device may be purchased at any authorized sales/service center or directly from a direct purchase website such as, e.g., paystick.com/Immtec. The Directed Purpose System device could be shipped completely configured and ready for use other than the initial recording of the biometric data and registration with Immtec. A user ID would be printed on the registration card and would not be subject to change. The Directed Purpose System device may additionally have the logo of the sales/service provider on its surface and unique code of the sales/service provider embedded in the firmware of the device.

A new user of a Directed Purpose System device with a biometric reader would be instructed to initialize the biometric data in the device. To do so, the user would remove a plastic cover from biometric on-off interface button. The user would place a finger, e.g., a right or left thumb, or the right or left index finger, on biometric on-off interface button and press the button. This process could be repeated up to 3 times to create an accurate scan of the biometric data. The Directed Purpose System device would record the biometric data, encrypt it, and store the data in its memory storage.

A new user would also be instructed to register a new Directed Purpose System device after the biometric data has been recorded. To do so, the user would be instructed to connect the user's personal computer, or via authorized sales/service center's computer, with the Server System, such as via the Internet or via a direct line connection The user would be instructed to choose the "initialize new Directed Purpose System device" option from a Server System menu.

The Server System would then present the user with secure forms to fill out which would include input fields for: name, address, phone, user ID from registration card and mother's maiden name. The user is prompted to complete the requested data and to click a "submit" button. The new user data would be transmitted to the Server System which would receive the information and update its database(s) with the information. The user would then be prompted by the Server System to synchronize the new Directed Purpose System device with the Server System, either via hardwire or infrared interface or other short range data transmission interface. The user would synchronize the new device via hardware or via infrared or other short range data transmission interface, indicate whether the user is using the user's PC or a "public" computer, and press the "send" button on the Directed Purpose System device.

If the computer is a "public" computer, e.g., an authorized service center or another public computer or kiosk, the Directed Purpose System device would transmit user ID, unique encrypted security code and biometric data to the Server System via hardwire or infrared interface, bypassing the public computer so that the public computer does not capture the data. The way in which this would be accomplished in the exemplary embodiment would be that the Server System sends "instructions" to the Directed Purpose System device which, when executed by the Directed Purpose System device, would cause the device to encrypt and embed the information in the instructions and return the embedded information in the instructions to the Server System. The Server System would then de-encrypt the transmission, extract the information, and store the information in the Server System's database(s). In another embodiment, the Directed Purpose System device would merely encrypt the information according to instructions by the Server System and send the encrypted information to the Server System. In both cases, the public computer would not capture the information because it would not have the de-encryption instructions. The public computer or kiosk would act as a conduit only.

The Server System would send certain validated information to a financial service clearinghouse for future reference and processing. At that point, the Directed Purpose System device would be ready to receive data and be used.

If instead of using a public computer, the computer is the user's personal computer, the Directed Purpose System device would transmit the user ID, unique encrypted security code and biometric data to the Server System via hardwire or infrared interface with the user's PC. The Server System would receive the user's Directed Purpose System device data and add the user's Directed Purpose System device data to the user's personal data to the Server System database. The Server System would then transmit the user's data to the user's personal computer with instruction for storing the data. The user's personal computer would receive the data and the instructions and store the data in a database. The Server System would transmit some of the data to a financial service clearinghouse. At this point, the Directed Purpose System device would be ready to receive data and be used.

7. Data Entity Relationships and Attributes

Figures 1, 24:
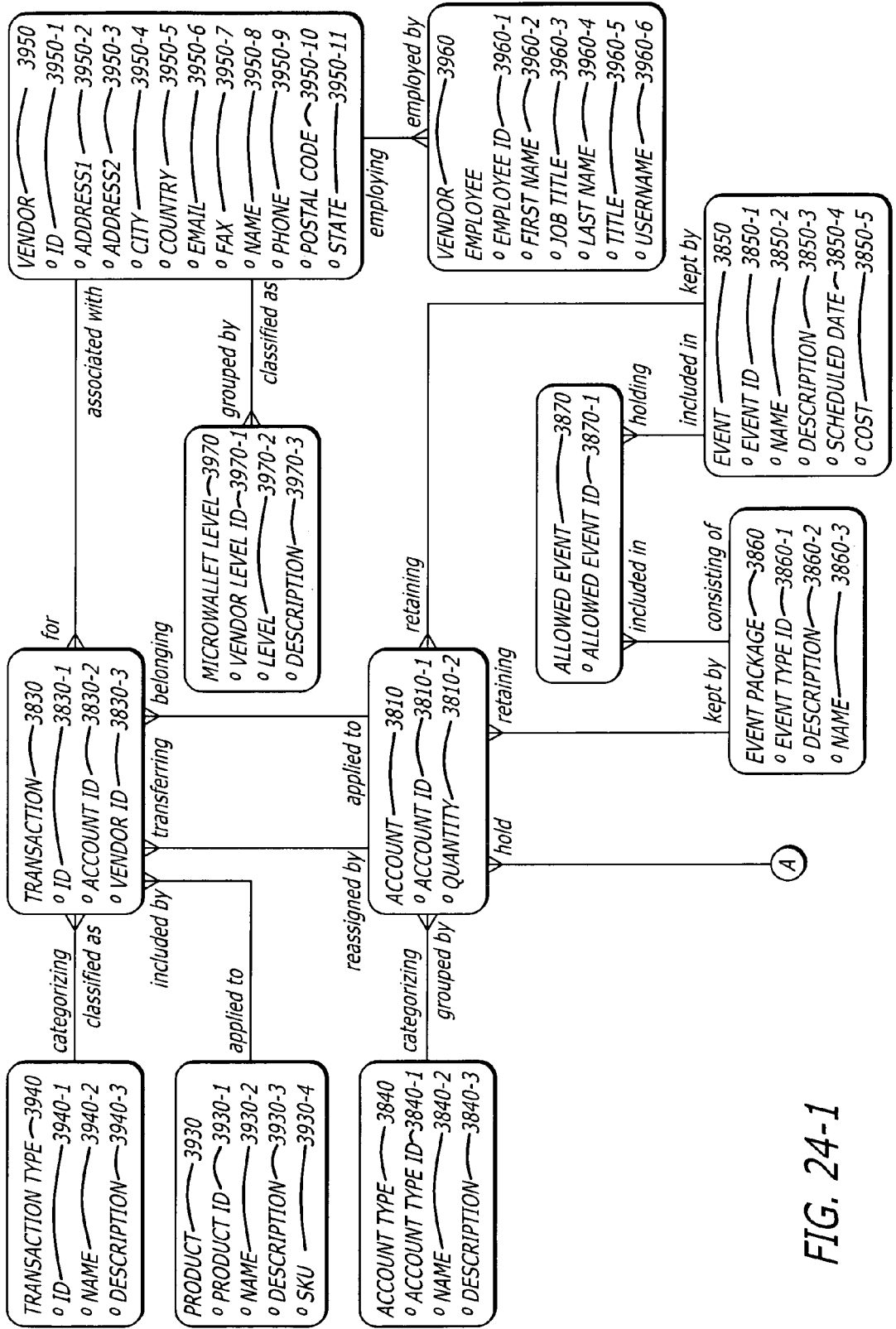
Figures 2, 24:
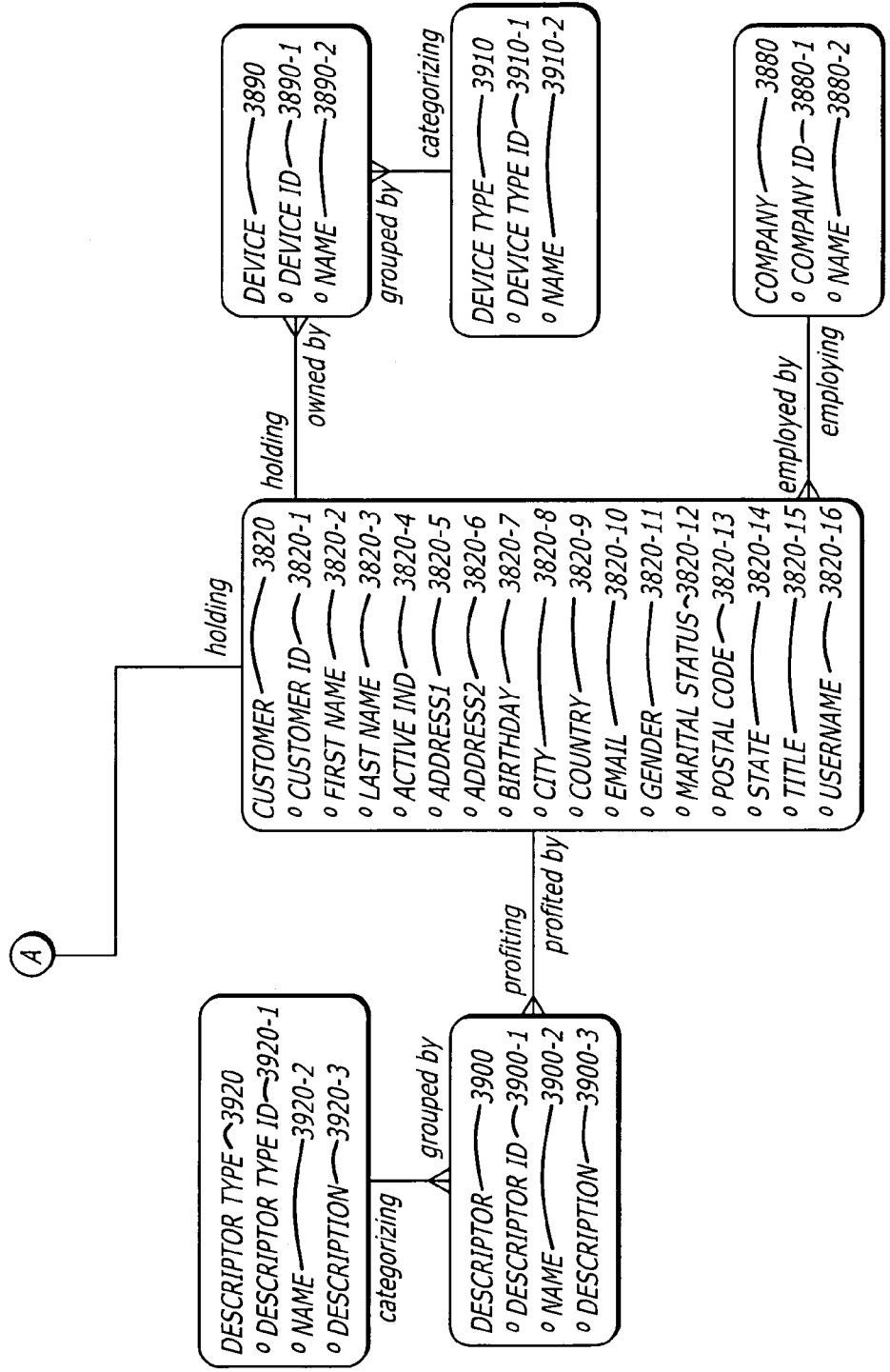

FIG. 24 is a data relationship diagram of exemplary data structures for data that would be maintained by the Server and/or the PDA/wireless/Directed Purpose devices. As depicted in FIG. 24, an exemplary data structure embodying the data of the present invention would provide an ACCOUNT entity 3810 (Short name, ACC; Plural name: ACCOUNTS). The ACCOUNT entity 3810 would be a repository for holding information about a particular account held by a particular customer. It would hold ticket information about a particular event, season game tickets, train tickets, or the like; it would also sometimes hold electronic cash. It would be common for multiple ACCOUNTS to be held for a single customer device. The ACCOUNT entity 3810 would be characterized by an ACCOUNT ID 3810-1 and an optional QUANTITY 3810-2. The ACCOUNT ID 3810 is a primary unique identifier. An ACCOUNT 3810 may be: held by one and only one CUSTOMER 3820; applied to one or more TRANSACTIONS 3830; and/or reassigned by one or more TRANSACTIONS 3830. An ACCOUNT 3810 must be grouped by one and only one ACCOUNT TYPE 3840. An ACCOUNT 3810 may: retain one and only one EVENT 3850; and/or retain one an only one EVENT PACKAGE 3860.

As depicted in FIG. 24, an exemplary data structure embodying the data of the present invention would provide an ACCOUNT TYPE entity 3840. The ACCOUNT TYPE entity 3840 would be used to classify ACCOUNTS 3810 into group types. The ACCOUNT TYPE entity 3840 would be characterized by an ACCOUNT TYPE ID 3840-1, a NAME 3840-2, and an optional DESCRIPTION 3840-3. An ACCOUNT TYPE 3840 may categorize one or more ACCOUNTS 3810. ACCOUNT TYPE IDS 3840-1 would include, for example, cash, ticket, business, personal, and the like.

As depicted in FIG. 24, an exemplary data structure embodying the data of the present invention would provide a CUSTOMER entity 3820. The CUSTOMER entity 3820 would be a repository for holding customer information. A CUSTOMER 3820 is usually identified for each single individual person holding multiple ACCOUNTS and possibly, multiple devices. The CUSTOMER entity 3820 aggregates, among other things, a customer's demographics, medical information, buying patterns, and the like. The CUSTOMER entity 3820 would be characterized by a CUSTOMER ID 3820-1, a FIRST NAME 3820-2, a LAST NAME 3820-3, and a number of optional attributes, including: an ACTIVE IND 3820-4, ADDRESS1 3820-5, ADDRESS2 3820-6, BIRTHDAY 3820-7, CITY 3820-8, COUNTRY 3820-9, EMAIL 3820-10, GENDER 3820-11, MARITAL STATUS 3820-12, POSTAL CODE 3820-13, STATE 3820-14, TITLE 3820-15, and USERNAME 3820-16. A CUSTOMER 3820 maybe: employed by one and only one COMPANY 3880; holding one or more ACCOUNTS 3810; holding one or more DEVICES 3890; and/or profiled by one or more DESCRIPTORS 3900.

As depicted in FIG. 24, an exemplary data structure embodying the data of the present invention would provide a ALLOWED EVENT entity 3870. The ALLOWED EVENT entity 3870 would be used to group event according to an EVENT PACKAGE 3860. For example, a limited season tickets package would contain only tickets good for certain games. The ALLOWED EVENT entity 3870 would be characterized by an ALLOWED EVENT ID 3870-1. The ALLOWED EVENT 3870 may hold one and only one EVENT 3850 and must be included in one and only one EVENT PACKAGE 3860.

As depicted in FIG. 24, an exemplary data structure embodying the data of the present invention would provide a COMPANY entity 3880. The COMPANY entity 3880 would be used to track the COMPANY 3880 with which CUSTOMERS 3820 are associated. The COMPANY entity 3880 would be characterized by a COMPANY ID 3880-1 and a NAME 3880-2. The COMPANY entity 3880 may employ one or more CUSTOMERS 3820.

As depicted in FIG. 24, an exemplary data structure embodying the data of the present invention would provide a DESCRIPTOR entity 3900. The DESCRIPTOR entity 3900 would provide a repository for descriptive information about a CUSTOMER 3820. The DESCRIPTOR entity 3900 would be characterized by a DESCRIPTOR ID 3900-1, an optional NAME 3900-2, and an optional DESCRIPTION 3900-3. Multiple DESCRIPTOR TYPEs 3900-1 would be used to store different types of information about a particular CUSTOMER 3820. A particular DESCRIPTOR maybe grouped by one and only one DESCRIPTOR TYPE 3920 and must be profiling one and only one CUSTOMER 3820.

As depicted in FIG. 24, an exemplary data structure embodying the data of the present invention would provide a DESCRIPTOR TYPE entity 3920. The DESCRIPTOR TYPE entity 3920 would provide selectable types of CUSTOMER 3820 DESCRIPTORs 3900. The DESCRIPTOR TYPE entity 3920 would be characterized by a DESCRIPTOR TYPE ID 3920-1, a NAME 3920-2 and an optional DESCRIPTION 3920-3. A DESCRIPTOR TYPE 3920 must be categorizing one or more DESCRIPTORS 3900.

As depicted in FIG. 24, an exemplary data structure embodying the data of the present invention would provide a DEVICE entity 3890. The DEVICE entity 3890 would hold information about all devices owned and/or associated with a particular CUSTOMER 3820. The DEVICE entity 3890 would be characterized by a DEVICE ID 3890-1 and a NAME 3890-2. A DEVICE 3890 must be grouped by one and only one DEVICE TYPE 3910 and must be owned by one and only one CUSTOMER 3820. The DEVICE ID 3890-1 would provide for the identification of such devices as a CUSTOMER's 3820 business cell phone, personal cell phone, palm pilot, and the like.

As depicted in FIG. 24, an exemplary data structure embodying the data of the present invention would provide a DEVICE TYPE entity 3910. The DEVICE TYPE entity 3910 would be used to categorize the different types of devices that can hold mewallet accounts. The DEVICE TYPE entity 3910 would be characterized by a DEVICE TYPE ID 3910-1 and a NAME 3910-2. A DEVICE TYPE 3910 may categorize one or more DEVICES 3890. DEVICE TYPE ID would provide for the identification of such device types as palm computer, Directed Purpose System device, cell phone, and the like.

As depicted in FIG. 24, an exemplary data structure embodying the data of the present invention would provide a EVENT entity 3850. The EVENT entity 3850 would contain data elements about a particular single event that would be kept by an ACCOUNT 3810. An EVENT 3850 may be referenced by an ALLOWED EVENT 3870 which lists all EVENTS 3850 within an EVENT PACKAGE 3860. The EVENT entity 3850 would be characterized by an EVENT ID 3850-1, an optional NAME 3850-2, an optional DESCRIPTION 3850-3, an optional SCHEDULED DATE 38504 and an optional COST 3850-5. An EVENT 3850 may be included in one or more ALLOWED EVENTS 3870 and may be kept by one or more ACCOUNTS 3810.

As depicted in FIG. 24, an exemplary data structure embodying the data of the present invention would provide an EVENT PACKAGE entity 3860. The EVENT PACKAGE entity 3860 would be characterized by an EVENT TYPE ID 3860-1, an optional DESCRIPTION 3860-2, and an optional NAME 3860-3. An EVENT PACKAGE 3860 may consist of one or more ALLOWED EVENTS 3870 and may be kept by one or more ACCOUNTS 3810.

As depicted in FIG. 24, an exemplary data structure embodying the data of the present invention would provide a MICROWALLET LEVEL entity 3970. The MICROWALLET LEVEL entity 3970 would hold information categorizing types or levels of VENDORS 3950. The MICROWALLET LEVEL entity 3970 would be characterized by a VENDOR LEVEL ID 3970-1, an optional LEVEL 3970-2, and an optional DESCRIPTION 3970-3. A MICROWALLET LEVEL 3970 must be grouped by one and only one VENDOR 3950. VENDOR LEVEL ID 3970-1 would identify such groups of VENDORS 3950 as, for example, small, medium or large.

As depicted in FIG. 24, an exemplary data structure embodying the data of the present invention would provide a PRODUCT entity 3930. The PRODUCT entity 3930 would hold information for the product sold by a particular VENDOR 3950. The PRODUCT entity 3930 would be characterized by a PRODUCT ID 3930-1, a NAME 3930-2, an optional DESCRIPTION 3930-3, and an optional SKU 39304. A PRODUCT 3930 may be applied to one or more TRANSACTIONS 3830, and may be provided by one and only one VENDOR 3950.

As depicted in FIG. 24, an exemplary data structure embodying the data of the present invention would provide a TRANSACTION entity 3830. The TRANSACTION entity 3830 would provide the ability to track all transactions relating to an ACCOUNT 3810. The TRANSACTION entity 3830 would be characterized by a TRANSACTION ID 3830-1, an ACCOUNT ID 3830-2, and a VENDOR ID 3830-3. A TRANSACTION 3830 may be included by one and only one PRODUCT 3930, may transfer one and only one ACCOUNT 3810, must belong to one and only one ACCOUNT 3810, must be classified as one and only one TRANSACTION TYPE 3940, and must be for one and only one VENDOR 3950. A TRANSACTION3830 would identify, for example, the purchase of a ticket for an event, the use of a ticket for a particular event, the transfer of account items such as tickets from one ACCOUNT 3810 to another an ACCOUNT ID.

As depicted in FIG. 24, an exemplary data structure embodying the data of the present invention would provide a TRANSACTION TYPE entity 3940. The TRANSACTION TYPE entity 3940 would be used to categorize TRANSACTIONS 3830. The TRANSACTION TYPE entity 3940 would be characterized by a TRANSACTION TYPE ID 3940-1, a NAME 3940-2 and an optional DESCRIPTION 3940-3. A TRANSACTION TYPE 3940 may categorize one or more TRANSACTIONS 3830.

As depicted in FIG. 24, an exemplary data structure embodying the data of the present invention would provide a VENDOR entity 3950. The VENDOR entity 3950 would provide information about vendors that are members of the mewallet community such as those that accept mewallet transactions. The VENDOR entity 3950 would be characterized by a VENDOR ID 3950-1, an optional ADDRESS1 3950-2, an optional ADDRESS2 3950-3, an optional CITY 3950-4, an optional COUNTRY 3950-5, an optional EMAIL 3950-6, an optional FAX 3950-7, an optional NAME 3950-8, an optional PHONE 3950-9, an optional POSTAL CODE 3950-10, and an optional STATE 3950-11. A VENDOR 3950 may be associated with one or more TRANSACTIONS 3830, may be classified as one or more MICROWALLET LEVELS 3970, may be employing one or more VENDOR EMPLOYEES 3960, and may be selling one or more PRODUCTS 3930.

As depicted in FIG. 24, an exemplary data structure embodying the data of the present invention would provide a VENDOR EMPLOYEE entity 3960. The VENDOR EMPLOYEE entity 3960 would be used to hold information about persons employed by a particular VENDOR 3950 in order to track actions by persons involved in mewallet transactions on behalf of a VENDOR 3950. The VENDOR EMPLOYEE entity 3960 would be characterized by an EMPLOYEE ID 3960-1, an optional FIRST NAME 3960-2, an optional JOB TITLE 3960-3, an optional LAST NAME 39604, an optional TITLE 3960-5, and an optional USERNAME 3960-6. A VENDOR EMPLOYEE 3960 must be employed by one and only one VENDOR 3950. The date in the VENDOR EMPLOYEE entity 3960 would be populated from a VENDOR's 3950 own employee database.

8. PC and PayStick.com User Interface

Figure 25:
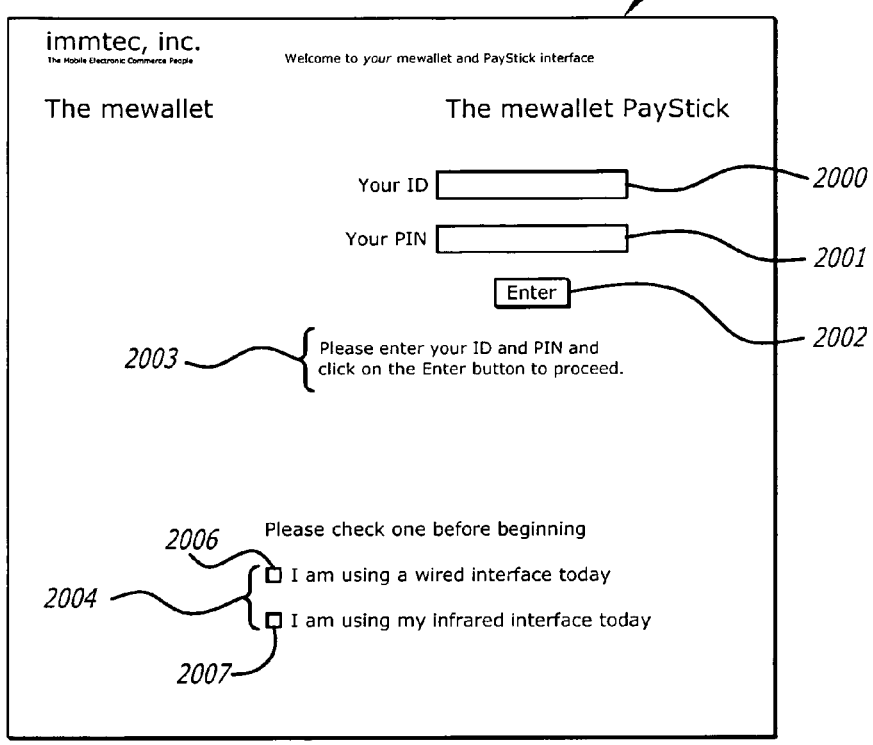
FIG. 25 is a graphic representation of an exemplary user interface Welcome screen that would be provided on a user's PC by an exemplary embodiment of the invention.

FIG. 25 is a graphic representation of an exemplary user interface Welcome screen that would be provided on a user's PC by an exemplary embodiment of the invention. As depicted in FIG. 25, the PC System would generate and format an input field with which to collect the user's User ID 2000 and PIN 2001. The PC System would prompt 2003 the User to press the online Enter button 2002 to enter the user input of the User ID 2000 and PIN 2001. The PC System would further prompt the User to identify whether the user would be using a wired interface 2006 or an infrared interface 2007.

Figure 26:
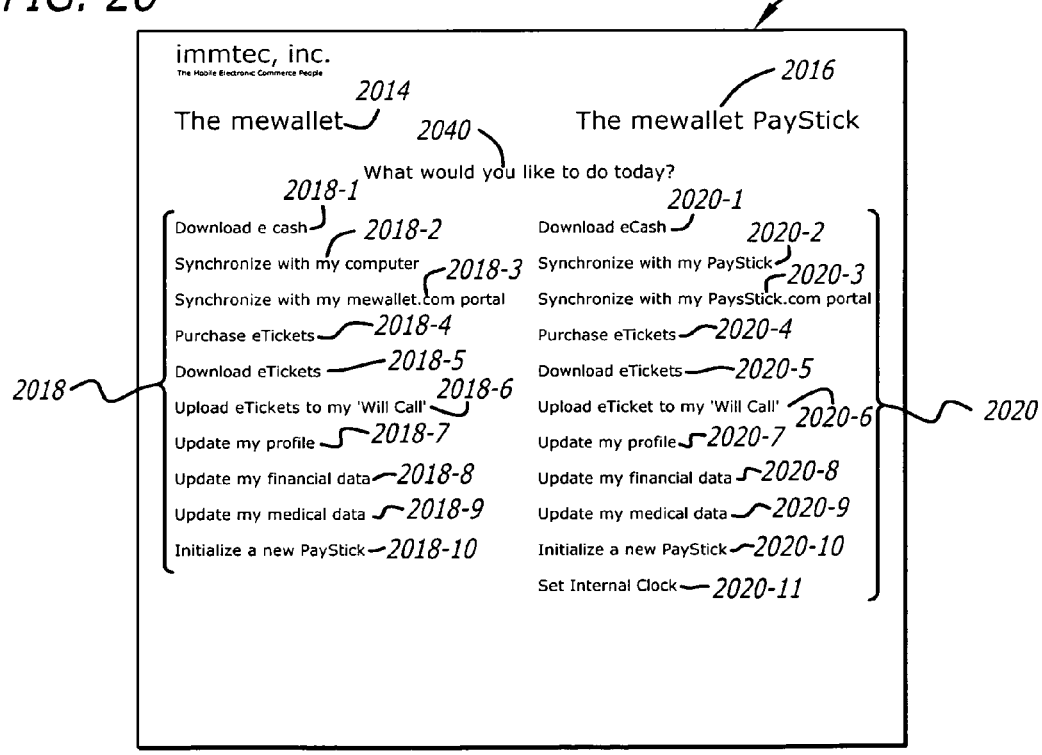
FIG. 26 is a graphic representation of an exemplary main menu user interface screen that would be provided on a user's PC by an exemplary embodiment of the invention.

FIG. 26 is a graphic representation of an exemplary main menu user interface screen that would be provided on a user's PC by an exemplary embodiment of the invention. As depicted in FIG. 26, the user would be able to choose from a mewallet menu 2014, 2018 or from a PayStick (Directed Purpose System device) menu 2016, 2020 of options. The PC System would prompt 2040 the user to make a selection. The PC System would provide mewallet 2014 user selection options 2018 including, for example: Download eCash 2018-1, Synchronize with my computer 2018-2, Synchronize with my mewallet.com portal 2018-3, Purchase eTickets 2018-4, Download eTickets 2018-5, Upload eTicket to my "Will Call" 2018-6, Update my profile 2018-7, Update my financial data 2018-8, Update my medical data 2018-9, or Initialize a new PayStick 2018-10. The PC System would provide PayStick 2016 user selection options 2020 including, for example: Download eCash 2020-1, Synchronize with my PayStick 2020-2, Synchronize with my PayStick.com portal 2020-3, Purchase eTickets 2020-4, Download eTickets 2020-5, Upload eTicket to my "Will Call" 2020-6, Update my profile 2020-7, Update my financial data 2020-8, Update my medical data 2020-9, Initialize a new PayStick 2020-10, or Set Internal Clock 2020-11.

Figure 27:
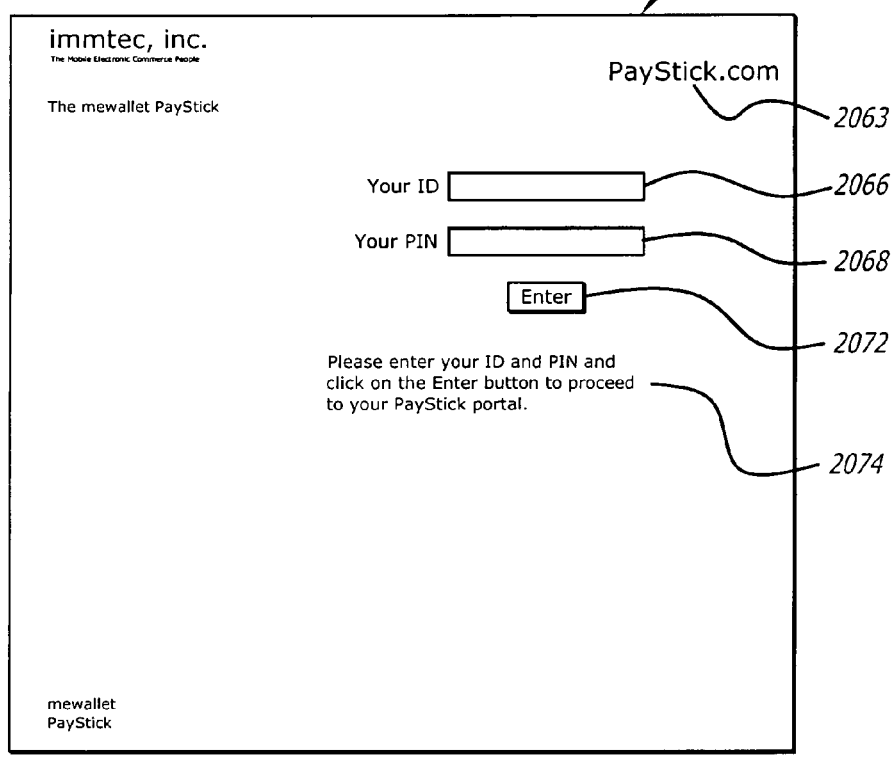
FIG. 27 is a graphic representation of an exemplary user interface Welcome screen that would be provided on a website with which a Directed Purpose System device user interfaces with the Server System by an exemplary embodiment of the invention.

FIG. 27 is a graphic representation of an exemplary user interface Welcome screen that would be provided on a website with which a Directed Purpose System device user interfaces with the Server System by an exemplary embodiment of the invention. The website is sometimes referred to herein as "PayStick.com." As depicted in FIG. 27, the PayStick.com portal to the Server System would generate and format an input field with which to collect the user's User ID 2066 and PIN 2068. The PC System would prompt 2074 the User to press the online Enter button 2072 to enter the user input of the User ID 2066 and PIN 2068.

Figure 28:
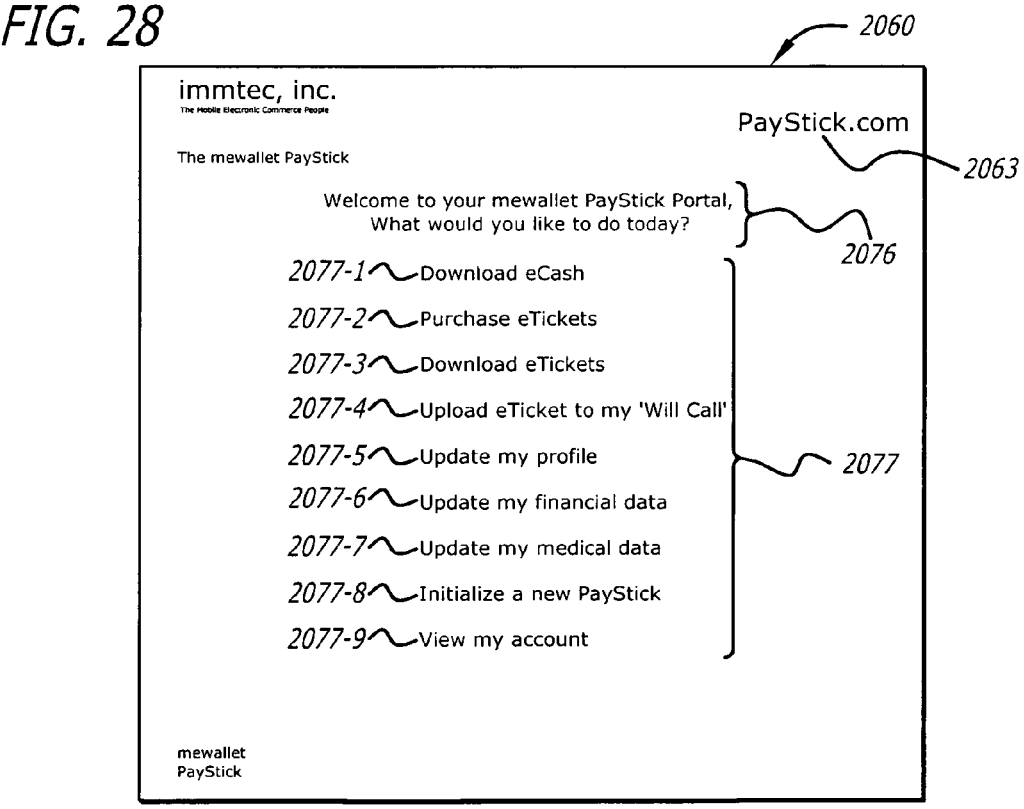
FIG. 28 is a graphic representation of an exemplary main menu user interface screen that would be provided on the Directed Purpose System device website interface by an exemplary embodiment of the invention.

FIG. 28 is a graphic representation of an exemplary main menu user interface screen that would be provided on the Directed Purpose System device website interface by an exemplary embodiment of the invention. The PayStick.com portal to the Server System would provide PayStick user selection options 2077 including, for example: Download eCash 2077-1, Purchase eTickets 2077-2, Download eTickets 2077-3, Upload eTicket to my "Will Call" 2077-4, Update my profile 2077-5, Update my financial data 2077-6, Update my medical data 2077-7, Initialize a new PayStick 2077-8, or View my account 2077-9.

G. Micropayment System

1. Overview

Figures 1, 29:
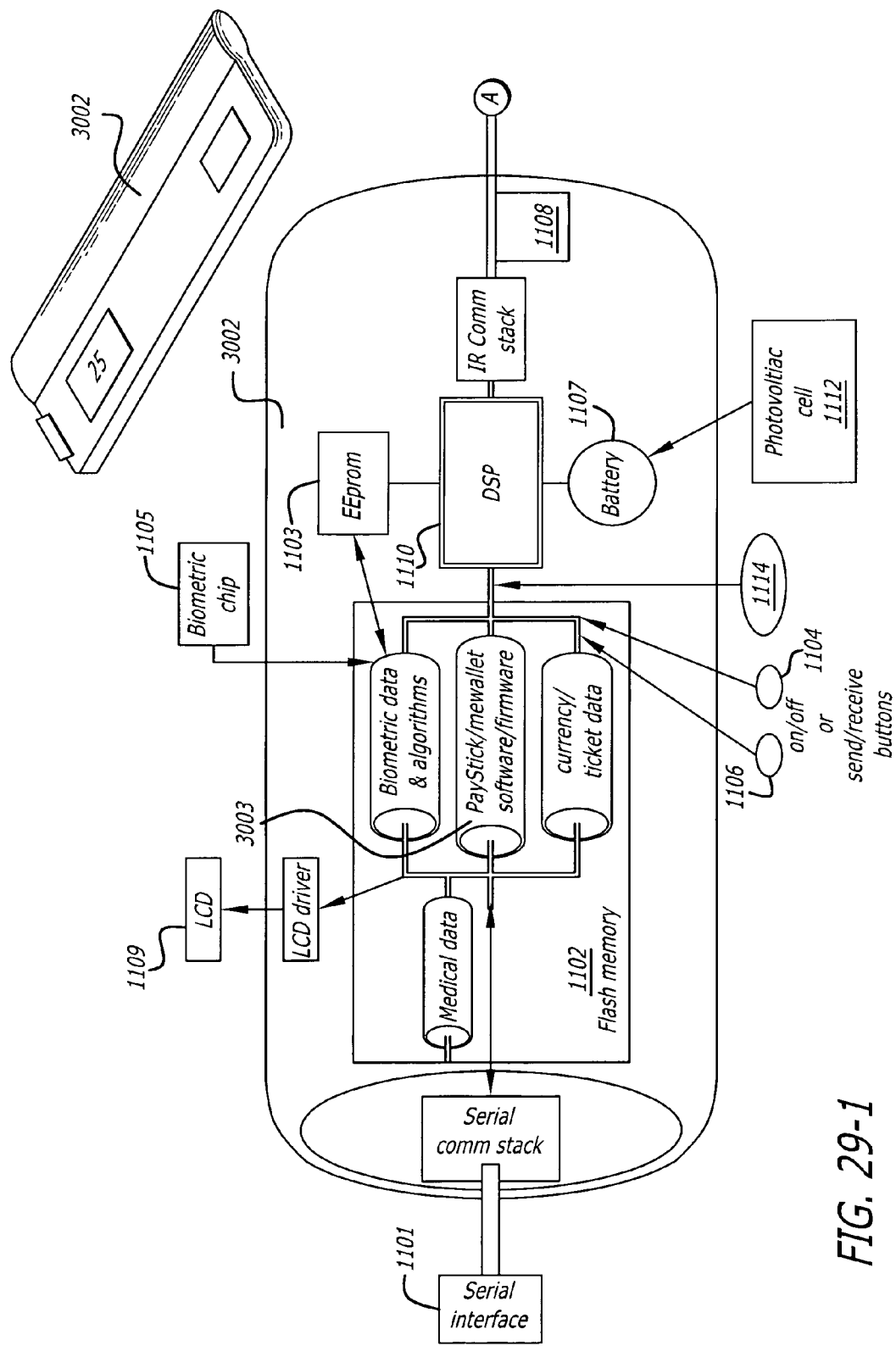
Figures 2, 29:
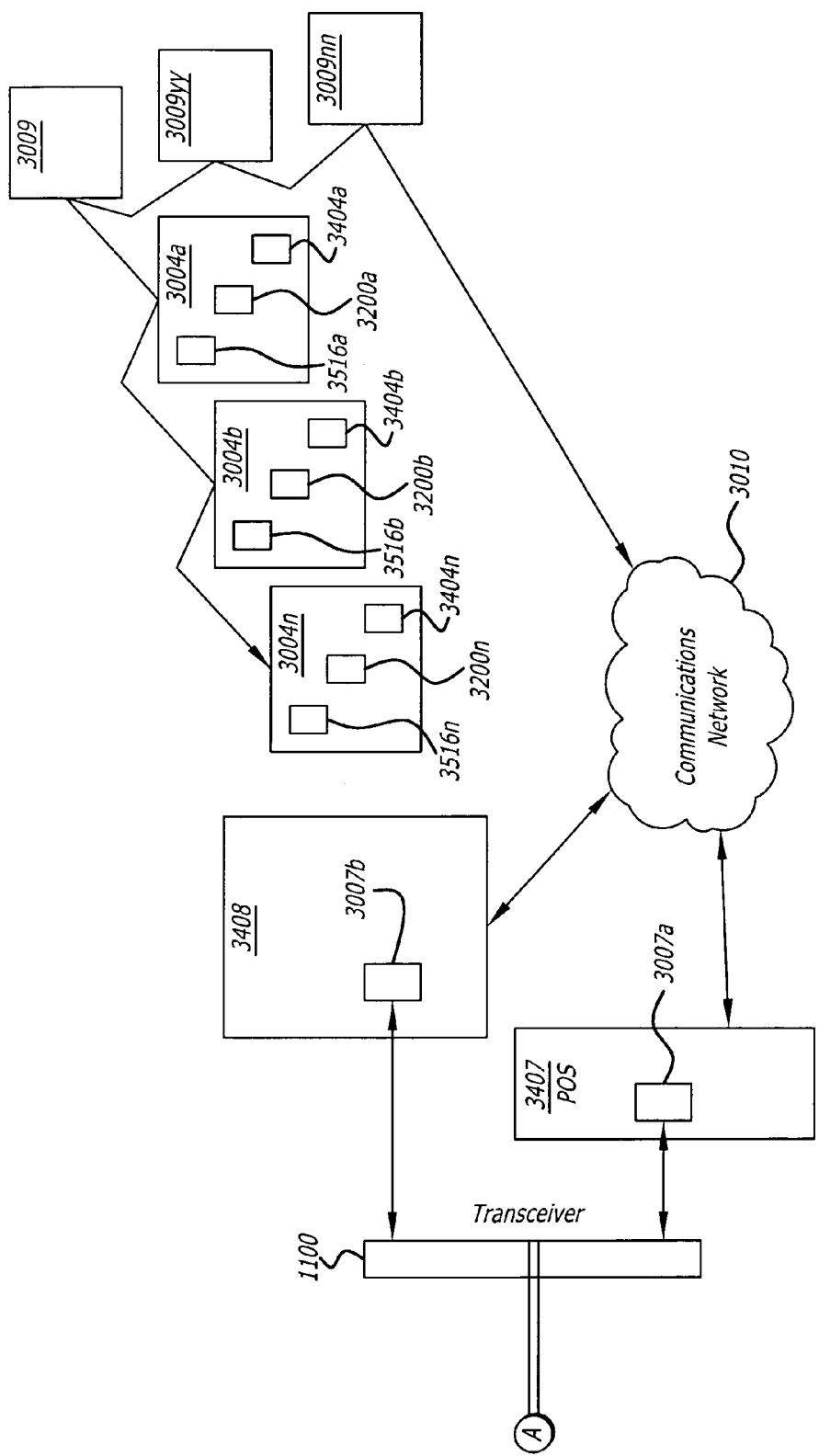

FIG. 29 is a high level simplified graphic representation of an exemplary relationship between some of the components of an exemplary embodiment of the present invention. As depicted in FIG. 29, the present invention would provide memory storage on a memory storage device 3001 in a wireless hand held device 3002. Wireless, hand held devices, include for example, wireless Personal Digital Assistants ("PDAs"), wireless telephones e.g., cellular telephones, and wireless electronic authority and cash transfer devices, an exemplary embodiment of which is discussed below and referred to herein as a PayStick™. In an exemplary embodiment of the present invention, the wireless hand held device would comprise a memory storage device for storing data, an executable memory, a computer device, such as a microprocessor, and short-range wireless communication hardware 1100 such as an infrared transceiver or Bluetooth radio transceiver, and related communication software and/or firmware. In some exemplary embodiments, the wireless hand held device would provide a display screen on which information text, numbers and/or graphics can be displayed. In some exemplary embodiments, the present invention would provide as part of the wireless hand held device an executable program for calculating a percentage amount equal to a pre-established percentage of a transaction amount and an executable program for reducing an amount dedicated for service charge micropayment by the calculated percentage amount.

In one exemplary embodiment of the invention a unique, encrypted, identification code for transmission to a micropayment processing Service/Sale provider would be provided and stored in the memory device. In another exemplary embodiment of the invention, some specific amount of electronic currency would be stored in the memory storage device for use in paying for very small Service and/or sale charges on electronic payments. In yet another exemplary embodiment of the invention, both a unique, encrypted identification code and a specific amount of electronic currency would be stored in the memory storage device of the hand held device.

The phrase "memory storage device" as used herein includes any and all devices on which data can be stored, including RAM, ROM, main memory, magnetic disk, optical disk and the like. In an exemplary embodiment of the invention, a unique identifying number and/or a specific amount of electronic currency for paying for small electronic payment Service/Sale charges would be stored in a RAM memory.

The present invention would also provide a software or firmware application for calculating and "paying" small service charge amounts (the "Microwallet™ handheld micropayment application). As depicted in FIG. 29, the Microwallet™ handheld micropayment application would be resident in an executable memory storage device 3 in the wireless handheld device 3002. The Microwallet™ handheld micropayment application would communicate and interact with a server-based electronic payment system that processes very small service charges or fees, "micropayments".

Figure 30:
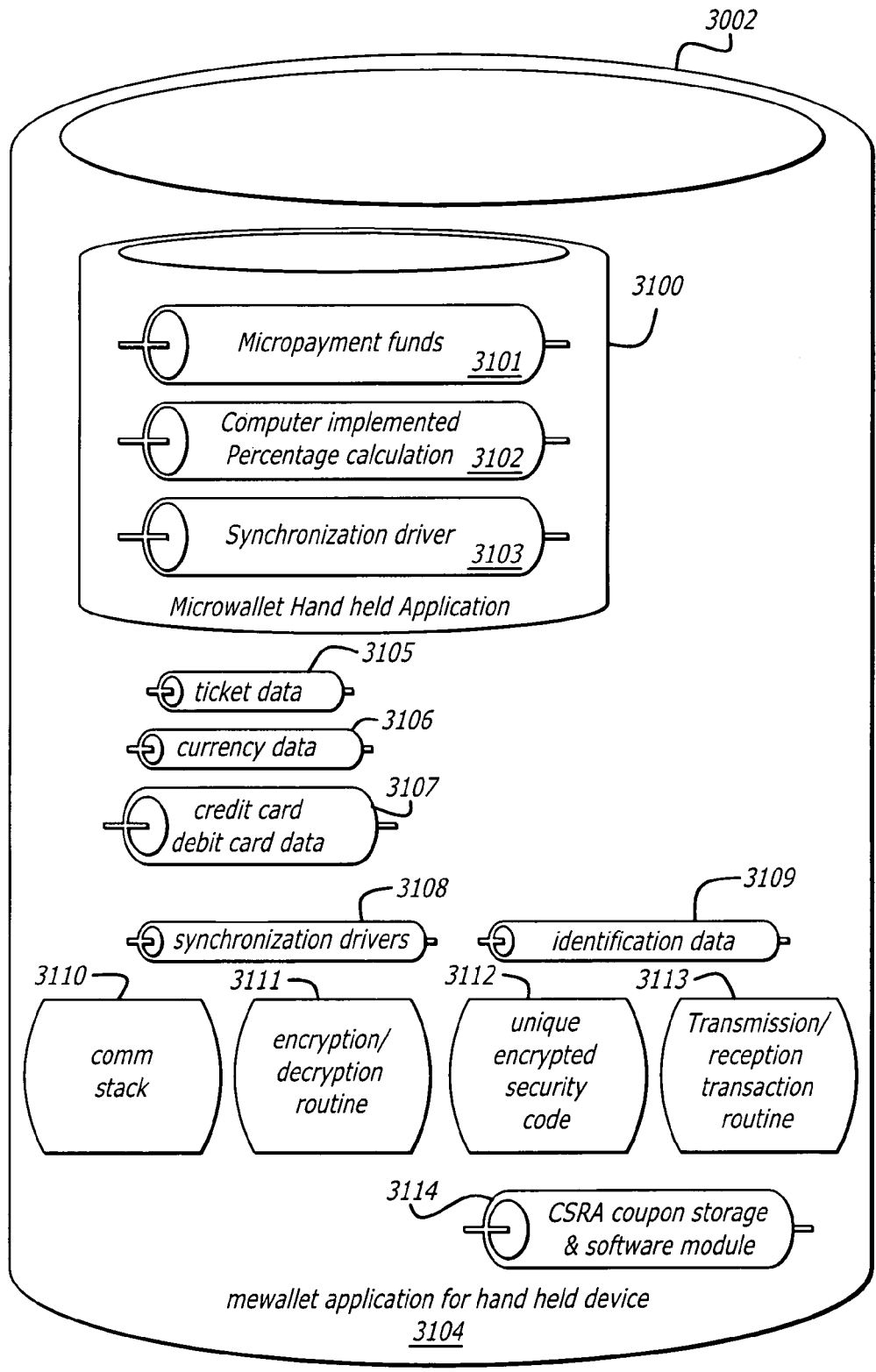
FIG. 30 is a high level simplified graphic representation of exemplary handheld device components of an exemplary embodiment of the present invention.

FIG. 30 is a high level simplified graphic representation of exemplary handheld device components of an exemplary embodiment of the present invention. As depicted in FIG. 30, the Microwallet™ handheld micropayment software 3100 in the exemplary embodiment would store certain data 3101, including, for example: 1.) Electronic currency; 2.) Amount of currency available; 3.) Amount of currency received; 4.) Amount of currency transmitted; and 5.) A unique identifier associated with the particular handheld device.

The Microwallet™ handheld micropayment software 3100 in the exemplary embodiment would generate and cause the transmission of electronic currency transaction. Further, and as will be discussed in more detail below, the Microwallet™ handheld micropayment software 3100 in the exemplary embodiment would receive electronic currency according to instructions 3306 (see FIG. 31) from a mewallet™ program application 3113 (FIG. 31) in a mobile handheld device or server.

Returning to FIG. 29, the present invention would further provide a micropayment processing software application, e.g., 3008a, 3008b, ... 3008n (sometimes referred to herein as the "Microwallet™micropayment server application", or sometimes referred to herein as the "Microwallet™ server application") on one or more server computers, e.g., 3004a, 3004b, ... 3004n (these server computers are sometimes referred to herein as "Immtec™" or "Immtec's™" servers). In the exemplary embodiment of the present invention, each wireless handheld device would be preregistered with the Microwallet™ micropayment server application with a unique account with a unique account number stored in a memory storage device, such as in a database, in, or accessible by, the Microwallet™ micropayment server application. In an embodiment in which a specific amount of electronic funds is stored in the memory storage device provided in a particular user's wireless, handheld device, that amount of electronic funds would be mirrored (that is, it is also stored) in a memory storage device accessible by the Microwallet™ micropayment server application; the server-side electronic funds would be associated (such as by a data relationship) with the particular unique account number associated with the relevant wireless, handheld device/user.

An exemplary micropayment recipient processing service provider is referred to herein as "Immtec™." References to Immtec™ are illustrative and are not a limitation of the invention; any micropayment recipient processing service provider can provide the disclosed functions without departing from the spirit of the present invention.

As further depicted in FIG. 29, the present invention would further provide that the Microwallet™ handheld micropayment application resident in an executable memory storage device 3003 in the wireless handheld device 3002 communicates and interacts with the Microwallet™ micropayment server application 3008a-3008n through an intermediary device, such as a Point of Service/Sale terminal, e.g., 3407 (see also POS terminal as depicted, e.g., in FIGS. 32-35). Alternatively, the Microwallet™ handheld micropayment application would communicate and interact with the Microwallet™ micropayment server application through an intermediary device that provides an online computer application (e.g., 3408 as depicted in FIGS. 32-35). The intermediary device would provide short-range wireless communication hardware 1100 such as an infrared transceiver or Bluetooth radio transceiver It will be understood by someone with ordinary skill in the art that the description of the components as depicted in FIG. 29 are illustrative and are not a limitation of the invention. For example, the wireless handheld device 3002 depicted in FIG. 29 characterizes a PayStick™ device. The invention, as further described below applies not only to PayStick™ devices but to other wireless handheld devices as well, including, as previously mentioned, for example: wireless Personal Digital Assistants ("PDAs"), and other wireless devices such as, e.g., cellular telephones.

Continuing with FIG. 29, each wireless handheld device 3002 would be equipped with short-range wireless communication hardware 100 such as an infrared transceiver or Bluetooth radio transceiver. Further, each Point of Service/Sale ("POS") terminal, e.g., 3407, would be similarly equipped with short-range wireless communication hardware 3007a such as an infrared transceiver or Bluetooth radio transceiver. Each wireless handheld device 3002 would communicate data via its short-range wireless communication hardware 1100 with the short-range wireless communication hardware e.g., 3007a, of a particular Point of Service/Sale terminal, e.g., 3407, or with the short-range wireless communication hardware e.g., 3007b, of a device providing an online computer application 3408. The particular Point of Service/Sale ("POS") terminal, e.g., 3407, or Online computer application 3408, in turn would communicate with the Microwallet™ micropayment server application 3200a-3200n resident on one or more server computers, e.g., 3004a, 3004b, . . . 3004n. It will be understood by someone with ordinary skill in the art that communications between the POS terminals and the server computers, e.g., 3004a, 3004b, . . . 3004n may be via direct connection, or via a communications network, including local area networks ("LAN"), wide area networks ("WAN") or a global communications network such as the Internet 3010. In some embodiments, communications with the server computers, e.g., 3004a, 3004b, . . . 3004n, would be provided via one or more Web Servers, and other control server computers, e.g., 3009 . . . 3009-YY. . . 3009-nn.

Figure 31:
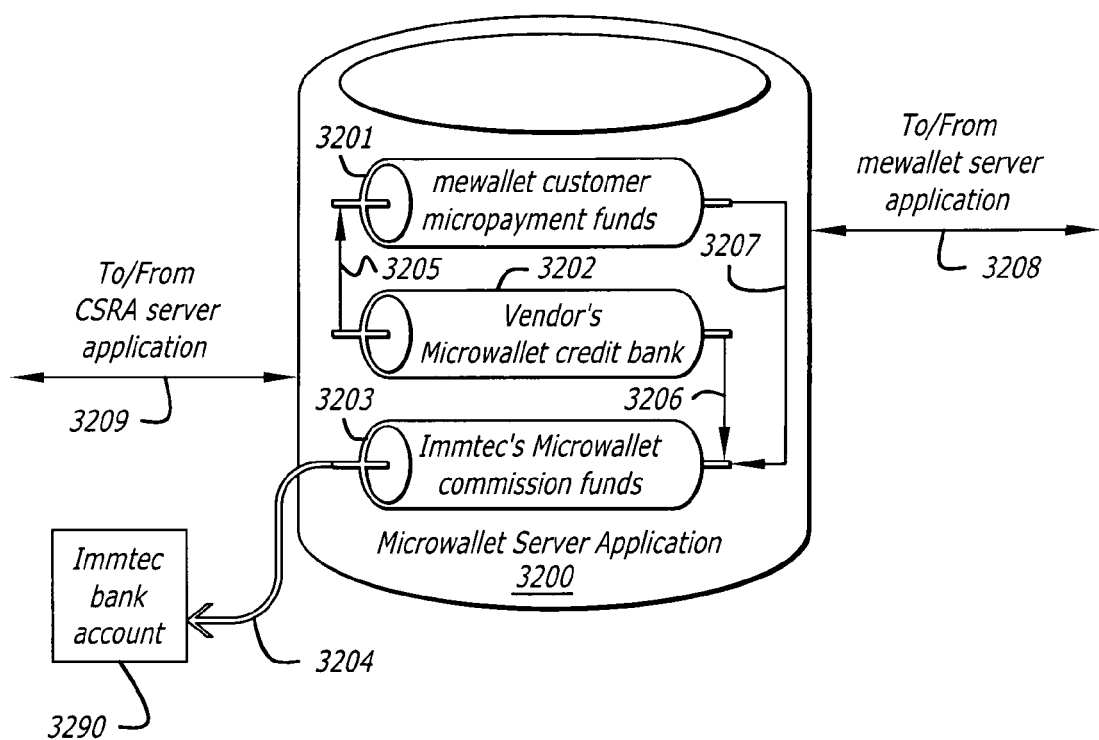
FIG. 31 is a high level simplified graphic representation of exemplary server-side components of an exemplary embodiment of the present invention.

FIG. 31 is a high level simplified graphic representation of exemplary server-side components of an exemplary embodiment of the present invention. The Microwallet™ server application 3200 would be programmed to work on numerous server platforms. As depicted in FIG. 31, the Microwallet™ server application 3200 would store electronic micropayment funds data 3201 of each mewallet™ customer in a memory storage device accessible by the Microwallet™ server application 3200. The Microwallet™ server application 3200 would also store electronic micropayment credit funds data 3202 for each participating vendor in a memory storage device accessible by the Microwallet™ server application 3200. Additionally, the Microwallet™ server application 3200 would store Immtec™'s micropayment funds 3203 before these funds 3203 are electronically transferred 3204 to Immtec™'s bank account 3290.

In the exemplary embodiment of the present invention, the Microwallet™ handheld micropayment application, and the Microwallet™ micropayment server application, would be programmed to interface with an exemplary electronic payment system (herein sometimes referred to as the "mewallet™" system", or in the alternative, as the "Server System"). In other embodiments, the Microwallet™ handheld micropayment application and the Microwallet™ micropayment server application would be programmed to interface with some other electronic payment system.

Mewallet™ apparatus, systems and methods are disclosed above. As disclosed above, mewallet™ apparatus, systems and methods are sometimes referred to as "The PDA Pay and eTicket System. . ." or as the "System." Mewallet™ apparatus, systems and methods would provide for electronic payments to be made from a hand held terminal or device (the words "band held terminal" and "hand held device" are used interchangeably herein) that is equipped with short range wireless communication hardware such as an infrared transceiver or Bluetooth radio transceiver. Mewallet™ apparatus, systems and methods would provide, but are not limited to, the following components: computer implemented percentage calculator, user database, vendor database, security routines and transaction routines. Mewallet™ apparatus, systems and methods would include a software application (the "mewallet™ software application") that resides in a hand held device such as a mobile phone or Personal Digital Assistant ("PDA"). The mewallet™ software application for mobile devices would facilitate wireless authority transfer and payment transactions and stores relevant transaction data.

1. Transmission of Microwallet™ Micropayments from the Mewallet™ Application in a User's Hand Held Device to Immtec™ During a Transaction.

Figure 32:
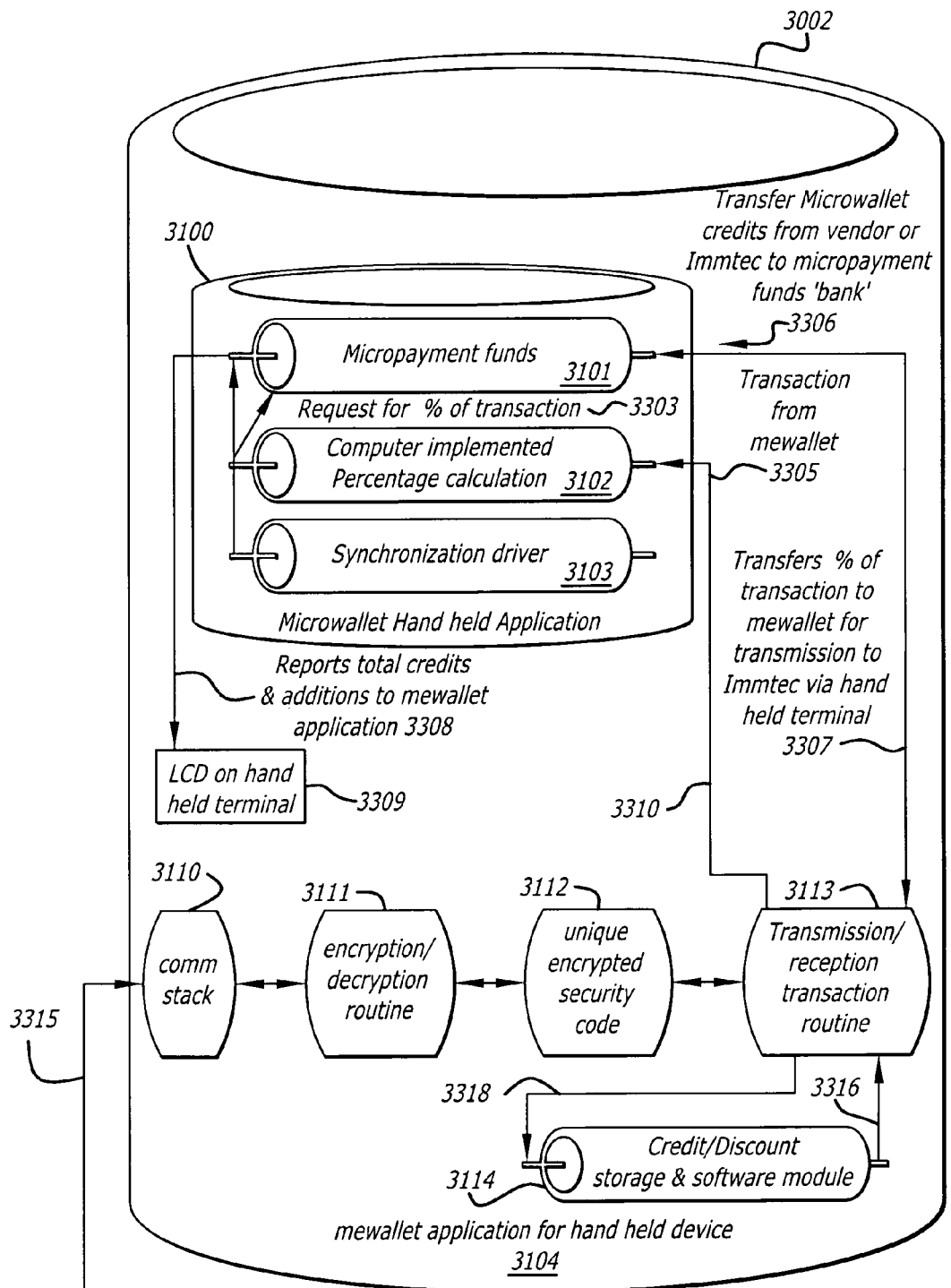
FIG. 32 is a high level simplified graphic representation depicting micropayment transmission interfaces between exemplary handheld device components of an exemplary embodiment of the present invention.

FIG. 32 is a high level simplified graphic representation depicting micropayment transmission interfaces between exemplary handheld device components of an exemplary embodiment of the present invention. FIG. 32 depicts transmission of Microwallet™ micropayments from the mewallet™ in a user's hand held device to a memory storage location for an Immtec™ account during a transaction. During a mewallet™ transaction of under $1,000.00 U.S. dollars, a micropayment would be transmitted to a memory storage location for an Immtec™ account in the user's handheld device. The micropayment amount would be calculated according to some pre-established percentage 3102 of the financial transaction. An account of electronic currency 3101 would be stored by the mewallet™ software program in the memory of the user's electronic handheld device. This account 3101 would be utilized only for storing electronic currency that would be used to pay the commissions due to Immtec™ for each mewallet™ transaction. This account is sometimes referred to herein, for purposes of convenience of reference, the Microwallet™ account 3101.

Once the amount of the transaction 3305 is established by the mewallet™ software 3113, the Microwallet™ software would include programming instructions to calculate the established percentage 3102 of the transaction 3303 and to withdraw 3307 that amount of electronic currency from the Microwallet™ account 3101 in the user's hand held device and to then transmit this amount in conjunction with all other payment and security data to the Immtec™ server 3110-3113, 3315.

2. Transmission of Microwallet™ Micropayments From The User's Mewallet™ Microwallet™ Account to Immtec™'s Account During a Transaction.

Figure 33:
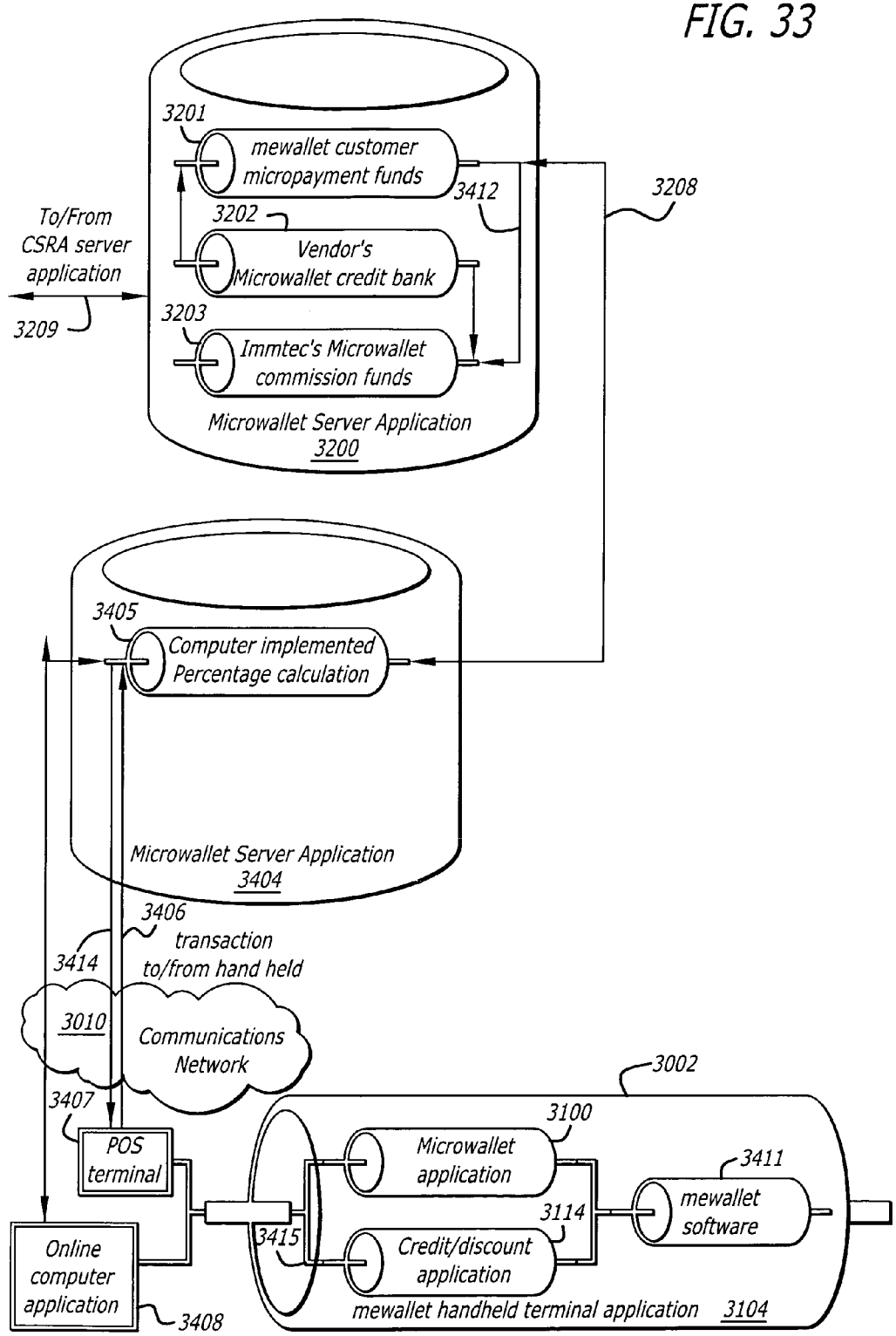
FIG. 33 is a high level simplified graphic representation depicting micropayment transfer interfaces between exemplary handheld device components, exemplary Point of Sale/Service components, and exemplary server-side components of an exemplary embodiment of the present invention.

FIG. 33 is a high level simplified graphic representation depicting micropayment transfer interfaces between exemplary handheld device components, exemplary Point of Sale/Service components, and exemplary server-side components of an exemplary embodiment of the present invention. As previously mentioned, as opposed to storing electronic funds for payment of micropayment service charges, in one exemplary embodiment the Microwallet™ application 3100 in the user's hand held device 3104 would store only a unique, encrypted, identification code. The unique, encrypted, identification code would be transmitted 3406 to the Immtec™ mewallet server application 3404 (that resides on an Immtec™ server, (e.g., 3004a as depicted in FIG. 29). When approval for a transaction is transmitted 3414 to the Point of Service/Sale terminal 3407, the mewallet™ server application 3404 on the Immtec™ server, (e.g., 3004a as depicted in FIG. 29), would calculate 3405 a pre-established percentage of the transaction. The calculated percentage would be communicated to the Microwallet Server Application 3200 which would deduct the calculated percentage amount of electronic currency from the user's Microwallet™ account 3201 on the Immtec™ server database(s). The deducted amount of electronic currency would be transferred 3412 to the Immtec™ micropayment account 3203 on an Immtec™ server database (s) by adding the deducted amount to the amount in the Immtec™ micropayment account 3203.

The remaining balance total of Microwallet™ credits in the user's account 3201 on the Immtec™ server would be communicated 3208 to the mewallet™ server application which would in turn communicate 3414 the remaining balance total to the user's hand held device 3002 through a POS terminal 3407 or Online computer application 3408. In one exemplary embodiment, the remaining balance total would be displayed on a display screen of the user's hand held device.

3. Establishing Vendor Microwallet™ Micropayment Account.

Figure 34:
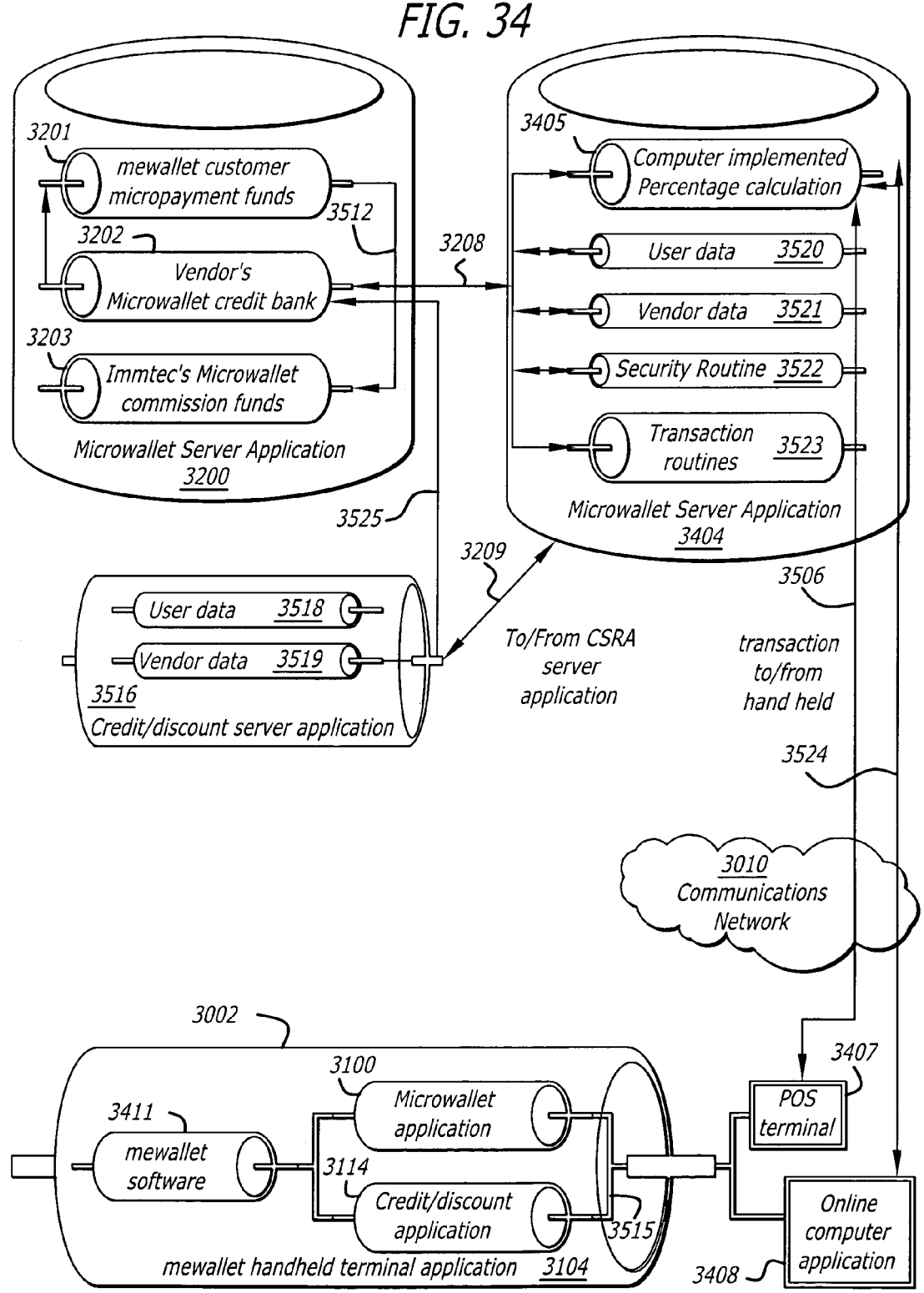
FIG. 34 is a high level simplified graphic representation depicting vendor credit transfer interfaces between exemplary handheld device components, exemplary Point of Sale/Service or Online application components, other server components and exemplary server-side components of an exemplary embodiment of the present invention.

FIG. 34 is a high level simplified graphic representation depicting vendor credit transfer interfaces between exemplary handheld device components, exemplary Point of Sale/Service or Online application components, other server components and exemplary server-side components of an exemplary embodiment of the present invention. Each vendor that accepts payment through mewallet™ devices and accepts the mewallet™ as a payment presentation system would have the option of establishing a vendor Microwallet™ micropayment credit account 3202 as depicted in FIG. 34. This vendor Microwallet™ micropayment credit account 3202 would be utilized to add Microwallet™ credits to a customer's Microwallet™ account 3201 (server side), and/or 3101 (wireless handheld client device). Using, for example, an online user interface with the mewallet™ server application 3404, the vendor would establish a vendor mewallet account 3519 (other), 3521 (mewallet). Using, for example, an online user interface with the Microwallet™ server application 3200, the vendor would define a percentage of each transaction amount to be transmitted to the customer's Microwallet™ account for each purchase the customer makes from the vendor. The vendor would also establish percentages of Microwallet™ credit payments for transfer to customers based upon specific items purchased or based upon particular time frames in which items are purchased—such as in particular promotional time periods.

4. Filling Vendor Microwallet™ Credit Account.

Continuing with FIG. 34, each participating vendor would establish a Microwallet™ micropayment credit account 3202 within the Microwallet™ server application. Upon establishing a vendor Microwallet™ micropayment credit account 3202, the vendor would 'fill' this account with an agreed upon amount of funds (the "filled state"). This payment to Immtec™ for the benefit of the vendor's Microwallet™ micropayment credit account 3202 would be in the form of a bank draft, check or electronic wire transfer. The funds for the Microwallet™ micropayment credit account 3202 would be held in a specific account on a bank's server to which Immtec™ has immediate and electronic access. The Microwallet™ System would track each vendor's credit account. Whenever the Microwallet™ micropayment credit account 3202 has been depleted to or below an agreed upon amount, the Microwallet™ System would prepare an invoice and the vendor would be billed for the amount that would bring the Microwallet™ micropayment credit account 3202 back up to its agreed-upon filled state.

The vendor's Microwallet™ micropayment credit account 3202 on the Immtec™ server would be a mirror of the account on the bank's server (that is, the amounts are equal). The vendor's Microwallet™ micropayment credit account 3202 on Immtec™'s server would hold credits equal to the amount of funds available in the vendor's Microwallet™ credit account on the bank server. Vendor Microwallet™ credits would be transmitted from the vendor's account on Immtec™'s server at the moment the transaction takes place. Settlement of the vendor's bank and Immtec™ Microwallet™ credit accounts would take place once each day.

5. Transmission of Microwallet™ Micropayment Credits from Vendor's Microwallet™ Credit Account to Customer's Mewallet™ in Hand Held Device.

Continuing with FIG. 34, the mewallet™ software 3104, 3100 would include programming instructions such that during each mewallet™ transaction, the mewallet™ System would cause the transmission of a request 3506,3524 to the mewallet™ system (and/or to 3209 another system) for possible Microwallet™ credits 3516, 3519, 3521, 3208, 3202. If there are Microwallet™ credits available 3202 from or through a participating vendor then the appropriate amount of Microwallet™ credits would be transmitted 3208, 3506, 3524 to the customer's hand held device with, for example, a transaction, such as a credit or discount coupon, from another interfacing system 3209, 3516, 3518, 3519 through the point of Service/Sale system, kiosk or wireless internet system 3506, 3524, 3407, 3408, 3515, 3114, 3510.

6. Transmission of Microwallet™ Micropayment Credits from Vendor's Microwallet™ Credit Account to Customer's Mewallet™ Microwallet™ Account on Immtec™ Server.

Figure 35:
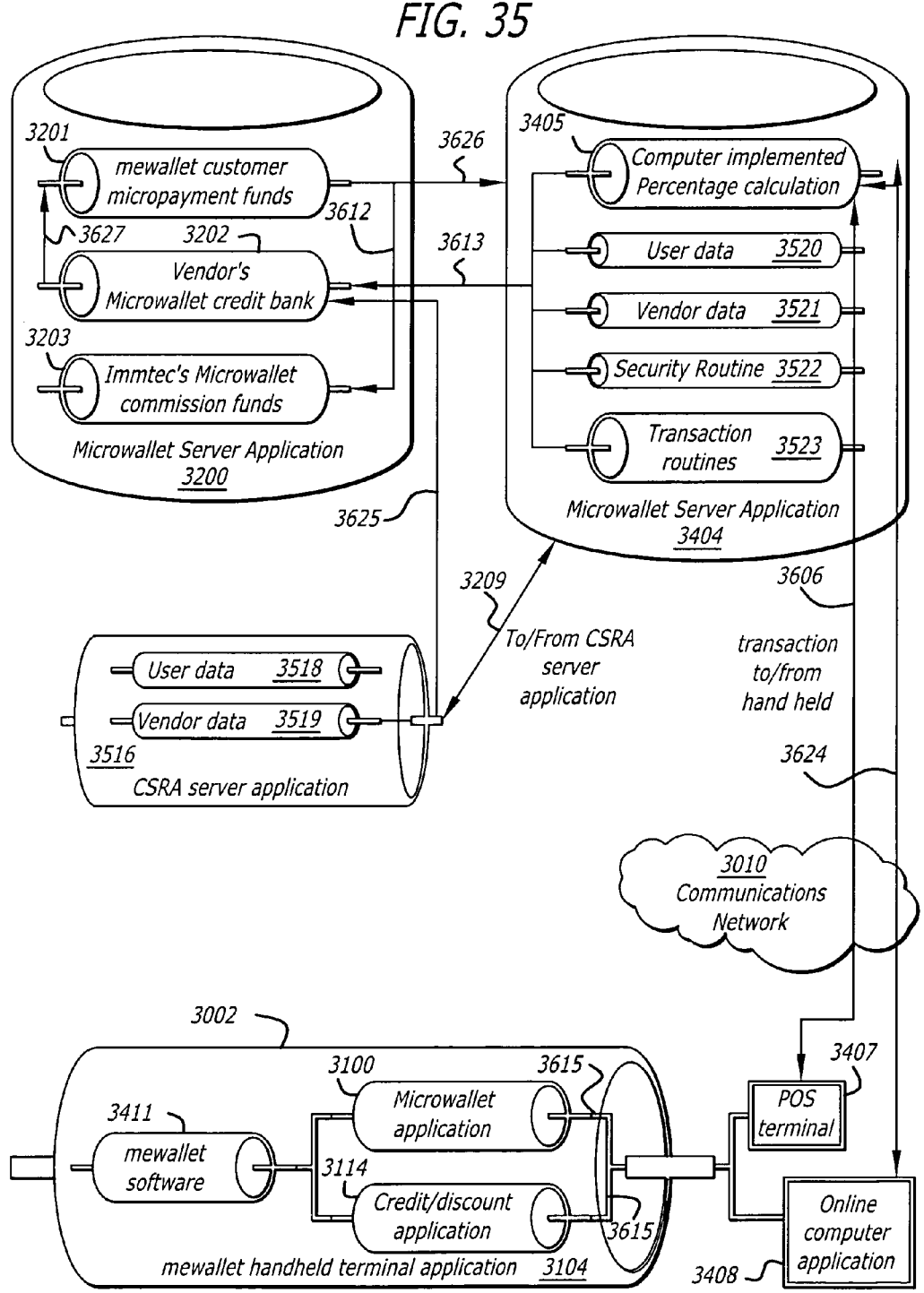
FIG. 35 is a high level simplified graphic representation depicting vendor credit server account transfer interfaces between exemplary handheld device components, exemplary Point of Sale/Service or Online application components, other server components and exemplary server-side components of an exemplary embodiment of the present invention.

FIG. 35 is a high level simplified graphic representation depicting vendor credit server account transfer interfaces between exemplary handheld device components, exemplary Point of Sale/Service or Online application components, other server components and exemplary server-side components of an exemplary embodiment of the present invention. As depicted in FIG. 35, during each mewallet™ transaction, the mewallet™ software 3104, 3100, 3611 would transmit a request to the Microwallet™ system 3521, 3519, 3613, 3625, 3202 for possible Microwallet™ credits. If there are Microwallet™ credits or discounts 3202 available from or through a participating vendor then the appropriate amount of Microwallet™ credits or discounts would be transmitted 3114 to the customer's Microwallet™ account 3201 on Immtec™'s server. The Microwallet™ credit/discount data would be transmitted to the customer's Microwallet™ 3626,b 3606, 3624 during the transmission of the receipt from another, e.g., the vendor's system 3516, 3519, 3209 to the customer's hand held device via the point of Service/Sale terminal, kiosk or wireless internet system 3407, 3408, 3615, 3617. The Microwallet™ system would inform the customer on the hand held device display screen of the addition of Microwallet™ credits to their Microwallet™ account, would identify the vendor from which the credits/discounts come and would present the level of Microwallet™ credits/discounts in the customer's Microwallet™ account 3610, 3611. The mewallet's unique encrypted security code is attached to every Microwallet™ credit/discount transaction. If the unique encrypted security code transmitted with the Microwallet™ credit does not match the unique encrypted security code of the mewallet™ in the hand held device then the Microwallet™ credit would not be added to the mewallet™ account and would be transferred to the customer's mewallet™ account on the Immtec™ server.

7. Transmission of Microwallet™ Micropayment Credits from Vendor's Account to Immtec™.

In the event that Immtec™ is due micropayments from a vendor for commissions on certain transactions, then those micropayments would be transferred from the vendor's bank account to Immtec™'s account on a transaction, daily, weekly, monthly or other periodic basis during settlement procedures as per contractual agreement.

8. Mewallet™ User Purchasing Microwallet™ Micropayment Credits to Fill Mewallet™ Microwallet™.

If a user depletes the electronic currency in the Microwallet™ in their mewallet™ to a specified and agreed upon level, then the Microwallet™ would need to be 'refilled' to a specified level. To facilitate the refilling of the Microwallet™, the user would need to have first given permission for Immtec™ to draw the funds necessary from the user's credit card, EC or debit card or a bank account. Immtec™ would draw only the amount of funds necessary to fill the Microwallet™ back to its agreed upon specified level. These funds would then be held in the user's Microwallet™ server funds account and mirrored/transmitted to the user's hand held mewallet™ enabled device during the next transaction such as is depicted in FIGS. 33-34.

9. Transmission of Micropayments from a Mewallet™ PayStick™.

Figure 36:
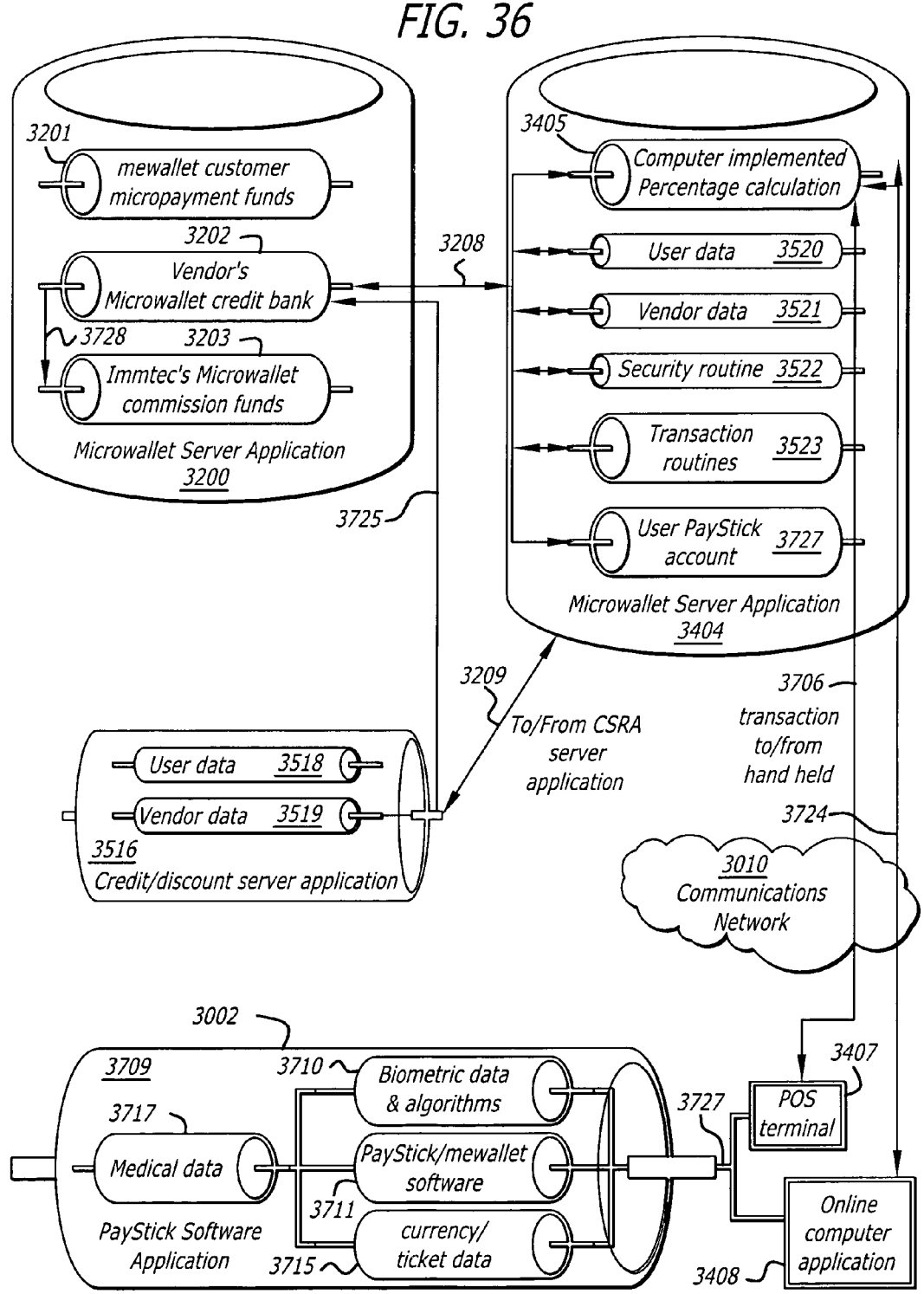
FIG. 36 is a high level simplified graphic representation depicting vendor credit server account transfer interfaces between exemplary handheld PayStick device components, exemplary Point of Sale/Service or Online application components, other server components and exemplary server-side components of an exemplary embodiment of the present invention.

FIG. 36 is a high level simplified graphic representation depicting vendor credit server account transfer interfaces between an exemplary handheld Directed Puropose System (PayStick™) device components, exemplary Point of Sale/Service or Online application components, other server components and exemplary server-side components of an exemplary embodiment of the present invention. As depicted in FIG. 36, one exemplary embodiment of the mewallet™ PayStick™ 3709 would not contain a Microwallet™ software component. In embodiments in which the PayStick™ includes a Microwallet™ software component, then the method of transmitting Microwallet™ micropayments to the mewallet™ and Microwallet™ server applications (3404 and 3200 respectively) would be the same as with any other hand held device utilizing the mewallet™ software, see, e.g., FIGS. 33-34.

On the other hand, some exemplary embodiments of the PayStick™ would not include a Microwallet™ software component. In embodiments of the PayStick™ 3709 that do not include a Microwallet™ software component, micropayments due to Immtec™ 3405 as commissions on each PayStick™ transaction would be deducted from the total amount of electronic currency contained in the PayStick™ 3715 and mirrored on Immtec™'s server 3727. The total amount of electronic currency remaining in the PayStick™ 3715 after the transaction and payment of micropayment would be transmitted 3706, 3724 from the Immtec™ server through the POS terminal or online computer application 3407-3408, 3727 and displayed 3711, 3715,on the PayStick™'s LCD screen.

If the user is utilizing the PayStick™ to carry only electronic tickets 3715 then the micropayments would be added to the cost of the ticket at the time of purchase. In one exemplary embodiment, the percentage of the ticket price designated to be the commission due to Immtec™ would be aggregated with all other commissions due to Immtec™ from the ticket vendor and paid to Immtec™ from the vendor's bank account on a daily or weekly basis during settlement procedures.

10. Collecting Established Percentage for Commissions on Service/Sales for Transactions Over $1,000.00 US and Similar Large Amounts.

For mewallet™ transactions over $1,000.00 or for a comparable amount of other currency, the commission due to Immtec™ for the transaction would be charged to the user's credit card, EC card or debit card or drawn from the user's bank account. For this level of transaction, the user would have a current and valid account with a credit card company or bank on file with Immtec™. Immtec™ would only access this account when necessary to withdraw funds from the user's account to pay for its commissions on that user's transactions.

ILLUSTRATIVE EMBODIMENTS

Although this invention has been described in certain specific embodiments, many additional modifications and variations would be apparent to those skilled in the art. It is, therefore, to be understood that this invention may be practiced otherwise than as specifically described. Thus, the embodiments of the invention described herein should be considered in all respects as illustrative and not restrictive, the scope of the invention to be determined by the appended claims and their equivalents rather than the foregoing description.

What is claimed is:

1. A wireless handheld device for executing a mobile transaction using the wireless handheld device, said wireless handheld device comprising:
   a data storage device adapted for storing data;
   a user input device;
   an executable memory storage device adapted for storing executable program instructions, the executable memory storage device encoded with a first set of executable computer program instructions, and a second set of executable computer program instructions;
   a microprocessor programmed for executing the first set of executable computer program instructions, and the second set of executable computer program instructions;
   wireless communication hardware adapted for communications using wireless Internet protocols over a wireless Internet connection;
   short-range wireless communication hardware adapted for communications using wireless short-range communication protocols;
   said microprocessor, executing the first set of executable computer program instructions, accesses a content host computer device at an Internet-accessible address according to a user input through said user input device of an indication of said Internet-accessible address, said accessing said content host computer device comprising accessing said Internet-accessible address through said wireless communication hardware using wireless Internet protocols through said wireless Internet connection; and said microprocessor, executing the second set of executable computer program instructions:
   requests said content host computer device for a particular authorization certificate for exchange with a particular merchant,
   receives from said content host computer device a request for security and payment information to pay for said particular authorization certificate,
   communicates security and payment information to said content host computer device to pay for said particular authorization certificate,
   receives an authorization from said content host computer device to download said particular authorization certificate,
   executes a downloading of data from a memory storage device associated with either the content host computer device or a content provider computer device, said executing said downloading of data comprising downloading said data from said memory storage device to said wireless handheld device through said wireless communication hardware using wireless Internet protocols through said wireless Internet connection, said data comprising said particular authorization certificate,
   activates a communication by said content host computer device to said content provider computer device of confirmation data comprising said payment information, security information, and said particular authorization certificate, said content provider computer system being accessible by point-of-sale devices for said particular merchant, and
   executes a storing of said data downloaded through the content host computer device in the data storage device of said wireless handheld device.

2. The wireless handheld device of claim 1, wherein a total amount in the account is stored in the data storage device.

3. The wireless handheld device of claim 2, said device further comprises:
   a display device;
   the executable memory storage device further encoded with a third set of executable computer program instructions and the microprocessor further programmed for executing the third set of executable computer program instructions; and
   said microprocessor, executing the third set of executable computer program instructions, displays the total amount on the display device.

4. The wireless handheld device of claim 1, said executable memory storage device further encoded with a third set of executable computer program instructions, said microprocessor, executing the third set of executable computer program instructions:
   communicates, using said short-range wireless communication hardware adapted for communications using wireless short-range communication protocols, redemption security information and said particular authorization certificate to a point-of-sale device for said particular merchant.

5. The wireless handheld device of claim 1, said downloading of data comprising downloading an electronic coupon.

6. The wireless handheld device of claim 1, said wireless handheld device further comprising:
   a biometric data reading device adapted for reading biometric data of a user that is using the wireless handheld device;
   said transaction further comprising, prior to executing said downloading of data, automatically obtaining biometric data from the user that is using the wireless handheld device through said biometric data reading device, validating the biometric data with biometric data stored in the data storage device, and requiring an authorization from the wireless handheld device based on said validating the biometric data before proceeding with said executing said downloading of data.

7. The wireless handheld device of claim 6, said downloading of data comprising downloading an electronic ticket.

8. The wireless handheld device of claim 6, said downloading of data comprising downloading an electronic pharmaceutical prescription.

9. The wireless handheld device of claim 6, said downloading of data comprising downloading electronic insurance data.

10. The wireless handheld device of claim 6, said downloading of data comprising downloading an electronic representation of electronic cash.

11. A wireless handheld device for interacting with a content host computer system and with point-of-authorization-use devices for at least one merchant, for executing a mobile transaction, said wireless handheld device comprising:
   a computer-accessible data storage device adapted for storing data;
   a user input device;
   a biometric data reading device adapted for reading biometric data of a user that is using the wireless handheld device;
   an executable memory storage device adapted for storing executable program instructions, the executable memory storage device encoded with a first set of executable computer program instructions, a second set of executable computer program instructions, a third set of executable computer program instructions, and a fourth set of executable computer program instructions;
   a microprocessor programmed for executing the first set of executable computer program instructions, the second set of executable computer program instructions, the third set of executable computer program instructions, and the fourth set of executable computer program instructions;
   wireless communication hardware adapted for wireless communications;
   short-range wireless communication hardware adapted for communications using wireless short-range communication protocols;
   said microprocessor, executing the first set of executable computer program instructions:
      automatically obtains biometric data from the user that is using the wireless handheld device through said biometric data reading device,
      validates the biometric data with biometric data stored in the computer-accessible data storage device, and
      requires an authorization from the wireless handheld device based on said validating the biometric data before proceeding with executing the second and third sets of executable computer program instructions;
   said microprocessor, executing the second set of executable computer program instructions, accesses a content host computer device using wireless communications according to a user input through said user input device of an indication of said Internet-accessible address; and said microprocessor, executing the third set of executable computer program instructions:
- interacts according to user input with the content host computer device using wireless communications to identify a particular authorization certificate redeemable with a particular merchant,
- pays for the particular authorization certificate,
- downloads the particular authorization certificate, and
- activates a communication by said content host computer device to a content provider computer device of confirmation data comprising security information and said particular authorization certificate, said content provider computer system being accessible by point-of-authorization-use devices for said particular merchant;

said microprocessor, executing the fourth set of executable computer program instructions in response to a request of the user, communicates said particular authorization certificate and redemption security information using said short-range wireless communication hardware of the wireless handheld device to a short range wireless interface of a point-of-authorization-use device for said particular merchant.

12. The wireless handheld device of claim 11, said wireless handheld device further comprising a fifth set of executable computer program instructions for sending the content host computer device security information for validation before proceeding with executing said third set of executable computer program instructions.

13. The wireless handheld device of claim 11, said downloading said electronic authorization comprising downloading an electronic ticket.

14. The wireless handheld device of claim 11, said downloading said electronic authorization comprising downloading an electronic pharmaceutical prescription.

15. The wireless handheld device of claim 11, said downloading said electronic authorization comprising downloading electronic insurance data.

16. The wireless handheld device of claim 11, said downloading said electronic authorization comprising downloading electronic cash.

* * * * *